(12) United States Patent
Cheng et al.

(10) Patent No.: US 12,271,001 B2
(45) Date of Patent: Apr. 8, 2025

(54) METHODS, DEVICES, AND SYSTEMS FOR ILLUMINATING SPATIAL LIGHT MODULATORS

(71) Applicant: Magic Leap, Inc., Plantation, FL (US)

(72) Inventors: Hui-Chuan Cheng, Cooper City, FL (US); Hyunsun Chung, Escondido, CA (US); Jahja I. Trisnadi, Cupertino, CA (US); Clinton Carlisle, Parkland, FL (US); Kevin Richard Curtis, Boulder, CO (US); Chulwoo Oh, Sammamish, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/470,801

(22) Filed: Sep. 20, 2023

(65) Prior Publication Data

US 2024/0012251 A1 Jan. 11, 2024

Related U.S. Application Data

(63) Continuation of application No. 17/456,083, filed on Nov. 22, 2021, now Pat. No. 11,835,723, which is a
(Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/3016* (2013.01); *G02B 6/0076* (2013.01);
(Continued)

(58) Field of Classification Search
None
See application file for complete search history.

(56) References Cited

U.S. PATENT DOCUMENTS 3,981,009 A 9/1976 Bishop
5,032,007 A 7/1991 Silverstein et al.
(Continued)

FOREIGN PATENT DOCUMENTS

JP H08136856 A 5/1996
JP 2000162576 A 6/2000
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Lunyi Lao
*Assistant Examiner* — Sarvesh J Nadkarni
(74) *Attorney, Agent, or Firm* — Tobias Intellectual Property Law, PLLC

(57) ABSTRACT

An optical device may include a light turning element. The optical device can include a first surface that is parallel to a horizontal axis and a second surface opposite to the first surface. The optical device may include a light module that includes a plurality of light emitters. The light module can be configured to combine light for the plurality of emitters. The optical device can further include a light input surface that is between the first and the second surfaces and is disposed with respect to the light module to receive light emitted from the plurality of emitters. The optical device may include an end reflector that is disposed on a side opposite the light input surface. The second surface may be inclined such that a height of the light input surface is less than a height of the side opposite the light input surface. The light coupled into the light turning element may be reflected by the end reflector and/or reflected from the second surface towards the first surface.

16 Claims, 46 Drawing Sheets

Related U.S. Application Data continuation of application No. 15/927,970, filed on Mar. 21, 2018, now Pat. No. 11,187,900.

(60) Provisional application No. 62/474,591, filed on Mar. 21, 2017.

(51) Int. Cl.

| | | |
|---|---|---|
| G02B 5/30 | (2006.01) | |
| G02B 27/00 | (2006.01) | |
| G02B 27/14 | (2006.01) | |
| G02B 30/26 | (2020.01) | |
| G02B 30/52 | (2020.01) | |
| G02F 1/137 | (2006.01) | |
| G03B 21/00 | (2006.01) | |
| G03B 21/20 | (2006.01) | |
| G06F 3/01 | (2006.01) | |
| G06F 3/0482 | (2013.01) | |
| G06T 19/00 | (2011.01) | |
| G06V 20/20 | (2022.01) | |
| G09G 3/02 | (2006.01) | |
| G09G 3/24 | (2006.01) | |
| H04N 13/00 | (2018.01) | |
| H04N 13/239 | (2018.01) | |
| H04N 13/279 | (2018.01) | |
| H04N 13/344 | (2018.01) | |

(52) U.S. Cl.
CPC ..... *G02B 27/0093* (2013.01); *G02B 27/0103* (2013.01); *G02B 27/141* (2013.01); *G02B 30/26* (2020.01); *G02F 1/137* (2013.01); *G03B 21/00* (2013.01); *G06F 3/012* (2013.01); *G06T 19/00* (2013.01); *G09G 3/24* (2013.01); *G02B 6/005* (2013.01); *G02B 2027/0123* (2013.01); *G02B 2027/0134* (2013.01); *G02B 2027/0138* (2013.01); *G02B 2027/014* (2013.01); *G02B 2027/0174* (2013.01); *G02B 27/0176* (2013.01); *G02B 2027/0178* (2013.01); *G02B 2027/0187* (2013.01); *G02B 30/52* (2020.01); *G03B 21/208* (2013.01); *G06F 3/013* (2013.01); *G06F 3/0482* (2013.01); *G06T 19/006* (2013.01); *G06V 20/20* (2022.01); *G09G 3/025* (2013.01); *H04N 2013/0081* (2013.01); *H04N 13/239* (2018.05); *H04N 13/279* (2018.05); *H04N 13/344* (2018.05)

(56) References Cited

U.S. PATENT DOCUMENTS

| | | | |
|---|---|---|---|
| 5,617,227 | A | 4/1997 | Tocnaye et al. |
| 5,751,388 | A | 5/1998 | Larson |
| 5,896,232 | A | 4/1999 | Budd et al. |
| 6,239,851 | B1 | 5/2001 | Hatazawa et al. |
| 6,513,937 | B1 | 2/2003 | Dehmlow |
| 6,850,221 | B1 | 2/2005 | Tickle |
| 6,850,352 | B1 | 2/2005 | Childers |
| 7,110,054 | B2 | 9/2006 | Jurg |
| 7,213,958 | B2 | 5/2007 | Ouderkirk et al. |
| 7,360,899 | B2 | 4/2008 | McGuire, Jr. et al. |
| 7,667,788 | B2 | 2/2010 | Lee et al. |
| 8,248,458 | B2 | 8/2012 | Schowengerdt et al. |
| 8,638,499 | B2 | 1/2014 | Mukawa |
| 8,950,867 | B2 | 2/2015 | Macnamara |
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,523,852 | B1 | 12/2016 | Brown et al. |
| 9,671,566 | B2 | 6/2017 | Abovitz et al. |
| 9,720,232 | B2 | 8/2017 | Hua et al. |
| 9,740,006 | B2 | 8/2017 | Gao |
| 9,791,700 | B2 | 10/2017 | Schowengerdt |
| 9,874,749 | B2 | 1/2018 | Bradski et al. |
| 10,564,533 | B2 | 2/2020 | Trisnadi et al. |
| 11,029,590 | B2 | 6/2021 | Trisnadi et al. |
| 11,187,900 | B2 | 11/2021 | Cheng et al. |
| 11,480,861 | B2 | 10/2022 | Trisnadi et al. |
| 11,567,320 | B2 | 1/2023 | Cheng et al. |
| 2002/0021498 | A1 | 2/2002 | Ohtaka et al. |
| 2002/0110320 | A1 | 8/2002 | Carlisle et al. |
| 2002/0172237 | A1 | 11/2002 | Murry et al. |
| 2003/0016335 | A1 | 1/2003 | Penn |
| 2003/0038923 | A1 | 2/2003 | Aastuen et al. |
| 2003/0058383 | A1 | 3/2003 | Jagt et al. |
| 2003/0067760 | A1 | 4/2003 | Jagt et al. |
| 2003/0147055 | A1 | 8/2003 | Yokoyama |
| 2003/0210214 | A1 | 11/2003 | Masazumi et al. |
| 2003/0231260 | A1 | 12/2003 | Pate et al. |
| 2004/0061916 | A1 | 4/2004 | Kuba |
| 2004/0080938 | A1 | 4/2004 | Holman et al. |
| 2004/0263732 | A1 | 12/2004 | Jurg |
| 2005/0162725 | A1 | 7/2005 | Childers |
| 2005/0232530 | A1 | 10/2005 | Kekas |
| 2005/0275808 | A1 | 12/2005 | Hashizume et al. |
| 2006/0028436 | A1 | 2/2006 | Armstrong |
| 2006/0050374 | A1 | 3/2006 | Slinger |
| 2006/0152681 | A1 | 7/2006 | Yamakawa et al. |
| 2006/0164607 | A1 | 7/2006 | Morejon et al. |
| 2006/0268421 | A1* | 11/2006 | Shimizu .......... G02B 5/32 359/630 |
| 2007/0030456 | A1 | 2/2007 | Duncan et al. |
| 2007/0052882 | A1 | 3/2007 | Hwang et al. |
| 2007/0081123 | A1 | 4/2007 | Lewis |
| 2007/0140616 | A1 | 6/2007 | Sugita et al. |
| 2007/0177275 | A1 | 8/2007 | McGuire |
| 2007/0263139 | A1 | 11/2007 | Hwang et al. |
| 2008/0062351 | A1 | 3/2008 | Handschy et al. |
| 2008/0123168 | A1 | 5/2008 | Maeda et al. |
| 2008/0174994 | A1 | 7/2008 | Liao et al. |
| 2008/0205077 | A1 | 8/2008 | Lenderink et al. |
| 2008/0212191 | A1 | 9/2008 | Harle et al. |
| 2008/0278691 | A1 | 11/2008 | Willemsen et al. |
| 2009/0103155 | A1 | 4/2009 | Shirai et al. |
| 2009/0135376 | A1 | 5/2009 | Itoh et al. |
| 2009/0161031 | A1 | 6/2009 | Kaise |
| 2009/0161076 | A1 | 6/2009 | Chen et al. |
| 2009/0168393 | A1 | 7/2009 | Chung et al. |
| 2009/0185274 | A1 | 7/2009 | Shpunt |
| 2009/0195729 | A1* | 8/2009 | Little .......... G02B 6/0056 349/64 |
| 2009/0284965 | A1 | 11/2009 | Zheng et al. |
| 2010/0014141 | A1 | 1/2010 | Lapchuk et al. |
| 2010/0014718 | A1 | 1/2010 | Savvides et al. |
| 2010/0020080 | A1 | 1/2010 | Iwanaga |
| 2010/0023476 | A1 | 1/2010 | Cannon et al. |
| 2010/0039796 | A1 | 2/2010 | Mukawa |
| 2010/0110340 | A1 | 5/2010 | Mather et al. |
| 2010/0157200 | A1 | 6/2010 | Mun et al. |
| 2010/0302798 | A1 | 12/2010 | Papakonstantinou et al. |
| 2011/0044582 | A1 | 2/2011 | Travis et al. |
| 2011/0075259 | A1 | 3/2011 | Shpunt |
| 2011/0044579 | A1 | 6/2011 | Travis et al. |
| 2011/0228562 | A1* | 9/2011 | Travis .......... G02B 27/30 362/628 |
| 2012/0038892 | A1 | 2/2012 | Kurtz et al. |
| 2012/0127062 | A1 | 5/2012 | Bar-Zeev et al. |
| 2012/0147334 | A1 | 6/2012 | Mizushima et al. |
| 2012/0162549 | A1 | 6/2012 | Gao et al. |
| 2012/0235883 | A1 | 9/2012 | Border et al. |
| 2013/0016292 | A1 | 1/2013 | Miao et al. |
| 2013/0038838 | A1 | 2/2013 | Ferri |
| 2013/0051730 | A1 | 2/2013 | Travers et al. |
| 2013/0082922 | A1 | 4/2013 | Miller |
| 2013/0117377 | A1 | 5/2013 | Miller |
| 2013/0125027 | A1 | 5/2013 | Abovitz |

(56) References Cited

U.S. PATENT DOCUMENTS

| | | |
|---|---|---|
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0226134 A1 | 8/2014 | Seetzen et al. |
| 2014/0267420 A1 | 9/2014 | Schowengerdt et al. |
| 2014/0306866 A1 | 10/2014 | Miller et al. |
| 2014/0347883 A1 | 11/2014 | Liu et al. |
| 2014/0361957 A1 | 12/2014 | Hua et al. |
| 2015/0015879 A1* | 1/2015 | Papadopoulos ......... G02F 1/011 356/301 |
| 2015/0016777 A1 | 1/2015 | Abovitz et al. |
| 2015/0023012 A1 | 1/2015 | Yang et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234254 A1 | 8/2015 | Schowengerdt |
| 2015/0235473 A1 | 8/2015 | Schowengerdt |
| 2015/0268415 A1 | 9/2015 | Schowengerdt et al. |
| 2015/0279114 A1 | 10/2015 | Yonekubo |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0018645 A1 | 1/2016 | Haddick et al. |
| 2016/0026253 A1 | 1/2016 | Bradski et al. |
| 2016/0033698 A1 | 2/2016 | Escuti et al. |
| 2016/0054623 A1 | 2/2016 | Maeda et al. |
| 2016/0161739 A1 | 6/2016 | Large |
| 2016/0202484 A1 | 7/2016 | Ouderkirk |
| 2016/0209656 A1 | 7/2016 | Urey |
| 2016/0209657 A1 | 7/2016 | Popovich et al. |
| 2016/0223736 A1 | 8/2016 | Karakawa et al. |
| 2016/0341873 A1 | 11/2016 | Kaehler |
| 2016/0349508 A1 | 12/2016 | Horikawa |
| 2017/0010488 A1 | 1/2017 | Klug et al. |
| 2017/0153866 A1 | 6/2017 | Grinberg et al. |
| 2017/0313032 A1 | 11/2017 | Arndt et al. |
| 2017/0315358 A1 | 11/2017 | Masuda |
| 2017/0373459 A1 | 12/2017 | Weng et al. |
| 2018/0045902 A1 | 2/2018 | Lee et al. |
| 2018/0205875 A1 | 7/2018 | Nakamaru |
| 2018/0245763 A1 | 8/2018 | Oshima et al. |
| 2018/0284585 A1 | 10/2018 | Trisnadi et al. |
| 2018/0335629 A1 | 11/2018 | Cheng et al. |
| 2018/0348524 A1 | 12/2018 | Blum et al. |
| 2019/0018245 A1 | 1/2019 | Cheng et al. |
| 2019/0094549 A1 | 3/2019 | Nicholson et al. |
| 2020/0096767 A1 | 3/2020 | Basset et al. |
| 2020/0209727 A1 | 7/2020 | Trisnadi et al. |
| 2021/0109433 A1 | 4/2021 | Trisnadi et al. |
| 2022/0082837 A1 | 3/2022 | Cheng et al. |

FOREIGN PATENT DOCUMENTS

| | | |
|---|---|---|
| JP | 2001066434 A | 3/2001 |
| JP | 2001117045 A | 4/2001 |
| JP | 2001305477 A | 10/2001 |
| JP | 2002228971 A | 8/2002 |
| JP | 2004110062 A | 4/2004 |
| JP | 2004126203 A | 4/2004 |
| JP | 2004271719 A | 9/2004 |
| JP | 2005276734 A | 10/2005 |
| JP | 2006019141 A | 1/2006 |
| JP | 2006208894 A | 8/2006 |
| JP | 2004126283 A | 8/2008 |
| JP | 2006208895 A | 8/2008 |
| JP | 2008249876 A | 10/2008 |
| JP | 2009070643 A | 4/2009 |
| JP | 2010528432 A | 8/2010 |
| JP | 2010250302 A | 11/2010 |
| JP | 2011002778 A | 1/2011 |
| JP | 2011028008 A | 2/2011 |
| JP | 2011192643 A | 9/2011 |
| JP | 2008191466 A | 5/2012 |
| JP | 2007033669 A | 7/2012 |
| JP | 2012181487 A | 9/2012 |
| JP | 2007011279 A | 6/2013 |
| JP | 2009180999 A | 7/2013 |
| JP | 2013530412 A | 7/2013 |
| JP | 2014048377 A | 3/2014 |
| JP | 2014081481 A | 5/2014 |
| JP | 2015145973 A | 8/2015 |
| JP | 2016099494 A | 5/2016 |
| WO | 2008016900 A1 | 2/2008 |
| WO | 2011073673 A1 | 6/2011 |
| WO | 2013049248 A2 | 4/2013 |
| WO | 2014006935 A1 | 1/2014 |
| WO | 2016205256 A1 | 12/2016 |
| WO | 2018175627 A1 | 9/2018 |
| WO | 2018175649 A1 | 9/2018 |
| WO | 2018175652 A1 | 9/2018 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP18772476.0 Examination Report dated Feb. 1, 2023.

EP23189010.4 Extended European Search Report dated Nov. 6, 2023.

International Preliminary Report on Patentability for PCT Application No. PCT/US2018/023647, dated Sep. 24, 2019.

International Preliminary Report on Patentability, re PCT Application No. PCT/US2018/023651, dated Sep. 24, 2019.

International Search Report and Written Opinion for PCT Application No. PCT/US2018/023647, dated Jun. 11, 2018.

International Search Report and Written Opinion, re PCT Application No. PCT/US2018/023651, dated Jul. 20, 2018.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

JP2022-71543 Office Action May 19, 2023.

KR2019-7030658 Office Action dated Jun. 26, 2023.

KR2023-7030932 Office Action dated Oct. 8, 08 2023.

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

JP2023-43328 Office Action mailed Apr. 18, 2024.

* cited by examiner

METHODS, DEVICES, AND SYSTEMS FOR ILLUMINATING SPATIAL LIGHT MODULATORS

PRIORITY CLAIM

This application is a continuation of U.S. patent application Ser. No. 17/456,083, filed on Nov. 22, 2021, which is a continuation of U.S. patent application Ser. No. 15/927,970, filed on Mar. 21, 2018, which claims the benefit of priority under 35 U.S.C. § 119(e) to U.S. Provisional Patent Application No. 62/474,591, filed on Mar. 21, 2017. The entire contents of each of the applications recited in this paragraph are hereby incorporated by reference into this application.

BACKGROUND

Field

The present disclosure relates to optical devices, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

Polarizing beam splitters may be used in display systems to direct polarized light to light modulators and then to direct this light to a viewer. There is a continuing demand to reduce the sizes of display systems generally and, as a result, there is also a demand to reduce the sizes of the constituent parts of the display systems, including constituent parts utilizing polarizing beam splitters.

SUMMARY

Various implementations described herein includes an illuminating system configured to provide illumination (e.g., a front light or a back light) to one or more spatial light modulators (e.g., liquid crystal on silicon (LCOS) devices). The illumination systems contemplated herein are configured to direct light having a first polarization state towards a spatial light modulator and direct light reflected from the spatial light modulator having a second polarization state different from the first polarization towards a viewer. The illumination systems contemplated herein can be configured as polarization beam splitting components having a reduced size.

A head mounted display system can be configured to project light to an eye of a user to display augmented reality image content in a vision field of the user. The head-mounted display system may include a frame that is configured to be supported on a head of the user. The head-mounted display system may also include an eyepiece disposed on the frame. At least a portion of the eyepiece may be transparent and/or disposed at a location in front of the user's eye when the user wears the head-mounted display such that the transparent portion transmits light from the environment in front of the user to the user's eye to provide a view of the environment in front of the user. The eyepiece can include one or more waveguides disposed to direct light into the user's eye.

The head mounted display system may further include a light source that is configured to emit light and/or a wedge-shaped light turning element. The wedge-shaped light turning element may include a first surface that is parallel to an axis. The wedge-shaped light turning element can further include a second surface disposed opposite to the first surface and/or inclined with respect to the axis by a wedge angle α. A light input surface between the first and the second surfaces can be configured to receive light emitted from a light source. The wedge-shaped light turning element can include an end reflector that is disposed on a side opposite the light input surface. The second surface of the wedge-shaped light turning element may be inclined such that a height of the light input surface is less than a height of the end reflector opposite the light input surface and/or such that light coupled into the wedge-shaped light turning element is reflected by the end reflector and redirected by the second surface towards the first surface.

The head mounted display system may further include a spatial light modulator that is disposed with respect to the wedge-shaped light turning element to receive the light ejected from the wedge-shaped light turning element and modulate the light. The wedge-shaped light turning element and the spatial light modulator may be disposed with respect to the eyepiece to direct modulated light into the one or more waveguides of the eyepiece such that the modulated light is directed into the user's eye to form images therein.

An optical device comprising may include a wedge-shaped light turning element. The optical device can include a first surface that is parallel to a horizontal axis and a second surface opposite to the first surface that is inclined with respect to the horizontal axis by a wedge angle α. The optical device may include a light module that includes a plurality of light emitters. The light module can be configured to combine light for the plurality of emitters. The optical device can further include a light input surface that is between the first and the second surfaces and is disposed with respect to the light module to receive light emitted from the plurality of emitters. The optical device may include an end reflector that is disposed on a side opposite the light input surface. The second surface may be inclined such that a height of the light input surface is less than a height of the side opposite the light input surface. The light coupled into the wedge-shaped light turning element may be reflected by the end reflector and/or reflected from the second surface towards the first surface.

An illumination system can include a light source that is configured to emit light, and a polarization sensitive light turning element. The polarization sensitive light turning element can include a first surface disposed parallel to an axis and a second surface opposite to the first surface. The polarization sensitive light turning element may include a light input surface that is between the first and the second surfaces and is configured to receive light emitted from the light source. The polarization sensitive light turning element can further include an end reflector that is disposed on a side opposite the light input surface. The second surface of the polarization sensitive light turning element may be such that light coupled into the polarization sensitive light turning element is reflected by the end reflector and/or redirected by the second surface towards the first surface. The illumination system can further include a spatial light modulator that is disposed with respect to the polarization sensitive light turning element to receive the light ejected from the polarization sensitive light turning element and modulate the light.

BRIEF DESCRIPTION OF THE DRAWINGS

The drawings are provided to illustrate example embodiments and are not intended to limit the scope of the disclosure. Like reference numerals refer to like parts throughout.

DETAILED DESCRIPTION

Figure 1:
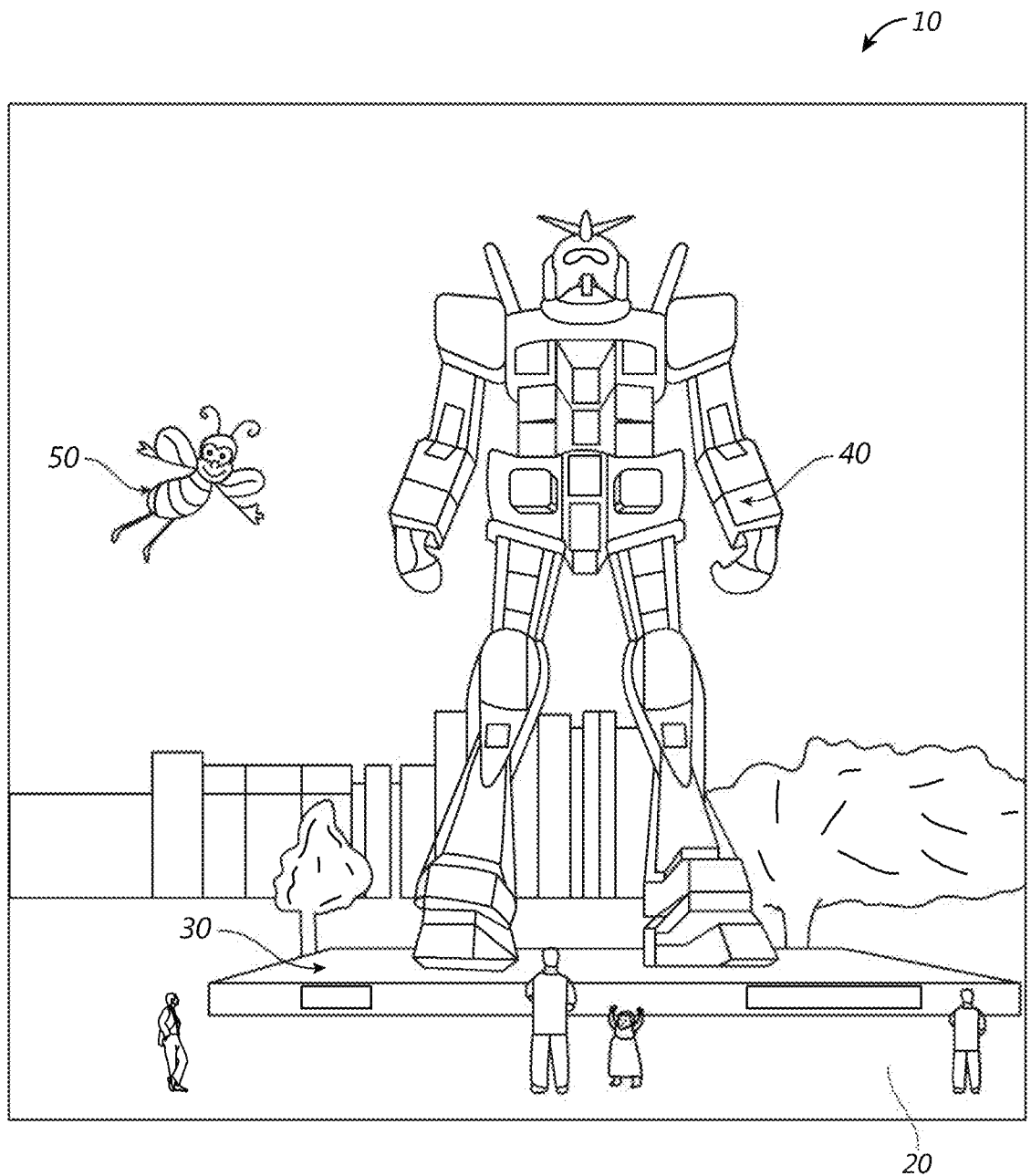
FIG. 1 illustrates a user's view of augmented reality (AR) through an AR device, according to some embodiments.

Display systems may in some cases employ spatial light modulators that modulate polarization states of light. Such spatial light modulators may include, for example, liquid crystal spatial light modulators such as liquid crystal on silicon (LCOS). Such spatial light modulators may include an array of individually activated pixels that may rotate or not rotate a polarization state, such as a linear polarization state, depending on a state of the pixel. For example, such a spatial light modulator may be illuminated with light having a linear polarization of a first orientation (e.g., s-polarized light). Depending on the state of the pixel (e.g., on or off), the spatial light modulator may or may not selectively rotate the light incident on that pixel having the linear polarization of the first orientation (s-polarized light) producing linearly polarized light having a second orientation (e.g., p-polarized light). A polarizer or analyzer may be used to filter out light of one of the polarization states thereby transforming the polarization modulation into intensity modulation that can form an image.

Since such spatial light modulators operate on linearly polarized light, certain illumination devices are configured to direct linearly polarized light to the spatial light modulators. More particularly, in some such examples, the spatial light modulators may be configured to receive light having a certain polarization state (e.g., s-polarization state).

Conventional illumination systems that are configured to provide illumination to spatial light modulators that are configured to modulate the polarization state of light may include polarizing beam splitters that are thick and bulky. It may be advantageous to reduce the size of polarizing beam splitters in illumination systems that provide illumination to spatial light modulators. These and other concepts are discussed below.

Reference will now be made to the figures, in which like reference numerals refer to like parts throughout.

Figure 2:
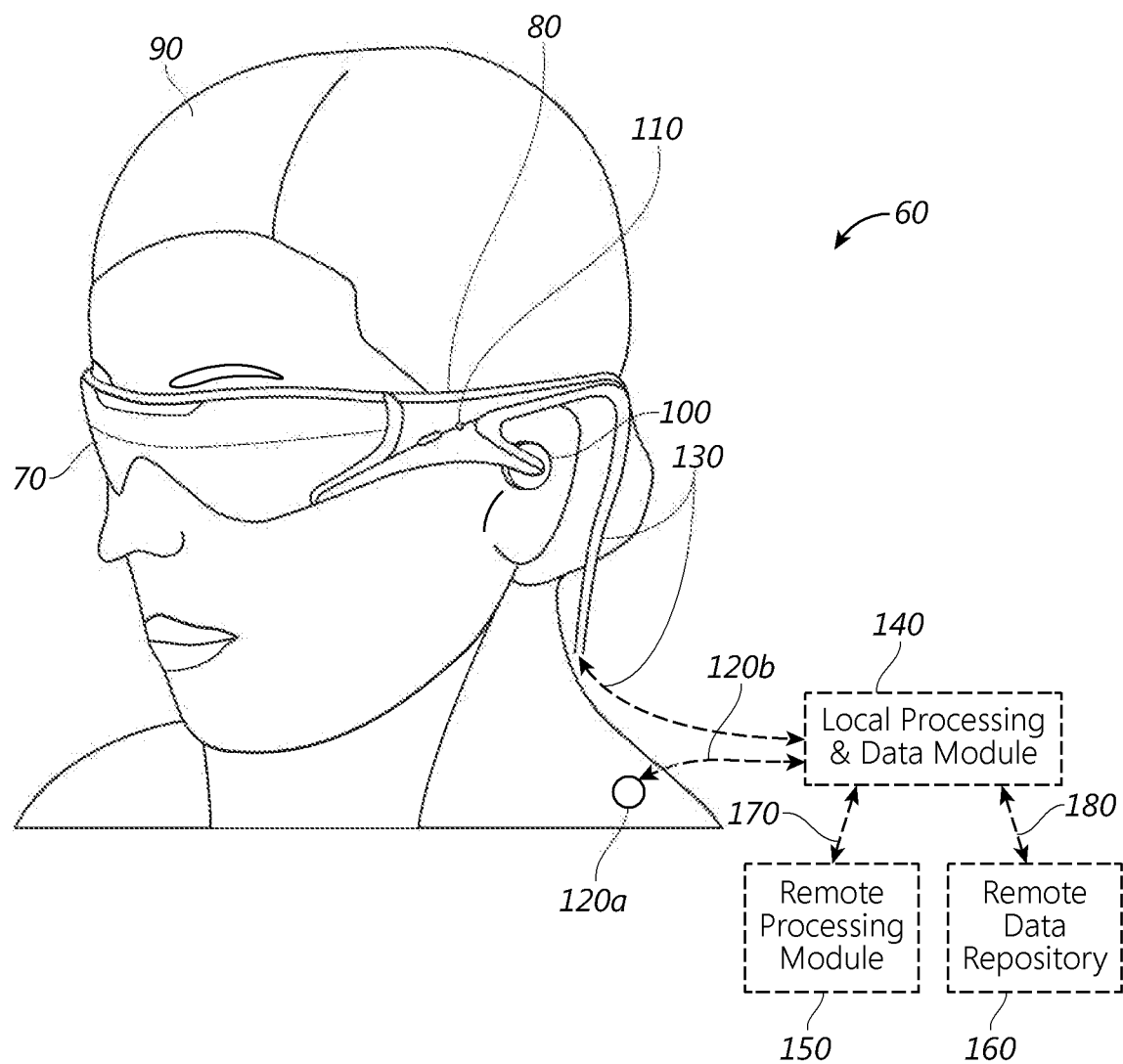
FIG. 2 illustrates an example of wearable display system, according to some embodiments.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
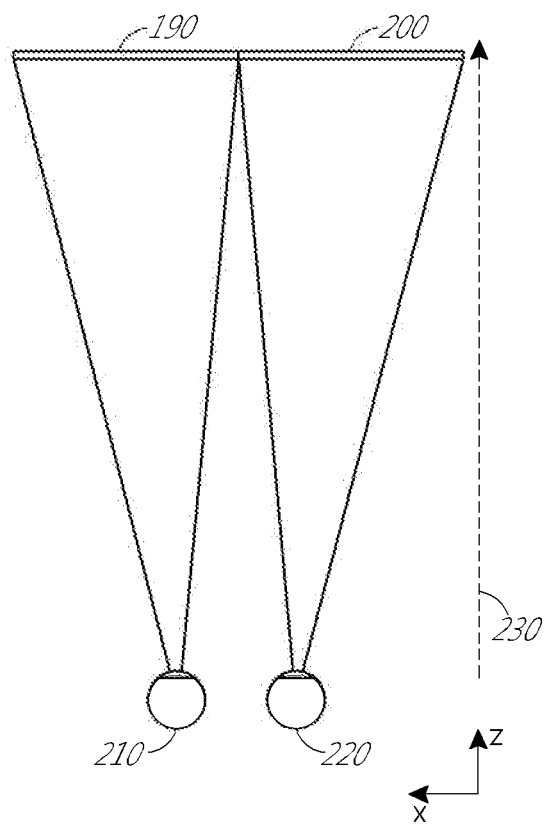
FIG. 3 illustrates a display system for simulating three-dimensional imagery for a user, according to some embodiments.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
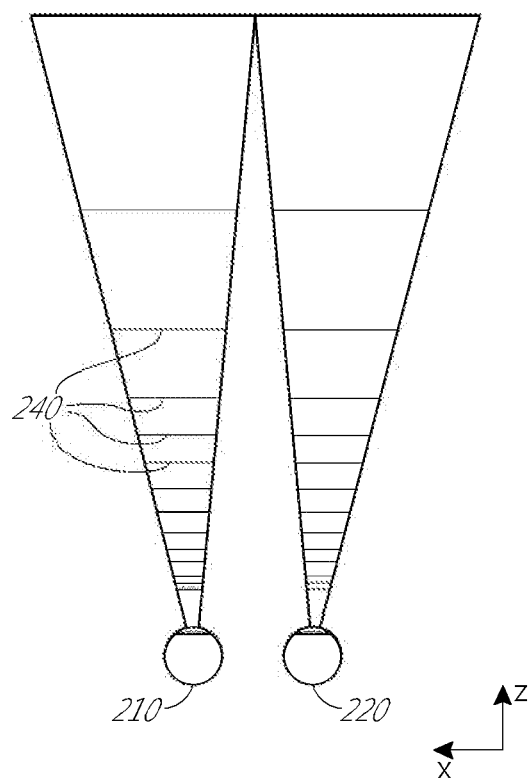
FIG. 4 illustrates aspects of an approach for simulating three-dimensional imagery using multiple depth planes, according to some embodiments.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
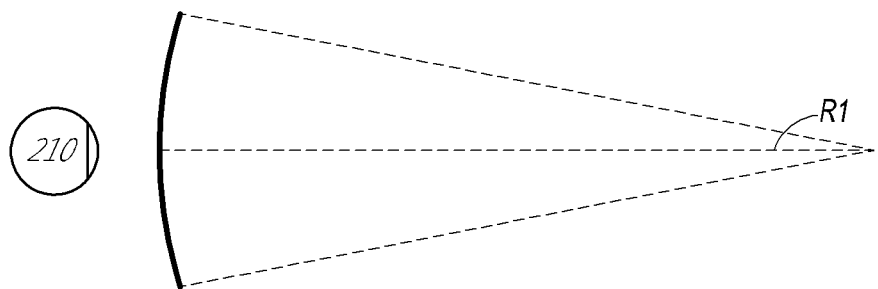
FIGS. 5A-5C illustrate relationships between radius of curvature and focal radius, according to some embodiments.
Figure 5B:
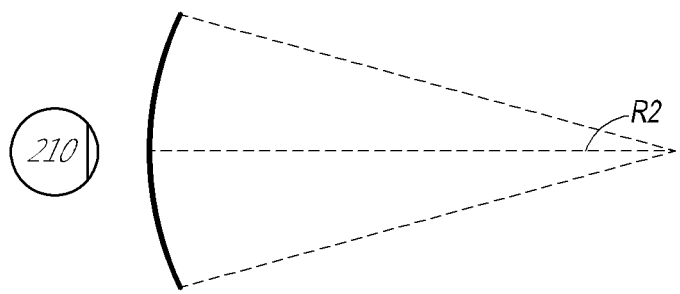
Figure 5C:
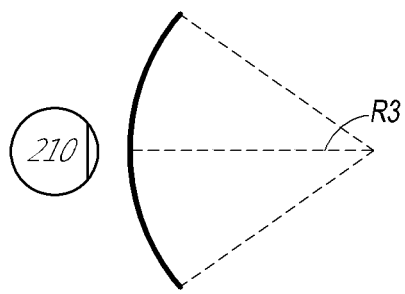

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
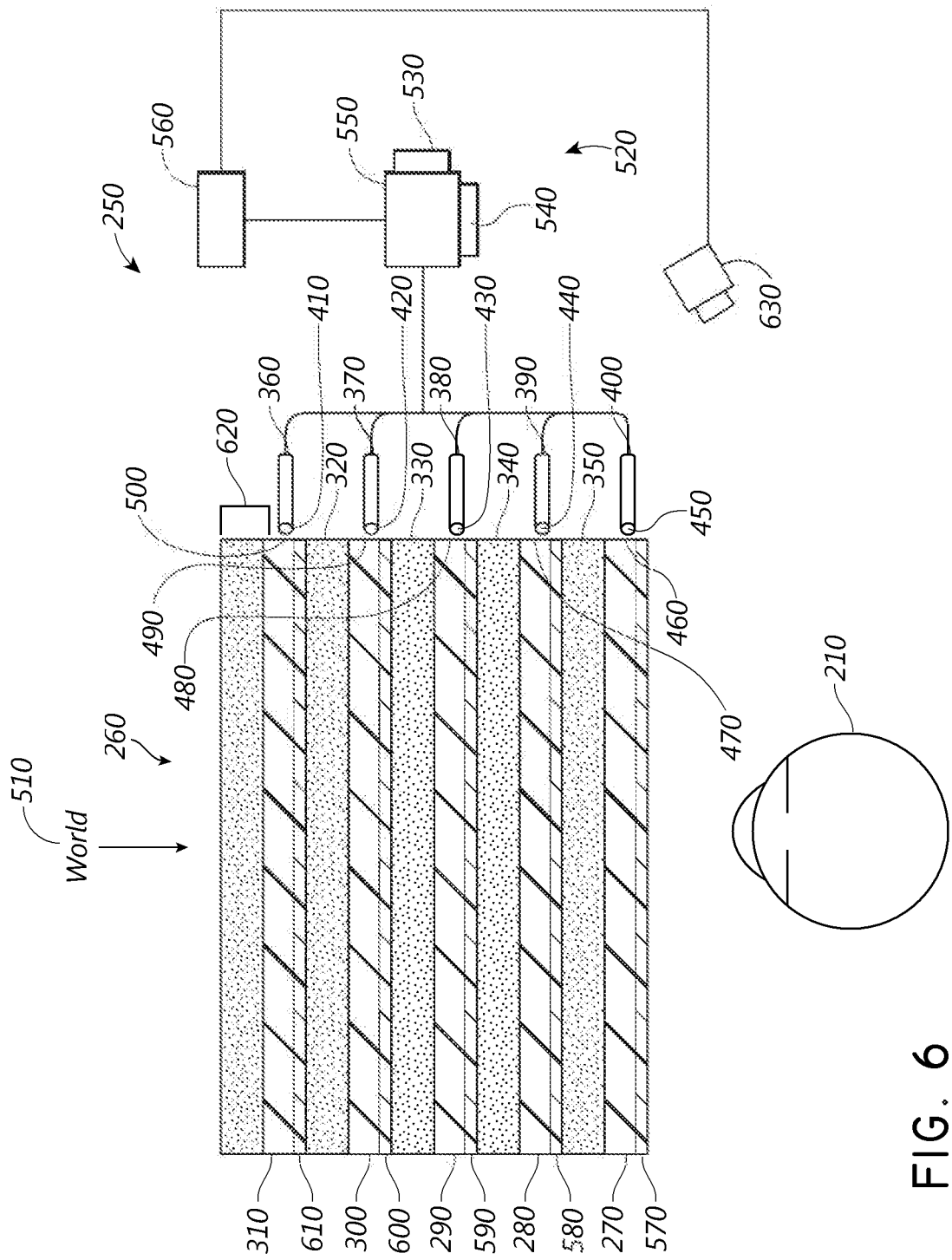
FIG. 6 illustrates an example of a waveguide stack for outputting image information to a user, according to some embodiments.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
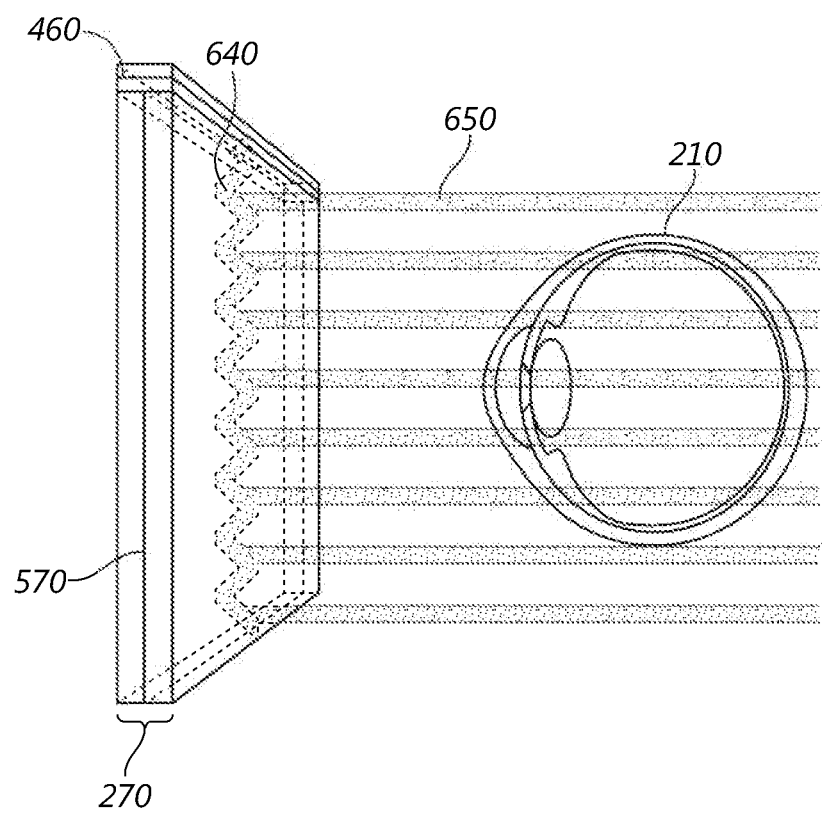
FIG. 7 illustrates an example of exit beams outputted by a waveguide, according to some embodiments.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
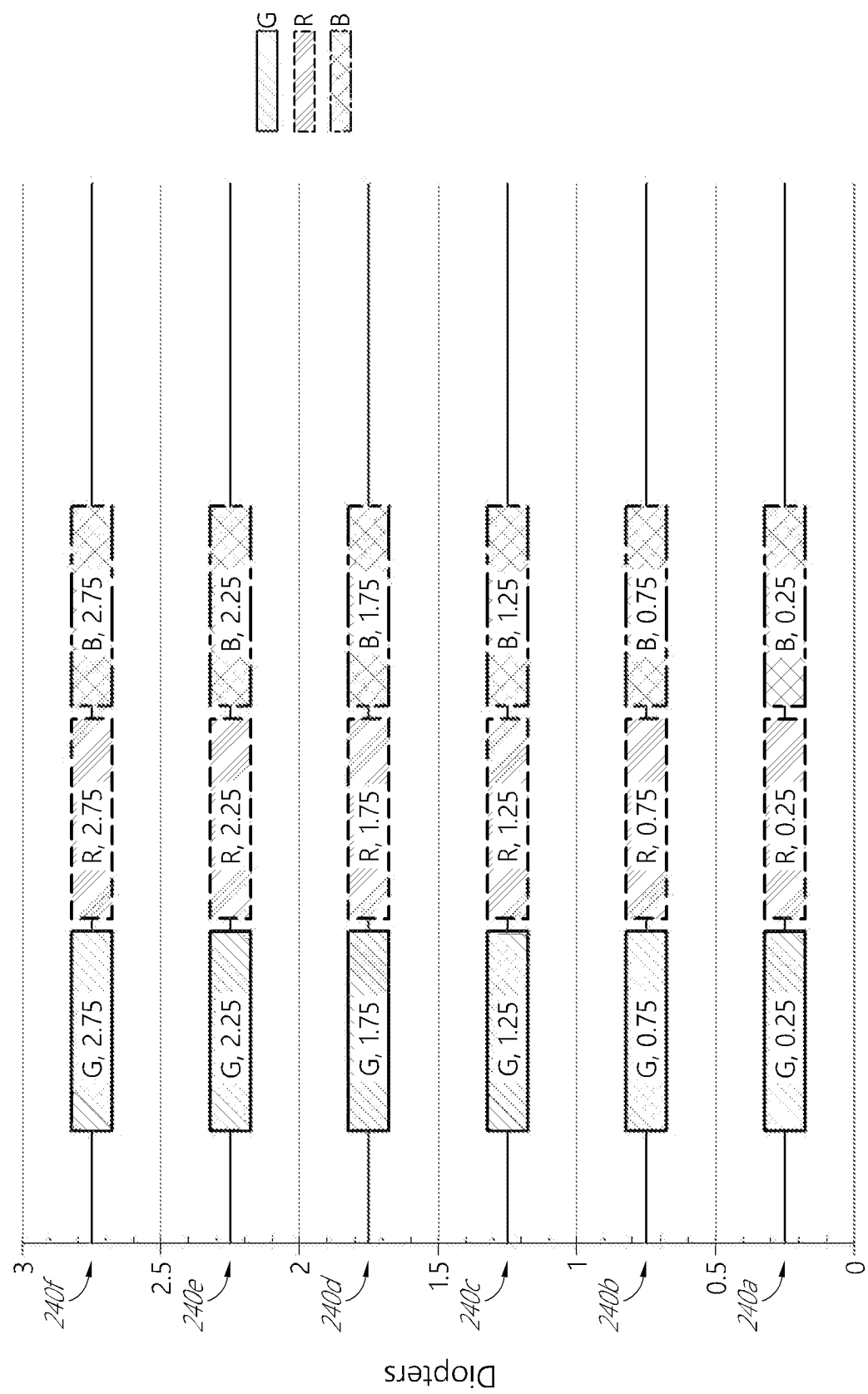
FIG. 8 illustrates an example of a stacked waveguide assembly in which each depth plane includes images formed using multiple different component colors, according to some embodiments.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
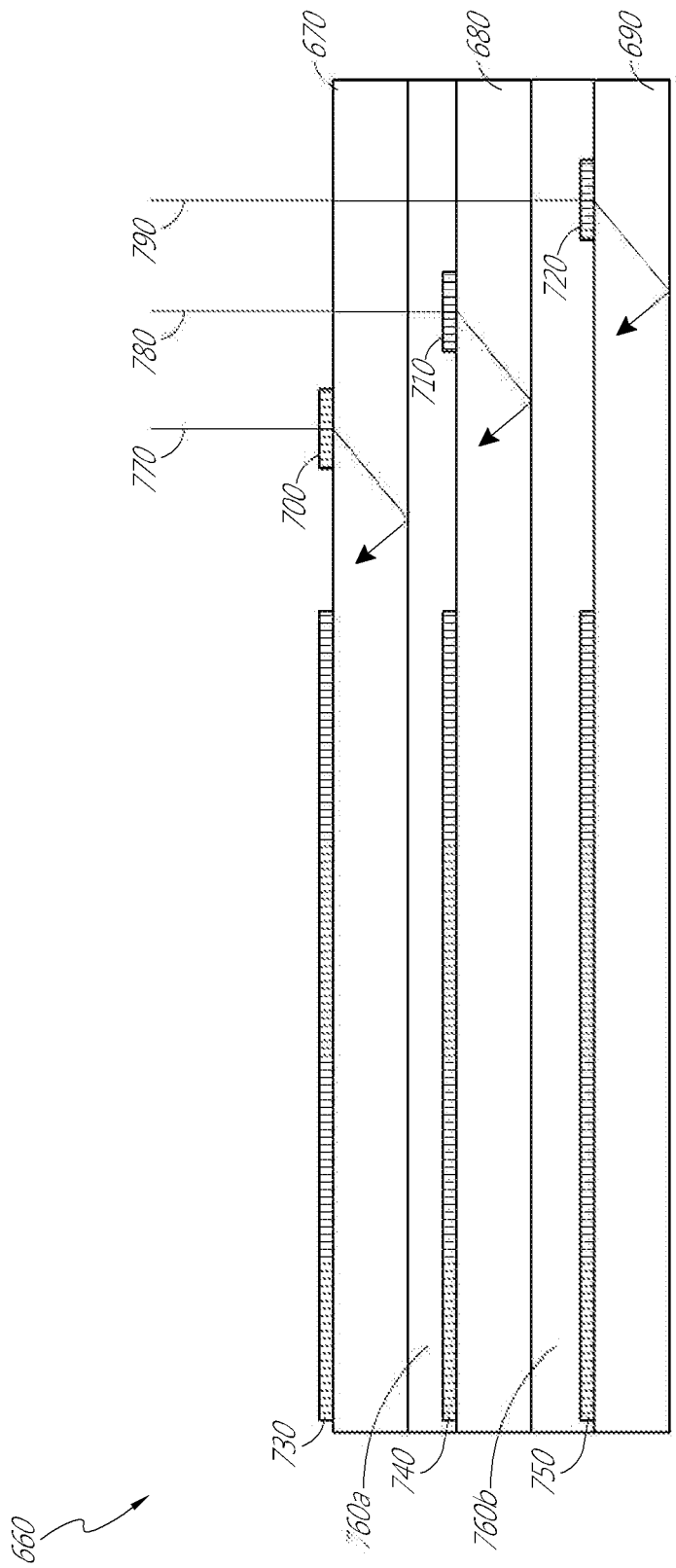
FIG. 9A illustrates a cross-sectional side view of an example of a set of stacked waveguides that each includes an incoupling optical element, according to some embodiments.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
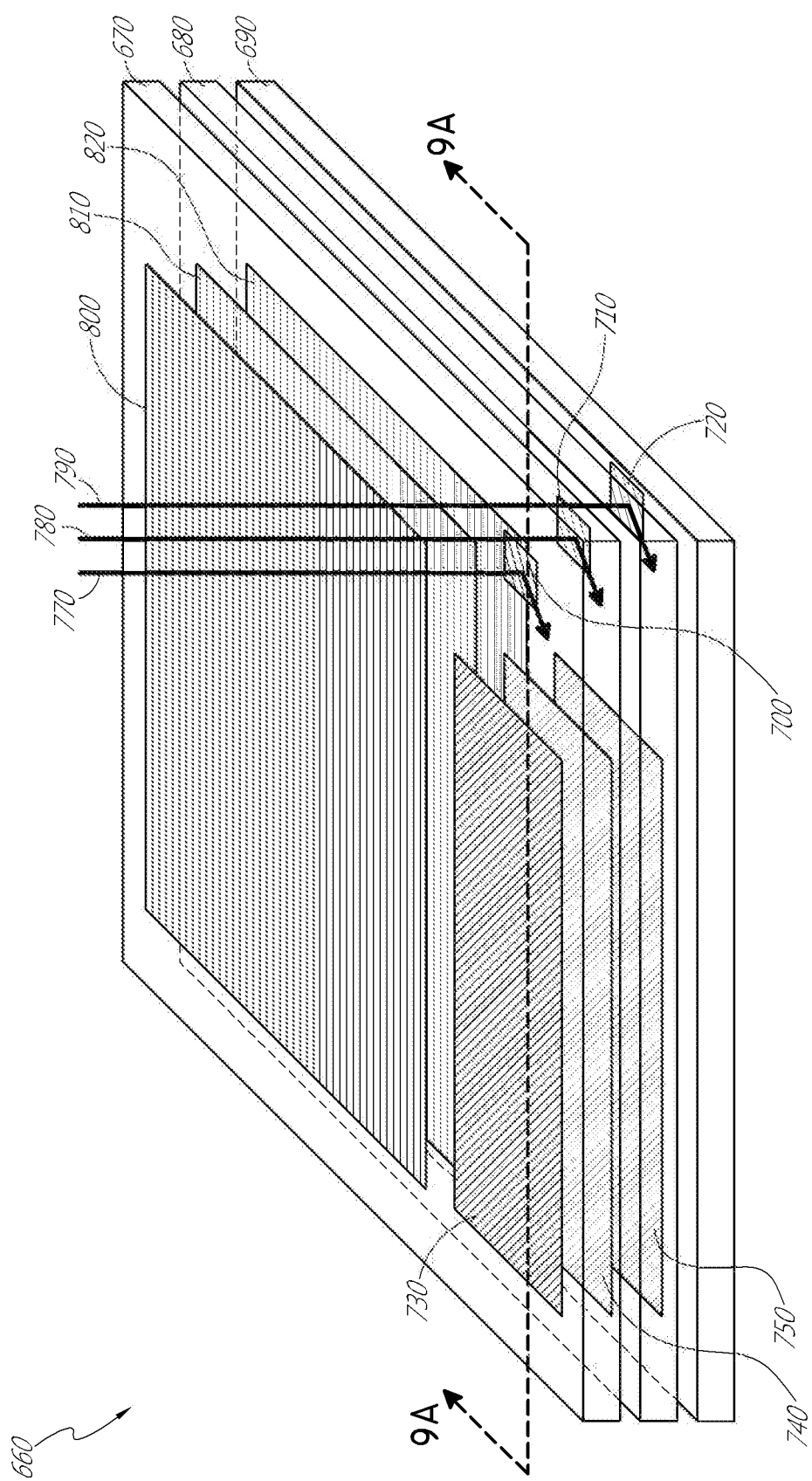
FIG. 9B illustrates a perspective view of an example of the set of stacked waveguides of FIG. 9A, according to some embodiments.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
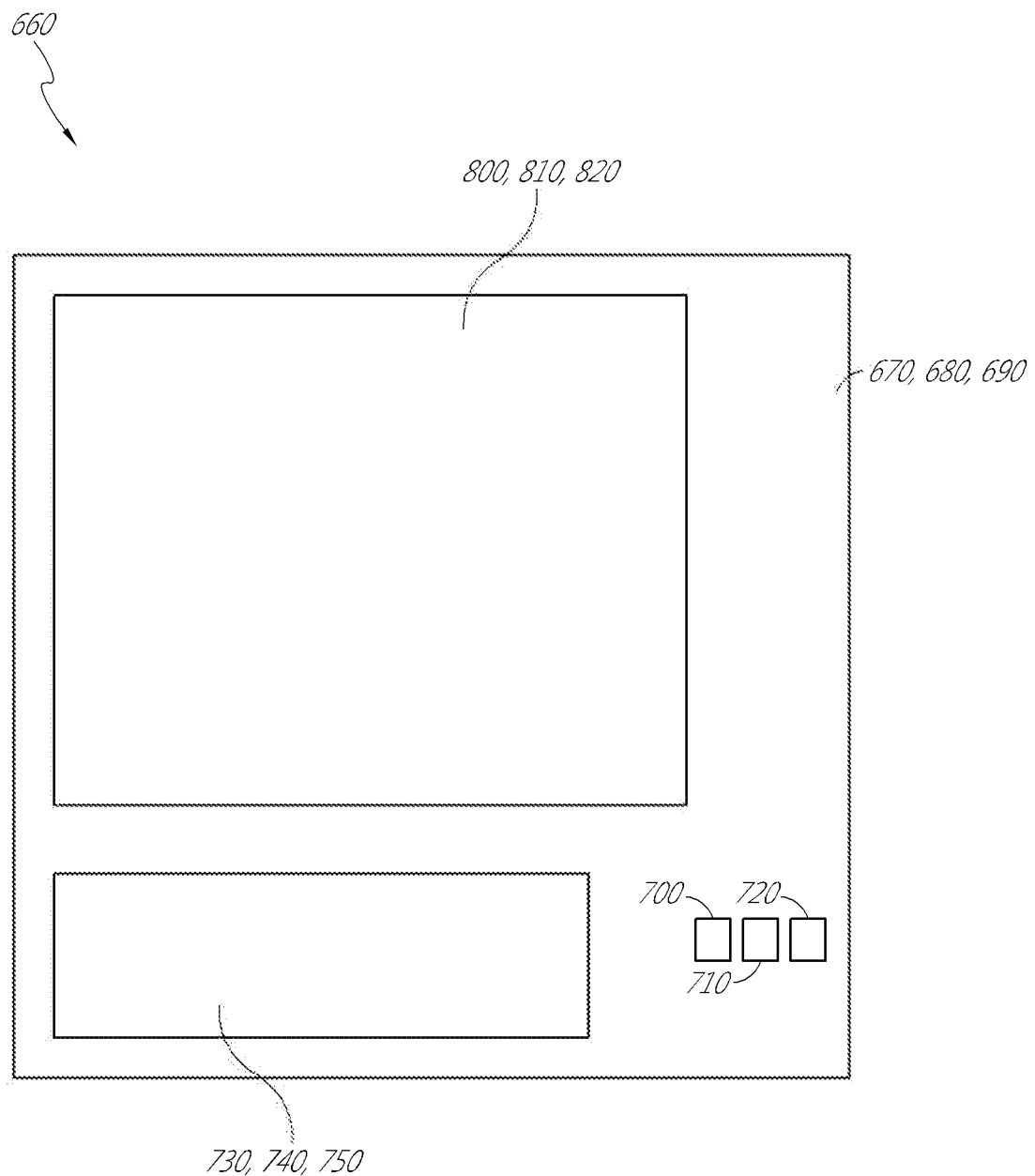
FIG. 9C illustrates a top-down plan view of an example of the set of stacked waveguides of FIGS. 9A and 9B, according to some embodiments.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Illumination Systems for Light Projections Systems

Figure 10:
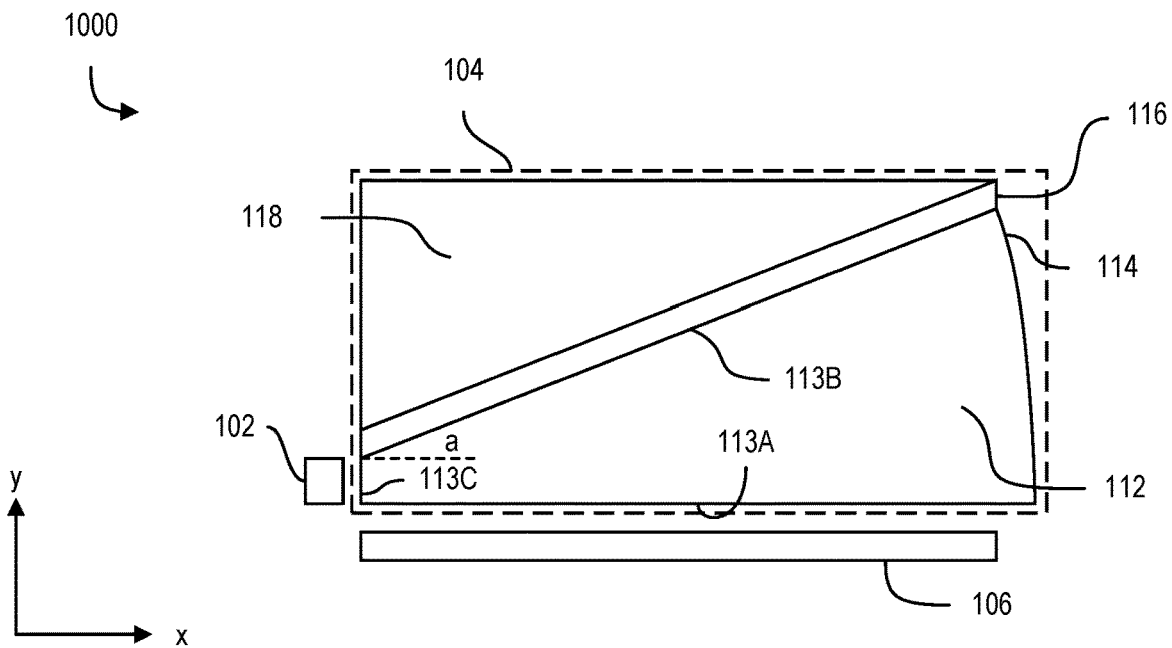
FIG. 10 schematically illustrates an example wedge illumination system, according to some embodiments.

FIG. 10 schematically illustrates an illumination system 1000, according to some embodiments. The illumination system 1000 includes an illumination module 102, a polarizing beam splitter 104 (hereinafter referred to as "PBS 104"), and a spatial light modulator 106 (hereinafter referred to as "SLM 106").

The illumination module 102 provides light to the PBS 104. The illumination module 102 is described in further detail in a section titled "Illumination Module" below.

The PBS 104 is configured to direct light having a first polarization state (e.g., s-polarization state) from the illumination module 102 toward the SLM 106, and transmit light modulated by the SLM 106 having a second polarization state (e.g., p-polarization state) towards a viewer. Transmitting light towards a view may include, for example, transmitting the light toward one or more waveguides (e.g., a waveguide stack). Additional details are disclosed herein, for example, with respect to FIG. 38 below. The first polarization state and the second polarization state may be orthogonal polarization states. The SLM 106 can extend along a horizontal axis parallel to an x-axis and also along a vertical axis parallel to a y-axis as well as along an orthogonal z-axis (into the paper). An optical axis of the illumination module 102 can be aligned parallel to the x-axis and light from the illumination module 102 can be emitted in a cone having a semi-angle less than about 60 degrees with respect to the optical axis of the illumination module 102. In some embodiments, angles outside this range are also possible.

The PBS 104 can be configured to be compact (e.g., low weight, low volume and/or spatial extent). In some embodiments, the PBS 104 can be configured to have a dimension (e.g., length, width, height, radius or any combination thereof) that is less than or equal to about 5 mm. In some embodiments, the PBS 104 can be configured to have a dimension (e.g., length, width, height, or radius any combination thereof) that is less than about 10 mm. In some embodiments, the PBS 104 can be configured to have a dimension (e.g., length, width, height, or radius any combination thereof) between about 2.0 mm and about 6.0 mm, between about 3.0 mm and about 5.0 mm, between about 3.5 mm and about 4.5 mm, or any value in these ranges/subranges or any range formed using any of these values.

The PBS 104 includes a light turning optical element or waveguide 112, a polarization sensitive reflector 116, and a refractive optical element 118.

The waveguide 112 may include optically transmissive material (e.g., plastic, glass, acrylic, etc.). The waveguide 112 includes a first surface 113A disposed over the SLM 106 and a second surface 113B opposite the first surface 113A, where the second surface 113B is in contact with the polarization sensitive reflector 116. In the implementation illustrated in FIG. 10 where the illumination system 1000 is configured as a front-lit illumination system, the waveguide 112 can be disposed at the bottom of the PBS 104 such that the first surface 113A forms a bottom surface of the PBS 104. The waveguide 112 further includes a light input surface 113C between the first surface 113A and the second surface 113B. The light input surface 113C is configured to receive light from the illumination module 102.

The waveguide 112 further includes an end reflector 114 disposed on a side opposite to the light input surface 113C. The end reflector 114 is configured to reflect light coupled into the waveguide 112 through the light input surface 113C. Some of the light coupled into the waveguide 112 through the light input surface 113C directly propagates to the end reflector 114, without, for example, being reflected off any other surface such as the first surface 113A or the second surface 113B. This light is reflected by the end reflector 114 towards the second surface 113B. Some of the light coupled into the waveguide 112 through the light input surface 113C reflects from the first surface 113A by the process of total internal reflection (TIR) prior to being reflected by the end reflector 114 towards the second surface 113B.

The end reflector 114 is configured to reflect light, for example, incident from the illumination module 102, such that the reflected light is redirected by the polarization sensitive reflector 116 along a direction substantially parallel to a normal (e.g., parallel to the y-axis) to a top surface of the SLM 106. For example, the end reflector 114 and the polarization sensitive reflector 116 can be configured to redirect light (e.g. the majority of light) from the illumination module 102 towards the SLM 106 in a cone between about ±10 degrees with respect to a normal to the surface of the SLM 106. The end reflector 114 can include a plastic or a glass material that forms part of the waveguide 112 that is coated with a reflective material (e.g., metal or dielectric). The end reflector 114 may include one or more dielectric layers such as a multilayer interference coating. The end reflector 114 can be adhered or molded to the side of the waveguide 112 opposite the light input surface 113C.

Figure 29A:
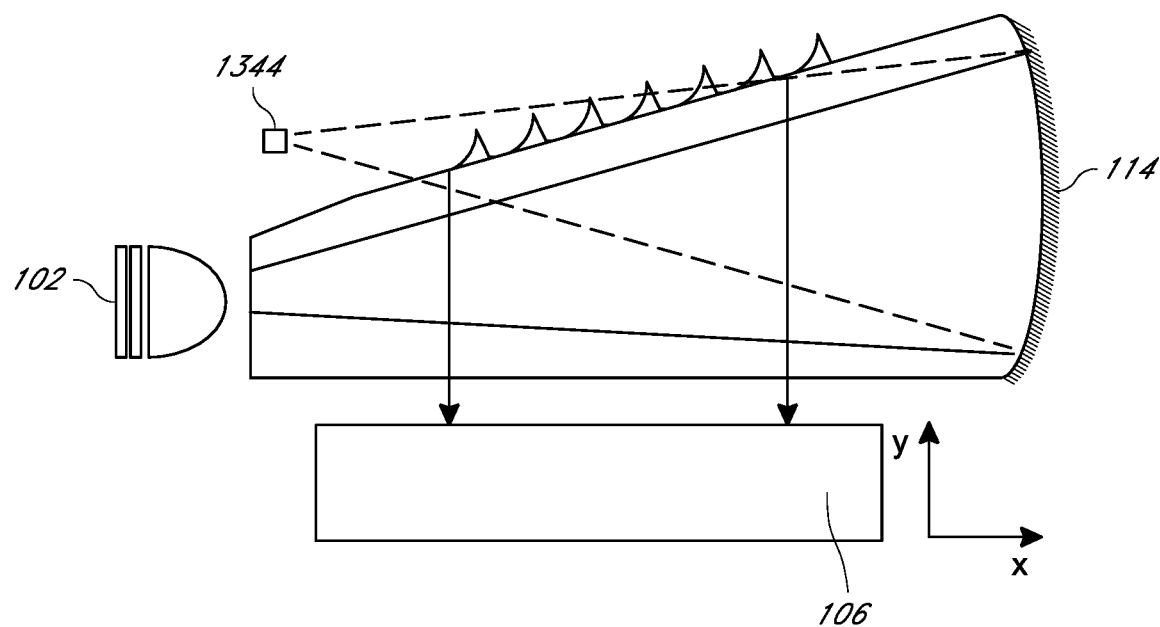
FIG. 29A illustrates an example implementation of the illumination system including turning features with optical power, according to some embodiments.
Figure 29B:
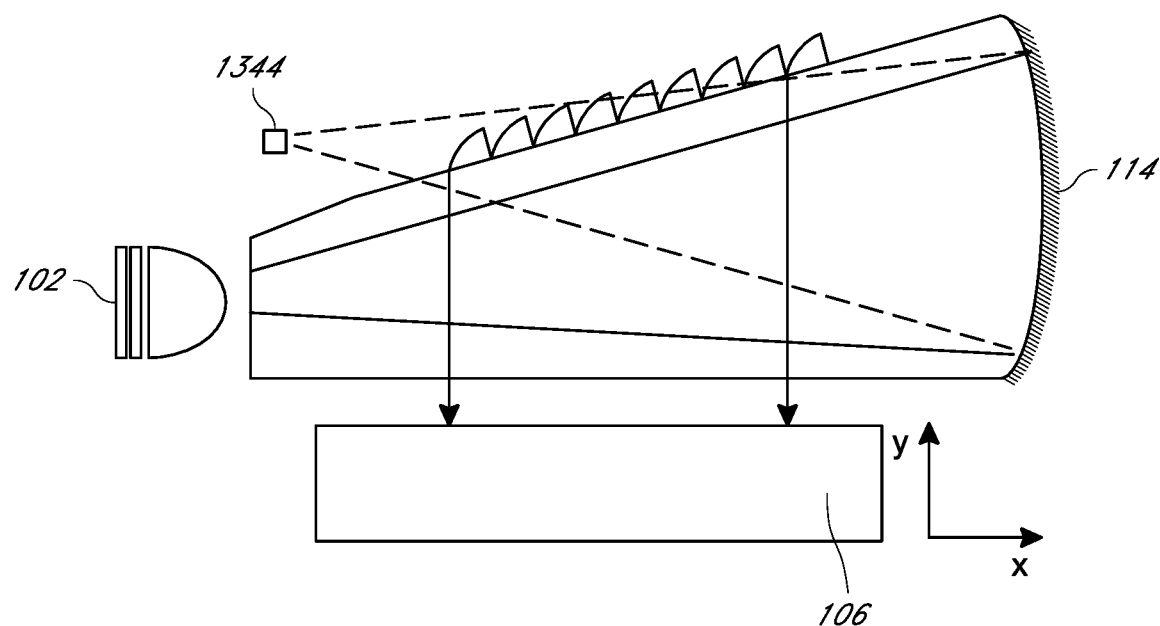
FIG. 29B illustrates an example implementation of the illumination system including turning features with optical power, according to some embodiments.

The end reflector 114 can be a curved mirror (e.g., a spherical or a parabolic mirror). Accordingly, the end reflector 114 may have optical power and may have a focal point. For example, the end reflector 114 may be tilted and/or the curvature of the end reflector 114 may be varied such that the reflected light converges toward a focus (focal point) or virtual focus in the region 1344 as depicted, for example, in FIGS. 29A and 29B that is away from, for example, the light source 102. The light converges toward a location farther from a first surface (e.g., the first surface 113A) and the spatial light modulator 106 than the light source 102. In such embodiments, the turning features (e.g., the turning features 1314) may be configured to provide optical power to redirect light reflected from the end reflector 114 towards the spatial light modulator 106. The turning features can be configured to have positive optical power as depicted in FIG. 29B or negative optical power as depicted in FIG. 29A. The illumination module 102 can be disposed at the focal point of the end reflector 114 such that light from the illumination module 102 is reflected along a direction parallel to the surface of the SLM 106 (e.g., parallel to the x-axis) or the light reflected from the end reflector 114 is substantially collimated and/or the light reflected from the polarization sensitive reflector 116 and directed onto the SLM 106 is substantially collimated. In such embodiments, the light (e.g. the majority of the light) reflected from the end reflector 114 is redirected substantially normal (e.g., parallel to the y-axis) to the surface of the SLM 106.

The first surface 113A can be planar and substantially parallel to a surface of the SLM 106 which can extend along an axis parallel to the x-axis. The second surface 113B can be slanted or sloped with respect to the first surface 113A, a horizontal axis parallel to the x-axis and/or the SLM 106 such that the waveguide 112 is wedge-shaped. The second surface 113B can be slanted or sloped towards the light input surface 113C. An angle of inclination (or wedge angle), "a", of the second surface 113B with respect to a horizontal axis parallel to the first surface 113A can have a value in the range between about 15 degrees and about 45 degrees. In some embodiments, the angle of inclination, "a", of the second surface 113B with respect to the first surface 113A can be in the range between about 20 degrees and about 35 degrees, between about 24 degrees and about 30 degrees or any value in these ranges/subranges in any range formed by any of these values. Other values are also possible.

Figure 19:
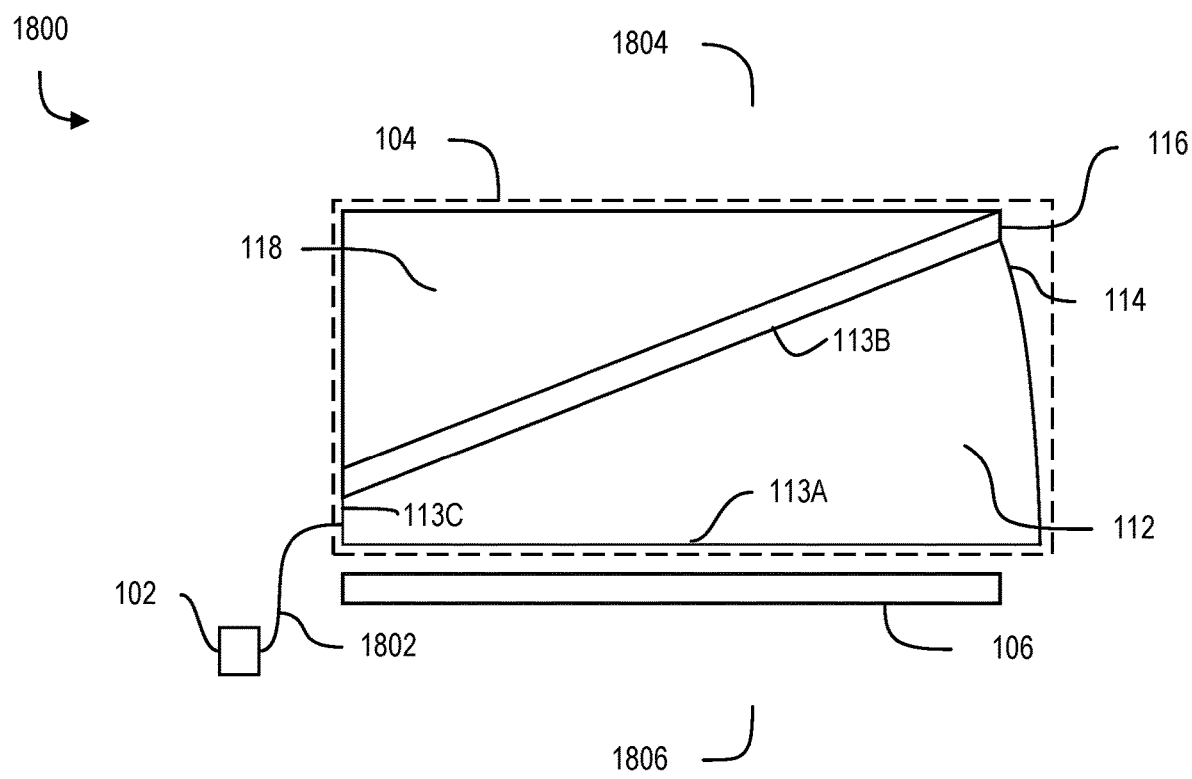
FIG. 19 illustrates an illumination system that may include a delivery system between the illumination module and the PBS, according to some embodiments.

In implementations of the wedge-shaped waveguide 112, the distance between the first surface 113A and the second surface 113B near the light input surface 113C (also referred to as the height of the light input surface 113C) can be smaller than the distance between the first surface 113A and the second surface 113B farther away from the light input surface 113C or near the end reflector 114. In various embodiments, an area of the light input surface 113C can be less than an area of the end reflector 114. In some implementations, the angle of inclination, "a", and the height of the light input surface 113C can be configured to accept substantially all the light emitted, for example, in a light cone, output from the illumination module 102. For example, if the illumination module 102 includes a LED, then light from the LED is emitted in a light cone having a semi angle of about 41 degrees with respect to the optical axis of the LED (which can be aligned parallel to the x-axis). In such embodiments, the angle of inclination, "a", of the second surface 113B can be between about 20 degrees and about 30 degrees with respect to a horizontal axis parallel to the x-axis or with respect to the first surface 113A or the SLM 106 or the front face thereof such that substantially all the light output from the illumination module 102 including the LED is coupled into the waveguide 112. The angle of inclination, "a", of the second surface 113B and/or the height of the light input surface 113C can be reduced if the illumination module 102 is less divergent. in some embodiments, if the illumination module 102 is coupled to the light input surface 113C via an optical fiber, for example, as illustrated in FIG. 19, then the angle of inclination, "a", of the second surface 113B may be less than 20 degrees.

The polarization sensitive reflector 116 is disposed over the second surface 113B of the waveguide 112. The polarization sensitive reflector 116 redirects light reflected from the end reflector 114 towards the SLM 106. For example, the polarization sensitive reflector 116 may redirect light having the first polarization state (e.g., s-polarization state) and may pass or reflect light having the second polarization state (e.g., p-polarization state). The polarization sensitive reflector 116 further transmits light reflected from the SLM 106. For example, the polarization sensitive reflector 116 may transmit light having the second polarization state (e.g., p-polarization state) and may block or reflect light having the first polarization state (e.g., s-polarization state).

In various embodiments, the polarization sensitive reflector 116 may be, for example, a polarization selective coating, one or more thin film coatings, dielectric coatings, or a wire grid. The polarization sensitive reflector 116 is configured to redirect light having a specific polarization state towards the SLM 106. For example, light having the first polarization state (e.g. s-polarized state) from the illumination module 102 that is reflected from the end reflector 114 can be redirected towards the SLM 106 by the polarization sensitive reflector 116. Further, the polarization sensitive reflector 116 is configured to transmit light having a specific polarization state towards an eyepiece (not shown in FIG. 10). For example, light having the second polarization state (e.g., p-polarization state) is transmitted. The modulated light from the SLM 106 includes light having the second polarization state (e.g., p-polarization state). The modulated light from the SLM 106 is transmitted by the polarization sensitive 116.

The refractive optical element 118 is disposed over the waveguide 112. The refractive optical element 118 includes transparent material such as dielectric (such as glass and/or plastic). The refractive optical element 118 may compensate for refractive optical effects introduced by the waveguide 112. For example, without any material or element disposed over the waveguide 112, light propagating from the SLM 106 through the waveguide 112 may be refracted upon exiting the polarization sensitive reflector 116 and/or the second surface 113B of the waveguide 112, which are/is inclined. The refractive optical element 118 may provide index matching that counteracts this refraction. An upper surface of the refractive optical element 118 may also be parallel to the first surface 113A of the waveguide 112, which further reduces refraction of light reflected from the SLM 106 that passes through the waveguide 112 and the refractive optical element 118. In various implementations, to reduce refraction at the second surface 113B of the waveguide 112, the refractive optical element 118 including transparent material may have a similar refractive index as the waveguide 112. One or both may include glass and/or plastic in some examples.

In some embodiments, the refractive optical element 118 may be configured to transmit light having the second polarization state (e.g., p-polarization state) and block light having the first polarization state (e.g., s-polarization state). In this manner, the refractive optical element 118 can remove unmodulated light that is unintentionally transmitted through the waveguide 112.

In some embodiments, the illumination system 1000 includes a pre-polarizer between the illumination module 102 and the PBS 104. For light going from the illumination module 102 towards the PBS 104, the pre-polarizer transmits light having the first polarization state (e.g., s-polarization state) and blocks or reflects light having the second polarization state (e.g., p-polarization state). In some embodiments, the PBS 104 may be designed such that for light going from the PBS 104 towards the illumination module 102, the pre-polarizer transmits light having the second polarization state (e.g., p-polarization state) and blocks or reflects light having the first polarization state (e.g., s-polarization state).

In some embodiments, the illumination system 1000 includes a clean-up polarizer between the PBS 104 and an eyepiece (not shown in FIG. 10). The clean-up polarizer transmits light having the second polarization state (e.g., p-polarization state) and blocks light having the first polarization state (e.g., s-polarization state). In this manner, the clean-up polarizer can remove unmodulated light that is unintentionally transmitted toward the eyepiece (not shown in FIG. 10).

The PBS 104 can be disposed with respect to waveguides 270, 280, 290, 300, 310 discussed below with reference to FIG. 6 and the incoupling elements thereon such that the light from the illumination system 1000, specifically from the PBS 104 can be incoupled into the waveguides 270, 280, 290, 300, 310. The light after being reflected from the SLM 106 can be directed to the incoupling elements of one or more waveguides 270, 280, 290, 300, 310 of the eyepiece.

The SLM 106 impresses a spatial modulation on a signal to provide an image. In an on state, the SLM 106 modulates input light from the first polarization state (e.g., s-polarization state) to the second polarization state (e.g., p-polarization state) such that a bright state (e.g., white pixel) is shown. The second polarization state may be the first polarization state modulated (e.g., shifted or rotated) by 90°. In the on state, the light having the second polarization state is transmitted by the polarization sensitive reflector 116 and goes downstream to the eyepiece (not shown in FIG. 10). In an off state, the SLM 106 does not rotate the input light from the first polarization state, thus a dark state (e.g., black pixel) is shown. In the off state, the light having the first polarization state is reflect by the polarization sensitive reflector 116 and reflects within the waveguide 112 and/or is input light to the SLM 106. In an intermediate state, the SLM 106 modulates the input light from the first polarization state to a certain elliptical polarization state. In the intermediate state, some of the light having the elliptical polarization state (e.g., s-polarization state) is transmitted by the polarization sensitive reflector 116 and some of the light having the elliptical polarization state (e.g., p-polarization state) is reflected by the polarization sensitive reflector 116.

Figure 11:
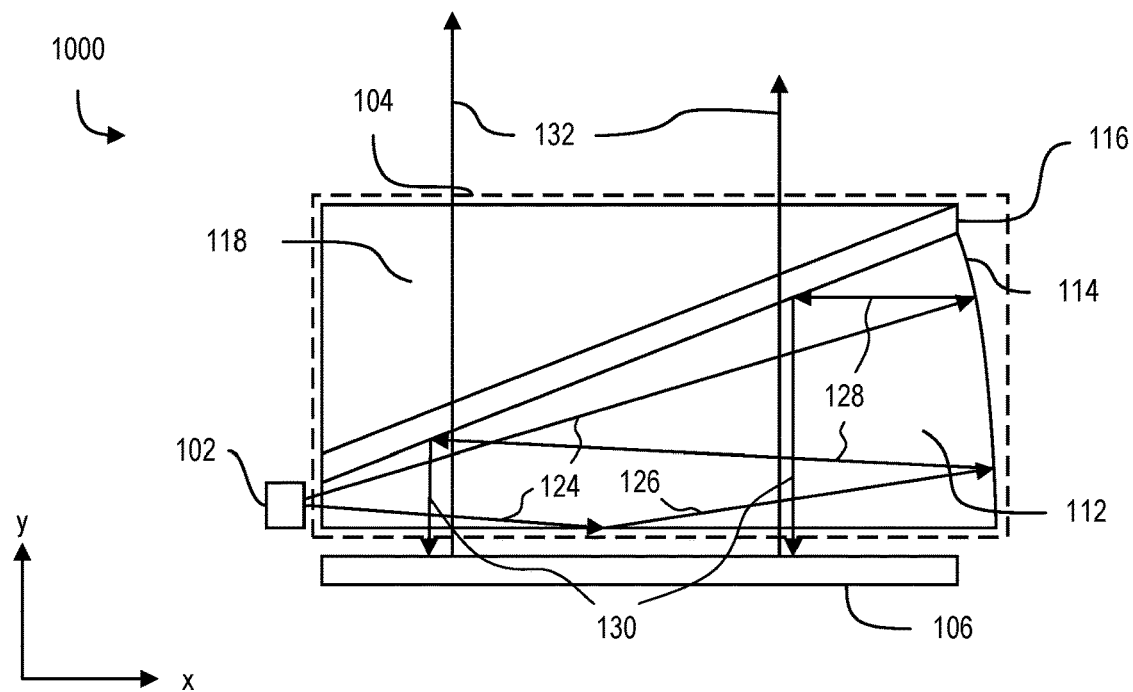
FIG. 11 illustrates a ray trace with relation to the illumination system illustrated in FIG. 10, according to some embodiments.

FIG. 11 illustrates a ray trace with relation to the illumination system illustrated in FIG. 10, according to some embodiments. The illumination module 102 may be configured to output and direct emitted light 124 into the PBS 104 and namely the waveguide 112 through the light input surface 113C. In some embodiments, the emitted light 124 propagates through the waveguide 112 and may be directly incident on the end reflector 114. In some embodiments, the emitted light 124 may be reflected by the first surface 113A and/or possibly second surface 113B by TIR and reflected light 126 may be incident on the end reflector 114. Light incident on the end reflector 114 may be reflected and/or collimated. Reflected collimated light 128 may be incident on the second surface 113B. The second surface 113B may be configured to selectively reflect light (e.g., light in the first polarization state) and turn the light toward the SLM 106. Turned light 130 may propagate toward the SLM 106, which may be configured to selectively modulate and reflect the turned light 130. In some embodiments, for example, as illustrated, the SLM 106 includes a reflective spatial light modulator array such as a reflected LCD SLM array.

The turned light 130 that is reflected from the SLM 106 may propagate through the PBS 104, the waveguide 112, and/or the refractive optical element 118 and thus be transmitted through the PBS 104. For example, transmitted light 132 may be in a polarization state different from the turned light 130. For example, the transmitted light 132 may be in the second polarization state (e.g., p-polarized). The transformation (e.g. rotation) of the polarization state from the first polarization state to the second polarization state may be achieved in a number of ways. For example, the SLM 106 may selectively alter (e.g., rotate) the polarization state of the light reflected therefrom from the first polarization (e.g., s-polarization) to the second polarization (p-polarization) depending on whether the respective pixel in the SLM is set in a state (e.g., "on" state) to modulate the light. Other configurations are also possible. The transmitted light 132 may be of a polarization state (e.g., p-polarization state) that will allow the light to be transmitted through the polarization sensitive reflector 116 and/or the refractive optical element 118.

Figure 12A:
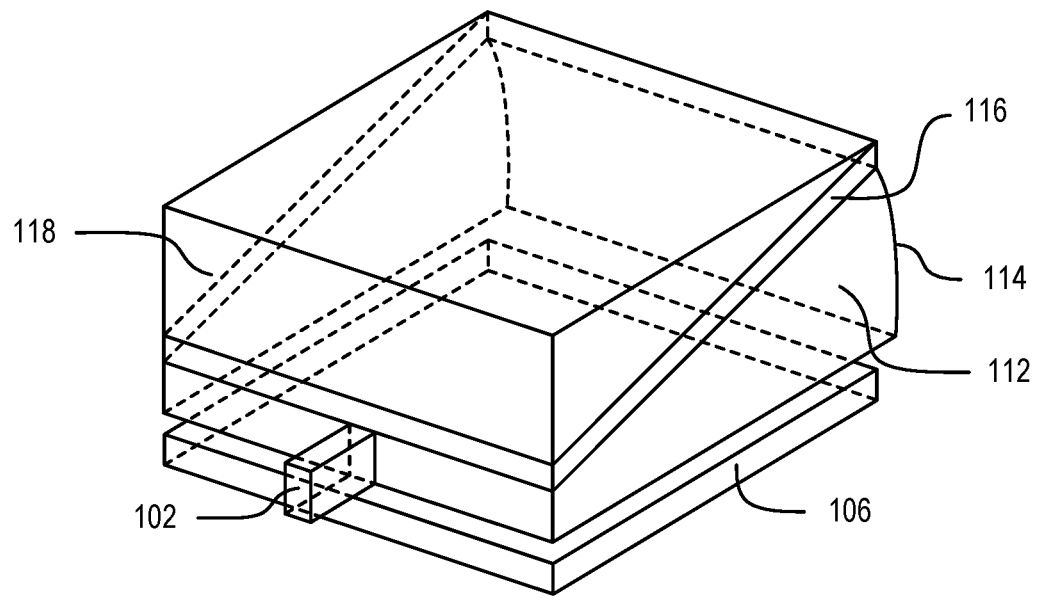
FIG. 12A illustrates a perspective view of the illumination system illustrated in FIG. 10, according to some embodiments.
Figure 12A:
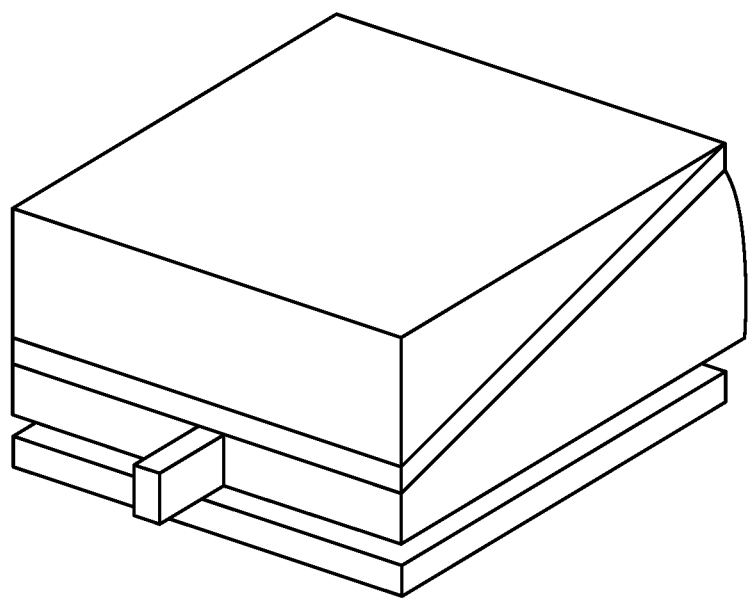
Figure 12B:
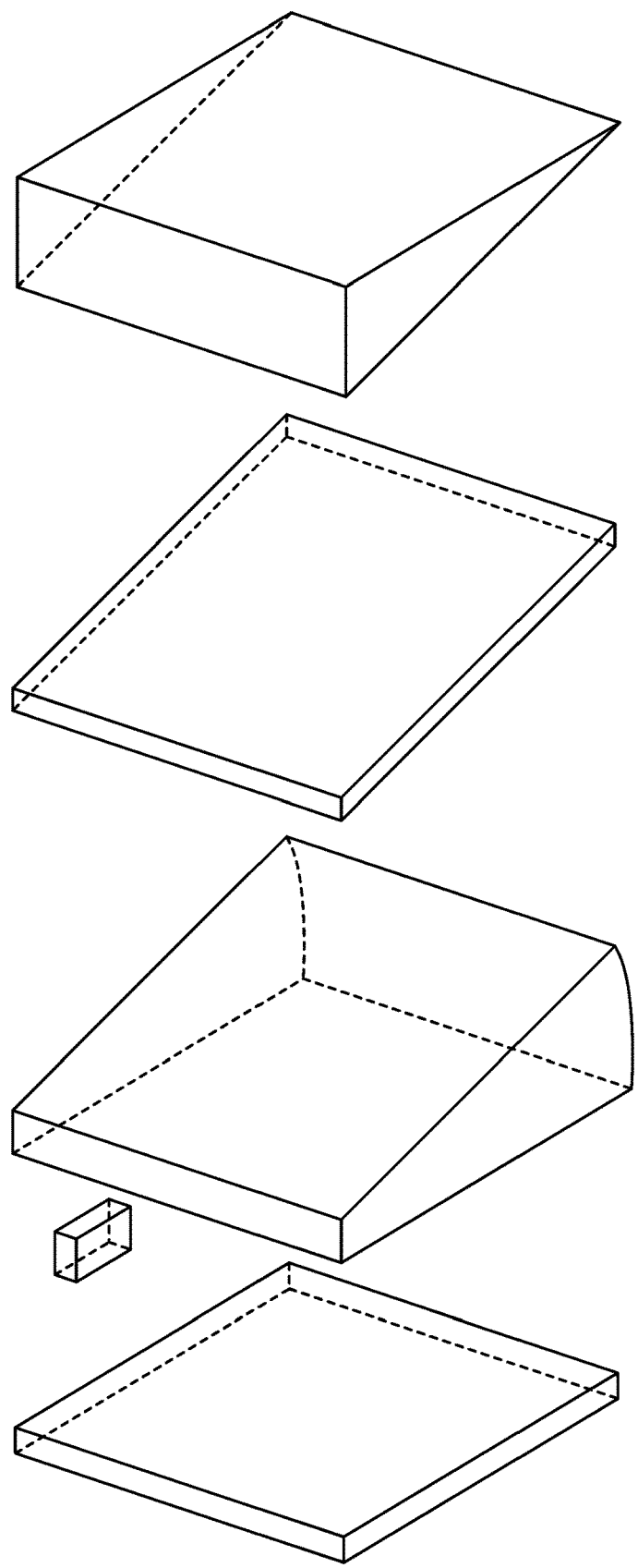
FIG. 12B illustrates an exploded perspective view of the illumination system illustrated in FIG. 12A, according to some embodiments.
Figure 24:
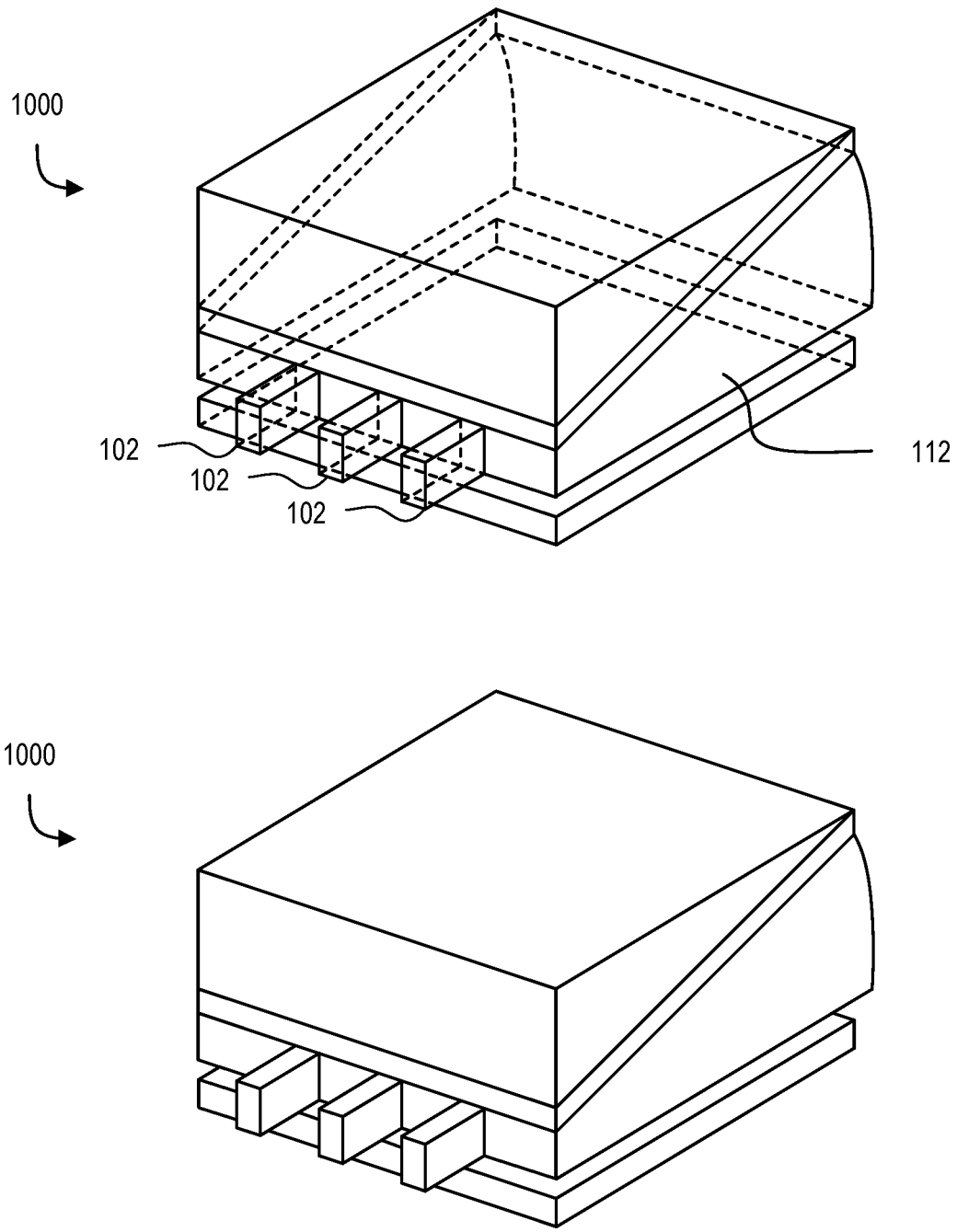
FIG. 24 illustrates a perspective view of an illumination system, according to some embodiments.
Figure 25:
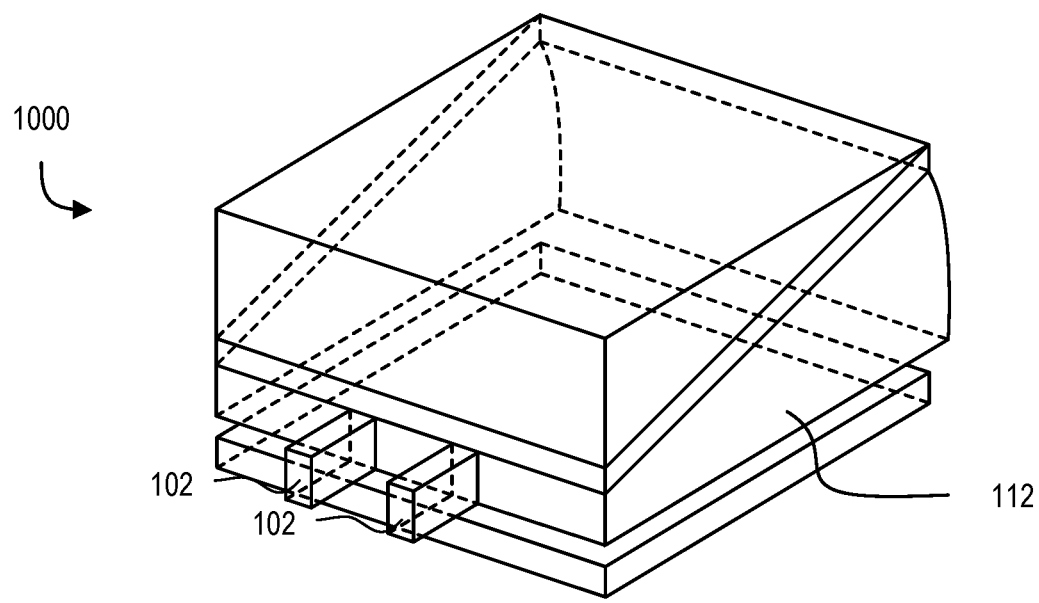
FIG. 25 illustrates a perspective view of another example illumination system, according to some embodiments.
Figure 25:
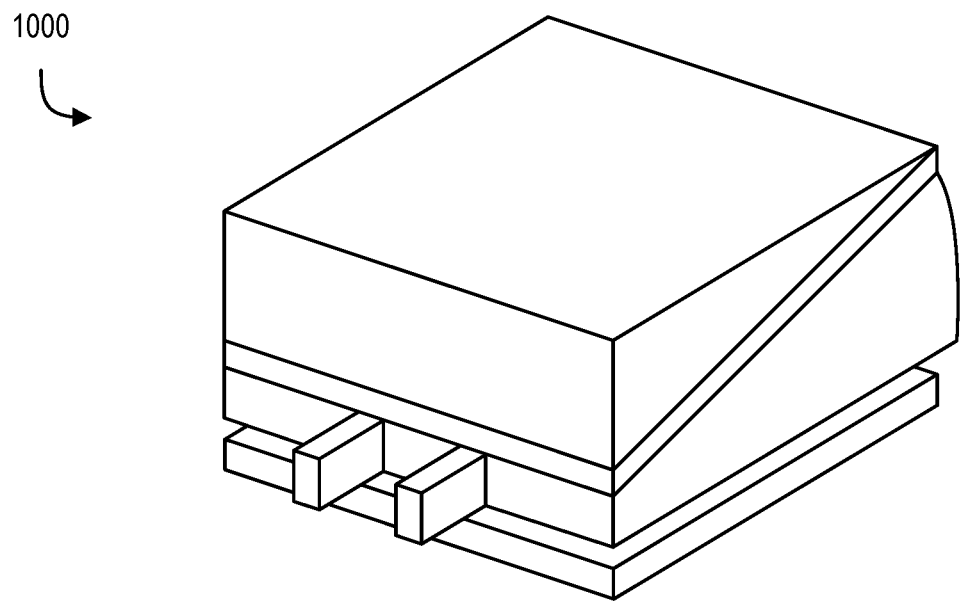

FIG. 12A illustrates a perspective view of the illumination system 1000 illustrated in FIG. 10, according to some embodiments, and FIG. 12B illustrates an exploded perspective view of the illumination system 1000 illustrated in FIG. 12, according to some embodiments. As illustrated, the illumination system 1000 may include one illumination module 102. In other embodiments, the illumination system 1000 may include more than one illumination module. Examples of embodiments of an illumination system including more than one illumination module are illustrated in FIGS. 24 and 25. FIGS. 24 and 25 are described in detail below.

Coatings

Figure 13A:
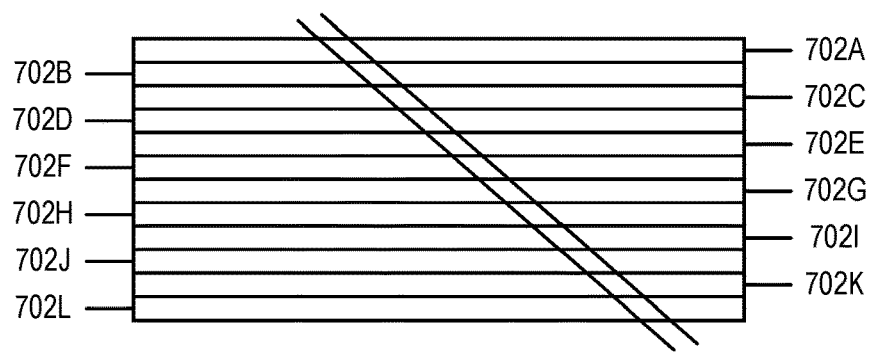
FIG. 13A illustrates a method of manufacturing a polarization sensitive reflector, according to some embodiments.
Figure 13B:
FIG. 13B illustrates a polarization sensitive reflector, according to some embodiments.
Figure 13C:
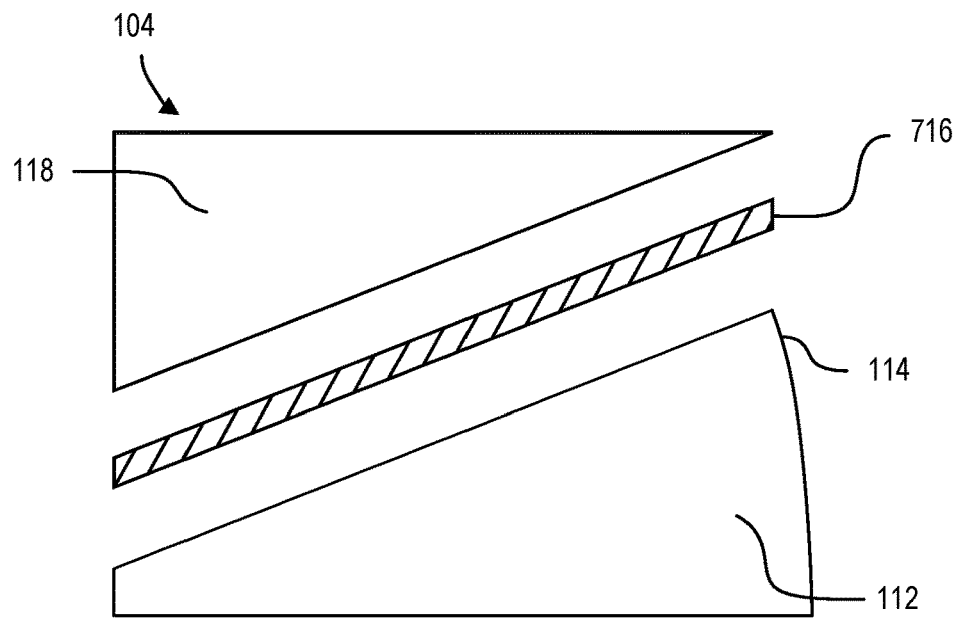
FIG. 13C illustrates a method of manufacturing a polarization sensitive reflector manufactured as shown in FIG. 13A, according to some embodiments.

FIGS. 13A-13C illustrate a method of manufacturing a polarization sensitive reflector (e.g., the polarization sensitive reflector 116), according to some embodiments. Additional and/or alternative features of the method may be disclosed below with respect to FIG. 31. The method includes stacking layers 702A-702L of transmissive material. The transmissive material may be, for example, glass, plastic, or other optically transmissive material. Different layers, for example, each layer (e.g., any one of layers 702A-702L) in the stack of layers 702A-702L, can be coated and/or patterned with a polarization selective coating, such as, for example, multiple thin films. The patterned layer can include sections that include the polarization selective coating and sections that are devoid of the polarization selective coating. Different layers of the layers 702A-702L, e.g., each layer 702A-702L, may be bonded and/or adhered to adjacent layers. For example, between one or more layers 702A-702L of the stack, an adhesive coating may be provided.

The stack of layers 702A-702L of the transmissive material can be sliced to obtain a polarization sensitive reflector 716 illustrated in FIG. 13B. The slice may transverse one or more layers of the stack of layers 702A-702L. In some embodiments, the stack of layers 702A-702L may be sliced at a transverse angle relative to a surface of the stack. The transverse angle may be an acute angle, for example, between 5° and 65° with respect to a normal of the layers 702A-702L. The polarization sensitive reflector 716 may be the polarization sensitive reflector 116 of FIG. 10. In the embodiment illustrated in FIG. 13B, the polarization sensitive reflector 716 is made of a sliced stack of layers (e.g., the layers 702A-702L) of the transmissive material.

As illustrated in FIG. 13C, the polarization sensitive reflector 716 is disposed over, molded to, and/or attached to the waveguide 112. For example, the polarization sensitive reflector 716 is disposed over, molded to, and/or attached to the second surface 113B of the waveguide 112. The reflective optical element 118 is be disposed over, molded to and/or attached to the polarization sensitive reflector 716.

Figure 13D:
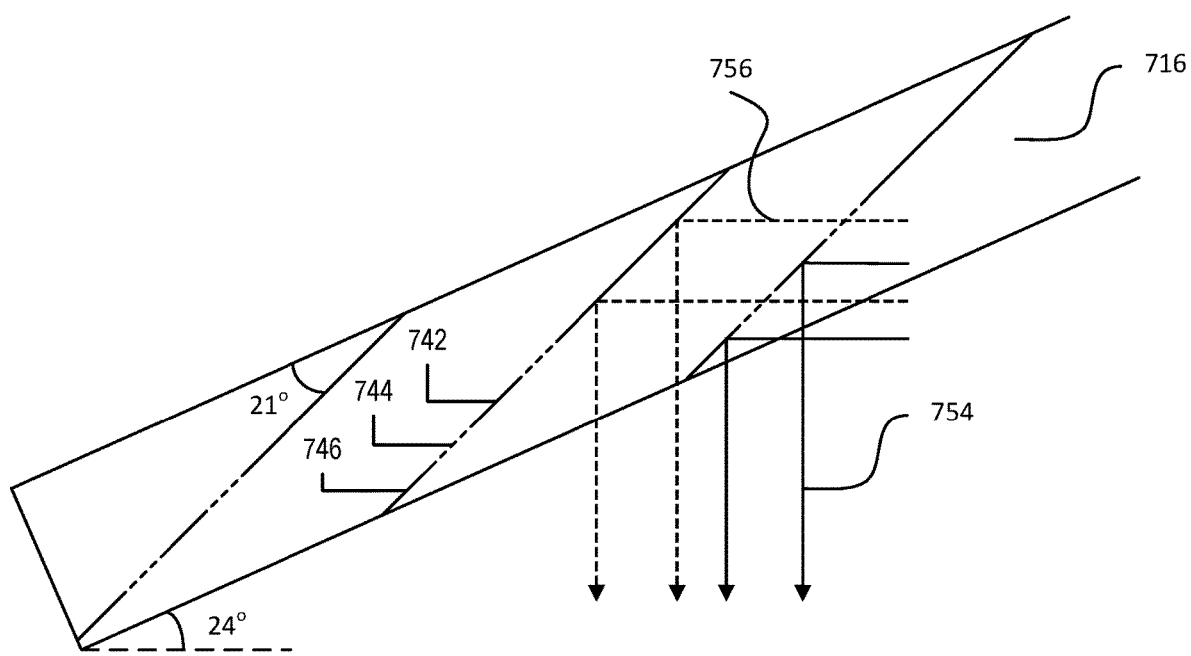
FIG. 13D illustrates a polarization sensitive reflector manufactured using the method illustrated in FIGS. 13A-13C, according to some embodiments.

FIG. 13D illustrates a polarization sensitive reflector 716 manufactured using the method illustrated in FIGS. 13A-13C, according to some embodiments. The polarization sensitive reflector 716 includes a first section 742 having a polarization selective element spaced apart from a second section 746 having a polarization selective element by a third section 744 that does not have a polarization selective element or is otherwise configured to reflect less light (e.g., has less of a polarization selective coating). Multiple such sections 742, 744, 746 may be disposed along one or more of the surfaces of the polarization sensitive reflector 716. Light reflected from an end reflector (e.g., the end reflector 114), that is incident on the third section 744 that does not have the polarization sensitive element will pass through that portion of the polarization sensitive reflector 716 until it is incident on a section having a polarization selective element, such as, for example, sections similar to first section 742 and second section 746. Such implementations can be advantageous in increasing uniformity of illumination across a spatial light modulator (e.g., the SLM 106). As shown, light 754 is reflected by sections of layers that include a polarization sensitive element while light 756 is initially passed through sections that do not include a polarization sensitive element (or have a polarization sensitive element that reflects less light than the other polarization sensitive elements). The light 756 may be incident on and reflected by sections of a different layer that include polarization sensitive element that reflect polarized light, as shown.

As illustrated in FIG. 13D, each layer may be disposed at an acute angle relative to a surface of the polarization sensitive reflector 716. For example, a surface of each layer (e.g., an interface between two layers) may form a transverse angle with the surface of the polarization sensitive reflector 716. Additional and/or alternative features of the polarization sensitive reflector 716 are disclosed below with regard, for example, to FIG. 28D. In order to balance form factor of an illumination system (e.g., the illumination system 1000) and the intensity of light reflected by the polarization sensitive reflector 716, the transverse angle may be between 5° and 65°. In some embodiments, the transverse angle may be between 10° and 35°. In some embodiments, for example, as illustrated in FIG. 13D, the transverse angle is 21°.

The polarization sensitive reflector 716 may be disposed at an incline angle relative to another element or surface in an illumination system (e.g., the illumination system 1000) such as the first surface 113A of the waveguide 112. The incline angle may be acute. In some embodiments, the incline angle may be between 5° and 80°. In some embodiments, the angle is the angle may be between 10° and 45°. In some embodiments, for example, as illustrated in FIG. 13D, the incline angle may be 24°. In some embodiments, the incline angle may be the same as the angle of inclination (or the wedge angle), "a".

It may be advantageous to direct light toward a spatial light modulator (e.g., the SLM 106) at a particular angle to increase or maximize efficient light output from the illumination system (e.g., the illumination system 1000) or for other reasons. To that end, the sum of the transverse angle and the incline angle may be between 25° and 65°. In some embodiments, for example, as illustrated in FIG. 13D, the sum of the angles may be 45°, for light reflected from the end reflector 114 that is parallel to the first surface 113A. In such embodiments, light (e.g., most of the light) reflected from an end reflector (e.g., the end reflector 114) may be configured to be reflected by the polarization sensitive reflector 716 at an angle normal to a spatial light modulator (e.g., the spatial light modulator 106).

Figure 14A:
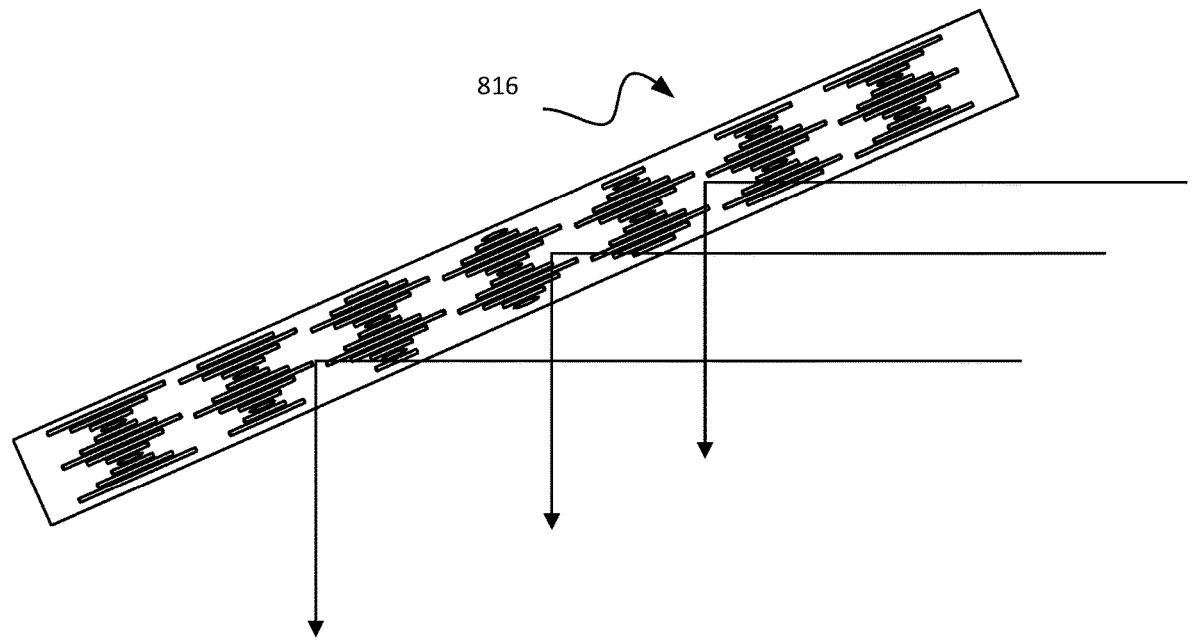
FIG. 14A illustrates polarization coatings with cholesteric liquid crystal gratings, according to some embodiments.
Figure 14B:
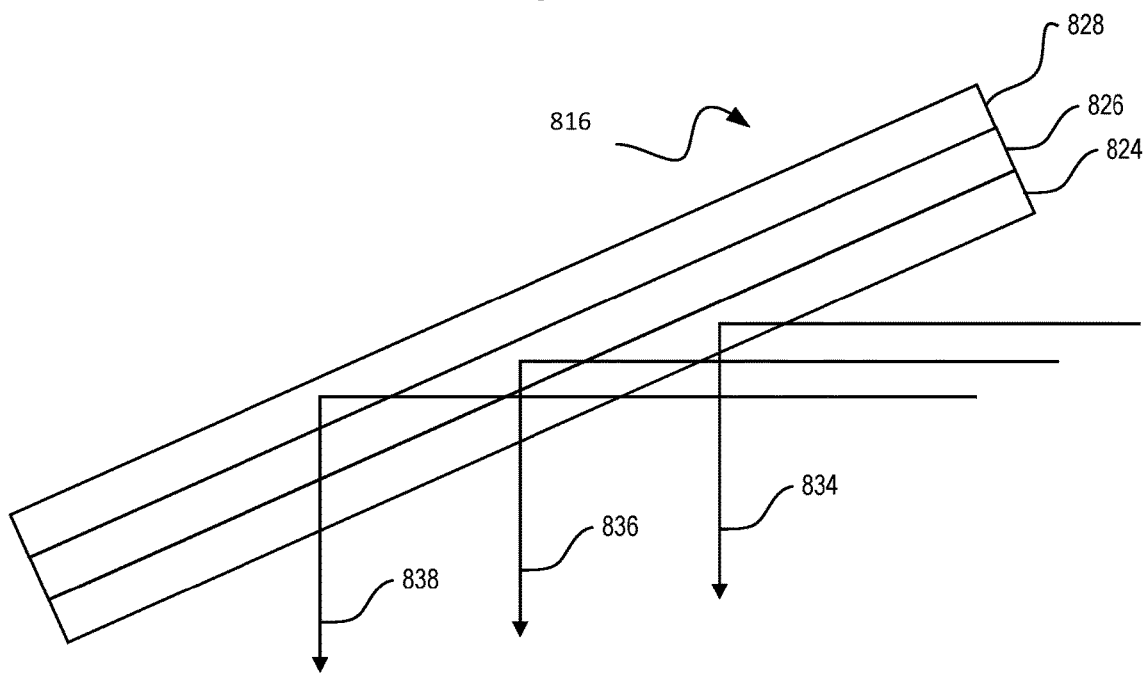
FIG. 14B illustrates polarization coatings with cholesteric liquid crystal gratings, according to some embodiments.

FIGS. 14A-14B illustrate polarization coatings including liquid crystal such as cholesteric liquid crystal, according to some embodiments. The polarization coating may include cholesteric liquid crystal (CLC) elements, such as CLC gratings, according to some embodiments. For example, in various implementations such as shown in FIG. 14A, a liquid crystal element 816 includes one or more liquid crystal reflective elements including liquid crystal. For example, the liquid crystal element 816 may include in various implementations, a cholesteric liquid crystal element including one or more cholesteric liquid crystal reflective elements including cholesteric liquid crystal. The liquid crystal reflective elements 816 may include, for example, one or more layers of liquid crystal such as one or more layers of cholesteric liquid crystal. The liquid crystal layers and liquid crystal reflective elements 816 may be polarization selective and may reflect one polarization state and transmit another polarization state. Additionally, the liquid crystal layers and liquid crystal reflective elements 816 may be wavelength selective and may reflect certain wavelengths and transmit other wavelengths. Accordingly, such optical elements 816 may operate on a particular wavelength or wavelength range and a particular polarization state. Likewise, light having a particular polarization and color (e.g., red, green, blue) reflected from an end reflector (e.g., end reflector 114) may be acted on by the cholesteric liquid crystal reflective element 816, for example, reflected by the cholesteric liquid crystal reflective element 816. However, light not in that wavelength range and not that polarization state may be passed through the cholesteric liquid crystal reflective element.

FIG. 14B shows a cholesteric liquid crystal element 816 including a stack of cholesteric liquid crystal layers 824, 826, 828. Different layers 824, 826, 828 in the stack may include cholesteric liquid crystal gratings configured for a particular wavelength or range of wavelengths. For example, a first cholesteric liquid crystal layer 824 may be configured to reflect a first light color 834 (e.g., red light) having a particular polarization state. A second cholesteric liquid crystal layer 826 may be configured to reflect a second light color 836 (e.g. green) having a particular polarization state. Similarly, a third cholesteric liquid crystal layer 828 may be configured to reflect a third light color 838 (e.g. blue) having a particular polarization state. Light of a color different from that for which the corresponding cholesteric liquid crystal layer 824, 826, 828 is configured to reflect may pass through the corresponding layer, for example, until it reaches a layer 824, 826, 828 configured to reflect that color light. Using multiple layers that operate at different color enable multiple wavelengths to be turned to illuminate the SLM 106.

Figure 15:
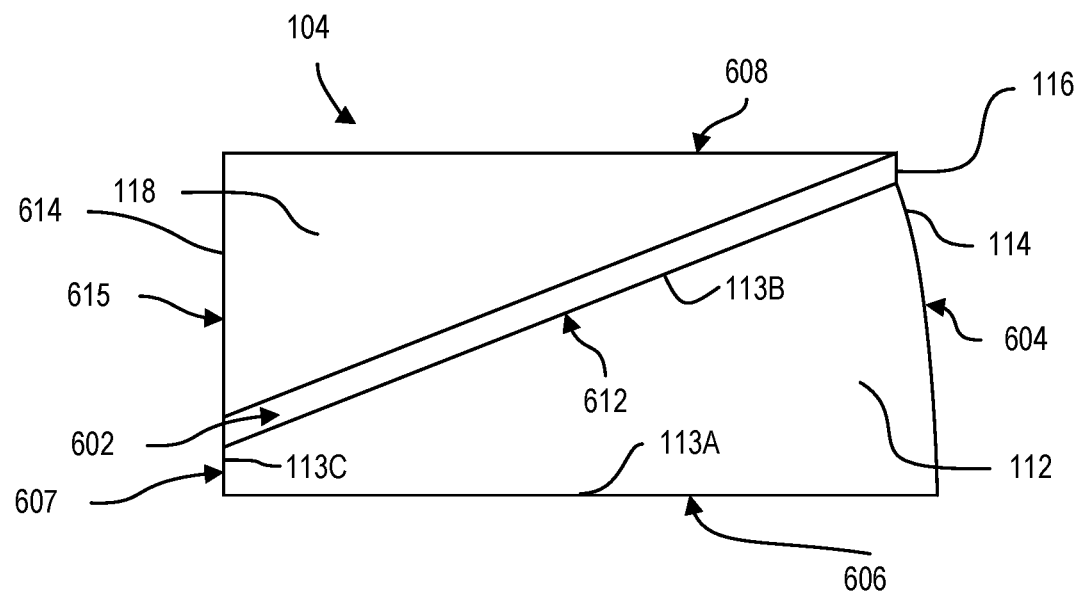
FIG. 15 illustrates coating locations of a polarizing beam splitter, according to some embodiments.

FIG. 15 illustrates coating locations of a polarizing beam splitter, according to some embodiments. The polarization sensitive reflector 116 may, for example, include a polarization coating 602. In some embodiments, the polarization coating 602 may be coated onto the waveguide 112. Accordingly, the polarization coating 602 may be disposed between the waveguide 112 and the refractive optical element 118. In some embodiments, the polarization coating 602 may be adjacent the waveguide 112. In some embodiments, the polarization coating 602 may also be disposed adjacent the refractive optical element 118. In some embodiments, the polarization coating 602 may be disposed in an optical path between the end reflector 114 and the SLM 106. In some embodiments, the polarization sensitive reflector 116 may include the polarization coating 602, for example, on layers within the polarization sensitive reflector 116. The polarization coating 602 may be configured to reflect light having a first polarization state (e.g., s-polarization) and to transmit light of a second polarization state, which may be an orthogonal polarization (e.g., p-polarization).

The end reflector 114 may include a reflective coating 604. The reflective coating 604 may be coated on a surface of the waveguide 112, such as on a surface opposite to and/or farther from the illumination module 102 (not shown in FIG. 15). The surface on which the reflecting coating 604 is formed/coated on may be curved to provide the curved end reflector 114 discussed above. Accordingly, the end reflector 114 may have optical power and may be disposed with respect to the illumination module 102 in some embodiments such that light from the illumination module 102 incident on the reflective coating 604 (e.g., the majority of this light) after reflection therefrom is collimated. The reflective coating 604 may be a high reflective (e.g., mirror) coating and may include in various implementations metal and/or dielectric and may be a multilayer coating in some implementations. The reflective coating 604 may in some implementations be configured to reflect more than 90%, 95% or 99% of light incident on it (e.g., visible light).

One or more surfaces of the PBS 104 may include anti-reflective coatings, such as anti-reflective coatings 606, 607, 608, configured to reduce a reflection of incident light. The anti-reflective coating 606 may be disposed on the first surface 113A of the waveguide 112. The anti-reflective coating 607 may also be disposed on the light input surface 113C. Such anti-reflective coating 607 may reduce input losses due to reflection of light emitted by the illumination module 102 by the light input surface 113C of the waveguide.

The anti-reflection coating 608 may be disposed on the refractive optical element 118, for example, on the surface opposite the polarization sensitive reflector 116 and/or opposite the first surface 113A of the waveguide 112 and/or opposite the anti-reflection coating 606. The anti-reflection coating 608 may increase the efficiency of the egress of modulated light from the PBS 104 and reduce back reflection onto the SLM 106 and thus increase the efficiency of the operation of the PBS 104.

The anti-reflection coatings 606, 607, 608 may be configured to reduce an amount of reflection by more than at least 50%, 70%, 90% or more (or any range between any of these values) relative to reflection without the coating. In some embodiments, the anti-reflection coatings 606, 607, 608 may, for example, reduce reflection from the coated surface to less than 4%, 3%, 2%, 1%, 0.5%, 0.1%, 0.01% or less (or any range between any of these values) for the particular design wavelength. In some designs, the anti-reflection coating 606, 607, 608 may include a multilayer coating and include at least two coating layers. The anti-reflective coating may include an interference coating. One or more of the anti-reflection coatings 606, 607, 608 may be a broadband anti-reflection coating.

Light that is reflected off the end reflector 114 may initially propagate toward the polarization sensitive reflector 116. As described above, some light may be transmitted through the polarization sensitive reflector 116 (e.g., depending on the polarization of the light). Light that is transmitted through the polarization sensitive reflector 116 from the end reflector 114 may be incident on a surface 614 of the refractive optical element 118 having a blackening coating 615. The refractive optical element 118 may include the blackening coating 615 to reduce back reflection of light incident thereon. For example, the blackening coating 615 may be coated onto the surface 614 of the refractive optical element 118 opposite the end reflector 114 of the waveguide 112. The blackening coating 615 may be disposed on a surface 614 coplanar with the light input surface 113C. The surface 614 on which the blackening coating 615 is disposed may be perpendicular to the first surface 113A and/or to the SLM 106. The blackening coating 615 may be disposed on a surface 614 perpendicular to a second surface 113B of the refractive optical element 118 in some implementations. The blackening coating 615 may also be configured to prevent reflection of light. For example, the blackening coating 615 may include a black dye or pigment. As discussed above, the blackening coating 615 may be disposed to receive light from the end reflector 114. Accordingly, the blackening coating 615 may be configured to absorb light reflected off the end reflector 114.

Figure 16:
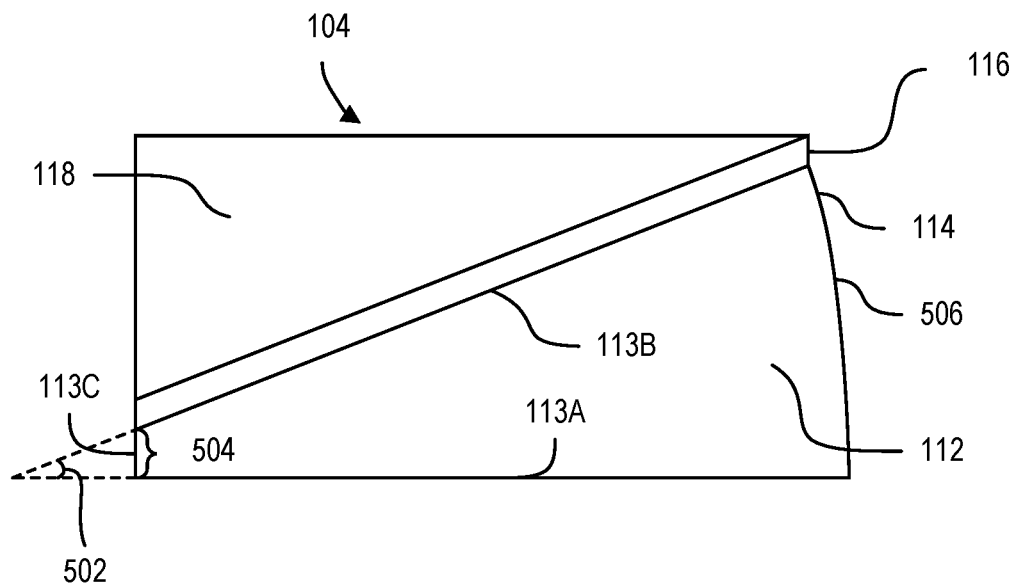
FIG. 16 illustrates features of a polarizing beam splitter, according to some embodiments.

FIG. 16 illustrates features of a polarizing beam splitter (e.g., the PBS 104), according to some embodiments. As illustrated, the waveguide 112 is wedge shaped with the second surface 113B inclined with respect to the light input surface 113C. A wedge angle 502 describes the incline of the second surface 113B relative to the first surface 113A. Although a wedge is often a triangle, the wedge-shaped waveguide 112 may be truncated so as to create the light input surface 113C, which can be used to input light into the waveguide 112. Accordingly, in this example, the intersection of planes defined by the two surfaces may occur outside the PBS 104, as shown, for example, in FIG. 16. Other configurations are possible. In some embodiments, the wedge angle 502 is acute. For example, the wedge angle 502 may be between about 5° and 55°. In some embodiments, the wedge angle 502 is between about 8° and 35°. In some embodiments, the wedge angle 502 may be 18°. As discussed above, the light input surface 113C may provide an input surface or input face 504 for introducing light into the waveguide 112. The input face 504 may be disposed along the light input surface 113C although an input face disposed elsewhere may be utilized in other geometries and configurations. In some embodiments, the input face is disposed toward the base of the PBS 104 such as the first surface 113A of the waveguide 112. Accordingly, the input face 504 can include a transparent surface, although as discussed above, a blackening coating 615 may be included on one or more nearby surfaces of the refractive optical element 118. In some embodiments, a height of the input face 504 may be approximately a height of the surface 113C. In some embodiments, the input face 504 and/or the light input surface 113C is smaller, for example, less than ½, ⅓, ¼, ⅕, ⅙, ⅛, 1/10, or 1/20 the sized of the end reflector 114 (or any value in any range defined by any of these values). The end reflector 114 may have an optical power 506, for example, to collimate light emitted through the input face 504 that is incident on the end reflector 114.

Illumination Module

Figure 17A:
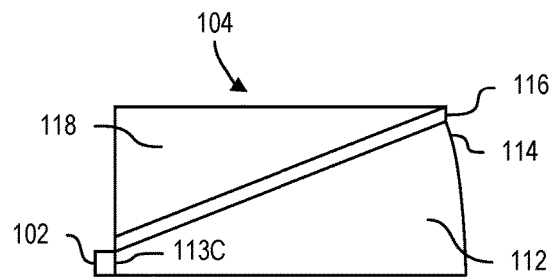
FIGS. 17A-17H illustrate various example configurations of an illumination module in relation to a polarizing beam splitter according to some embodiments.

FIGS. 17A-17H illustrate example configurations of the illumination module 102 in relation to the PBS 104, according to some embodiments. For example, FIGS. 17A-17H illustrate various configurations and/or orientations of the illumination module 102 in relation to the light input surface 113C as well as variations in the configurations and/or orientations of the light input surface 113C. The illumination module 102 may have a central optical axis that may be perpendicular to an output surface of the illumination module 102 through which light is emitted. The light input surface 113C may also have a normal. In FIG. 17A, an optical axis of the illumination module 102 is parallel to a surface axis of the light input surface 113C. An output face of the illumination module 102 may be butt coupled to the light input surface 113C, as shown. In some embodiments, such as shown in FIG. 17A, the surface axis (e.g., optical axis, central axis, etc.) of the light input surface 113C is parallel to a surface (e.g., the first surface 113A) of the waveguide 112. In some embodiments, the surface axis (e.g., surface normal) of the light input surface 113C is perpendicular to a surface of the waveguide 112 (e.g., surface opposite the refractive optical element 118 and/or output area and/or the first surface 113A). In some embodiments, the surface axis of the light input surface 113C is not parallel to any surface of the waveguide 112.

Figure 17E:
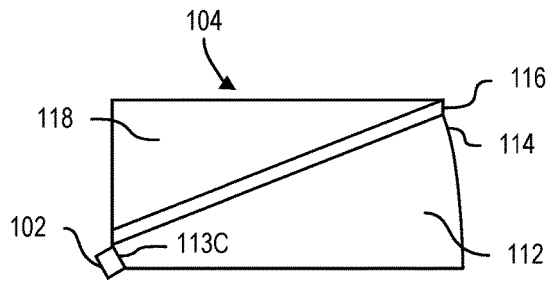
Figure 17B:
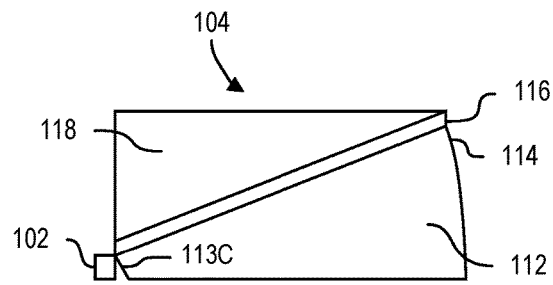
Figure 17F:
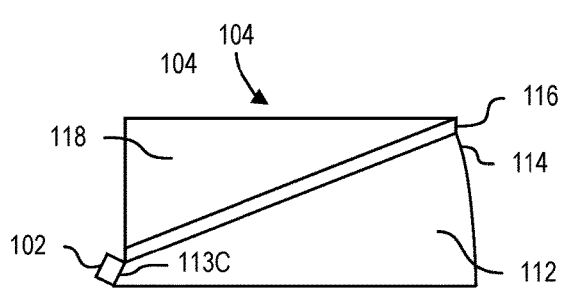
Figure 17C:
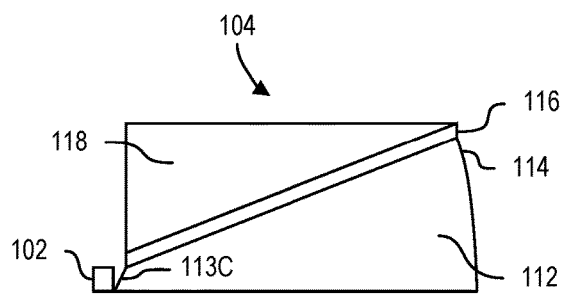

FIGS. 17B and 17C illustrate examples of where a surface axis of the illumination module 102 is neither parallel nor perpendicular to a surface axis of the light input surface 113C. An angle formed between the illumination module 102 and the light input surface 113C may define an acute angle. As shown by FIG. 17B, the light input surface 113C may form an obtuse angle with a surface of the waveguide 112 opposite the polarization sensitive reflector 116 and/or opposite the refractive optical element 118 and/or the surface closest to the SLM 106. As shown by FIG. 17C, the light input surface 113C may form an acute angle with the surface of the waveguide 112 opposite the polarization sensitive reflector 116 and/or opposite the refractive optical element 118 and/or the surface closest to the SLM 106. In some embodiments, the light input surface 113C forms a right angle with the surface of the waveguide 112 opposite the polarization sensitive reflector 116 and/or opposite the refractive optical element 118 and/or opposite the surface closest to the SLM 106, for example, as illustrated in FIG. 17A. Also, in both FIGS. 17B and 17C, light input surface 113C is tilted with respect to the illumination modules 102. Similarly, the surface axis of the illumination module 102 may not be parallel with the normal to the light input surface 113C. As a result of the tilt, an air gap is disposed between light input surface 113C and the illumination modules 102. Also, as a result of the tilt, this air gap is asymmetrical.

Figure 17G:
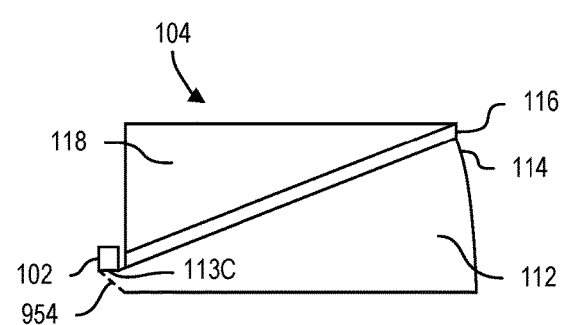
Figure 17D:
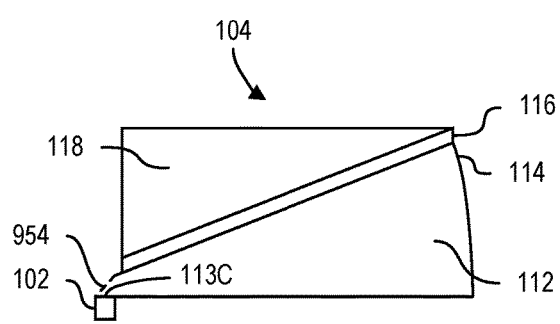

FIG. 17D illustrates a configuration of the PBS 104 that includes a deflecting element 954. The deflecting element 954 may include reflective and/or diffractive elements. For example, the deflective element 954 may include a mirror and/or grating. As illustrated, the illumination module 102 injects light into the surface of the waveguide 112 opposite the polarization sensitive reflector 116 and/or opposite the refractive optical element 118 and/or the surface closest to the SLM 106. In some embodiments, the light is injected into a surface of the PBS 104 opposite the refractive optical element 118 and/or closest to the SLM 106. In some embodiments, the light is injected into a surface of the PBS 104 proximate the refractive optical element 118. In the implementation illustrated in FIG. 17D, the waveguide 112 is longer than the refractive optical element 118, although the design need not be so limited. The deflecting element 954 is disposed on a portion of the waveguide 112, in this example, on a tilted surface, opposite the first surface 113A at the narrowest portion of the wedge or at an apex of the wedge. Accordingly, the deflecting element 954 is tilted and, and together with the tilted surface on which the deflecting element 954 is disposed, forms an acute angle with respect to the first surface 113A of the waveguide 112. Light can be redirected using the deflecting element 954. The deflecting element 954 may direct light to propagate toward the end reflector 114, which may be curved and/or have optical power and may collimate the light in some configurations. The deflecting element 954 may include a dielectric coating such as an interference coating and/or metallization. Such coating may provide, for example, reflection.

FIGS. 17E and 17F illustrate examples of configurations where a surface axis of the illumination module 102 is parallel to a surface axis of the light input surface 113C (e.g., parallel to the normal of the surface of the light input surface 113C). FIG. 17E illustrates how the light input surface 113C may form an obtuse angle with a surface of the waveguide 112 opposite the polarization sensitive reflector 116 and/or opposite the refractive optical element 118 and/or surface closest to the SLM 106. FIG. 17F illustrates how the light input surface 113C may form an acute angle with a surface of the waveguide 112 opposite the polarization sensitive reflector 116 and/or opposite the refractive optical element 118 and/or surface closest to the SLM 106. In the implementations illustrated in FIGS. 17E and 17F, the illumination module 102 is butt up against the light input surface 113C (e.g., with no gap therebetween). The illumination module 102 as a result may be tilted such that the surface axis of the illumination module 102 forms is angled with respect to the first surface 113A of the waveguide 112.

FIG. 17G illustrates a configuration of the PBS 104 that includes a deflecting element 954. The deflecting element 954 may include reflective and/or diffractive elements. For example, the deflective element 954 may include a mirror and/or a grating. As illustrated, the illumination module 102 injects light into a surface of the waveguide 112 proximate the refractive optical element 118. Light can be redirected using a deflective element 954, for example, toward the end reflector 114. In the implementation illustrated in FIG. 17G, the waveguide 112 is longer than the refractive optical element 118, although the design need not be so limited. The deflecting element 954 is disposed on a portion of the waveguide 112, in this example, on a tilted surface at the narrowest portion of the wedge or at an apex of the wedge. Accordingly, the deflecting element 954 is tilted, and together with the tilted surface the deflecting element is disposed on, forms an obtuse angle with respect to the first surface 113A of the waveguide 112. The deflective element 954 may direct light to propagate toward the end reflector 114 which may be curved and/or have optical power and may collimate the light. The deflective element 954 may include a dielectric coating such as an interference coating and/or metallization. Such coating may provide, for example, reflection.

Figure 17H:
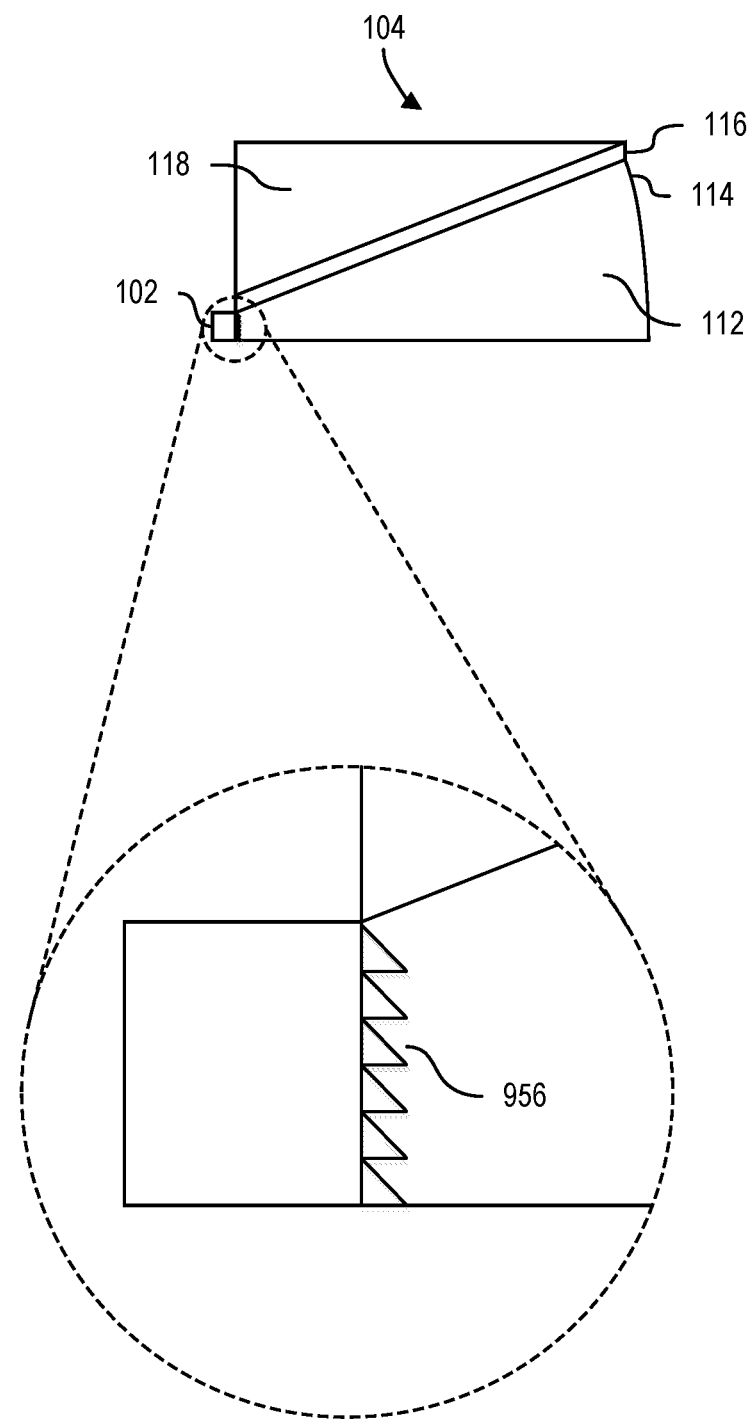

FIG. 17H illustrates the PBS 104 with input turning features 956 configured to redirect light introduced into the waveguide 112. The turning features 956 are disposed on the surfaces opposite the end reflector 114. The turning features 956 are shown disposed on the light input surface 113C. Light injected by the illumination module 102 into the waveguide 112 may propagate through the turning features 956 toward the end reflector 114 being redirected, possibly being bent by refraction and/or diffraction. The turning feature 956 may potentially include a microprism structure and/or nano-prism structure (e.g., grating). In some implementations, the turning features 956 may, for example, include tilted sloping surfaces that refract light incident thereon and bend the light transmitted therethrough redirecting the light exiting the tilting sloping surface. In some embodiments, the turning features 956 may, for example, include a grating or diffractive features that diffract light incident thereon and bend the light transmitted therethrough redirecting the light exiting the grating or diffractive features. The one or more surfaces of the turning features 956 may intersect the light input surface 113C and be optically transmissive to visible light and operation in transmission.

Figure 18A:
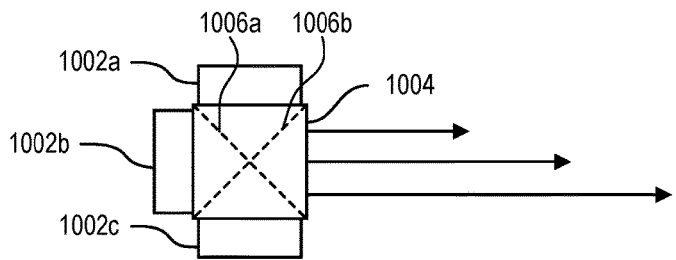
FIGS. 18A-18M illustrate various example configurations of illumination modules, according to some embodiments.

FIGS. 18A-18M illustrate example configurations of an illumination module (e.g., the illumination module 102), according to some embodiments. FIG. 18A shows three light emitters 1002a, 1002b, and 1002c injecting light into a color mixing element 1004. The color mixing element 1004 may be included in a dichroic combiner or beam combiner (see below). Each light emitter 1002a, 1002b, 1002c may emit different colors. For example, the first light emitter 1002a may be configured to emit a first color of light (e.g., red), the second light emitter 1002b may be configured to emit a second color of light (e.g., green), and the third light emitter 1002c may be configured to emit a third color of light (e.g., blue). Other configurations are also possible. The various light beams may travel and overlap within the beam combiner. One or more of the light emitters 1002a, 1002b, 1002c may include one or more LEDs. For example, each light emitter may be exactly one LED or may be more. However, other configurations (e.g., using lasers) may be used. In some cases, it may be advantageous for one or more of the light emitters 1002a, 1002b, 1002c to emit coherent light. For example, one or more of the light emitters 1002a, 1002b, 1002c may include laser elements, such as laser diodes.

The color mixing element 1004 may include a prism structure. For example, the color mixing element 1004 may include an x-cube. The x-cube includes a first dichroic beam combiner element 1006a and a second dichroic beam combiner element 1006b in a prism structure. One or more of the dichroic beam combiner elements 1006a, 1006b may include an optical film or other structure configured to reflect light having certain wavelengths and transmits light having certain wavelengths. Light from the first emitter 1002a is reflected by the first dichroic beam combiner element 1006a and light from the third emitter 1002c is reflected by the second dichroic beam combiner element 1006b. Light from the second emitter 1002b may be transmitted by both the first and second dichroic beam combiner. Accordingly, light from the first, second, and third emitters 1002a, 1002b, 1002c is combined. The emitters 1002a, 1002b, 1002c may be butt coupled to the color mixing element 1004 as shown in FIG. 18A. Other configurations are also possible. As shown in various figures discussed above that include illumination modules 102, an output surface of the color mixing element 1004 is optically coupled to a light input surface of a waveguide (e.g., the light input surface 113C of the waveguide 112) opposite an end reflector (e.g., the end reflector 114). Light from the three emitters 1002a, 1002b, 1002c combined by the color mixing element 1004 is thus injected into the waveguide 112 and propagates towards the end reflector 114.

Figure 18B:
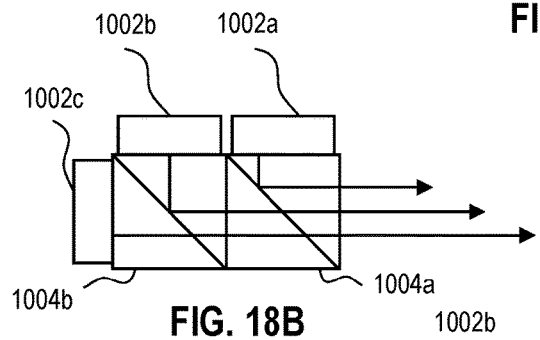

FIG. 18B shows a first light emitter 1002a injecting light into a first color mixing element 1004a and second and third light emitters 1002b, 1002c injecting light into a second color mixing element 1004b. The first color mixing element 1004a and/or second color mixing element 1004b may include prisms or prism structures such as dichroic prisms. The first color mixing element 1004a and/or second color mixing element 1004b may include a dichroic beam combiner element. The dichroic beam combiner element may include a film or other optical structure that reflects light having certain wavelengths and transmits light having certain wavelengths. Light from the first emitter 1002a (possibly of a first color) is reflected by a first dichroic beam combiner element and light from the second emitter 1002b (possibly of a second color) is reflected by a second dichroic beam combiner element. Light from the third emitter 1002c (possibly of a third color) may be transmitted by both the first and second dichroic beam combiner. Accordingly, light from the first, second, and third emitters 1002a, 1002b, 1002c is combined. One or more of the emitters 1002a, 1002b, 1002c may be butt coupled to one or more color mixing elements as shown in FIG. 18B, for example, to the input surface of the color mixing elements although other configurations are possible. As shown, an output surface of the second color mixing element 1004b is optically coupled to an input surface of the first color mixing element 1004a. An output surface of the first color mixing element 1004a may be optically coupled to a light input surface of a waveguide (e.g., the light input surface 113C of the waveguide 112) opposite an end reflector (e.g., the end reflector 114). Light from the three emitters 1002a, 1002b, 1002c combined by the color mixing elements 1004a, 1004b is thus injected into the waveguide 112 and propagates towards the end reflector 114. In some embodiments, the first color mixing element 1004a and second color mixing element 1004b are adjacent one another. Each of the color mixing elements 1004a, 1004b may include a dichroic beam combiner including a dichroic reflector or mirror possibly comprising a dichroic coating. As discussed above, the color mixing elements 1004a, 1004b may be configured to reflect light of a certain wavelength (e.g., tuned to that wavelength) and/or to transmit light of a different wavelength. For example, the first color mixing element 1004a may be tuned to blue light (e.g., configured to reflect blue light) and the second color mixing element 1004b may be tuned to green light (e.g., configured to reflect green light).

Figure 18C:
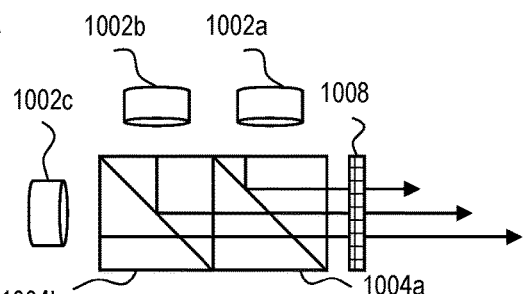

FIG. 18C shows an illumination module 102 similar to that shown in FIG. 18B including color mixing elements 1004a, 1004b and light emitters 1002a, 1002b, 1002c. FIG. 18C shows a first light emitter 1002a injecting light into a first color mixing element 1004a and second and third light emitters 1002b, 1002c injecting light into a second color mixing element 1004b. The light emitters 1002a, 1002b, 1002c may include any type of light emitter described herein (e.g., LEDs, lasers, OLEDs, etc.). As shown, however, one or more of the light emitters 1002a, 1002b, 1002c may be spaced from the corresponding color mixing element 1004a, 1004b. Light from the three emitters 1002a, 1002b, 1002c combined by the color mixing elements 1004a, 1004b is thus injected into the waveguide 112 and propagates towards the end reflector 114. The illumination module 102 shown in FIG. 18C may include a diffuser 1008. In some embodiments, the emitters 1002a, 1002b, 1002c may be configured to create footprints of possibly divergent light (e.g., R, G, B) that overlap on the diffuser 1008. For example, as illustrated, the light emitters 1002a, 1002b, 1002c, the color mixing elements 1004a, 1004b and the diffuser 1008 may be disposed along the same optical path such that the diffuser 1008 receives the light from the light emitters 1002a, 1002b, 1002c. The diffuser 1008 may diffuse the light from the emitters 1002a, 1002b, 1002c, and may provide a more uniform intensity of the light across a spatial area. In some embodiments, for example, the diffuser 1008 may reduce the likelihood of "hot spots" including observable intensity peaks. The diffuser 1008 may also assist in mixing together the light of different light emitters 1002a, 1002b, 1002c, for example, in the waveguide 112 which receives the light from the illumination module 102. In some embodiment, the diffuser 1008 may also diverge the beam incident thereon. The diffuser 1008 can thus provide the emission cone useful for a head mounted display system that may be in optical communication therewith.

Figure 18D:
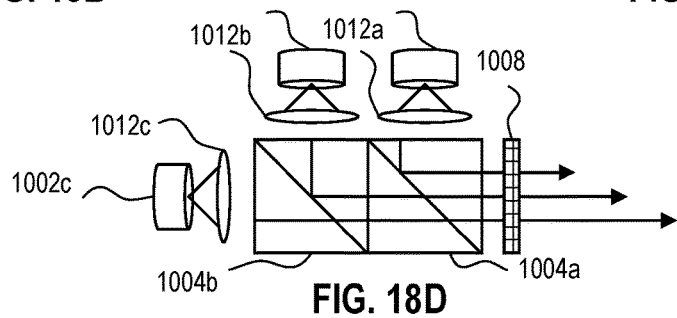

FIG. 18D shows design similar to FIG. 18C that includes optics such as beam-shaping optics (e.g., collimating optics) may be included to shape the beam of light entering the color mixing elements 1004a, 1004b. The beam-shaping optics may include, for example, lenses 1012a, 1012b, 1012c. One or more of the lenses 1012a, 1012b, 1012c may be configured to focus light (e.g., have positive power). The lenses 1012a, 1012b, 1012c may be configured to reduce divergence of light from the respective emitters 1002a, 1002b, 1002c, such that the light is more efficiency coupled into the color mixing elements 1004a, 1004b. The lenses 1012a, 1012b, 1012c may, for example, be collimating lenses that are configured to collimate light from the corresponding emitters 1002a, 1002b, 1002c. The lenses 1012a, 1012b, 1012c, may, for example, form collimated beams from the light emitted by the light emitters 1002a, 1002b, 1002c, respectively, that may overlap within the color mixing elements 1004a, 1004b and/or dichroic beam combiner and/or at the diffuser. In some embodiments, the lenses 1012a, 1012b, 1012c may have negative power. In some embodiments, the power and position of the lenses 1012a, 1012b, 1012c may be configured to create a divergent light cone, for example, entering the waveguide 112. The lenses 1012a, 1012b, 1012c may assist in controlling the amount of divergence and provide suitable divergence cone of light. Each of the lenses 1012a, 1012b, 1012c may be disposed between the corresponding light emitters 1002a, 1002b, 1002c and one or more of the color mixing elements (e.g., color mixing elements 1004a, 1004b). In some designs, a diffuser 1008 is included in the illumination module 102, as shown in FIGS. 18C-18D. As illustrated, the light emitters 1002a, 1002b, 1002c, the lenses 1012a, 1012b, 1012c, the color mixing elements 1004a, 1004b and the diffuser 1008 may be disposed along the same optical path such that the diffuser 1008 receives the light from the light emitters 1002a, 1002b, 1002c.

FIGS. 18A-18D show illumination modules including color mixing elements 1004a, 1004b that include aligned prisms such as aligned prism cubes. The prisms may, for example, be rectangular prisms. Each prism can receive two inputs and has one output. These prisms may include material substantially transparent to visible light and may include plastic or glass. As discussed above, these prisms include wavelength selective filters such as dichroic filters that reflect certain wavelengths and transmit other wavelengths.

Figure 18E:
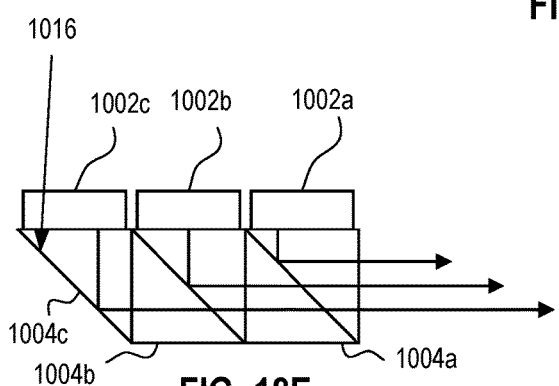
Figure 18F:
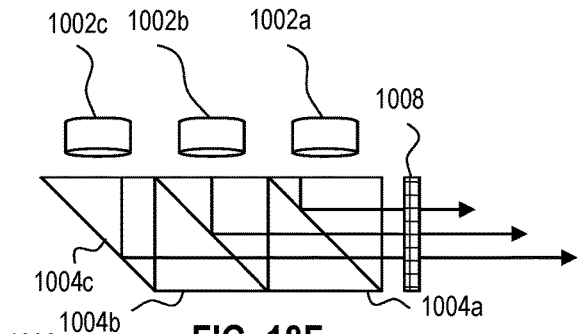
Figure 18G:
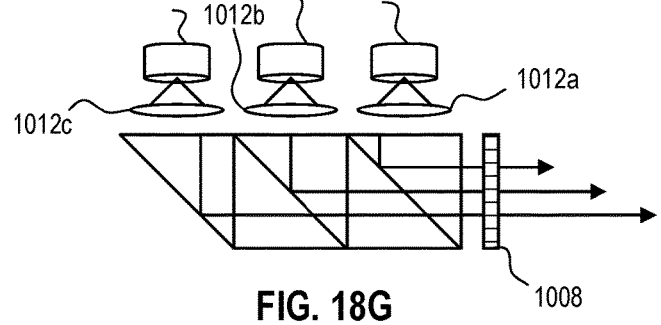

FIGS. 18E-18G illustrate example embodiments of illumination modules 102 including a turning mirror 1004c in addition to color mixing elements 1004a, 1004b. In the examples shown, the turning mirror 1004c include a prism, or portion thereof. The color mixing elements 1004a, 1004b may include prisms such as dichroic beam combiner prisms such as described above. The turning mirror 1004c has an inclined reflective surface for redirecting a light beam. The inclined reflective surface may be inclined for example between about 30° to 60° with respect to one of the other sides of the prism and, in some embodiments, may be inclined about 45°. Accordingly, the turning mirror 1004c may include, for example, a 45° prism. The turning mirror 1004c may include a prism that turns light by total internal reflection. The turning mirror 1004c may include, for example, optically transmissive material such as glass or plastic that provides for total internal reflection. The turning mirror 1004c and the color mixing elements 1004a, 1004b, may be aligned along an optical path (e.g., along the same optical axis), as shown in FIGS. 18E-18G. Each of the light emitters 1002a, 1002b, 1002c may be disposed adjacent corresponding color mixing elements. Accordingly, light from the light emitters 1002a, 1002b, 1002c may be coupled into the respective turning mirror 1004c and color mixing element 1004a, 1004b. The light thereby is combined and directed along a common optical path. In some embodiments, such as shown in FIG. 18F, the light emitters 1002a, 1002b, 1002c may be spaced from the corresponding color mixing elements 1004a, 1004b. As shown in FIG. 18G, lenses 1012a, 1012b, 1012c may be included. Also, as illustrated in FIGS. 18F and 18G, the illumination module

102 may include a diffuser 1008. Various features and characteristics of the lenses, and diffusers, as well as the color mixing elements 1004a, 1004b are discussed herein. Accordingly any such characteristics or features discussed herein can be applied to these structures.

Figure 18H:
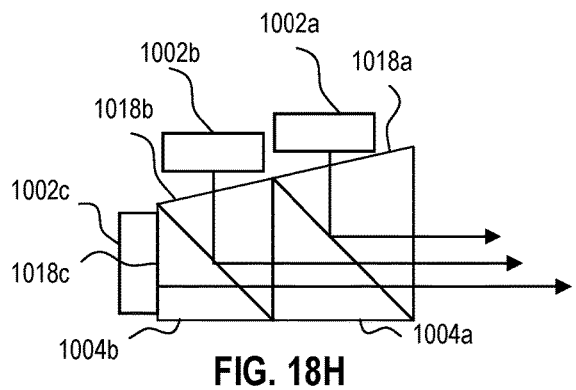
Figure 18I:
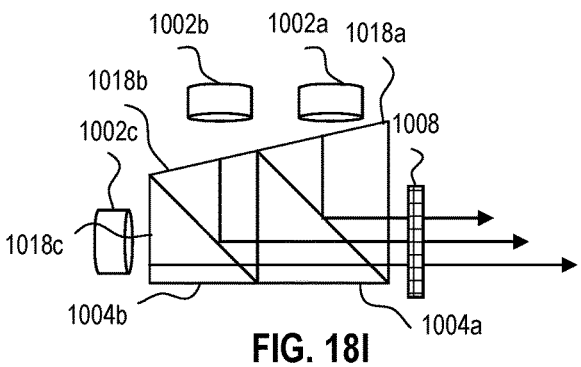
Figure 18J:
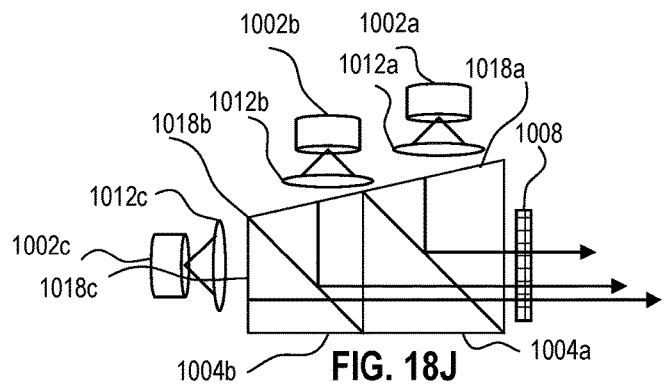

FIGS. 18H-18M illustrate example embodiments of illumination modules 102 similar to those described in FIGS. 18B-18G, respectively, however, wherein the illumination module 102 is tapered. FIGS. 18H-18J, for example, show illumination modules 102 including color mixing element 1004a, 1004b such as dichroic prisms wherein one prism is larger than another. Similarly, one end of each color mixing element 1004a, 1004b is larger than another end of the same color mixing element 1004a, 1004b. The color mixing element 1004a, 1004b are arranged such that a small end of one color mixing element 1004a is adjacent or closest to a large end of the other color mixing element 1004b. In some implementations such as those shown in FIGS. 18H-18J, the color mixing element 1004a, 1004b have one or more an inclined input surfaces as a result of having one end larger than another end. The one or more inclined input surfaces of each color mixing element 1004a, 1004b may be disposed on the same side of the illumination module 102 and together may be create larger sloping surface which may, in some implementations be smooth. As shown in FIGS. 18H-18J, inclined input surfaces 1018a, 1018b may be coplanar with one another. These inclined input surfaces 1018a, 1018b may correspond to input surfaces of the color mixing element 1004a, 1004b. Input surface 1018c may correspond to an input surface of the color mixing element 1004b. The light emitters 1002a, 1002b may be disposed with respect to these inclined input surfaces 1018a, 1018b, and the light emitter 1002c may be disposed with respect to the input surface 1018c, to inject light into the color mixing element 1004a, 1004b through these inclined input surfaces 1018a, 1018b. 1018c. The illumination module 102 may thus be tapered as a result with one end being larger than another end. The side opposite the sloping surface need not be sloping. The sloping surfaces 1018a, 1018b may be non-parallel to one or more surfaces on the opposite side of the illumination module 102 as illustrated in FIGS. 18H-18J.

In various implementations, the color mixing elements 1004a, 1004b include tilted surfaces possibly including a dichroic beam combiner that direct light from the emitters 1002a, 1002b, 1002c along a common optical path. The color mixing elements 1004a, 1004b are arranged along this optical path. In various implementations, the inclined input surfaces 1018a, 1018b are inclined with respect to this optical path.

Figure 18K:
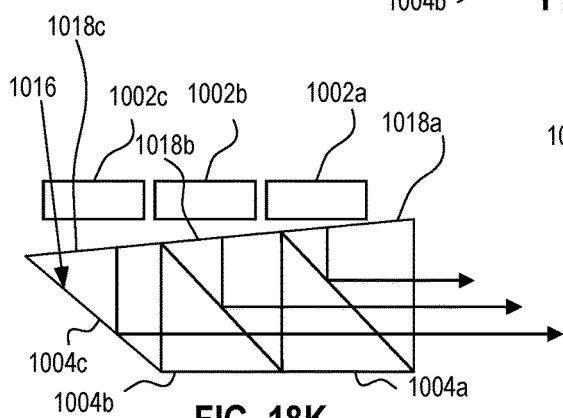
Figure 18L:
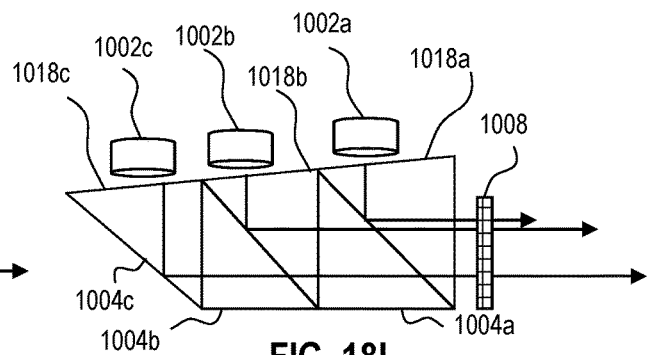
Figure 18M:
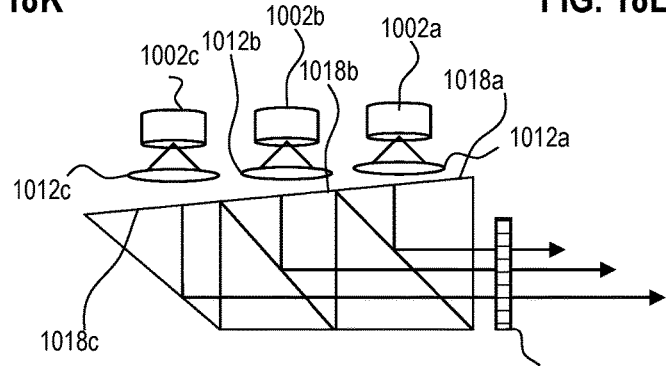

FIGS. 18K-18M illustrate example embodiments of illumination modules 102 including a turning mirror 1004c in addition to color mixing elements 1004a, 1004b in configurations similar to that shown in FIGS. 18E-18G. The illumination modules 102 shown in FIGS. 18K-18M however are tapered like those in FIG. 18H-18J. Accordingly, the discussion above with regard to FIGS. 18H-18J applied to the tapered illumination modules 102 shown in FIGS. 18K-18M.

FIGS. 18K-18M, for example, show illumination modules 102 including color mixing element 1004a, 1004b such as dichroic prisms wherein one prism is larger than another. Similarly, one end of each color mixing element 1004a, 1004b is larger than another end of the same color mixing element 1004a, 1004b. The color mixing elements 1004a, 1004b are arranged such that a small end of one color mixing element 1004a is adjacent or closest to a large end of the other color mixing element 1004b. A turning mirror 1004c may also include a prism that has an inclined reflective surface for redirecting a light beam is disposed adjacent to or closer to the smaller end of the other color mixing element 1004b.

In some embodiments, such as those shown in FIGS. 18K-18M, the color mixing elements 1004a, 1004b have inclined input surfaces 1018a, 1018b as a result of having one end larger than another end. The inclined input surfaces 1018a, 1018b of each color mixing element 1004a, 1004b may be disposed on the same side of the illumination module 102 and together may be create larger sloping surface which may, in some embodiments, be smooth. The emitters 1002a, 1002b, 1002c may be disposed with respect to these inclined input surfaces 1018a, 1018b to inject light into the color mixing elements 1004a, 1004b through these inclined input surfaces 1018a, 1018b. The illumination module 102 may thus be tapered as a result with one end being larger than another end. The side opposite the sloping surface need not be sloping. The inclined input surfaces 1018a, 1018b may be non-parallel to one or more surfaces on the opposite side of the illumination module as illustrated in FIGS. 18K-18M.

The turning mirror 1004c may have a surface 1016 that is inclined so as to receive light from the respective light emitter 1002c and reflect the light to the neighboring mixing element 1004b. The turning mirror 1004c may also include an inclined input surface 1018c disposed with respect to the respective light emitter 1002c to receive light therefrom. As described above, this light is reflected by the surface 1016. The inclined input surface 1018c may, with the other inclined input surfaces 1018a, 1018b of each color mixing element 1004a, 1004b, be disposed on the same side of the illumination module 102 and together may be create larger sloping surface which may, in some implementations be smooth. Likewise, as shown in FIGS. 18K-18M, each of the input surfaces 1018a, 1018b, 1018c may be disposed coplanar with one another.

As illustrated in FIGS. 18K-18M, in some embodiments, the color mixing elements 1004a, 1004b may include tilted surfaces possibly including a dichroic beam combiner that directs light from the emitters 1002a, 1002b along a common optical path. The color mixing elements 1004a, 1004b are arranged along this optical path. In various implementations, the inclined input surfaces 1018a, 1018b, 1018c are inclined with respect to this optical path.

The taper of the illumination module 102 may, in some embodiments, follow the divergence of the light from the emitters 1002a, 1002b, 1002c. For example, the inclined input surfaces 1018a, 1018b, 1018c may have an angle of inclination that is at least as large as the divergence angle of the light beam propagating through the color mixing elements 1004a, 1004b. Other amounts of taper and other configurations, however, are possible.

Other characteristics of the illumination module 102, light emitters 1002a, 1002b, 1002c color mixing element 1004a, 1004b, and arrangement thereof may be similar to that described above with regard to FIGS. 18B-18M. For example, the color mixing element 1004a, 1004b may include prisms such as dichroic prisms having dichroic beam combiners that reflect light of certain wavelengths and transmit light of other wavelengths. At least one of the light emitters 1003c may be butt coupled to the respective color mixing element 1004b. In some implementations, the light emitters 1002a, 1002b, 1002c can be spaced apart from the color mixing element 1004a, 1004b by a gap. In some embodiments, one or more lenses may be disposed between the light emitters 1002a, 1002b, 1002c can be spaced apart from the color mixing element 1004a, 1004b. Additionally, in some embodiments, the illumination module 102 includes a diffuser 1008. Features and characteristics of the illumination module 102, color mixing element 1004a, 1004b, lenses 1012a, 1012b, 1012c, diffuser 1008, are discussed above. Accordingly, any such characteristics or features discussed herein can be applied to these structures. Advantageously light from the different color light emitters 1002a, 1002b, 1002c is combined and mixed together in the color mixing element 1004a, 1004b.

Figure 18N:
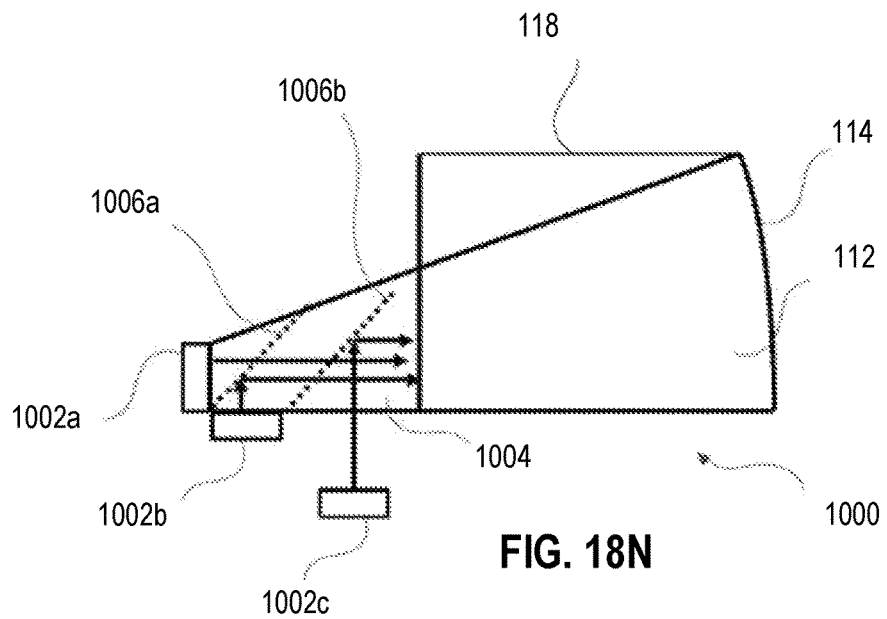
FIGS. 18N-18P illustrate various example configurations of illumination modules combined with polarization beam splitters, according to some embodiments.
Figure 18O:
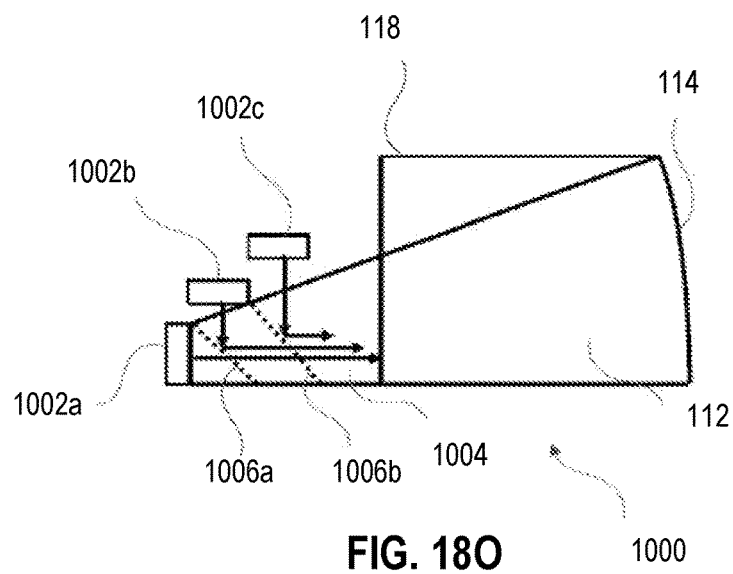
Figure 18P:
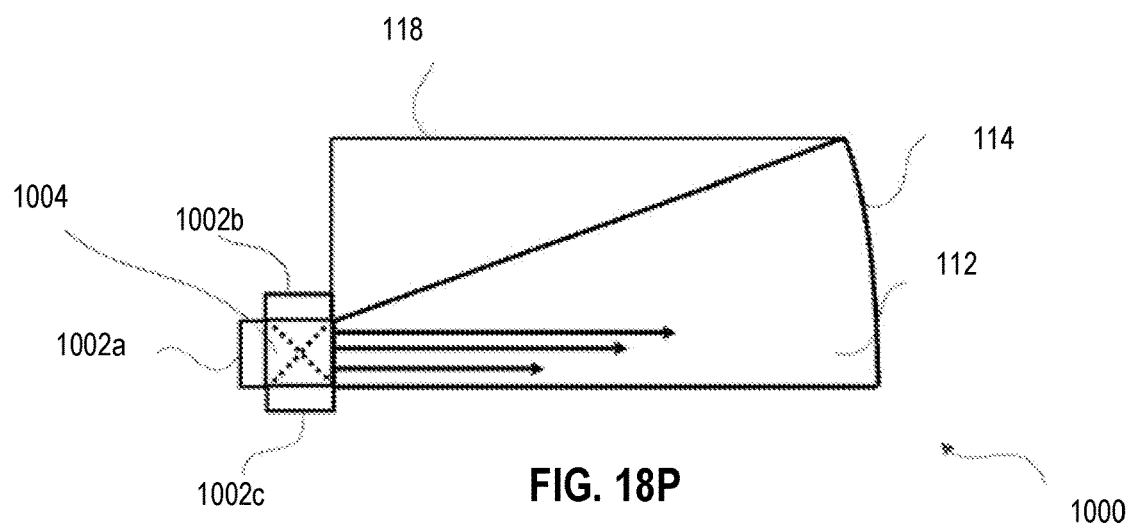
Figure 18Q:
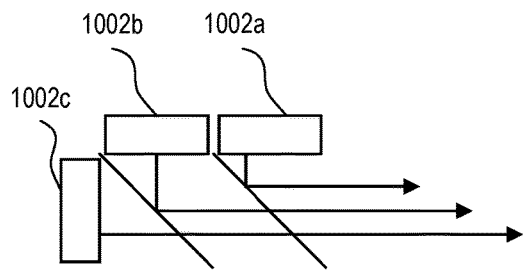
FIGS. 18Q-18V illustrate various example configurations of illumination modules, according to some embodiments.
Figure 18R:
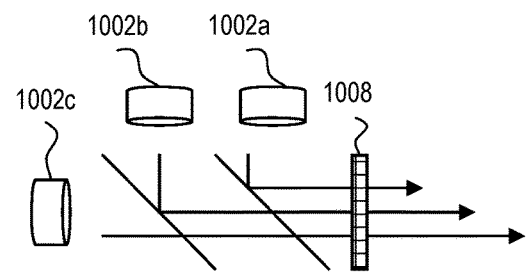
Figure 18S:
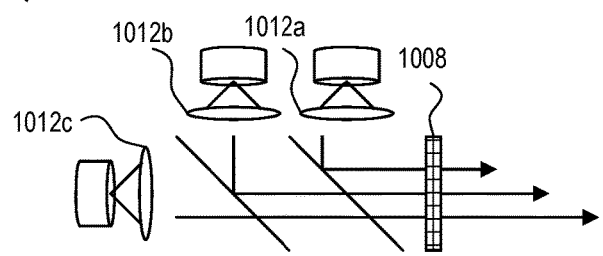
Figure 18T:
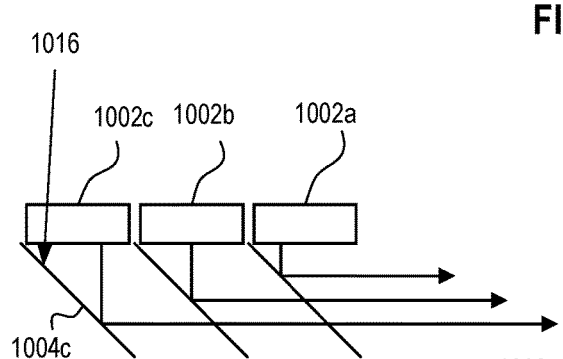
Figure 18U:
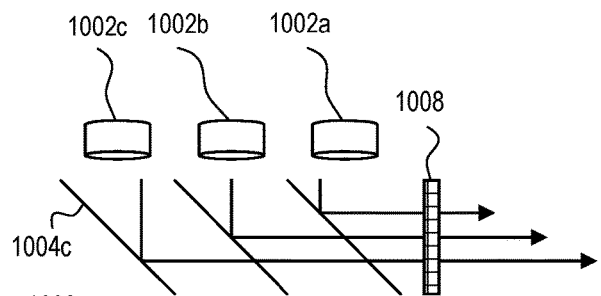
Figure 18V:
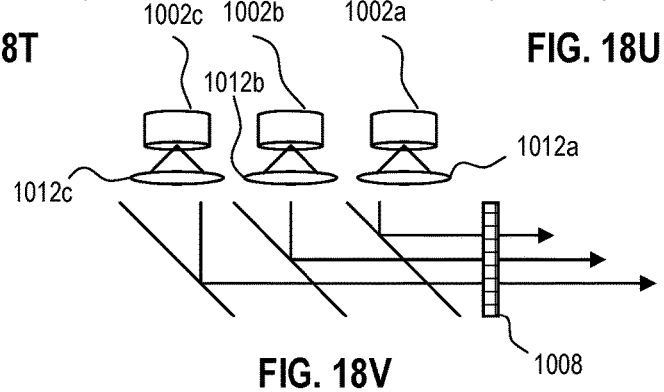

Another configuration that includes a one or more dichroic beam combiner elements is shown in FIG. 18N. FIGS. 18N through 18P illustrate arrangements configured to combine and/or mix different color light from different color light sources. As illustrated, illumination device 1400 may include one or more wavelength dependent light-redirecting elements. The one or more wavelength dependent light-redirecting elements may include a dichroic coating or layer. In some designs, the wavelength dependent light-redirecting element includes a color combining or color mixing element 1666 (e.g., an x-cube).

FIG. 18N shows three light emitters 1002a, 1002b, 1002c. Each light emitter 1002a, 1002b, 1002c may correspond to a different color (e.g., red, blue, green). The light emitter 1002a may inject light into a color mixing element 1004 that includes wavelength dependent combining elements 1006a, 1664b that are disposed within the illumination module 102 so as to combine light of different colors from the light emitters 1002a, 1002b, and 1002c and redirect the light toward the end reflector 114. In some implementations, the color mixing element 1004 that includes the combining elements 1006a, 1664b can be separate from and disposed with respect to the waveguide 112. Combining elements 1006a, 1006b may include dichroic coatings. The light may be injected into a surface of the waveguide 112 opposite the end reflector 114. The light emitter 1002a is disposed to inject light into a surface of the color mixing element 1004 opposite of (e.g., farthest from) the end reflector 114. The light emitters 1002b, 1002c may inject light into a surface of the color mixing element 1004 parallel to and/or adjacent a surface of the waveguide 112 that is closest to the SLM (bottom surface) (not shown). As shown, the light emitters 1002b, 1002c may inject light into a surface of the color mixing element 1004 opposite (e.g., farthest from) the refractive optical element 118. Light from the first emitter 1002a is transmitted through the dichroic combining element 1006a while light from the second emitter 1002b is reflected from the first dichroic combining element 1006a so that the light from the first and second emitters 1002a, 1002b are combined and propagate along the same path to the second combining element 1006b. At the second combining element 1006b, light from the third emitter 1002c is combined with the combined light from the first and second emitters 1002a, 1002b.

As illustrated the first and second dichroic combining elements 1006a, 1006b are tilted, for example with respect to the bottom surface of the waveguide 112 opposite the refractive optical element 114. The light emitter 1002a as well as the first and second dichroic combining elements 1006a, 1006b, are disposed along an optical path and the first and second dichroic combining elements 1006a, 1006b are also tilted, for example with respect to the that optical path. The first and second dichroic combining elements 1006a, 1006b are tilted at an angle with respect to the bottom surface (e.g., closest to the SLM (not shown)) of the color mixing element 1004. This tilt angle is acute in the implementation shown in FIG. 18N.

FIG. 18O shows three light emitters 1002a, 1002b, 1002c in a different configuration from FIG. 18N. Each light emitter 1002a, 1002b, 1002c may correspond to a different color (e.g., red, blue, green). The first light emitter 1002a may inject light into a color mixing element 1004 that includes wavelength dependent combining elements 1006a, 1006b that are disposed within the waveguide 112 so as to redirect light from the light emitters 1002a, 1002b, and 1002c toward the end reflector 114. In some implementations, the color mixing element 1004 that includes the combining elements 1006a, 1664b can be separate from and disposed with respect to the waveguide 112. The combining elements 1006a, 1006b may include dichroic coatings. Light from the first emitter 1002a may be injected into a surface of the color mixing element 1004 opposite (e.g., farthest from) the end reflector 114. The light emitters 1002b, 1002c may inject light into a surface of the color mixing element 1004 on an opposite side of the color mixing element 1004 (e.g., farthest from) as the SLM.

The light from the first emitter 1002a may be incident on and transmitted through the first combining element 1006a and combined with light from the second light emitter 1002b that is reflected from the first combining element 1006a and propagated to the second combining element 1006b. Light from the first and second light emitters 1002a, 1002b is transmitted through the second light combining element 1006b. Light from the third light emitter 1002c is reflected from the second light combining element 1006b and combined with the light from the first and second light emitters 1002a, 1002b. The combined light from the three emitters 1002a, 1002b, 1002c may be injected into a surface of the waveguide 112 opposite the end reflector 114.

As illustrated the first and second dichroic combining elements 1006a, 1006b are tilted, for example with respect to the bottom surface of the waveguide 112 opposite the end reflector 114. The light emitter 1002a as well as the first and second dichroic combining elements 1006a, 1006b are disposed along an optical path and the first and second dichroic combining elements 1006a, 1006b are also tilted, for example with respect to the that optical path. The first and second dichroic combining elements 1006a, 1006b are tilted at an angle with respect to the bottom surface (e.g., closest to the SLM) of the color mixing element 1004. This tilt angle is obtuse in the implementation shown in FIG. 18O.

FIG. 18P shows three light emitters 1002a, 1002b, 1002c injecting light into another color mixing element 1004. The color mixing element 1004 may include an x-cube. The x-cube includes first and second dichroic beam combiner elements 1006a, 1006b. Light from the first emitter 1002a is reflected by the first dichroic beam combiner element 1006a and light from the second emitter 1002b is reflected by the second dichroic beam combiner element 1006b. Light from the third emitter 1002c may be transmitted by both the first and second dichroic beam combiner elements 1006a, 1006b. Accordingly, light from the first, second, and third emitters 1002a, 1002b, 1002c is combined. As shown, an output surface of the color mixing element 1004 is optically coupled to the input surface of the waveguide 112 opposite (e.g., farthest from) the end reflector 114. Light from the three emitters 1002a, 1002b, 1002c combined by the x-cube 1004 is thus injected into the waveguide 112 and propagates toward the end reflector 114. The illumination modules 102 having a variety of different configurations are disclosed above. These configurations may include multiple dichroic beam combiner elements. In various configurations, these dichroic beam combiner elements were included prisms such as dichroic prism (e.g., dichroic cube prisms or rectangular prism). Dichroic beam combiner elements may be employed differently. Instead of prisms such as cube prisms, beamsplitters or beam combiner plates may be used. Such plates may include, for example, a substrate (e.g., plate, sheet, layer) of transparent material on which is formed a dichroic beam combiner element. Such a dichroic beam combiner element may include for example a dichroic coating. As described above, the dichroic beam combiner element may reflect light of certain wavelengths and transmit light of other wavelengths. FIGS. 18Q-18V show illumination modules utilizing beam combiner plates analogous to the illumination modules depicted in FIGS. 18B-18M that utilize dichroic (e.g., cube or rectangular prism) prisms. As illustrated in some implementations lenses 1012a, 1012b, 1012c (e.g., collimating lenses) are included. Some implementations include a diffuser 1008. Light emitter 1002a, 1002b, 1002c such as lasers (e.g., laser diodes) may be included. Accordingly, characteristics, structures and/or features discussed above and elsewhere herein with respect illumination modules 102 comprising dichroic (cube or rectangular prism) prisms can be applied to illumination modules comprising beam combiner plates. Still other variations such as described elsewhere herein are possible.

As illustrated in FIG. 19, an illumination system 1800 can include a delivery system 1802 between the illumination module 102 and the PBS 104, according to some embodiments. The delivery system 1802 may be, for example, an optical fiber delivery system. The illumination module 102 may include a coherent light emitter, such as a laser module. The laser module may include one or more lasers and may include different color lasers. The different lasers may include one or more color laser such as red, green, and blue, for example. The laser module may further include one or more couplers to combine beams from more than one laser. Such couplers may include one or more beam splitters or combiners, dichroic beam splitters or combiners, and/or optical fiber couplers to combine light from different sources like different color source (e.g., different color lasers). The optical fiber delivery system 1802 may include multimode optical fiber. In some designs the optical fiber has a sufficiently large core to promote mixing of the light from different lasers. The optical fiber may also include polarization maintaining fiber.

The delivery system 1802 may include two or more fibers. For example, different fibers may be optically coupled to different light sources such as different color light sources to inject different colors of visible light (e.g., red, green, blue). However, in some embodiments, multiple light emitters such as multiple color light sources are combined into a single fiber. The illumination module 102 may include multiple lasers such as different color lasers. The outputs of the illumination module 102 (e.g., different color lasers) can be optically coupled to a multi-mode optical fiber. The different color light from the illumination module 102 may mix in the fiber. Color mixing may occur inside the illumination module 102 and/or within the delivery system 1802, such as in embodiments that include a multimode laser.

The illumination module 102 including laser light emitters may be output polarized light such as light of a first polarization state (e.g., s-polarization state) that can be modulated by the SLM 106. Accordingly, the delivery system 1802 may include polarization maintaining fiber (PMF). The polarization maintaining fiber may maintain the polarization state of the light so that the illumination module 102 can efficiently deliver suitably polarized light to the PBS 104.

The delivery system 1802 is disposed to inject light into the waveguide 112. The delivery system 180 is butt coupled to the light input surface 113C. In some embodiments, the delivery system 1802 injects light into the waveguide 112 opposite an output area 1804 and/or opposite the refractive optical element 118.

The flexibility of the delivery system 1802 including optical fibers and the ability to couple over distances may facilitate the use of the illumination module 102 including one or more laser modules at a distance remote from the polarizing beam splitter 104. For example, the illumination module 102 (e.g., laser module) may be installed on a unit that is not mounted on or near a head of the user where the PBS 104 may be located. The illumination module 102 may be mounted on a platform that is wearable by a user on a location other than the head. The platform may, for example, be mountable on a belt or in a wearable pack. Providing the one or more laser modules in a separate wearable different from the head mounted apparatus can reduce thermal emission near the head of a user, reduce the weight of an associated head-mounted system to be worn by the head, and/or provide greater flexibility in form of the associated head-mounted system.

As discussed above, the illumination module 102 may include one or more coherent light emitters such as lasers. In some embodiments, the illumination module 102 includes one or more fiber lasers. Lasers can provide relatively high optical output relative to other light emitters. The coherent light emitters also have a narrow spectral band. The narrow band coherent light emitters may, for example, output over a narrow range of wavelengths between about 2 nm and 45 nm. In some embodiments, the range of wavelengths of the narrowband coherent light emitters is between about 10 nm and 40 nm. In some embodiments, the range of wavelengths of the narrowband coherent light emitters is between about 20 nm and 30 nm. A coherent light emitter may include multiple such laser sources (e.g., a laser source for red, green, and blue light). Narrow band coherent light emitters can have increased color saturation which can be useful for color displays. The increased saturation of the coherent light emitters may potentially expand the size of the available color gamut that can be produced using the different high saturation color light emitters.

In some embodiments, using a fiber can allow smaller optics. An optical fiber having a small output area as compared to a large LED may enable coupling into a smaller input face of the waveguide 112 with reduced coupling losses. The waveguide 112 may therefore potentially be made smaller. Additionally, in some designs, the numerical aperture (NA) of the fiber is configured to increase an in-coupling efficiency of the PBS 104. For example, the NA of a fiber provides a narrower cone angle than an LED. A fiber may therefore potentially be used to in-couple the light into a smaller waveguide 112 efficiently. A fiber laser may provide a narrower cone angle over an LED. Additionally, a narrower cone angle may allow for a smaller beam diameter of light after the light is collimated by the end reflector 114. This can improve interoperability with one or more other optical elements with which the waveguide 112 may be optically coupled, such as one or more incoupling optical elements 700, 710, 720 (see, e.g., FIG. 9A). In some designs, light can be polarized before being in-coupled at the waveguide 112 without the need of a pre-polarizer. In some embodiments, the illumination module 102 outputs polarized light and the delivery system 1802 includes a polarization-maintaining fiber (PMF). In these embodiments, a pre-polarizer may not be necessary to polarize light output by the fiber prior to in-coupled into the waveguide 112.

The illumination module 102, however, need not be limited to lasers. LEDs may also be employed. One or more super luminescent light-emitting diodes (SLED) may be used in certain designs. As with laser sources colors, different color light from LEDs or other light emitters can be mixed. Multimode optical fiber may be employed.

The illumination system 1800 may be configured in a transmission mode using coherent light. In the transmission mode, the illumination module 102 injects light into the waveguide 112 via a delivery system 1802. The delivery system 1802 may include one or more fibers. In some embodiments, the illumination module 102 injects light into the surface of the waveguide 112 proximate an output area 1806. After the light is reflected off the end reflector 114 and the polarization sensitive reflector 116, at least some light is reflected toward the SLM 106. Light may transmit through the SLM 106 to the output area 1806. The SLM 106 may be disposed on a side of the illumination system 1800 proximate the output area 1806. In some implementations, the illumination module 102 may include one or more coherent light sources, such as lasers, and output coherent light. In other implementations the illumination module 102 may include one or more incoherent light sources such as LEDs (e.g., superluminescent diodes, organic light emitting diodes (OLEDs)) and outputs incoherent light.

The illumination system 1800 may be configured to operate in a reflection mode using an incoherent light. In the reflection mode, the illumination module 102 injects light into a surface of the waveguide 112 opposite the end reflector 114. In some embodiments, the illumination module 102 injects light into the surface of the waveguide 112 opposite the output area 1806 and/or refractive optical element 118. Light from the illumination module 102 may thus reflect off the end reflector 114 and then off the polarization sensitive reflector 116. The SLM 106 may be disposed on a side of the illumination system 1800 proximate the first surface 113A at the base or bottom of the waveguide 112. As a result, at least some light is incident on the SLM 106. The SLM 106 may be a reflective SLM that modulate reflected light. Such reflected light may propagate through the PBS 104, for example, the waveguide 112 and the refractive optical element 118 and reach the output area 1804. The illumination module 102 may include one or more incoherent light emitters, such as, for example, a light emitting diode (LED) (e.g., superluminescent diode, organic light emitting diode (OLED)). In other implementations, the illumination module 102 comprises one or more coherent light sources such as laser and output coherent light.

Figure 20A:
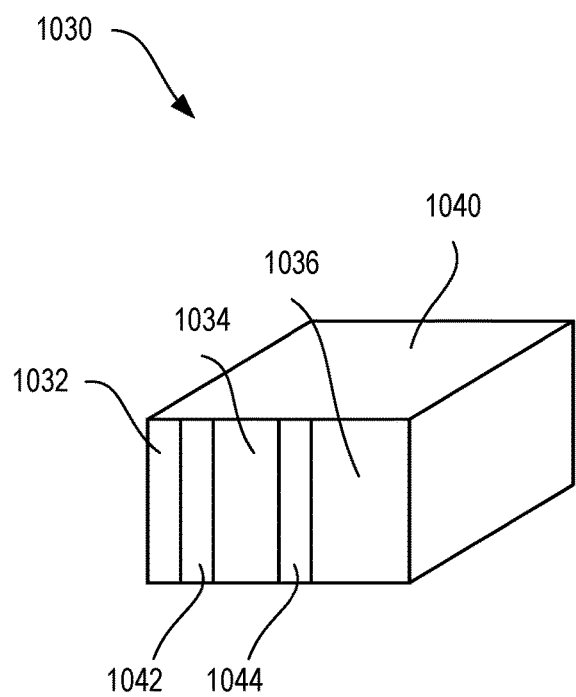
FIG. 20A shows an example light pipe integrator including color source areas, according to some embodiments.
Figure 20B:
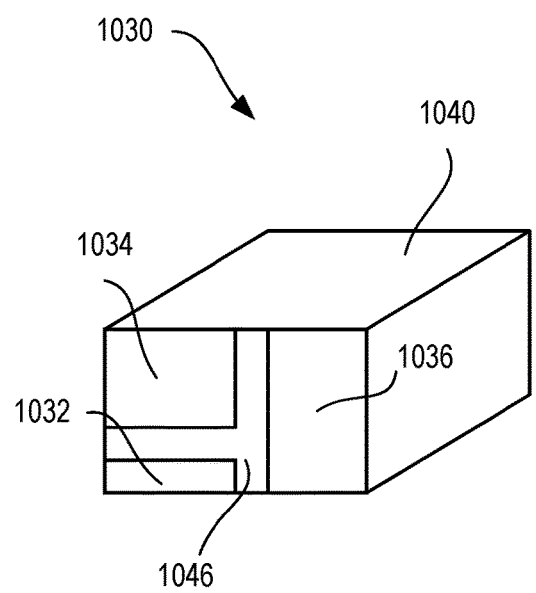
FIG. 20B shows an example light pipe integrator including color source areas, according to some embodiments.

As illustrated in FIGS. 20A and 20B, the illumination modules 102 may include a light pipe integrator 1030 configured to receive light from one or more light emitters and to mix light received by the one or more light emitters. The light emitters may include one or more different color light emitters. The size and/or number of light emitters may be different for different colors.

The size and/or number of light emitters may depend, for example, on the optical efficiency of the light emitters and/or white color balance or possible other factors. To counter reduced efficiency for color emitters having relatively less efficiency, the number and/or size of emitters of that particular color can be increased. Likewise, to compensate for color emitters having relatively more efficiency, the number and/or size of emitters of that particular color can be decreased. Similarly, the number and/or size of emitters of a particular color can be increased (or decreased) to increase (or decrease) the contribution of that color to the overall output to obtain, for example, the desired white balance.

In various implementations, having different number and/or size of the emitters for different colors may result in regions or areas for different colors emitters having different size. FIGS. 20A-20B, for example, show a light pipe with one or more different color regions produced by different color light sources of different size and/or number.

FIG. 20A shows an example light pipe integrator 1030 having three such regions, a first color source emission area 1032, a second color source emission area 1034, and a third color source emission area 1036 corresponding to emission regions or active areas of the emitters for three different colors. In this example, the first color source emission area 1032 is smaller than the second color source emission area 1034 and the third color emission source area 1036, and the second color source emission area 1034 is smaller than the third color source emission area 1036. The first color source emission area 1032, the second color source emission area 1034, and the third color source emission area 1036 may correspond to first, second, and third colors of light respectively. The difference in area may be used to counter reduced efficiency of the emitter(s) for the particular color, and/or may be used to provide the desired distribution of color components, for example, to produce a desired white balance. The third color source emission area 1036 may be larger than the first color source emission area 1032 and the second color source emission area 1034 because a larger number of emitters of the third color than the first color or the second color may be used. Alternatively or additionally, the emitter or emitters outputting light of the third color may be larger than the emitter or emitters outputting light of the first or second colors. Similarly, second color source emission area 1034 may be larger than the first color source emission area 1032 because a larger number of emitters of the second color than the first color may be used. Alternatively or additionally, the emitter or emitters outputting light of the second color may be larger than the emitter or emitters outputting light of the first color.

Other configurations are possible. For example, even if the size of the emitters of one color are larger than the size of the emitters of another color, the number of emitters may be sufficiently larger to produce a larger emission area for the one color as opposed to the other color. Similarly, even if the number of the emitters of one color are smaller than the number of the emitters of another color, the size of emitters may be sufficiently larger to produce a larger emission area for the one color as opposed to the other color. In some embodiments, multiple emitters are used for a particular color source emission area 1032, 1034, 1036. Alternatively, a single emitter may be used for a particular color source emission area 1032, 1034, 1036. The shape and arrangement of the color source emission area 1032, 1034, 1036 may also vary for different embodiments. In some embodiments, the color source emission areas 1032, 1034, 1036 may be spaced apart by other non-color sections 1042, 1044 that do not produce or transmit light emission. The shape and arrangement of the non-color sections 1042, 1044 may also vary for different embodiments. Also, although in this example three color source emission areas 1032, 1034, 1036 corresponding to three colors are shown, the number of color source emission areas 1032, 1034, 1036 and/or colors can vary. Similarly, although in this example two non-color sections 1042, 1044 are shown, the number of non-color sections 1042, 1044 can vary. The colors may also vary. In one example, three colors such as red, green, and blue are used. The colors can be different. Additionally, which source emission areas 1032, 1034, 1036 correspond to which color may also vary. Still other variations are possible.

In some implementations, each of the three color source emission areas 1032, 1034, 1036 may be disposed on the same surface of the light pipe integrator 1030. Other configurations are also possible. A light pipe 1040 may receive the light along an optical axis. The optical axis may be aligned with the length of the light pipe 1040. In some embodiments, the light pipe 1040 includes a rectangular prism shape. Other shapes are also possible.

The size and shape and thus dimensions of the light pipe integrator 1030 may be different for different designs. A height of the light pipe integrator 1030 may, for example, be between 0.20 mm and 2.5 cm. In some embodiments, the height is, for example, between 0.30 mm and 5.0 mm. In some embodiments, the height may be between 0.50 mm and 2.0 mm. In some embodiments, the height is 0.70 mm. A width of the light pipe integrator 1030 may be, for example, between 0.30 mm and 3.0 cm. In some embodiments, the width is between 0.50 mm and 7.0 mm. In some embodiments, the width may be between 0.85 mm and 3.0 mm. In some embodiments, the width is 1.20 mm. A length of the light pipe integrator 1030 may, for example, be between 1.0 mm and 5.0 cm. In some embodiments, the length is between 2.0 mm and 1.5 cm. In some embodiments, the length may be between 3.0 mm and 9.0 mm. In some embodiments, the length is 4.50 mm. Other ranges formed by any of these values are also possible. Values outside these ranges are also possible.

The various color emission areas 1032, 1034, 1036 may each be separated by parallel (e.g., vertical) non-color sections 1042, 1044. For example, as shown in FIG. the first color source emission area 1032 and the second color source emission area 1034 may be separated by the first non-color section 1042, and the second color source emission area 1034 and the third color source emission area 1036 may be separated by the second non-color section 1044. The distance between the first color source emission area 1032 and the second color source emission area 1034 may, for example, be between 0.01 mm and 0.50 mm. In some embodiments, the distance is 0.11 mm. The distance between the second color source emission area 1034 and the third color source emission area 1036 may be between 0.01 mm and 0.50 mm. In some embodiments, the distance is 0.11 mm. Other ranges formed by any of these values are also possible. Values outside these ranges are also possible.

The first color source emission area 1032 may be disposed at an edge of a first surface of the light pipe integrator 1030. In some embodiments, the first color source emission area 1032 spans the full dimension (e.g., height) of the first surface of the light pipe integrator 1030, as shown in FIG. 20A. The first color source emission area 1032 may have a length, for example, between 0.2 mm and 1.2 mm. In some embodiments, the length is mm. In some embodiments, the length is 0.59 mm. The first color source emission area 1032 may have a width, for example, between 0.01 mm and 0.50 mm. In some embodiments, the width is 0.12 mm. In some embodiments, the width is 0.14 mm. Other ranges formed by any of theses values are also possible. Values outside these ranges are also possible.

In some designs the second color source emission area 1034 may be disposed between the first color source emission area 1032 and the third color source emission area 1036. The second color source emission area 1034 may span the full dimension (e.g., height) of the first surface of the light pipe integrator 1030, as shown in FIG. The second color source emission area 1034 may have a length between 0.2 mm and 1.2 mm. In some embodiments, the length is 0.70 mm. In some embodiments, the length is mm. The second color source emission area 1034 may have a width between 0.01 mm and 0.90 mm. In some embodiments, the width is 0.37 mm. In some embodiments, the width is 0.45 mm. Other ranges formed by any of these values are also possible. Values outside these ranges are also possible.

The third color source emission area 1036 may be disposed at an edge of the first surface of the light pipe integrator 1030. In some embodiments, the third color source emission area 1036 spans the full dimension (e.g., height) of the first surface of the light pipe integrator 1030, as shown in FIG. 20A. The third color source emission area 1036 may have a length between 0.2 mm and 1.2 mm. In some embodiments, the length is 0.70 mm. The third color source emission area 1036 may have a width between 0.01 mm and 1.50 mm. In some embodiments, the width is 0.49 mm. In some embodiments, the width is mm. Other ranges formed by any of these values are also possible. Values outside these ranges are also possible.

As stated above, the number, size, shape, orientation, distance of separation, and other attributes of the color source emission areas 1032, 1034, 1036 may be different for different designs and may be determined based on one or more factors. For example, these attributes may be based on the efficienlty of the light sources (e.g., LEDs) and/or the white color balance of the light pipe integrator 1030. The layout of the light sources can be different. The shapes of one or more of the color source emission areas 1032, 1034, 1036 may be rectangular although other shapes are possible.

The light pipe integrator 1030 may take on one of a number of forms. For example, the light pipe 1040 may be hollow in some embodiments. In such embodiments, interior walls of the light pipe 1040 may be reflective (e.g., including a mirror coating). In some embodiments, such a reflective coating may promote improved mixing of the light as the light propagates along the optical axis of the light pipe integrator 1030. In some embodiments, the light pipe 1040 may include a solid material, such as an optically transmissive material (e.g., plastic, glass, resin). Light may be configured to propagate through the light pipe integrator 1030 reflecting off of sidewalls by total internal reflection (TIR). In some embodiments, the optically transmissive material through which the light propagates within the light pipe integrator 1030 is diffusive. The diffusive material may be configured to scatter light propagating within the light pipe integrator 1030 (e.g., forward scattering the light along the length of the light pipe integrator 1030) thereby mixing the different colors of light. In some embodiments, the light pipe 1040 may include scatter features such as small particles to promote diffusion of the light. For example, the light pipe 1040 may be a volume light integrator doped with diffusive particles.

FIG. 20B shows an example light pipe integrator 1030 using an alternative arrangement of color source emission areas 1032, 1034, according to some embodiments. As shown in FIG. 20B, more than one color source emission areas 1032, 1034, 1036 may be disposed along an edge of the first surface of the light pipe integrator 1030. The first color source emission area 1032 and the second color source emission area 1034 may be separated from one another by a portion of an integrated non-color section 1046. One or both of the first color source emission area 1032 and/or the second color source emission area 1034 may be separated from the third color source area 1036 by the integrated non-color section 1046. In some embodiments, the integrated non-color section 1046 is shaped like a capital T, although other shapes are possible. The second color source emission area 1034 and the first color source emission area 1032 may be disposed relative to one another along a first axis. The third color source emission area 1036 may be disposed relative to one or both of the second color source emission area 1034 and/or the first color source emission area 1032 along a second axis different from the first axis. In some designs, the first axis may be perpendicular to the second axis, as shown in FIG. 20B. As discussed above, however, a wide range of different shapes, sizes, arrangements and configurations are possible.

Figure 20C:
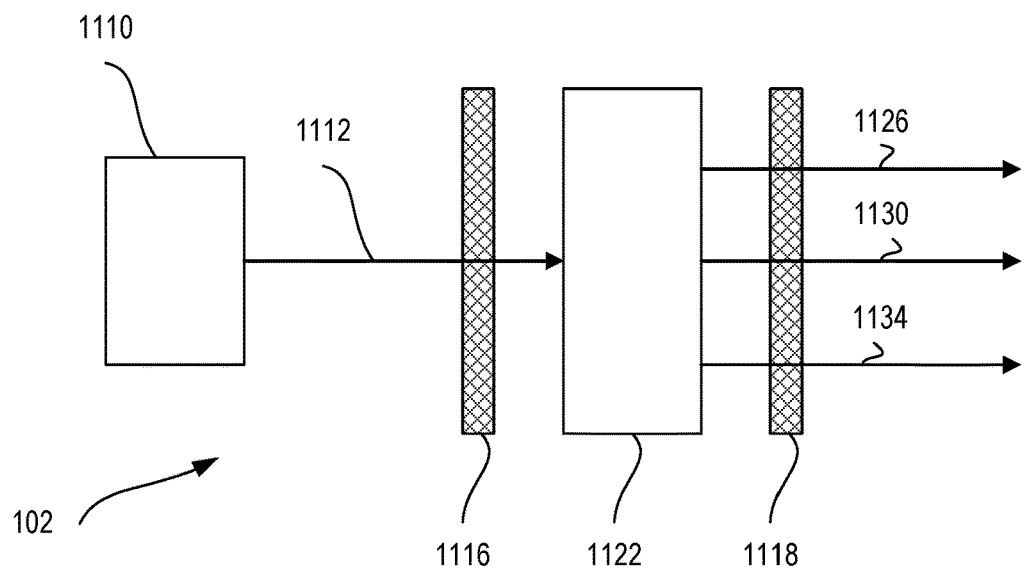
FIGS. 20C-20D show examples of an alternative illumination module.
Figure 20D:
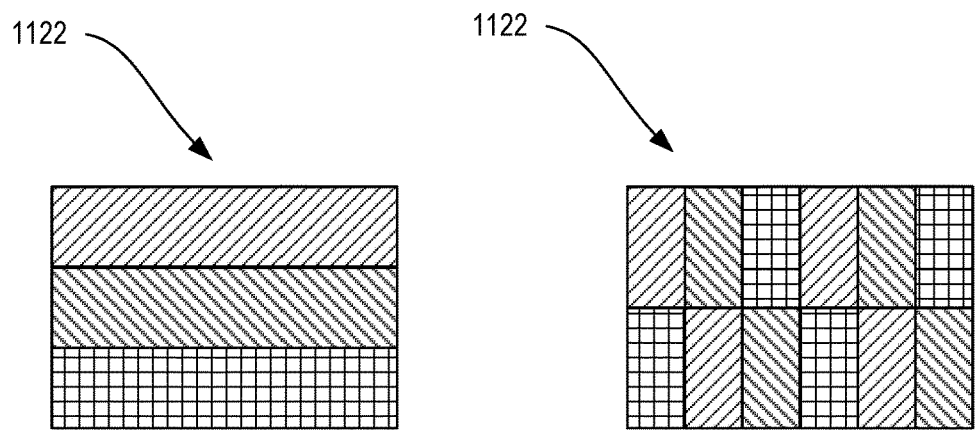
Figure 20D:
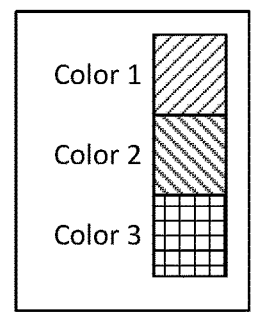

FIGS. 20C-D show additional aspects of embodiments of color emitters that can be used in illumination modules 102. An illumination module 102 may use one or more color emitters (e.g., laser diodes or light emitting diodes) to produce color light, in certain implementations, a white light source 1110 and a color modulator may be employed. The white light source 1110 may include, for example, one or more white light emitting diodes (LEDs). The color modulator may include a spatial light modulator (SLM) 1122 having different pixels with associated color filters. The SLM 1122 may include, for example, a liquid crystal cell including one or more pixels that can be switch between states. The pixels can include color filters or be disposed with respect to color filters such that, for example, light passing through the color pixel passes through the color filter. For example, one or more pixels may have associated therewith one or more color filters of a first color (e.g., red), one or more pixels may have associated therewith one or more color filters of a second color (e.g., green), and one or more pixels may have associated therewith one or more color filters of a third color (e.g., blue). The states of the pixel can be altered, for example, by applying electrical signals. For example, the polarization state of light passing through the SLM 1122 may be rotated or not rotated depending on the state of the pixel. First and second polarizers 1116, 1118 may be included on either side of the SLM 1122. The polarizers 1116, 1118 may be crossed. Accordingly, the first polarizer 1116 may polarize the light, for example, to a first linear polarization, and the second polarizer 1118 may block the light of the first polarization. The liquid crystal cell of the SLM 1122 may rotate the polarization of light passing through a pixel depending on the state of the pixel, which may be switched to rotate the polarization of light. Color filters associated with the pixels may be configured to pass light of a certain color. Accordingly, depending on which pixels are set to cause the light to be transmitted and which pixels are set to cause the light to be blocked, the amount different color light output by the illumination module 102 may be controlled.

The size, shape, and arrangement of pixels and color filters may vary to produce different regions corresponding to different colors. FIG. 20D shows two example arrangements of different regions 1112 corresponding to different colors. The example in FIG. 20D shows regions having one of three colors (e.g., red, green, and blue). However, the number of colors may be different. Likewise, the number, size, and shape of the regions may be different for different designs.

Accordingly, the color modulator may be controlled to activate or not activate different regions to produce the desired color and/or color combination. Additionally, the color modulator may be controlled to vary the amount of light output by the pixel to provide more than just two levels of brightness for said pixel. For example, instead of simply controlling whether the pixel is on or off, additional intermediate levels for the pixel may be selected (e.g., by rotating the polarization by different amounts) thereby enabling more than two different amounts of light output that can be output from that pixel. In some implementations, the color pixels can be addressed time sequentially. For example, the pixels corresponding to a first color can be addressed at a first period of time, the pixels corresponding to a second color can be addressed at a second period of time, and the like. The different colors can be produced at different time to vary the color output in a time sequence matter that can be coordinated, for example, another SLM 106 that is illuminated with light from the illumination module 102 to produce different color images at different times.

The size and/or number of pixels associated with a given color can be selected to provide the desired color balance (e.g., white balance) and/or address different efficiencies associated with different colors as described above with regard to FIGS. 20A and 20B. Accordingly, the area associated with different color pixels that are activated (and the associated level of brightness) may be used to control the amount of light of a particular color output from the illumination module 102. Likewise, the discussions with regard to FIGS. and 20B also apply to the various configurations of the illumination module 102 discussed with respect to FIGS. 21A-21C. For example, an illumination module 102 including a white light source 1110 and a color modulator such as shown with regard to FIGS. 20A and/or 20B can be used with a light pipe integrator 1030.

Figure 21A:
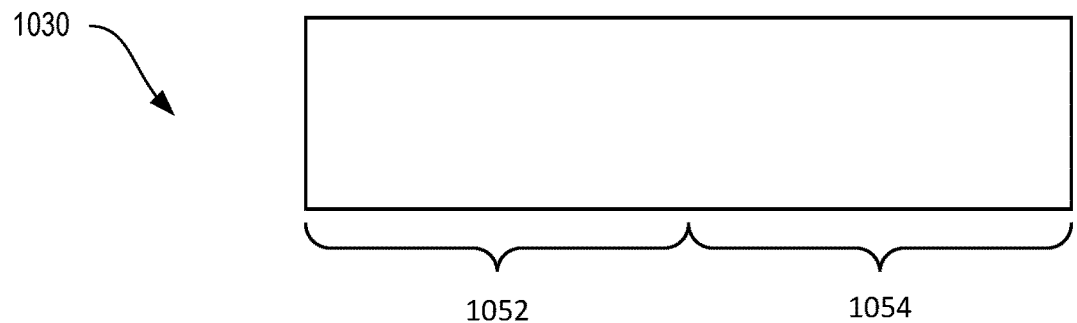
FIG. 21A shows a basic structure of an integrated dichroic combiner and light integrator, according to some embodiments.
Figure 21B:
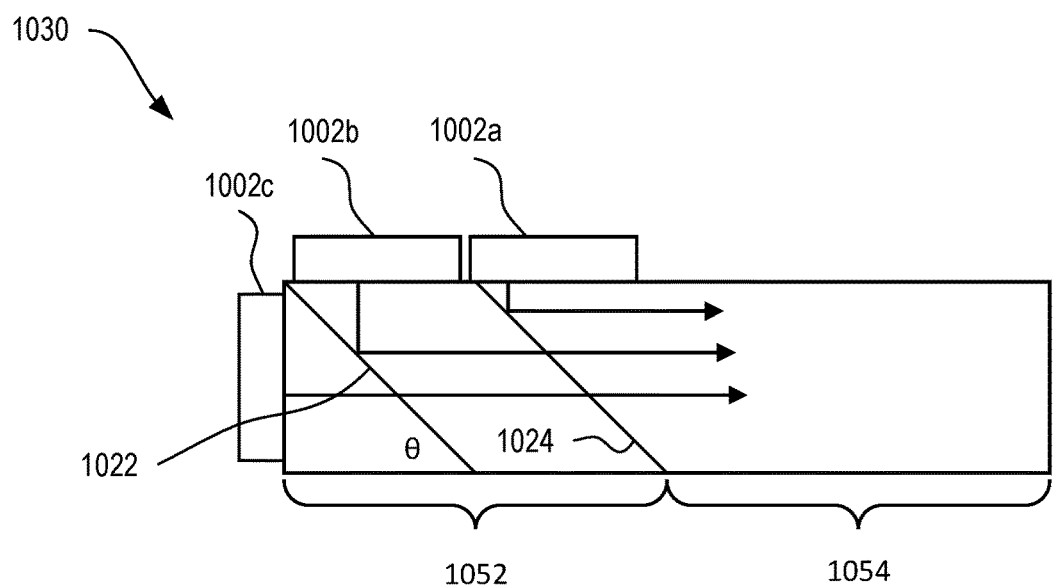
FIG. 21B shows an example of an embodiment of FIG. 21A with light emitters and combining elements, according to some embodiments.
Figure 21C:
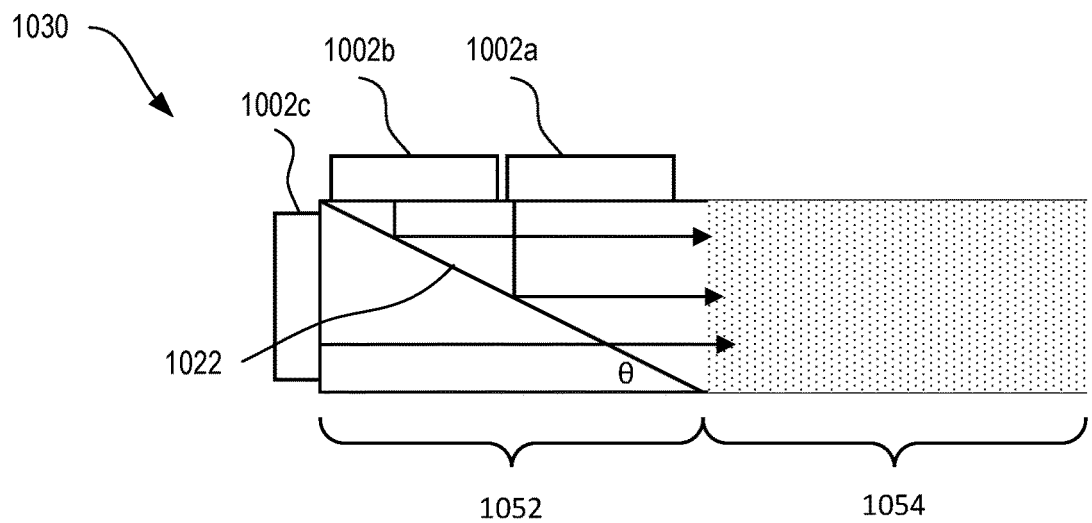
FIG. 21C shows an example embodiment of FIG. 21A with only one combining element as well as a light integrator, according to some embodiments.

FIGS. 21A-21C illustrate a dichroic combiner 1052 in series with a light integrator 1054 configuration of a light pipe integrator 1030 of an illumination module 102, according to some embodiments. The dichroic combiner 1052 may alternatively be referred to as a dichroic light combiner 1052. FIG. 21A shows an integrated structure having a first region for the dichroic combiner 1052 and a second region for the light integrator 1054. In some embodiments, the dichroic combiner 1052 may be disposed adjacent the light integrator 1054. In the example shown, the light pipe integrator 1030 is linear and elongate with a first region for the dichroic combiner 1052 at a first end and a second region for the light integrator 1054 at a second end. This elongate integrated structure may comprise a rod. This elongate integrated structure may have planar outer surfaces and may have the shape of a rectangular prism in certain implementation. The light emitters 1002a, 1002b, 1002c may be butt coupled against one or more of these outer surfaces to couple light into the light pipe integrator 1030. In some embodiments, the dichroic combiner 1052 may be seamlessly formed with or integrated with the light integrator 1054. In some embodiments, for example, either or both the first and second region include hollow portions defined by inner reflective sidewalls through which light can propagate. As described above, the inner reflective sidewalls may be coated with a reflective coating. In some embodiments, either or both the first and second region include solid optically transmissive material (e.g., plastic or glass) through which light can propagate via total internal reflection off the sidewalls. In some designs, a combination of such solid and hollow portions may be included. The dichroic combiner 1052 may be attached to the light integrator 1054, but in some embodiments they are manufactured as a unitary (e.g., monolithic) element. In some embodiments, the first region and/or the second region are fabricated by combining or attaching different portions.

FIG. 21B shows an example of an embodiment of FIG. 21A with the light emitters 1002a, 1002b, 1002c and dichroic combining elements 1022, 1024 of the dichroic combiner 1050. The dichroic combining elements 1022, 1024 may be reflective optical elements. The dichroic combining elements 1022, 1024 may be optically transmissive and/or optically reflective. For example, each of the dichroic combining elements 1022, 1024 may be tuned to a particular wavelength or range of wavelengths such that they are configured to reflect light of that wavelength or range of wavelengths and to transmit light of other wavelengths. For example, the dichroic combining elements 1022, 1024 may include dichroic coatings. In some embodiments, the dichroic combining elements 1022, 1024 include tilted surfaces that direct light from the emitters 1002a, 1002b, 1002c along a common optical path. The color mixing elements including the dichroic combining elements 1022, 1024 are arranged along this optical path. In some embodiments, the inclined input surfaces are inclined with respect to this optical path. Accordingly, one or more of the dichroic combining elements 1022, 1024 may be disposed at an angle θ relative to this optical path and/or relative a surface of the light pipe integrator 1030. The angle θ may, for example, be between 20° and 45°. In some designs, the angle is 30°. The selected angle θ may increase or optimize efficiency of light mixing and/or intensity.

FIG. 21C shows an example embodiment of the integrated structure of FIG. 21A with a dichroic combining element 1022 of the dichroic combiner 1052 and a light integrator 1054. The dichroic combining element 1022 is disposed with respect to first and second light emitters 1002a, 1002b to receive and reflect different color light from the first and second light emitters 1002a, 1002b, respectively. The dichroic combining element 1022 may be configured to transmit light only of certain wavelengths (e.g., red light) and reflect light of other wavelengths (e.g., blue and green). For example, the dichroic combining element 1022 may be configured to transmit light emitted by the third light emitter 1002c and reflect light from the first and second emitters 1002a, 1002b. The dichroic combining element 1022 may be tilted more (angle θ shown in reduced) to accommodate reflection from two emitters 1002a, 1002b compared to a design where the dichroic combining element 1022 reflects light from a single color emitter. Nevertheless, such a configuration may be simpler to fabricate as the number of dichroic combining elements 1022 that are included and possibly components to be assembled are reduced.

This technique of reducing the number of dichroic combining elements 1022 that are employed by using one dichroic combining elements 1022 to receive, reflect, and/or transmit from multiple different color emitters may be applied to any of the other designed concepts discussed herein. Accordingly, instead of using two dichroic beam combiners, a single dichroic beam combiner may be used to receive, reflect, and/or transmit light from multiple different color emitters. This single dichroic beam combiner can receive light from a third color emitter having a third different color that is transmitted through the dichroic beam combiner. Consolidating two dichroic beam combining elements or dichroic beam combiners into a single dichroic beam combining element or dichroic beam combiner may be utilized for the different design approaches described herein and may provide simplification in manufacturing. Likewise, any characteristics or features discussed here can be applied elsewhere to structures and concepts discussed elsewhere herein. Similarly, any characteristics, features, or concepts discussed elsewhere herein can be applied to other structures, feature or concepts described here.

The light integrator 1054, as shown in FIG. 21C, may include solid optically transmissive material (e.g. plastic or glass) including diffusing features such as particles or other scattering features to more effectively mix the colors of light. Accordingly, the light integrator 1054 may be configured to scatter light diffusely as the light propagates along an optical axis of the light pipe integrator 1030. For example, the light pipe integrator 1030 may include a diffuse material, such as a translucent material and/or a material that includes microparticles configured to scatter light. Other approaches to diffusing and/or scattering light may also be employed. For example, the walls of the light integrator 1054 may be textured so as to scatter light. Also, in designs where the light pipe integrator 1030 is hollow, the inner sidewalls from which the light reflects may be textured or coated so as to increase diffuse reflection. The inner sidewalls may, for example, be colored white. The mixing of light (e.g., color mixing) within the light pipe integrator 1030 thereby be increased.

Adding the light pipe integrator 1030 whether or not in an integrated structure and/or adding diffusing features for example to an optically transmissive material which may possibly increase mixing may be utilized for the different design approaches described herein. Likewise, any characteristics or features discussed here can be applied elsewhere to structures and concepts discussed elsewhere herein. Similarly, any characteristics, features, or concepts discussed elsewhere herein can be applied to other structures, feature or concepts described here.

Figure 22A:
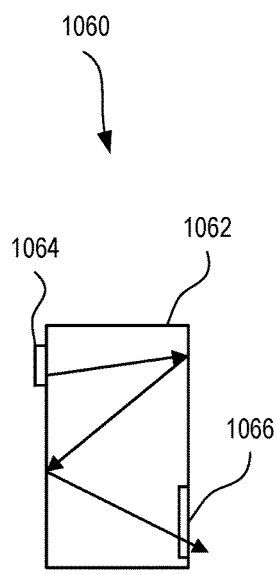
FIG. 22A shows a side view of an example reflective illumination module, according to some embodiments.
Figure 22B:
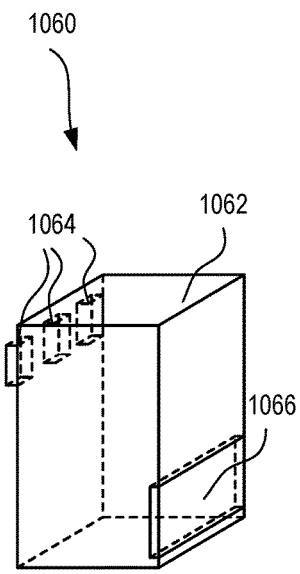
FIG. 22B shows an isometric view of the example reflective illumination module of FIG. 22A, according to some embodiments.
Figure 22C:
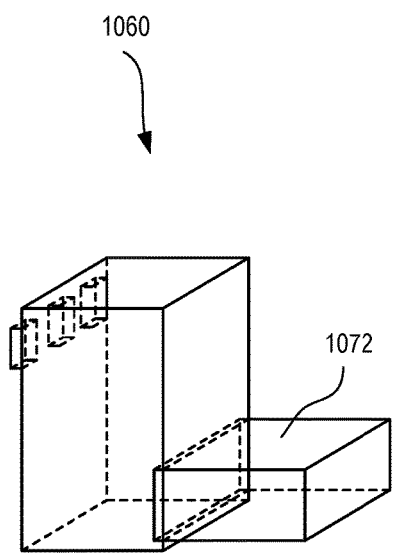
FIG. 22C shows an example reflective illumination module including an extension, according to some embodiments.

It may be advantageous to include a reflective illumination module configured for ingress on a first side and egress on a second (e.g., opposite) side at locations that are displaced such that the light reflects from the first and second opposite sides between ingress and egress. Such a configuration may increase color mixing. FIGS. 22A-22C illustrate a reflective illumination module 1060, according to some embodiments. FIG. 22A shows a side view the reflective illumination module 1060. FIG. 22B shows an isometric view of the reflective illumination module 1060 of FIG. 22A. The reflective illumination module 1060 may include one or more light sources 1064 and one or more opening for receiving light from the one or more light sources 1064, an elongate illumination module body 1062 having ends and sidewalls between the two ends, and an exit aperture 1066. The light source(s) 1064 may be disposed on location on the sidewall of the illumination module body 1062. The exit aperture 1066 may be disposed at another location on the sidewall of the illumination module body 1062. The locations on the sidewalls where the light source(s) 1064 and the exit aperture 1066 are positioned may be on opposite sides of the illumination module body 1062 as illustrated in FIGS. 22A and 22B. However, the locations on the sidewalls where the light source(s) 1064 and the exit aperture 1066 are positioned may be on the same side of the illumination module body 1062 in some implementation or elsewhere on the sidewall. In some embodiments, such as shown in FIGS. 22A and 22B, the light source(s) 1064 and the exit aperture 1066 are located at opposite ends of the illumination module body 1062. The shape of the illumination module body 1062 may be rectangular (e.g., rectangular prism) although other shapes are possible. In some embodiments, the illumination module body 1062 is elongate, with the distance from end to end being greater than the width between opposing sidewalls. In some embodiments, an aspect ratio of the illumination module body 1062 (e.g., the ratio of the distance between end to the distance between opposing sidewalls) is at least greater than 2, or 3, or 4, or 5, or any value in any range between any of these values. Other aspect ratios are also possible.

The illumination module body 1062 may be hollow and include an interior region or cavity in which light propagates from the one or more light sources 1064 exit aperture 1066 reflecting one or more or two or more times off of interior portions of the sidewalls. The interior portions of the sidewalls can be coated to increase reflectivity. The interior portions of the sidewalls can be white to increase reflectivity. Increasing the reflectivity may potentially improve the efficiency of the light output through the aperture 1066. Multiple reflections can also increase mixing (e.g., color mixing). In some implementations, the reflections may be diffuse reflection to further increase mixing. Accordingly, the interior portions of the sidewalls may be coated and/or texture to as to provide diffuse reflection and possibly scatter.

The illumination module body 1062 may have an interior region that is solid (as opposed to hollow) and may include substantially transparent material (e.g., glass or plastic) in some designs. For example, the illumination module body 1062 may include a transmissive medium (e.g., plastic, glass, acrylic, etc.). Such an illumination module body 1062 may be referred to as a volume light integrator. Light may propagate within the interior region from the one or more light sources 1064 to the exit aperture 1066 reflecting one or more or two or more times off of interior portions of the sidewalls. Such reflection may be the result of total internal reflection. However, alternatively or in addition, one or more surfaces of the illumination module body 1062 may be coated with a reflective or mirror coating. For example, surfaces of the illumination module body 1062 may be coated in a white and/or reflective or mirror coating to promote reflection. As discussed above, increasing reflectivity may improve the efficiency of the light output through the exit aperture 1066.

The illumination module body 1062 may include a diffusive material (such as that described regarding the light pipe integrator 1030 in FIG. 22C). In some embodiments, the diffusive material may be doped with diffusive particles or include some other diffusing features and/or scattering features. Increased diffusion or scattering can increase mixing such as color mixing.

The light source(s) 1064 may include one or more LEDs in some implementations although other types of light source (e.g., lasers) may possible be used. For example, each of the light source(s) 1064 may be configured to emit light of a separate color (e.g., red, green, blue). The exit aperture 1066 includes an opening through which light may propagate from the interior of the illumination module body 1062. A polarization-sensitive element may be included, for example, proximal to the exit aperture 1066. This polarization-sensitive element may be polarization selective. For example, the polarization selective element may reflect light of one polarization state and transmit light of another polarization state. The polarization-sensitive element or polarization selective element may, for example, include a polarizer such as a wire grid polarizer. The polarization-sensitive element may be configured to recycle light within the illumination module body 1062 in order to further improve efficiency of the system. For example, if light output of a particular polarization state is desired, the polarization-sensitive element may transmit light having such polarization however may reflect light having different polarization. This reflected light would be returned to or retained within the illumination module body 1062 and reflect therein possibly altering polarization and exiting through the polarization-sensitive element (when the light has the appropriate polarization).

The reflective illumination module 1060 may be configured to be disposed adjacent a polarizing beam splitter (e.g., the PBS 104). Such a polarizing beam splitter may be configured for a particular polarization (e.g., the PBS 104 may turn light of a particular polarization to the SLM 106. The illumination module body 1062 may be configured to output light of that polarization. For example, the polarization-sensitive element may transmit light of that particular polarization for which the PBS 104 is configured to turn to the SLM 104 and reflect other polarizations.

FIG. 22C shows an example reflective illumination module 1060 additionally including an extension 1072. The extension 1072 may be advantageous in directing an output of light and/or increasing mixing (e.g., color mixing). The extension 1072 may be disposed between the reflective illumination module 1060 (e.g., along the aperture 1066) and the PBS 104 (not shown). The extension 1072 may be disposed adjacent the reflective illumination module 1060 (e.g., along the exit aperture 1066). The extension 1072 may have properties, features, and/or characteristics similar to the light integrator describe elsewhere herein. Accordingly, the extension 1072 may be hollow or solid (e.g., plastic, glass, acrylic, etc.). An interior or exterior of the extension 1072 may be coated with a reflective (e.g., white, mirror) coating possibly increasing efficiency. The extension 1072 may be a rectangular prism. The extension may be elongate, having a length longer than width or height in some implementations. Other shapes are possible. The extension 1072 may be configured to be disposed adjacent a polarizing beam splitter (e.g., the polarizing beam splitter 104 described above).

Various implementations described above included one or more separate color light emitters 1002a, 1002b, 1002c. Although different color light emitters 1002a, 1002b, 1002c can be useful for certain designs, a white light emitter such as a white LED can be configured to provide different color illumination. As illustrate in FIGS. 23A-23E, a white light source can be coupled with a switchable color filter, for example, to provide a color light source. Such a light source may include a variable color light source the color output of which can be varied and/or selected. In particular, the switchable color filter has an electrical input that can be varied to control the color light output. Such a light source may be included in the illumination modules 102 discussed herein.

Figure 23A:
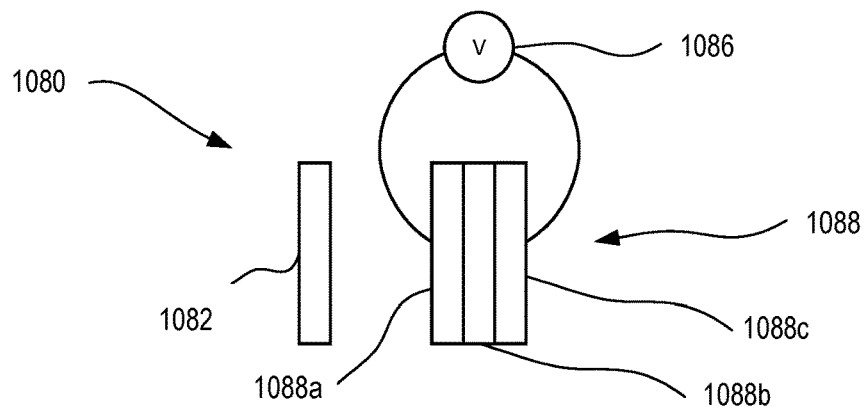
FIG. 23A shows an example of a broadband light source, according to some embodiments.
Figure 23B:
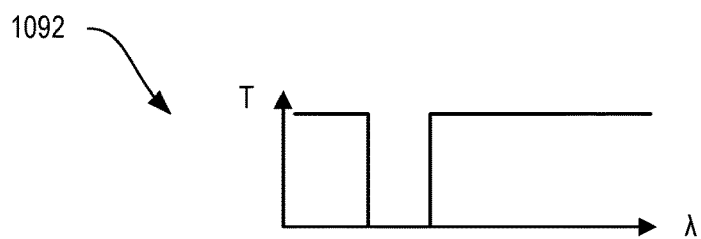
FIG. 23B shows a first color cell off-state, according to some embodiments.
Figure 23C:
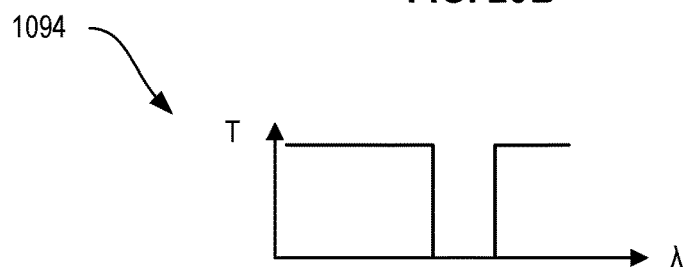
FIG. 23C shows a second color cell off-state, according to some embodiments.
Figure 23D:
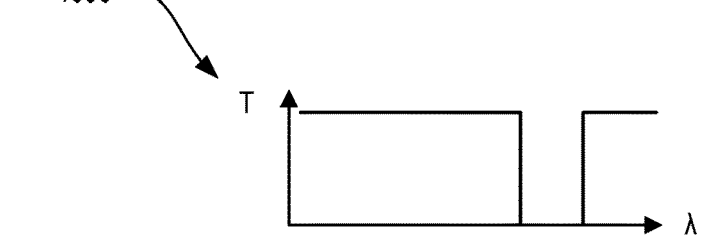
FIG. 23D shows a third color cell off-state, according to some embodiments.
Figure 23E:
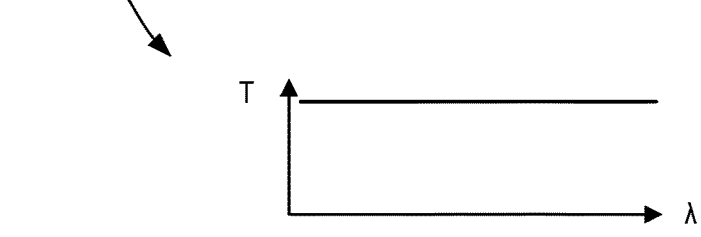
FIG. 23E shows an on-state where transmission of each color of light is effected, according to some embodiments.

FIGS. 23A-23E illustrate cholesteric liquid crystal (CLC) as switchable color filters, according to some embodiments. FIG. 23A shows a broadband light source 1082 such as an LED (e.g., a white light LED). In some embodiments, the broadband light source 1082 used outputs broad band visible light. Such light may, for example, span across the spectrum sufficiently so as to include blue and red and may be have a broader spectral output in various designs. In some embodiments, a white light source that emits visible white light may be used. The broadband light source 1082 may output wavelengths extending continuously over a range or may include multiple peaks in wavelength that may be separated from each other by spectral regions of reduced even possible negligible intensity. The broadband light source 1082 may be disposed with respect to a switchable color filter 1088 such that the switchable color filter 1088 is in the path of light output by the broadband light source 1082 so as to receive light therefrom. The color filter 1088 may include one or more wavelength selective filters 1088a, 1088b, 1088c. Although the switchable color filter 1088 is in front of the broadband light source 1082, other configurations are possible, for example where optics such as mirrors, prisms, light pipes, or other components direct light from the broadband light source 1082 to the switchable color filter 1088. As discussed above, the switchable color filter 1088 can filter light incident thereon with the spectral output being controlled by a control signal to the switchable color filter 1088. As an example, the switchable color filter 1088 may include a CLC cell. The CLC cell may be in electrical communication with a voltage source 1086, which can provide a control signal to the CLC cell to alter the spectral transfer function of the CLC cell. The CLC cell may include separate color CLC cells that may include, for example, a first color CLC cell (e.g., blue) 1088a, a second color CLC cell (e.g., green) 1088b and/or a third color CLC cell (e.g., red) 1088c. The separate color CLC cells can be separately activated. When activated, the color CLC cells may block transmission of a particular spectral region. For example, the first color CLC cell 1088a may be controlled to block wavelengths corresponding to a first color (e.g., blue) as illustrated in FIG. 23B. For example, when in the off state, the first CLC cell 1088a may block wavelengths corresponding to blue light. The second color CLC cell 1088b may be controlled to block wavelengths corresponding to the second color (e.g., green) as illustrated in FIG. 23C. For example, when in the off state, the second CLC cell 1088b may block wavelengths corresponding to green light. The third color CLC cell 1088c may be controlled to block wavelengths corresponding to the third color (e.g., red) as illustrated in FIG. 23D. For example, when in the off state, the third CLC cell 1088c may block wavelengths corresponding to red light. When each of the first, second, and third color CLC cells 1088a, 1088b, 1088c are in the on state, the first, second, and third CLC cells 1088a, 1088b, 1088c may no longer block the wavelengths that were previously being blocked (blue, green, and red, respectively). Accordingly, broadband illumination appears to be transmitted when a control signal is applied. Other configurations are possible. Accordingly, the first CLC cell 1088a may be turned on and the second CLC cell 1088b and the third CLC cell 1088c may be turned off to produce (e.g., transmit) the first color (e.g. blue) from the broad band light source. Accordingly, the second CLC cell 1088b may be turned on and the first CLC cell 1088a and the third CLC cell 1088c may be turned off to produce (e.g., transmit) the second color (e.g., green) from the broad band light source. Accordingly, the third CLC cell 1088c may be turned on and the first CLC cell 1088a and the second CLC cell 1088b may be turned off to produce (e.g., transmit) the third color (e.g., red) from the broad band light source. The first, second, and third CLC cells 1088a, 1088b, 1088c can therefore be turned on time sequentially. For each frame of a particular color, for the period during which the frame is to be presented, only turning on one of the color CLC cells so as to only pass one of the colors. Other configurations are possible. For example, different colors, less color, or more colors can be employed. The electrical signals used to alter the states of the color CLC cells may vary.

Other configurations are possible. As described above, for example, three different color light emitter 1002a, 1002b, 1002c may be used. FIG. 24, for example, illustrates a perspective view of another illumination system, according to some embodiments. As shown, the illumination system 1000 may include three illumination modules 102. As shown, each of the illumination modules 102 may be configured to abut the waveguide 112. Each of the illumination modules 102 may be disposed along a common surface of the waveguide 112. In some embodiments, the illumination modules 102 may each be configured to emit different colors of light. In some embodiments, each of the illumination modules 102 is configured to emit a different color (e.g., red, blue, green, respectively). The illumination modules 102 can be oriented to emit light parallel to one another and/or parallel to a surface of the waveguide 112. The illumination modules 102 may be configured to be time multiplexed. For example, each of the illumination modules 102 may be configured to emit light sequentially. FIG. 25 illustrates a perspective view of another example illumination system 1000, according to some embodiments. As shown, the illumination system 1000 may include two illumination modules 102.

Upon reading this disclosure, those of skill in the art will appreciate still additional alternative structural and functional designs for a system and a process for motion-based content navigation through the disclosed principles herein. Thus, while particular embodiments and applications have been illustrated and described, it is to be understood that the disclosed embodiments are not limited to a precise construction and components disclosed herein. Various modification, changes and variations, which will be apparent to those skilled in the art, can be made in the arrangement, operation and details of the method and apparatus disclosed herein without departing from the spirit and scope defined in the appended claims Modulating Polarization As discussed above with reference to FIG. 6, the light injected into the waveguides 270, 280, 290, 300, 310 may be provided by a light module 540 and may be directed to a spatial light modulator 530 via a beam splitter 550. In various implementations, the spatial light modulator 530 may be configured to modulate the polarization state of the light. In such embodiments, the spatial light modulator 530 can be illuminated by an illumination system in which light from the light module 540 is directed towards the light modulator 530 via a polarizing beam splitter 1306 as shown in FIG. 26.

Figure 26:
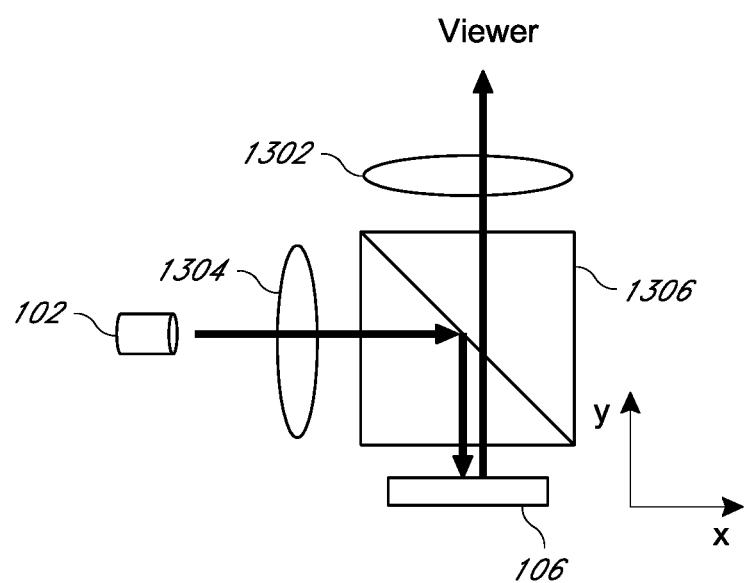
FIG. 26 schematically illustrates an illumination system configured to provide illumination to a spatial light modulator, according to some embodiments.

The illumination system depicted in FIG. 26 is configured to provide illumination to an embodiment of a spatial light modulator 106 that is configured to modulate polarization state of light. In the illustrated implementation, light from a light source 102 can be in-coupled into a polarizing beam splitter (PBS) 1306 via in-coupling optics 1304. The PBS 1306 is configured to direct light having a first polarization state (e.g., s-polarization state) from the light source 102 towards the spatial light modulator 106 and transmit light modulated by the spatial light modulator 106—which can have a second polarization state (e.g., p-polarization state) towards a viewer. In various embodiments, the modulated light can be conditioned by projection optics 1302 disposed between the PBS 1306 and the viewer. The size of the PBS 1306 is determined by a variety of factors including by not limited to the spatial extent of the spatial light modulator 106. For example, consider the implementation illustrated in FIG. 26 in which light from the light source 102 is emitted generally along a horizontal axis parallel to the x-axis. In such an implementation, to direct light towards an embodiment of the spatial light modulator 106 along a direction normal to the surface of the spatial light modulator 106 (e.g., along a vertical axis parallel to the y-axis), the reflecting surface should be inclined at an angle of 45 degrees with respect to the horizontal axis. In order to uniformly illuminate the spatial light modulator along the length of the spatial light modulator 106, the length of the PBS 1306 is at least equal to the length of the spatial light modulator 106. Since, the reflecting surface of the PBS 1306 is inclined at an angle of 45 degrees, the height of the PBS 1306 is also at least equal to the length of the length of the spatial light modulator 106. For example, if the length of an embodiment of the spatial light modulator 1306 is about 10 mm, then the PBS 1306 is a cube having a length and a height equal to at least 10 mm. In other embodiments of the illumination system, the PBS 1306 can have a dimension (e.g., length, width, height, or radius) that is greater than or equal to about 5 mm. Furthermore, in several embodiments, the light source 102 may need to be spaced at a certain distance from the PBS 1306. These and other factors can lead to increasing the size of the illumination system. It may be desirable to reduce the weight, volume, and/or spatial extent of the illumination system that provides illumination to the spatial light modulator 106. For example, when the spatial light modulator 106 is associated with embodiments of wearable display systems discussed herein, it may be desirable to reduce the size of the illumination system. However, it may not be practical to reduce the height of a conventional PBS 1306 and simultaneously redirect light uniformly across the entire length of the spatial light modulator 106 along a direction normal to the surface of the spatial light modulator. Various embodiments described herein comprise a PBS having a surface that is inclined with respect to the horizontal axis by an angle less than about 45 degrees to reduce the height of the PBS and employs a plurality of turning features to provide the additional turning functionality required to illuminate the spatial light modulator uniformly along the normal direction.

Figure 27:
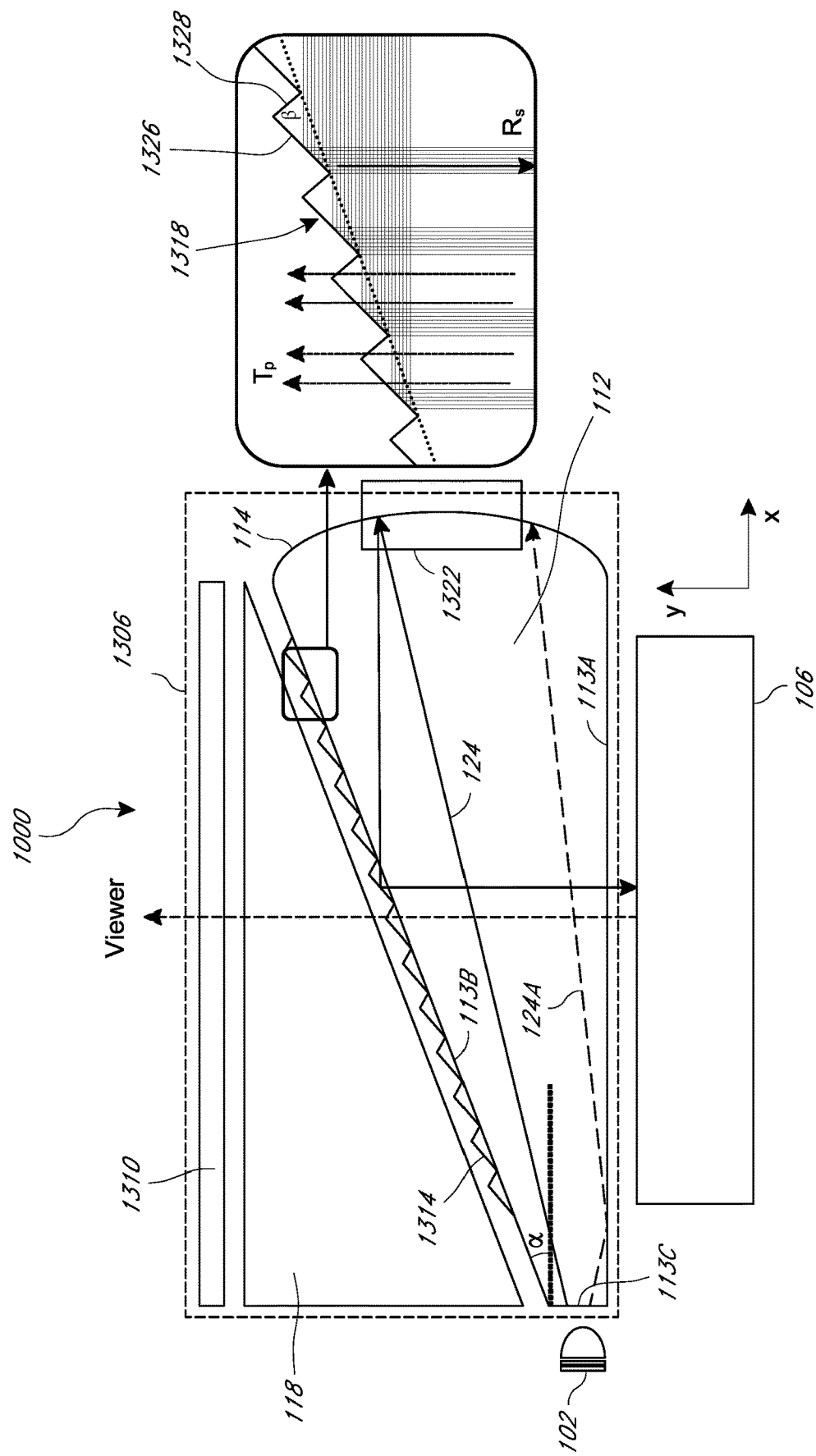
FIG. 27 schematically illustrates an illumination system configured to provide illumination to a spatial light modulator associated with various embodiments of display systems contemplated herein, according to some embodiments. The inset in FIG. 27 provides an enlarged view of a section of the illumination system showing turning features including microstructure reflecting collimated light, according to some embodiments.

FIG. 27 schematically illustrates an embodiment of an illumination system 1000 that is configured to illuminate a spatial light modulator 106 that modulates the polarization of incident light. The illumination system 1000 includes a polarizing beam splitter (PBS) 1306 that is configured to direct light having a first polarization state (e.g., s-polarization state) from a light source 102 towards the spatial light modulator 106 and transmit light modulated by the spatial light modulator 106—which can have a second polarization state (e.g., p-polarization state) towards a viewer. As discussed above, the spatial light modulator 106 can extend along a horizontal axis parallel to an x-axis. The optical axis of the light source 102 can be aligned parallel to the x-axis and light from the source 102 can be emitted in a cone having a semi angle less than about 60 degrees with respect to the optical axis of the light source 102. The PBS 1306 can be configured to be compact and have a reduced weight, volume and/or spatial extent as compared to the PBS 1306 depicted in FIG. 26. For example, the PBS 1306 can be configured to have a dimension (e.g., length, width, height, or radius) that is less than or equal to about 5 mm. As another example, the PBS 1306 can be configured to have a dimension (e.g., length, width, height, or radius) that is less than about 10 mm. As yet another example, the PBS 1306 can be configured to have a dimension (e.g., length, width, height, or radius) between about 2.0 mm and about 6.0 mm, between about 3.0 mm and about 5.0 mm, between about 3.5 mm and about 4.5 mm, or any value in these ranges/subranges or any range formed by any of these values.

Various embodiments of the PBS 1306 include a light turning optical element or waveguide 112 including a first surface 113A disposed over the spatial light modulator 106 and a second surface 113B opposite the first surface 113A. In the implementation depicted in FIG. 27, wherein the illumination system 1000 is configured as a front light, the light turning optical element 112 can be disposed at the bottom of the PBS 1306 such that the first surface 113A forms a bottom surface of the PBS 1306. The waveguide 112 further includes a light input surface 113C between the first and the second surfaces 113A and 113B. The light input surface 113C is configured to receive light from the light source 102. The waveguide 112 further includes an end reflector 114 disposed on a side opposite to the light input surface 113C. The end reflector 114 is configured to reflect light coupled into the waveguide 112 through the light input surface 113C. Some of the light coupled into the waveguide 112 through the light input surface 113C directly propagates to the end reflector 114, without, for example, being reflected off any other surface such as first surface 113A or the second surface 113B. This light is reflected by the end reflector 114 onto the second surface 113B as discussed below. Some of the light coupled into the waveguide 112 can be reflected from the first surface 113A by the process of total internal reflection (TIR) prior to being reflected by the end reflector 114.

In various designs, one or more turning features 1314 are disposed over the second surface 113B. The turning features 1314 may be configured to redirect light reflected from the end reflector 114 towards the spatial light modulator 106. The turning features 1314 may also be configured to transmit light reflected from the spatial light modulator 106 through the waveguide 112. The PBS 1306 further includes a refractive optical element 118 that is configured to compensate for any refractive optical effects introduced by the waveguide 112. The PBS 1306 can further include a clean-up polarizer 1310. The clean-up polarizer 1310 may be configured to transmit light having the second polarization state (e.g., p-polarization state) and block light having the first polarization state (e.g., s-polarization state). In this manner, the clean-up polarizer 1310 can remove unmodulated light that is unintentionally transmitted through the waveguide 112.

The waveguide 112 can comprise a transmissive material (e.g., plastic, glass, acrylic, etc.). The refractive optical element 118 can also comprise a transmissive material (e.g., plastic, glass, acrylic, etc.). The turning features 1314 can be formed on the second surface 113B of the waveguide 112 by a process such as, for example, molding. The plurality of turning features 109 can include microstructures or nanostructures.

In various embodiments, the turning features 1314 can include a groove formed by a pair of facets (e.g., first and second facets 1326 and 1328, respectively). The groove can be straight or curved (e.g., extend along a straight line or along a curve). The facets may be planar in some embodiments. In other embodiments, such as, for example, the embodiment discussed below with reference to FIGS. 29A and 29B, the facets may be curved to provide optical power. In some embodiments, the facets may be of equal widths in some embodiments. In some other embodiments, the facets may have unequal widths. The facets may include an angle β between them. The angular separation β between the facets may vary between about 15 degrees and about 120 degrees. The different facets of the turning features 1314 may be inclined by different amounts (e.g., with respect to a horizontal axis parallel to the x-axis). The pitch (e.g., the distance a pair of consecutive first facets 1326 on two consecutive turning features 1314 or a pair of consecutive second facets 1328 on two consecutive turning features can be between about 20 µm and about 200 µm. For example, the pitch can be greater than or equal to about 20 µm and less than or equal to about 200 µm, greater than or equal to about 30 µm and less than or equal to about 175 µm, greater than or equal to about 40 µm and less than or equal to about 150 µm, greater than or equal to about 50 µm and less than or equal to about 125 µm, greater than or equal to about 60 µm and less than or equal to about 100 µm, greater than or equal to about 70 µm and less than or equal to about 90 µm, greater than or equal to about 75 µm and less than or equal to about 85 µm, or values in these ranges/sub-ranges or any range formed by any of these values. The portion of the second surface 113B that extends beyond the extent of the spatial light modulator 106 (e.g., along the x-axis) can be devoid of the plurality of turning features 1314. Without relying on any particular theory, the pitch of the plurality of turning features 1314 can be configured to avoid dead pixels in the spatial light modulator 106 and/or to avoid optical effects that may arise from non-uniform illumination of the entire spatial light modulator 106.

In various embodiments, the first surface 113A of the waveguide 112 can be planar and substantially parallel to a surface of the spatial light modulator 106 which can extend along an axis parallel to the x-axis while the second surface 113B of the waveguide 112 can be slanted or sloped with respect to the first surface 113A, a horizontal axis parallel to the x-axis and/or the spatial light modulator or the front face of the modulator such that the waveguide 112 is wedge-shaped. The second surface 113B can be slanted or sloped towards the light input surface 113C. The angle of inclination, a, of the second surface 113B with respect to a horizontal axis parallel to the first surface 113A can have a value in the range between about 15 degrees and about 45 degrees. For example, the angle of inclination, a, of the second surface 113B with respect to the first surface 113A can be in the range between about 20 degrees and about 35 degrees, between about 24 degrees and about 30 degrees or any value in these ranges/subranges in any range formed by any of these values.

In implementations of the wedge-shaped waveguide 112, the distance between the first surface 113A and the second surface 113B near the light input surface 113C (also referred to as the height of the light input surface 113C) can be smaller than the distance between the first surface 113A and the second surface 113B farther away from the light input surface 113C or near the end reflector 114. In various embodiments, an area of the light input surface 113C can be less than an area of the side of the wedge shaped waveguide opposite the light input surface 113C. In some implementations, the angle of inclination and the height of the light input surface 113C can be configured to accept substantially all the light emitted in a light cone output from the light source 102. For example, if the light source 102 includes a LED, then light from the LED is emitted in a light cone having a semi angle of about 41 degrees with respect to the optical axis of the LED (which can be aligned parallel to the x-axis). In such embodiments, the angle of inclination of the second surface 113B can be between about 20 degrees and about 30 degrees with respect to a horizontal axis parallel to the x-axis or with respect to the first surface 113A or the spatial light modulator 106 or the front face thereof such that substantially all the light output from the light source 102 including the LED is coupled into the waveguide 112. The angle of inclination of the second surface 113B and/or the height of the light input surface 113C can be reduced if the light source 102 is less divergent. For example, if the light source 102 is coupled to the input surface 113C via an optical fiber then the angle of inclination of the second surface 113B may be less than 20 degrees.

The end reflector 114 is configured to reflect light incident from the light source 102 such that the reflected light is redirected by the turning features 1314 along a direction substantially parallel to a normal (e.g., parallel to the y-axis) to the surface of the spatial light modulator 106. For example, the end reflector 114 and the turning features 1314 can be configured to redirect light from the source 102 towards the spatial light modulator 106 in a cone between about ±10 degrees with respect to a normal to the surface of the spatial light modulator 106. The end reflector 114 can include a plastic or a glass material that is coated with a reflective material (e.g., metal or dielectric). The end reflector 114, may include one or more dielectric layers such as a multilayer interference coating. The end reflector 114 can be adhered or molded to the side of the waveguide 112 opposite the light input surface 113C as discussed below.

In the embodiment depicted in FIG. 27, the end reflector 114 can be a curved mirror (e.g., a spherical or a parabolic mirror). Accordingly, the end reflector 114 may have optical power and may have a focal point. The source 102 can be disposed at the focal point of the end reflector 114 such that light from the source 102 is reflected along a direction parallel to the surface of the spatial light modulator 106 (e.g., parallel to the x-axis) or the light reflected from the end reflector 114 is substantially collimated and/or the light reflected from the turning features and directed onto the spatial light modulator is substantially collimated. In such embodiments, the turning features 1314 can include pairs of first and second planar facets 1326, 1328 with an angular separation of about 45 degrees between the first and second planar facets 1326, 1328 such that light reflected from the end reflector 114 is redirected substantially normal (e.g., parallel to the y-axis) to the surface of the spatial light modulator 106 as depicted in the inset of FIG. 27.

In various embodiments, the turning features 1314 can include a polarization selective element 1318 (e.g., a polarization selective coating, one or more thin film coatings, dielectric coatings, or a wire grid) that is configured to redirect light having a specific polarization state towards the spatial light modulator 106. For example, as shown in the inset of FIG. 27, a first polarization state (e.g. s-polarized state) from the light source 102 can be that is reflected from the end reflector 114 can be redirected towards the spatial light modulator 106. However, light of the second orthogonal polarization state (e.g., p-polarization state) is transmitted. The modulated light from the spatial light modulator 106 includes light having the second polarization state (e.g., p-polarization state). This light from the spatial light modulator 106 is transmitted by the polarization selective element 1318. The clean-up polarizer 1310 can be included and be configured to transmit the second polarization state (e.g., p-polarization state) while blocking the first polarization state (e.g., s-polarization state). The PBS 1306 can be disposed with respect to the waveguides 270, 280, 290, 300, 310 discussed above with reference to FIG. 6 and the incoupling elements thereon such that the light from the PBS 1306 can be incoupled into the waveguides 270, 280, 290, 300, 310.

FIGS. 28A, 28B, 28C and 28D depict various embodiments of turning features including polarization selective elements. As discussed above, the polarization selective elements can include coatings or wire grids. In the embodiment illustrated in FIG. 28A, the a pair of facets of each turning feature is at least partially coated with a polarization selective coating for example, that is configured to reflect the first polarization state (e.g. s-polarization state) and transmit the second polarization state (e.g. p-polarization state). This polarization coating may include, for example, one or more layers (e.g., multiple thin film coatings) such as one or more dielectric layers. The polarization selective coating can be configured to be broadband such that the coating reflects the first polarization state (e.g., s-polarization state) in a wide range of wavelengths in the visible spectral range (e.g., s-polarized light in red, green and blue spectral ranges). The PBS coating that selectively reflects a first polarization state and transmit a second polarization state can advantageously provide high contrast (e.g., by efficiently discriminating between s-polarized and p-polarized states) as selective pixels of the spatial light modulator 106 modulate the polarization to produce an image. Additionally, the multiple thin film coatings that can selectively reflect a first polarization state and transmit a second polarization state may be cheaper and easier to manufacture.

However, various embodiments of multiple thin film coatings that can selectively reflect a first polarization state and transmit a second polarization state may have a small angular acceptance range. For example, some embodiments of the multiple thin film coatings that can selectively reflect a first polarization state and transmit a second polarization state may not function efficiently if the angle of incident of light varies by an amount greater than about ±10-degrees from a design angle of incidence. For example, if a facet comprising multiple thin film coatings is configured to reflect s-polarized light incident at an angle of about 45 degrees with respect to a normal to the facet, then it may not efficiently reflect light, if light is incident at an angle greater than about 55 degrees with respect to the normal to the facet or at an angle less than about 35 degrees with respect to the normal to the facet. As another example, if a facet comprising multiple thin film coatings is configured to transmit p-polarized light incident at an angle of about 45 degrees with respect to a normal to the facet, then it may not efficiently transmit light, if light is incident at an angle greater than about 55 degrees with respect to the normal to the facet or at an angle less than about 35 degrees with respect to the normal to the facet.

Accordingly, in those embodiments in which a wider angular range of acceptance is desired wire grids can be used to efficiently reflect a first polarization state and transmit a second polarization state. Thus, wire grids can be disposed at least partially over one of the pair of facets of the turning feature, for example, for embodiments in which light reflected from the end reflector 114 is incident on the facets in an angular range greater than about ±10-degrees from a design angle of incidence.

Figure 28A:
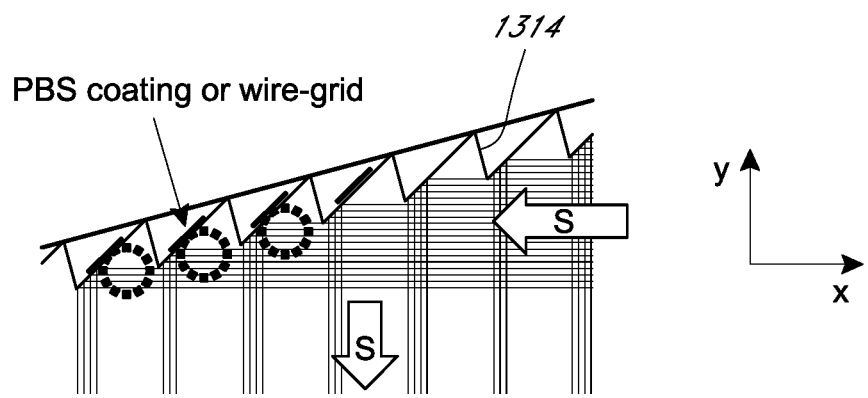
FIG. 28A illustrates an example implementation of turning features that are included in the illumination system illustrated in FIG. 27, according to some embodiments.
Figure 28B:
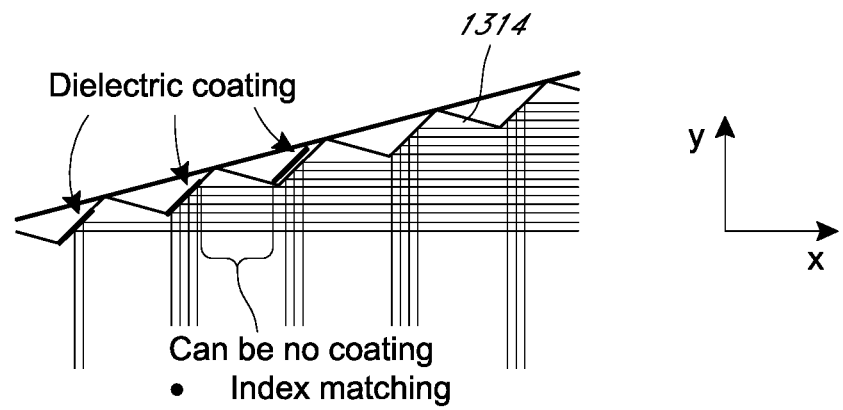
FIG. 28B illustrates an example implementation of turning features that are included in the illumination system illustrated in FIG. 27, according to some embodiments.
Figure 28C:
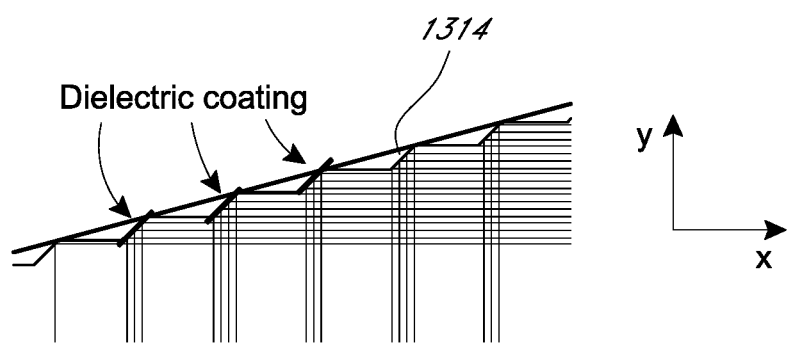
FIG. 28C illustrates an example implementation of turning features that are included in the illumination system illustrated in FIG. 27, according to some embodiments.

As shown in FIG. 28B, a polarization selective element can be disposed over a portion of the facet that receives light from the end reflector 114. The other facet need not include the polarization selective element or coating. In the embodiment depicted in FIG. 28C, one facet of turning feature 1314 is inclined at an angle of about 45-degrees with respect to a vertical axis parallel to the y-axis while the other facet is parallel to a horizontal axis parallel to the x-axis. In such embodiments, the facet that is inclined at an angle of about 45-degrees with respect to a vertical axis parallel to the y-axis can include the polarization selective element and/or the other facet is devoid of the polarization selective element or at least the inclined facet can include more of the polarization beamsplitting coating than the other facet.

Figure 28D:
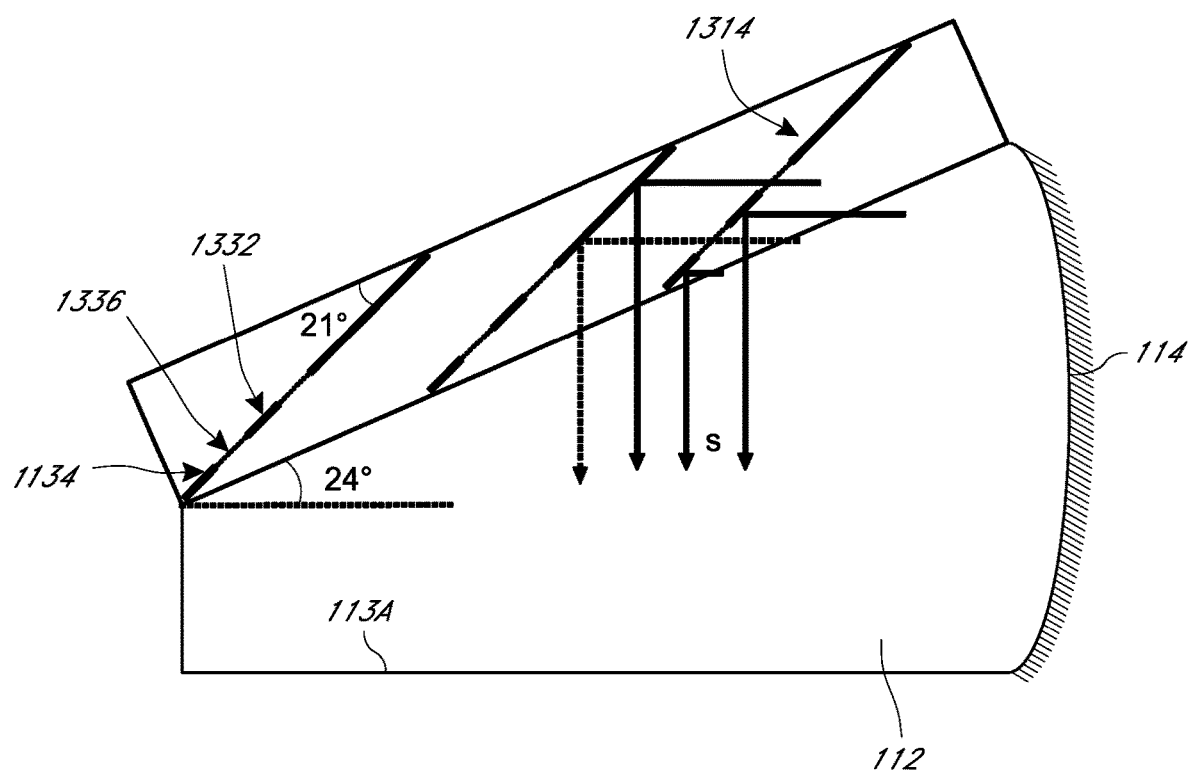
FIG. 28D illustrates an example implementation of turning features that are included in the illumination system illustrated in FIG. 27, according to some embodiments.

In various embodiments, the turning feature 1314 can include a first section 1332 having the polarization selective element spaced apart from a second section 1340 having the polarization selective element by a section 1336 that does not have the polarization selective element, as shown in FIG. 28D. Light reflected from the end reflector 114 that is not incident on the section (e.g., section 1336) that does not have the polarization selective element will pass through the turning feature until it strikes a section that has the polarization selective element. Such implementations can be advantageous in increasing the uniformity of illumination across the surface of the spatial light modulator 106.

The PBS 1306 discussed above can have several advantages including but not limited to a reduced size as compared to a conventional PBS. In various designs, for example, the inclined surface of the microstructure or turning features 1314 can reflect the light reflected from the end reflector 114 such that the light is incident on the spatial light modulator 106 at a normal or substantially normal angle without needing large angle of inclination of the second surface 113B. Having the second surface 113B be angled less than degrees, enables the PBS 1306 to have reduced thickness.

Advantageously, when integrated with the light source 102, the PBS 1306 discussed above can provide collimated illumination that can be used to front light (or back light) a spatial light modulator, such as, for example a LCOS. Additionally, the contrast ratio of the spatial light modulator 106 can be increased since, the end reflector 114 and the turning features 1314 can be configured to direct light towards the spatial light modulator 106 along a direction normal to or substantially normal to the first surface 113A or the spatial light modulator 106 or the front face of the spatial light modulator 106. Furthermore, the refractive optical element 118 can be configured to absorb any stray light that is not turned towards the spatial light modulator 106 which can also improve contrast ratio of the spatial light modulator 106. Additionally, the illumination system 1000 can be capable of color sequential and color filter-based operation.

As discussed above, the turning features 1314 need not be disposed in regions of the second surface 113B that extends beyond the extent of the spatial light modulator 106. For example, referring to FIG. 27, ray 124A which is incident on the portion of the end reflector 114 outside box 1322 after being total internally reflected from the first surface 113A will be incident on a portion of the second surface 113B that does not include the turning features 1314 and thus will not be directed towards the spatial light modulator 106. Furthermore, light that is emitted along the optical axis of the light source 102 and is incident on the portion of the end reflector 114 outside the box 1322 will be reflected back towards the light input surface 113C and will not be directed towards the spatial light modulator 106. Thus, some light emitted from the light source 102 may be wasted and the illumination efficiency may be reduced.

To increase utilization of light emitted from the source 102, the end reflector 114 may be tilted and/or the curvature of the end reflector 114 may be varied such that the reflected light converges toward a focus (focal point) or virtual focus in the region 1344 as depicted in FIGS. 29A and 29B that is away from, for example, the light source 102. The light converges toward a location farther from a first surface (e.g., the first surface 113A) and the spatial light modulator 106 than the light source 102. In such embodiments, the turning features (e.g., the turning features 1314) may be configured to provide optical power to redirect light reflected from the end reflector 114 towards the spatial light modulator 106. The turning features can be configured to have positive optical power as depicted in FIG. 29B or negative optical power as depicted in FIG. 29A.

Figure 30:
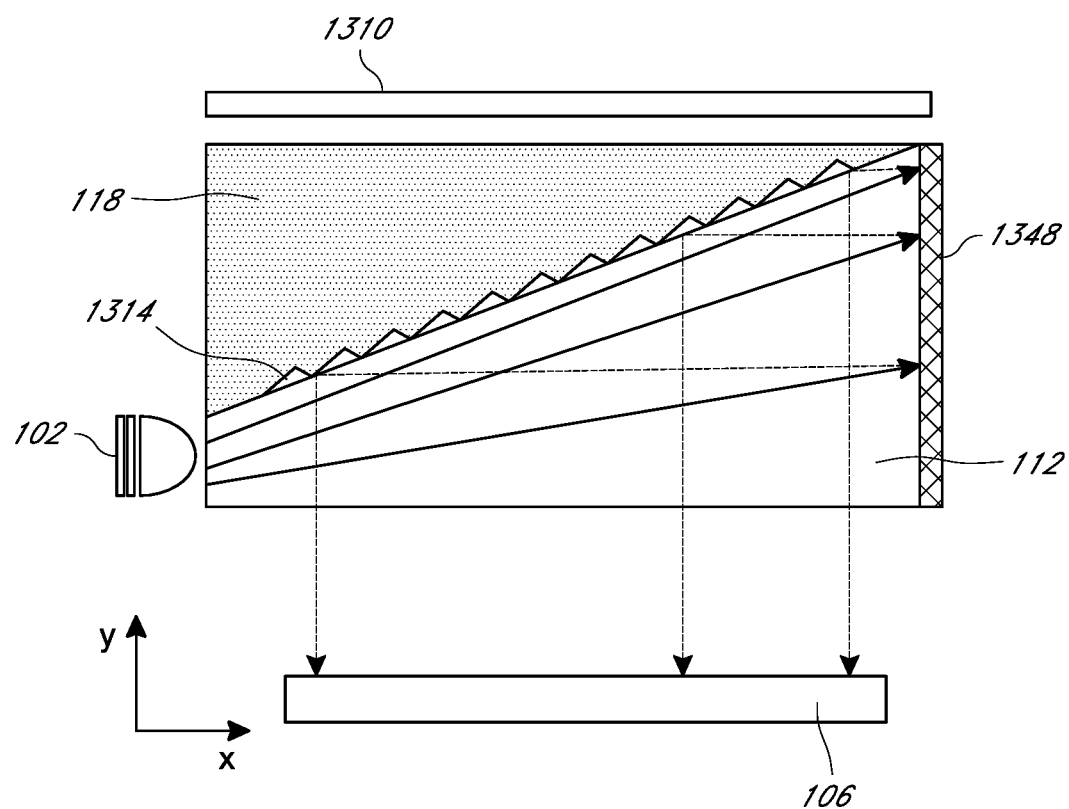
FIG. 30 illustrates an embodiment of the illumination system including a reflective holographic component, according to some embodiments.

In various embodiments, the end reflector 114 can include a reflective holographic structure 1348 as shown in FIG. 30. The reflective holographic structure 1348 can include diffractive features that are configured to redirect incident light to the inclined surface. The reflective holographic structure 1348 may be configured to provide one or more of the features of the end reflector 114 discussed above. For example, the reflective holographic structure 1348 may be configured to collimate the light or to provide light that converges on or near the light source 102. In some cases, the reflective holographic structure 1348 may be configured to cause the reflected light to converge at a location away from the light source 102 and farther away from the spatial light modulator 106. The reflective holographic structure 1348 can include diffractive features that are configured to redirect incident light in a wide range of wavelengths (e.g., red, green and blue wavelengths) and in a wide range of incident angles (e.g., between about ±41 degrees with respect to the optical axis of the light source 102 which is along a horizontal axis parallel to the x-axis along a direction parallel to the x-axis.) The reflective holographic structure 1348 can be configured to collimate light from multiple light sources. In various embodiments, the reflective holographic structure 1348 can be configured to reflect light from a first light source along a first desired direction and light from a second light source along a second desired direction. In this manner, the reflective holographic structure 1348 can reflect light from different sources (e.g., different colored light sources) along different independently-controlled propagation directions that are set by the design of the reflective holographic structure 1348. The reflective holographic structure may include one or more holograms or diffractive optical elements.

Figure 31:
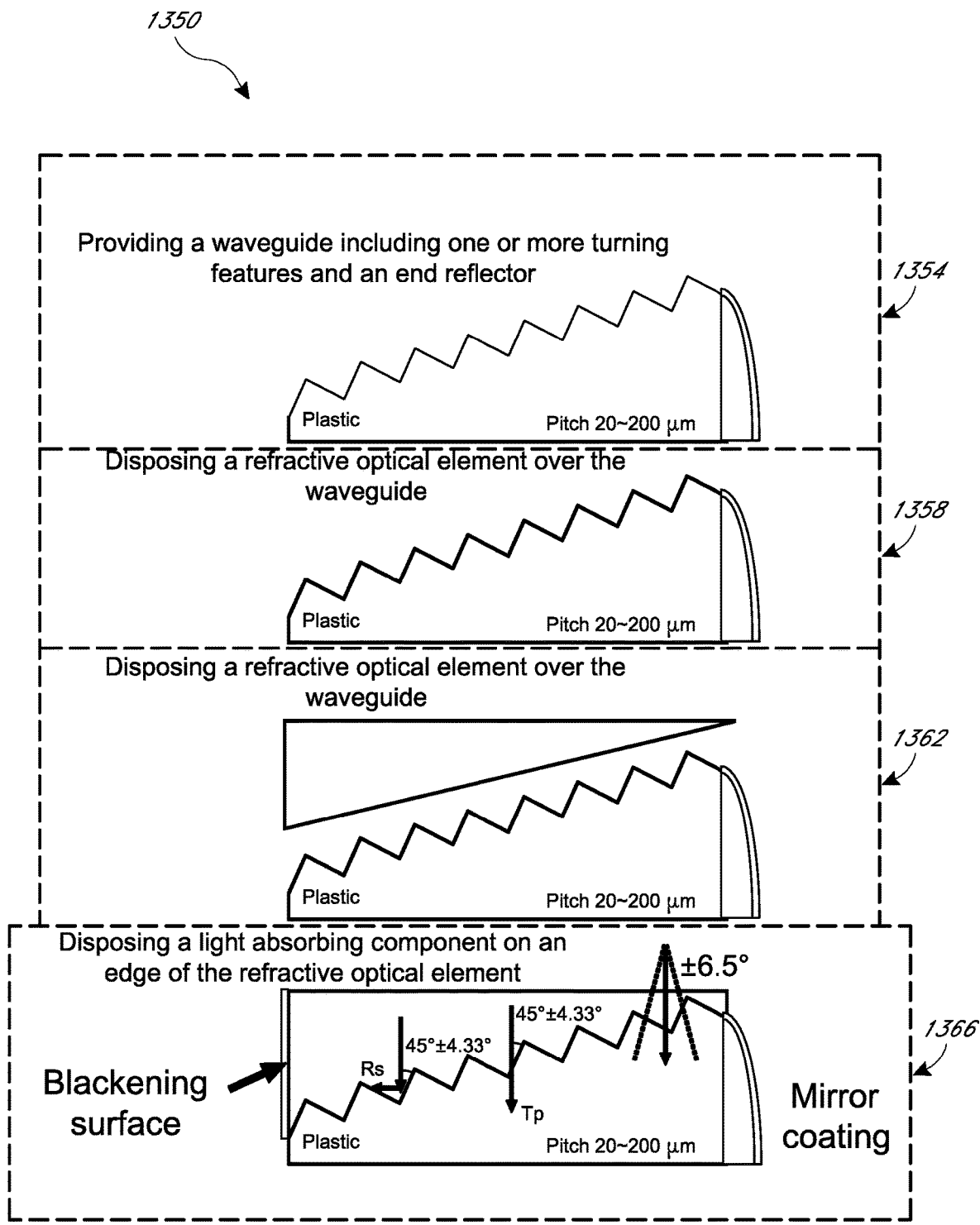
FIG. 31 schematically illustrates a method of manufacturing an embodiment of a compact polarization beam splitter contemplated herein, according to some embodiments.

FIG. 31 illustrates an embodiment of a method 1350 of manufacturing an embodiment of the PBS 1306. The method includes providing a waveguide (e.g., the waveguide 112) including one or more turning features (e.g., turning features 1314) and an end reflector (e.g., end reflector 114) as shown in block 1354. As discussed above, the one or more turning features can be formed on a surface (e.g., second surface 113B) of the waveguide (e.g., the waveguide 112) for example by molding. The end reflector can also be molded on to an edge of the waveguide or attached to the edge of the waveguide using adhesives.

The method may further include disposing a polarization selective coating (e.g., including multiple thin films, one or more dielectric coating, or a wire grid) at least partially on the turning features as depicted in block 1362. The method further includes disposing a refractive optical element (e.g., refractive optical element 118) over the waveguide as depicted in block 1366. The refractive optical element can be attached to the waveguide using adhesives. An index matching layer can be disposed between the refractive optical element and the waveguide. A side of the refractive optical element opposite the side including the end reflector can be configured to absorb any stray light that is not turned by the turning features by blackening the surface as shown in block 1366. Alternately, a light absorbing component can be disposed on the side of the refractive optical element opposite the side including the end reflector to absorb stray light that is not turned by the turning features.

Figure 33:
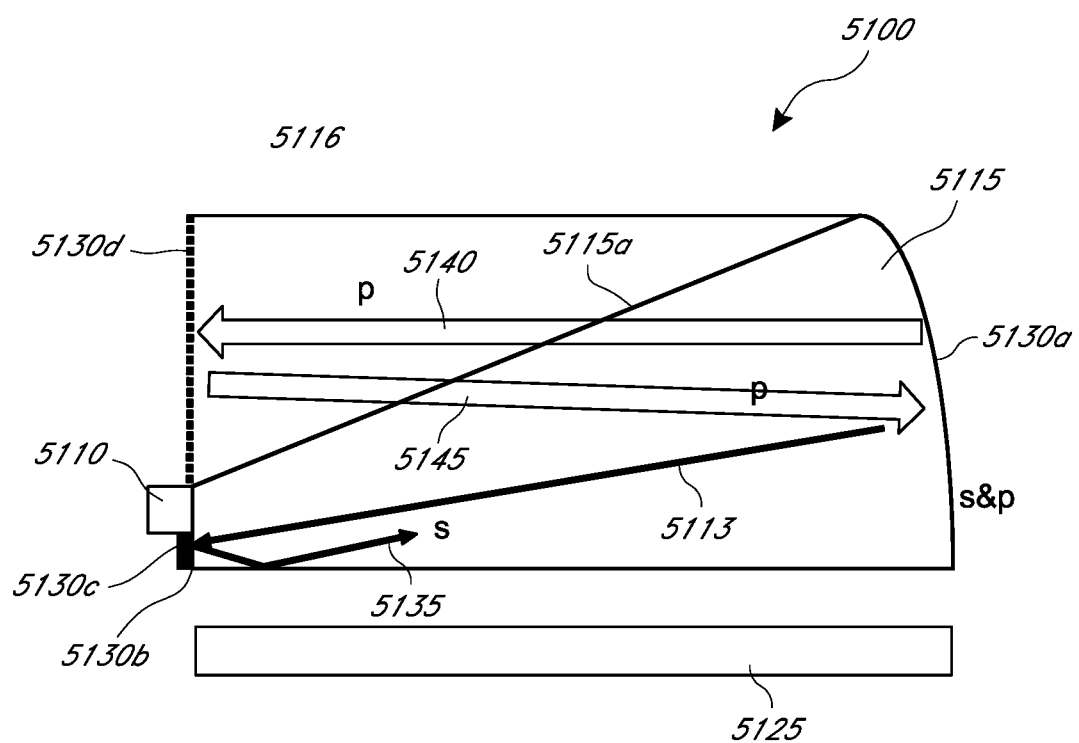
FIG. 33 illustrates an example of a display device incorporating a light recycling system to recycle light, according to some embodiments.

In embodiments of illumination systems that employ light recycling as shown in FIG. 33 discussed herein, the side of the refractive optical element opposite the side including the end reflector and/or a portion of the input surface of the waveguide that is between the light source and the spatial light modulator (e.g., spatial light modulator 106) can be configured to be reflective. Additionally, to facilitate light recycling in the manner illustrated in FIG. 33, a quarter-wave retarder or plate can be disposed adjacent to the reflective portion of the input surface of the light turning element that is between the light source and the spatial light modulator.

Figure 34:
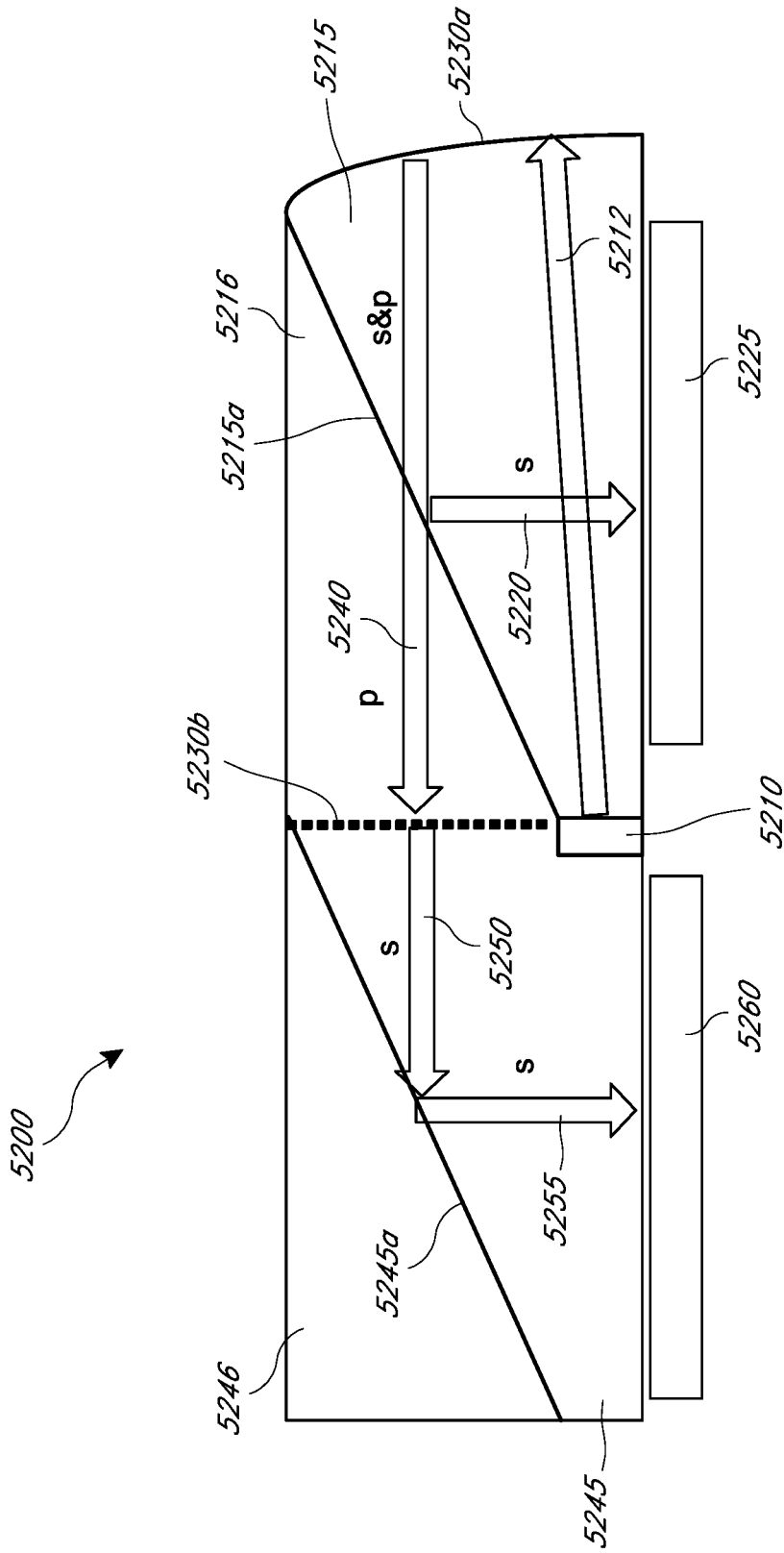
FIG. 34 illustrates an example of a display device incorporating a light recycling system to recycle light, according to some embodiments.

In embodiments of illumination systems that employ light recycling as shown in FIG. 34 discussed herein, a half-wave plate can be disposed on the side of the refractive optical element opposite the side including the end reflector. A second waveguide comprising including one or more turning features and a second spatial light modulator can be disposed on the other side of the half-wave retarder or plate to facilitate light recycling in the manner illustrated in FIG. 34.

Polarization Based Light Recycling

In case where the illumination device includes a light source or light emitter that outputs unpolarized light, some of the light (e.g., light not having the desired polarization) goes unused. For example, when an unpolarized light emitter such as a light emitting diode (LED) is combined with a linear polarizer to produce linearly polarized light of the desired orientation, 50% of the light may be discarded in certain cases.

Various example illumination devices described herein, however, can utilize one or more light emitters configured to emit light having more than one polarization state (e.g., unpolarized light or partially polarized light), yet advantageously can increase the efficiency of light usage of the device. These illumination devices can nevertheless eject light of a particular polarization state (e.g., s-polarization state) onto a spatial light modulator, where the light can be modulated. To improve efficiency of light usage, light that is not ejected to and/or received by the spatial light modulator can be recycled. For example, a light recycling system can be configured to convert light having a polarization state (e.g., p-polarization state) that is not useful for the spatial light modulator into light of another polarization state (e.g., s-polarization state) that can be received and properly modulated by the spatial light modulator to form an image.

Figure 32:
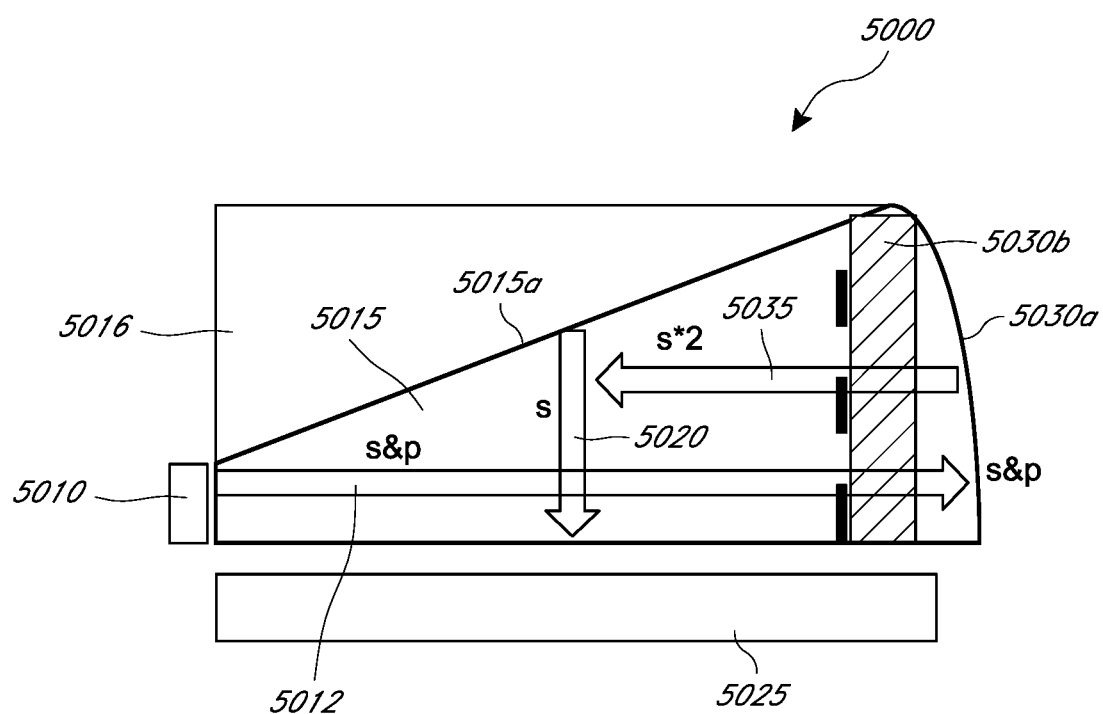
FIG. 32 illustrates an example of a display device incorporating a light recycling system to recycle light, according to some embodiments.

FIG. 32 illustrates an example of a display device incorporating a light recycling system to recycle light, according to one embodiment. A display device 5000 can include at least one light emitter 5010 configured to emit light 5012 having more than one polarization state (e.g., illustrated as s-polarization state and p-polarization state). The display device 5000 may further include a light guiding optical element, such as a waveguide 5015 disposed with respect to the light emitter 5010 to receive the light 5012 and turn the light out toward at least one spatial light modulator 5025. The waveguide 5015 can eject out light 5020 having a first polarization state (e.g., s-polarization state) that can be modulated by the spatial light modulator 5025 to form an intensity image. Accordingly, the spatial light modulator 5025 is disposed with respect to the waveguide 5015 to receive the light 5020 ejected from the waveguide 5015. As described herein, the display device 5000 can include a light recycling system (e.g., including components 5030*a* and 5030*b*) to recycle light not ejected from the waveguide 5015 to the spatial light modulator 5025. For example, as shown in FIG. 32, the light recycling system (e.g., 5030*a* and 5030*b*) can be configured to convert light having a second polarization state (e.g., p-polarized light in this example) that is not used by the spatial light modulator 5025 into light 5035 having the first polarization state (e.g., s-polarization state) that is usable by the spatial light modulator 5025. Accordingly, instead of some light being unused, by converting the light having the second polarization state to light having the first polarization state, additional light can be ejected from the waveguide 5015 to the spatial light modulator 5025 and contribute to the image formed by the spatial light modulator 5025. Various features of FIG. 32 will now be described.

With reference to FIG. 32, the display device 5000 can include at least one light emitter 5010. The light emitter 5010 can include a single light emitter or more than one light emitter (hereinafter referred to as "light emitter 5010"). The light emitter 5010 can be configured to emit light 5012 having more than one polarization state. For example, light 5012 can include a first polarization state (e.g., s-polarization state) and a second polarization state (e.g., a p-polarization state). The light emitter 5010 can include any of the light emitters disclosed herein or other types of emitters as well. In some embodiments, the light emitter 5010 can include one or more light emitting diode (LED), such as a red LED, a green LED, a blue LED, and/or a white LED (WLED). As another example, the light emitter 5010 can include one or more superluminescent diodes (SLED) or one or more lasers.

The display device 5000 can also include at least one light turning optical element which may include a waveguide 5015 disposed with respect to the light emitter 5010 to receive the light 5012 from the light emitter 5010. In various designs, at least some of the light 5012 can be guided within the waveguide 5015 by total internal reflection (TIR). The waveguide 5015 can include any of the light turning optical elements described herein. For example, the waveguide 5015 can include plastic, glass (e.g., a high index glass in some embodiments), or a combination thereof. As described herein, the waveguide 5015 can function as a polarizing beam splitter to reflect light 5020 having a certain polarization state (e.g., s-polarization state in this example) to the spatial light modulator 5025. In some examples, the waveguide 5015 can have an angled surface 5015*a* configured to reflect light 5020 having the first polarization state (e.g., s-polarization state) and transmit light (not shown) having the second polarization state (e.g., p-polarization state). The waveguide 5015 can include one or more turning elements (e.g., on the angled surface 5015*a*) configured to turn light guided within the waveguide 5015 (e.g., light having a certain polarization state) out of the waveguide 5015 and to the spatial light modulator 5025. The angled surface may include a polarization selective element or structure that may operate differently for different polarization states. For example, the turning elements can include turning features configured to redirect light guided within the waveguide 5015 out of the waveguide 5015 (e.g., microstructures such as a dielectric coating on one or more microprisms or a wire grid configured to direct light having a certain polarization state out of the waveguide 5015). As a result, light propagating in the waveguide 5015 having the desired polarization state (e.g. s-polarization state) that is incident on the angled surface 5015*a* may be reflected so as to be ejected out of the waveguide 5015, for example, out of a major surface of the waveguide 5015, for example, the bottom of the waveguide 5015, and directed on the spatial light modulator 5025. A compensation layer 5016 can be disposed over the angled surface 5015*a* and turning features thereon. For some designs, the compensation layer 5016 can include the same or a similar material as the material for the waveguide 5015 (e.g., plastic, glass, or a combination thereof). The compensation layer 5016 can reduce the effect of refraction of the angled surface 5015*a* on light passing through the waveguide 5015. The compensation layer 5016 may redirect light reflected from the spatial light modulator 5025 that passes through the waveguide 5015 on reflection from the spatial light modulator 5025 that would otherwise be bent by the angled surface 5015*a*.

With continued reference to FIG. 32, the display device 5000 can include at least one spatial light modulator 5025 such as a liquid crystal spatial light modulator including an array of pixels that can be independently modulated to form an image. The spatial light modulator 5025 can be disposed with respect to the waveguide 5015 to receive the light 5020 having the certain polarization state (e.g. s-polarization state) ejected from the waveguide 5015. For example, light having the desired (first) polarization state (e.g., s-polarization state) that is incident on the angled surface 5015*a* may be turned and directed at an angle such that light is not guided in the waveguide 5015 nor is otherwise directed out a major surface of the waveguide 5015 such as the bottom surface of the waveguide 5015 and onto the spatial light modulator 5025. The spatial light modulator 5025 may be electrically coupled to electronics configured to drive the spatial light modulator 5025 to thereby modulate the light 5020. For example, for certain spatial light modulators that modulate polarization, the spatial light modulator 5025 can receive light 5020 having a first polarization state (e.g., s-polarization state) and output light having either the first or a second polarization state (e.g., p-polarization state) depending on the state of the pixel.

Light that does not get directed out of the waveguide 5015 and to the spatial light modulator 5025, for example, that is not of the desired first polarization state (e.g., s-polarization state), can continue to propagate through the waveguide 5015. This light may not be reflected by the angled surface 5015*a* out of the waveguide 5015.

As described herein, however, the display device 5000 can include a light recycling system including elements 5030*a* and 5030*b* configured to convert light 5012 having a second polarization state (e.g., p-polarization state) to light 5035 having the first polarization state (e.g., s-polarization state). In FIG. 32, the light recycling system includes a reflective element 5030*a* and a polarization converter element 5030*b*. The reflective element 5030*a* can be disposed with respect to an edge of the waveguide 5015 to reflect light 5012 not ejected to the spatial light modulator 5025 via a major surface of the waveguide 5015 such as the bottom of the waveguide 5015 as illustrated in FIG. 32. The edge of the waveguide 5015 can include the edge that is opposite the light emitter 5010. The reflective element 5030*a* can be integrated with the surface edge of the waveguide 5015 or can be attached to the edge of the waveguide 5015. The reflective element 5030*a* can be configured to reflect light that otherwise may escape out of the edge of the waveguide 5015 back therein. The reflective element 5030*a* may include a variety of reflective elements including various reflective elements described elsewhere herein. The reflective element may include metalization or a reflective dielectric coating such as a coating including one or more dielectric layers, such as a multilayer interference coating. In some examples, the reflective element 5030*a* may have a surface that includes curvature such as a concave surface, which may be, for example, at least part of a spherical surface, at least part of a parabolic surface, etc. In some examples, the reflective element 5030*a* may have a surface that is planar. The reflective element 5030*a* can include a mirror such as a collimating mirror. For example, the reflective element 5030*a* can include a spherical mirror (e.g., a mirror having at least part of a spherical shape) or a parabolic mirror (e.g., a mirror having at least part of a parabolic shape). In some embodiments, the reflective element 5030*a* may include a diffractive optical element, such as a grating, a holographic optical element, or another type of reflective surface. The diffractive optical element, grating, holographic optical element, or other structure may be on a planar surface in some instances.

As shown in FIG. 32, the light recycling system can also include the polarization converter element 5030*b* disposed with respect to the reflective element 5030*a* to receive light reflected and/or collimated by the reflective element 5030*a* and convert light having the second polarization state (e.g., p-polarization state) into light having the first polarization state (e.g., s-polarization state). The polarization converter element 5030b may include a polarization rotator that rotates the orientation of linearly polarized light. The polarization rotator may rotate vertically polarized light into horizontally polarized light, or vice versa, or p-polarized light into s-polarized light, or vice versa. The polarization rotator may include, for example, a retarder such as a quarter wave retarder. Two passes through the quarter wave retarder may in some cases introduce 180° of retardation between orthogonal polarization and have the effect of rotating linearly polarized light. Accordingly, the recycled light can propagate back within the waveguide 5015 as light 5035 having the first polarization state (s-polarization state) and be ejected out of the waveguide 5015 (e.g., via turning elements) to the spatial light modulator 5025 improving efficiency of the display device 5000.

Although a liquid crystal based spatial light modulator 5025 is referenced above, the spatial light modulator 5025 may include other types of spatial light modulators such as digital light processing (DLP) device or an e-paper device, which may also include a one or more pixels that can be modulated to form an image. In some embodiments, the spatial light modulator 5025 can include a reflective spatial light modulator configured to reflect and modulate the light incident thereon. In some embodiments, the spatial light modulator 5025 can include a transmissive spatial light modulator configured to modulate light transmitted through the spatial light modulator.

FIG. 33 illustrates another example of a display device incorporating a light recycling system to recycle light. Similar to FIG. 32, the display device 5100 can include one or more light emitters 5110 (hereinafter referred to as "light emitter 5110") configured to emit light having more than one polarization state and a light turning element or waveguide 5115 configured to receive the light and eject out light having a first polarization state (e.g., s-polarization state) of a major surface of the waveguide 5115, such as the bottom or rear surface of the waveguide 5115, to a spatial light modulator 5125. The light recycling system can include a reflective element 5130a disposed with respect to an edge of the waveguide 5115 to reflect light not ejected to the spatial light modulator 5125.

In some such examples, the light emitter 5110 may be located with respect to the reflective element 5130a to inject light into an edge of the waveguide 5115, possibly off center, for example, proximal to a corner of the waveguide 5115. The edge of the waveguide 5115 can include the edge that is opposite the reflective element 5130a. As discussed above, the reflective element 5130a may include a curved surface. For example, the reflective element 5130a may include a spherical mirror. The light emitter(s) 5110 may be located at or proximal to the focal point of the spherical mirror (e.g., reflective element 5130a). As shown in FIG. 33, the reflective element 5130a may be configured to reflect and/or collimate the reflected light. The reflected light may be directed to a location away from the location of the light emitter 5110 and may ultimately be incident on a location below the light emitter 5110 as illustrated. The light recycling system may also include a polarization rotator such as a quarter wave retarder 5130b and a second reflective element 5130c disposed with respect to the quarter wave retarder 5130b to reflect light incident on the reflective element 5130c from the quarter wave retarder 5130b back through the quarter wave retarder 5130b. The pair of passes through the quarter wave retarder 5130b can introduce 180° of phase between orthogonal polarization components thereby rotating linear polarized light in some cases. The quarter wave retarder 5130b and second reflective element 5130c may be disposed at an edge of the waveguide 5115 opposite the first reflective element 5130a and/or at the location where light reflected from the first reflective element 5130a ultimately reaches (e.g., at a location below the light emitter 5110). The quarter wave retarder 5130b may be transmissive and thus configured to allow light reflected by the first reflected element 5130a to pass to the second reflective element 5130c. The second reflective element 5130c can be configured to reflect light back to the quarter wave retarder 5130b. In some embodiments, the second reflective element 5130c can include a reflective coating, such as a mirror coating. Upon passing twice through the quarter wave retarder 5130b, light 5113 having the second polarization state (e.g., p-polarization state) can be converted to recycled light 5135 having the first polarization state (e.g., s-polarization state).

The quarter wave retarder 5130b may be a birefringent material, (e.g. quartz), that is dimensioned and oriented so as to provide a quarter wave of phase delay between orthogonal linear polarizations or retard one component with respect to the other by a quarter wavelength. After having passed through quarter wave retarder 5130b, linearly polarized light can be turned into a circular polarization state propagating towards the reflective element 5130c.

The reflective element 5130c can reflect light back towards the quarter wave retarder 5130b while changing the handedness of its polarization. In some embodiments, the reflective element 5130c may be made out of several layers of dielectric material. Similarly, the reflective element 5130c can be to be tuned to the wavelength of light from the light emitter 5110 and thus can facilitate increased reflectivity.

Upon passing the quarter wave retarder 5130b for the second time, light can be changed back from circular polarization to linear polarization, but now having a rotated linear polarization state (e.g., s-polarization state). The recycled light can propagate back within the waveguide 5115 as recycled light 5135 having the desired first polarization state and be ejected out of the waveguide 5115 (e.g., via turning features) to the spatial light modulator 5125 improving efficiency of the display device 5100.

As described herein, the waveguide 5115 can function as a polarizing beam splitter to reflect light having a certain polarization state to the spatial light modulator 5125. In some examples, the waveguide 5115 can have an angled surface 5115a (e.g., which may include turning features) to reflect light having the first polarization state (e.g., s-polarization state) and transmit light 5140 having the second polarization state (e.g., p-polarization state). As discussed above, a compensation layer 5116 can be disposed over the angled surface 5115a. As illustrated, the light recycling system includes a third reflective element 5130d disposed to receive collimated light reflected from the first reflective element 5130a. The reflective element 5130d can be disposed with respect to an edge of the waveguide 5115 (e.g., an edge of the compensation layer 5116 opposite reflective element 5130a). In some embodiments, the reflective element 5130d can include the same or similar material as for reflective element 5130c. For example, the reflective element 5130d can include a mirror coating. The reflective element 5130d can be configured to reflect the light 5140 transmitted by the angled surface 5115a, such as light having the second polarization state (e.g., p-polarization state), back into the waveguide 5115 as light 5145. This light 5145 reflected from the reflective element 5130d may be of the second polarization state (e.g., p-polarization state) and can be reflected again by the first reflective element 5130*a* to the quarter wave retarder 5130*b*. This light can continue through the quarter wave retarder 5130*b* to the second reflective element 5130*c* associated therewith and can be reflected again through the quarter wave retarder 5130*b* thereby rotating the polarization state. Accordingly, the light directed to the quarter wave retarder 5130*b* can be rotated, for example, to a polarization state (e.g., s-polarization state) that can be ejected out of the waveguide 5115 upon reflection from the angled surface 5115*a*. For example, the linearly polarized light having the second polarization state (e.g., p-polarization state) is converted into recycled light 5135 having the first polarization state (e.g., s-polarization state) for example, by the other components of the light recycling system such as the reflective element 5130*a*, the reflective element 5130*d*, the quarter wave retarder 5130*b*, and the reflective element 5130*c*). This light is again reflected from the first reflective element 5130*a* to the angle surface 5115*a* which selectively reflects the first polarization state (e.g., s-polarization state). The recycled light 5135 having the first polarization state (e.g., s-polarization state) can then be ejected out of the waveguide 5115 (e.g., via turning elements on the angled surface) to the spatial light modulator 5125, improving the efficiency of the display device 5100.

FIG. 34 illustrates another example of a display device incorporating a light recycling system to recycle light. Similar to FIGS. 32 and 33, the display device 5200 can include one or more light emitters 5210 (hereinafter referred to as "light emitter 5210") configured to emit light having more than one polarization state and a waveguide 5215 configured to receive the light 5212 and eject out light 5220 having a first polarization state (e.g., s-polarization state) to a spatial light modulator 5225. The light recycling system can include a reflective element 5230*a* disposed with respect to an edge of the waveguide 5215 to reflect light received from the light emitter 5210.

As described herein, the waveguide 5215 can function as a polarizing beam splitter to reflect light 5220 having a certain polarization state (e.g., s-polarization state) to the spatial light modulator 5225. In some examples, the waveguide 5215 can have an angled surface 5215*a* (e.g., which may include turning elements) to reflect light 5220 having the first polarization state (e.g. s-polarization state) and transmit light 5240 having the second polarization state (e.g., p-polarization state). Accordingly, light from the light emitter 5210 and reflected by the first reflective element 5230*a* to the angled surface 5215*a* having the first polarization state (e.g., s-polarization state) is reflected toward to the spatial light modulator 5225. This light may be reflected from the spatial light modulator 5225 and passed through the waveguide 5215 and angled surface 5215*a*. In particular, light having the second polarization state (e.g., p-polarization state), for example, light having a polarization rotated by selective pixels of the spatial light modulator 5225 may pass through the waveguide 5215 and the angled surface 5215*a*. A compensation layer 5216 can be disposed over the angled surface 5215*a*, as described above to counter refraction otherwise caused by the angled surface 5215*a*.

To improve efficiency of light usage, the light recycling system can also include a polarization rotator such as a half wave retarder 5230*b*. The half wave retarder 5230*b* can be disposed with respect to an edge of the waveguide 5215, for example, on or proximal an edge of the compensation layer 5216 opposite reflective element 5230*a*. In some designs, the half wave retarder 5230*b* can be transmissive and thereby configured to allow light 5240 transmitted by the angled surface 5215*a* to pass to a second light turning element or waveguide 5245. The half wave retarder 5230*b* can also be configured to convert light 5240 having the second polarization state (e.g., p-polarization state) to light 5250 having the first polarization state (e.g., s-polarization state). The recycled light 5250 having the first polarization state (e.g., s-polarization state) can then be ejected out of the second waveguide 5245 (e.g., via turning elements) to a second spatial light modulator 5260, further improving efficiency of the device. For example, the second waveguide 5245 can function as a polarizing beam splitter as described herein. The second waveguide 5245 can include an angled surface 5245*a* (e.g., which may include turning elements) to reflect light 5255 having the first polarization state (e.g., s-polarization state) to the second spatial light modulator 5260. Similarly, the second waveguide 5245 may include a second optical compensation layer 5246 to counter refraction otherwise caused by the angled surface 5245*a*.

As illustrated, in the design shown in FIG. 34, the light emitter 5210 and the half wave retarder 5230*b* are disposed between the two waveguides 5215 and 5245. Other configurations are possible.

Figure 35:
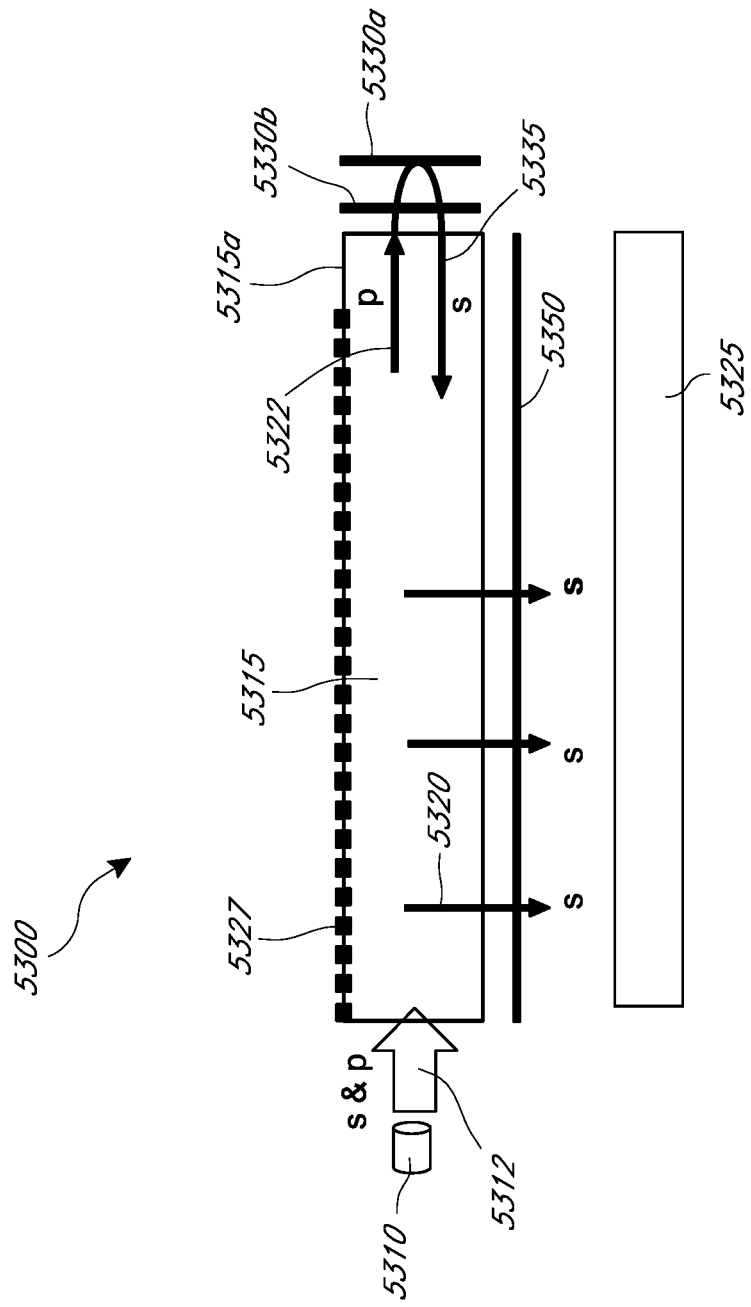
FIG. 35 illustrates an example of a display device incorporating a light recycling system to recycle light, according to some embodiments.
Figure 36:
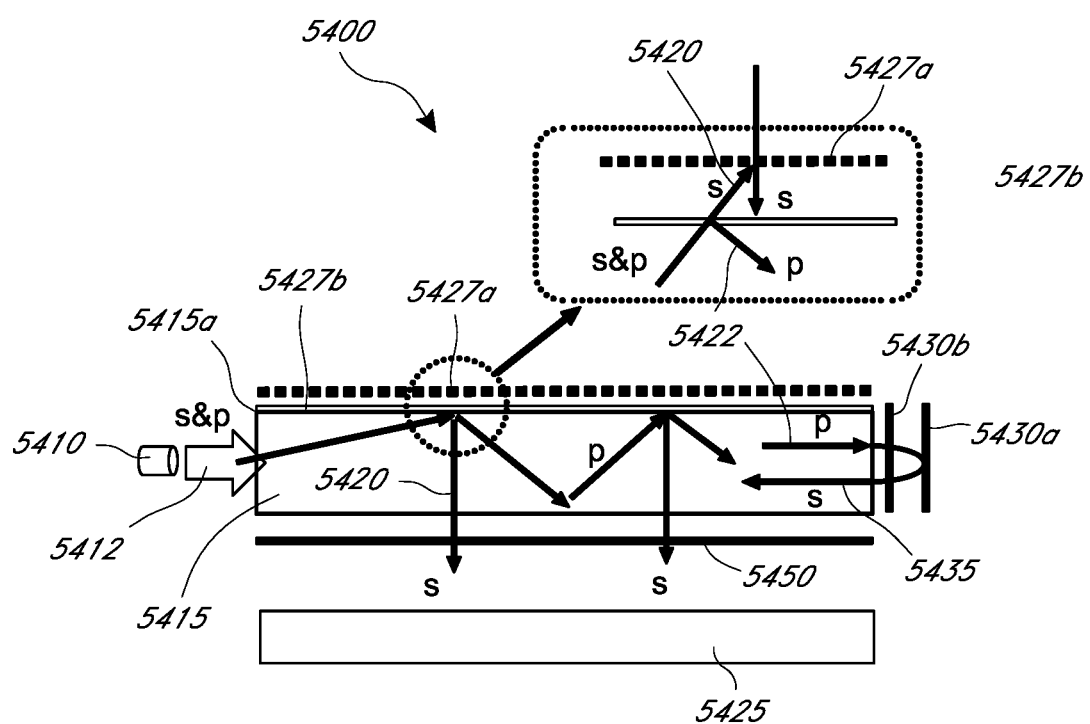
FIG. 36 illustrates an example of a display device incorporating a light recycling system to recycle light, according to some embodiments.

While FIGS. 32-34 are illustrated with waveguides 5015, 5115, 5215 having angled surfaces 5015*a*, 5115*a*, 5215*a*, various embodiments including a light recycling system may be incorporated in waveguides that have substantially planar surfaces. For example, FIGS. 35 and 36 illustrate two such examples. In some such embodiments, a display device 5300, 5400 can include at least one light emitter 5310, 5410 configured to emit light 5312, 5412 having more than one polarization state and a waveguide 5315, 5415 configured to receive the light 5312, 5412. The waveguide 5315, 5415 can eject out light 5320, 5420 having a first polarization state (e.g., s-polarization state) to a spatial light modulator 5325, 5425.

In various embodiments, the device 5300, 5400 can include one or more turning elements 5327, 5427*a* disposed relative to the waveguide 5315, 5415 (e.g., on or adjacent the waveguide surface 5315*a*, 5415*a*) to turn light guided within the waveguide 5315, 5415 out of the waveguide 5315, 5415 and to the spatial light modulator 5325, 5425. The turning elements 5327, 5427*a* can include one or more turning features configured to redirect light 5320, 5420 guided within the waveguide 5315, 5415 out of the waveguide 5315, 5415. The turning elements 5327, 5427*a* can include one or more nanostructures or microstructures configured to eject light 5320, 5420 having the first polarization state (e.g., s-polarization state) out of the waveguide 5315, 5415. The turning element may include, for example, one or more diffractive optical elements such as gratings, holographic optical elements, or other structures.

In some embodiments, the turning element can include a polarization sensitive turning element. The polarization sensitive turning element may include polarization sensitive microstructures or nanostructures. The polarization sensitive turning element may include gratings (e.g., highly sensitive), diffractive optical elements, holographic optical elements, etc. As illustrated in FIG. 35, some such nanostructures or gratings can direct light 5320 having the first polarization state (e.g., s-polarization state) to the spatial light modulator 5325, while light 5322 having the second polarization state (e.g., p-polarization state) can continue propagating through the waveguide 5315. For example, light having the polarization that is turned by the nanostructures or gratings (e.g., the first polarization state) can be out-coupled and/or reflected towards the spatial light modulator 5325, while light having the polarization that is not turned by the nanostructures or gratings (e.g., the second polarization state) can continue to propagate through the waveguide 5315.

In some embodiments, the nanostructures or gratings may not include polarization sensitive nanostructures or gratings, which is illustrated by FIG. 36. In some such embodiments, the device 5400 may also include a wire grid 5427*b* disposed between the waveguide 5415 (e.g., on or adjacent the waveguide surface 5415*a*) and the one or more nanostructures or gratings (e.g., 5427*a*).

The wire grid 5427*b* may be tuned to the wavelength of light produced by light emitter 5410, so as to reflect light of a specific polarization state and transmit light of another polarization state. For example, as illustrated in FIG. 36, the wire grid 5427*b* can be configured to transmit light 5420 having the first polarization state (e.g., s-polarization state) to the one or more nanostructures or gratings (e.g., 5427*a*) and reflect light 5422 having the second polarization state (e.g., p-polarization state). The nanostructures or gratings (e.g., 5427*a*) can then direct light 5420 having the first polarization state (e.g., s-polarization state) to the spatial light modulator 5425, while light 5422 having the second polarization state (e.g., p-polarization state) can continue propagating through the waveguide 5415.

In FIGS. 35 and 36, various embodiments can incorporate a light recycling system to convert the light 5322, 5422 having the second polarization state (e.g., p-polarization state) propagating through the waveguide 5315, 5415 to light 5335, 5435 having the first polarization state (e.g., s-polarization state). The light recycling system can include a reflective element 5330*a*, 5430*a* and a quarter wave retarder 5330*b*, 5430*b*.

The quarter wave retarder 5330*b*, 5430*b* may be transmissive and disposed with respect to an edge of the reflective element 5330*a*, 5430*a* to allow light not ejected to the spatial light modulator 5325, 5425 that reaches the edge of the waveguide 5315, 5415 to pass to the reflective element 5330*a*, 5430*a* after undergoing a 90° phase shift between orthogonal polarization states. The reflective element 5330*a*, 5430*a* can be configured to reflect light back to the quarter wave retarder 5330*b*, 5430*b*. As described with respect to FIG. 33, upon passing twice through the quarter wave retarder 5330*b*, 5430*b*, light 5322, 5422 undergoes a 180° phase shift between orthogonal polarization states. As a result, the second polarization state (e.g., p-polarization state) can be converted to light 5335, 5435 having the first polarization state (e.g., s-polarization state). Some such recycled light 5335, 5435 having the first polarization state (e.g., s-polarization state) can propagate back within the waveguide 5315, 5415 and be ejected out of the waveguide 5315, 5415 (e.g., via turning elements). Instead of light of the second polarization state (e.g., p-polarization state) being unused, the light having the second polarization state (e.g., p-polarization state) can be converted into light having the first polarization state (e.g., s-polarization state) that can be directed to and used by the spatial light modulator 5325, 5425 to contribute to producing an image, thereby improving the efficiency of the device.

As shown in FIGS. 35 and 36, some embodiments can also include a polarizer 5350, 5450 between the waveguide 5315, 5415 and the spatial light modulator 5325, 5425. Such a polarizer 5350, 5450 may be used to produce an intensity image from a spatial light modulator 5325, 5425 that operates on polarized light, selectively modulating the polarization state. The polarizer 5350, 5450 can transmit one linear polarization state and attenuate another polarization state such that the spatial light modulator 5325, 5425 by selectively controlling the polarization state on a pixel-by-pixel basis, has the effect of controlling the intensity on a pixel-by-pixel basis.

As described herein with respect to FIGS. 32-36, various designs can include a light recycling system to improve the efficiency of light usage of a device. Various features described with respect to other devices described herein can be incorporated with any features or combination of features of devices including a light recycling system. In addition, the example light recycling systems or any features or combination thereof described herein can be incorporated in any of the other designs described herein or combined with any features or combination of features of any other design described herein.

Figure 37:
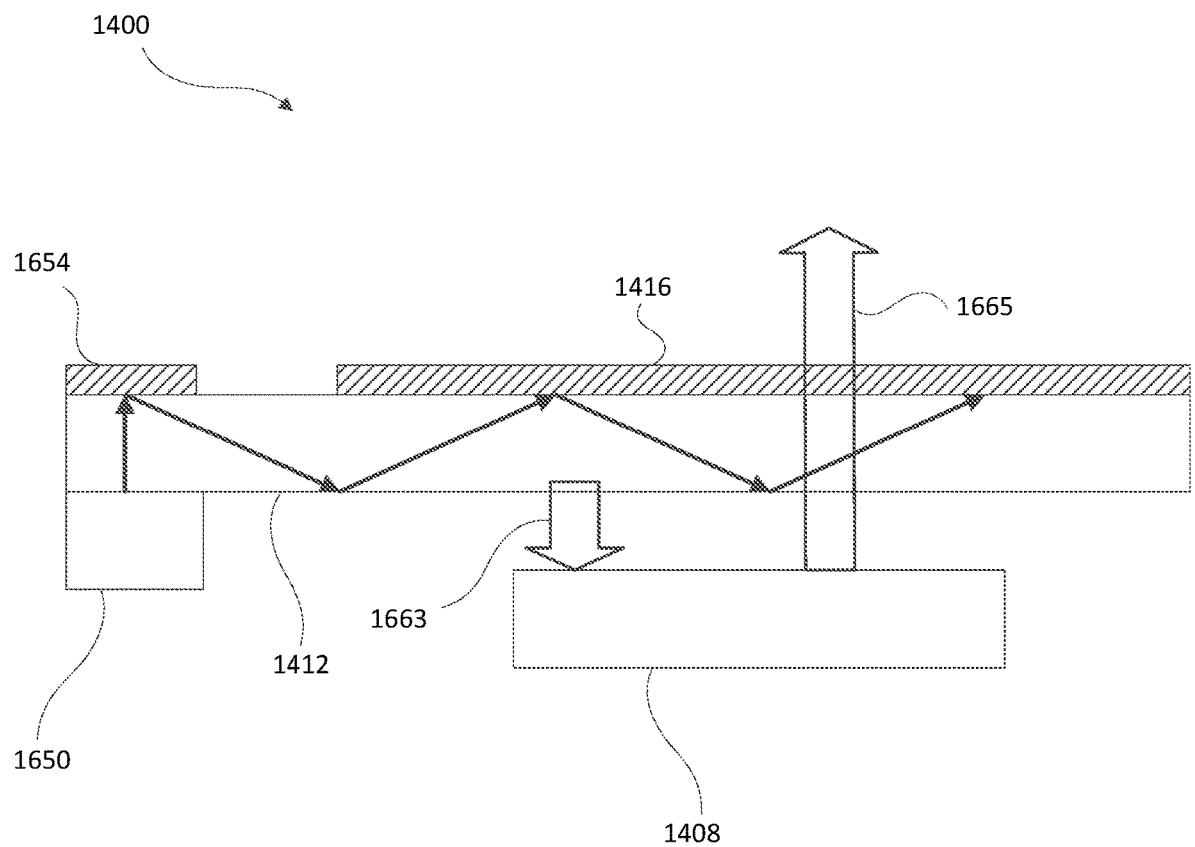
FIG. 37 illustrates an illumination device with an incoupling element that deflects light so as to couple into the light redirecting element, according to some embodiments.

FIG. 37 illustrates an illumination device 1400 with an in-coupling element 1654 that deflects light so as to couple into the waveguide 1412 wherein the in-coupling element 1654 is parallel to the in-coupling surface 1652 and the surface closest to the spatial light modulator 1408. The in-coupling element 1654 may include a diffraction grating or other diffractive optical element. In some designs, the in-coupling element 1654 is reflective and may include, for example, a dielectric coating (e.g., interference coating). The in-coupling element 1654 may also include micro- and/or nano-prism structure. As illustrated in FIG. 37, the light emitter 1650 injects light at the in-coupling surface 1652 into the waveguide 1412. At least a portion of the light (e.g., light of a certain polarization) is deflected (e.g., diffracted, reflected, etc.). The light may propagate through the waveguide 1412 via TIR. This waveguide 1412 may include a planar waveguide. The waveguide 1412 further includes light turning features 1416 disposed to receive the light propagating in the waveguide by TIR and to eject at least some of the light incident thereon. The light turning features 1416 are configured to eject the light 1663 toward a spatial light modulator 1408. The spatial light modulator 1408 may be disposed opposite the light turning features 1416 so as to receive light ejected by the light turning features 1416. As shown, the exiting light 1663 may be reflected by the spatial light modulator 1408 (e.g., in reflection modes). In some embodiments (e.g., transmission modes), the exiting light 1663 may be at least partially transmitted through the spatial light modulator 1408. As shown in FIG. 37, modulated light 1665 may propagate through the waveguide 1412 toward the output area 1436.

Figure 38:
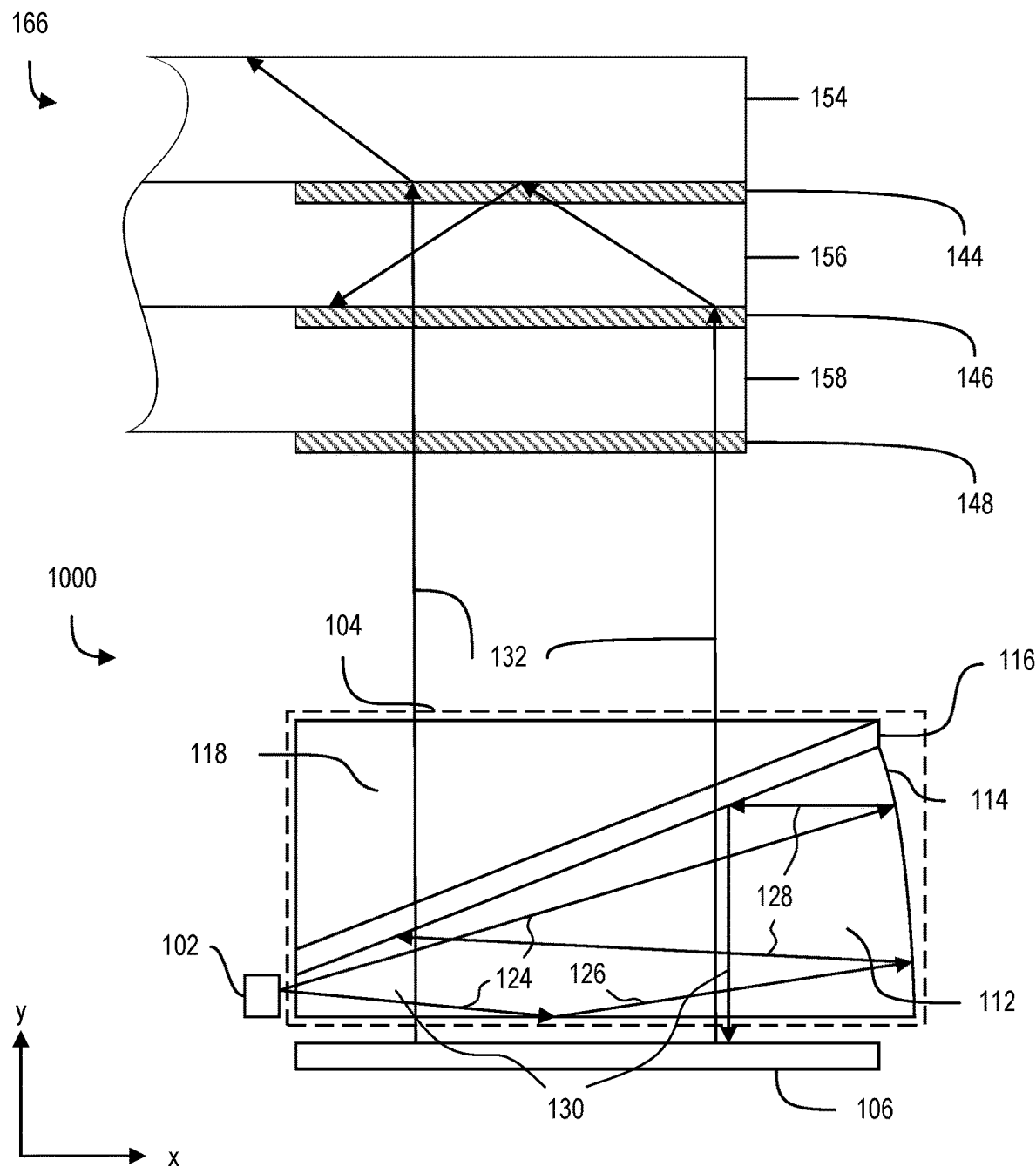
FIG. 38 illustrates an illumination module and a polarization beam splitter used in combination with an eyepiece to provide images thereto, according to some embodiments.

Polarizing beam splitters and illumination systems, as disclosed herein, may have a variety of applications. For example, such beam splitters and illumination systems may operate together in an augmented reality display device. An illumination system may be configured to be in optical communication with an eyepiece. In some implementations the eyepiece may comprise one or more waveguides disposed in the view of the user. As described herein, images can be presented to the user's eye when the eye is looking at the eyepiece. In certain implementation the eye piece comprises a waveguide stack although the use of the polarizing beam splitters and illumination systems such as described herein should not be so limited. FIG. 38 shows an example illumination system 1000 coupled to an eyepiece and in particular coupled to a waveguide stack 166 in the eyepiece. The illumination system 1000 may include any one or more features of illumination systems described herein. Additionally or alternatively, the waveguide stack 166 may include one or more features described with respect to waveguides, waveguide stacks (e.g., with respect to FIGS. 9A-9C) or eyepieces. The transmitted light 132 may be received by one or more incoupling optical elements 144, 146, 148. The illumination system 1000 can be in optical communication with (e.g., disposed along an optical axis of) the waveguide stack 166. In some implementations, the illumination system 1000 may be configured to abut one or more elements of the waveguide stack 166 or may be separated therefrom. For example, the refractive optical element 118 can be abut a surface of the waveguide 158 and/or the incoupling optical element 148. Abutment, however, is not required. The illumination system 1000 can be configured to direct light (e.g., the transmitted light 132) into the waveguide stack 166. In some embodiments, the transmitted light 132 may propagate between the illumination system 1000 and the waveguide stack 166 via a waveguide (e.g., an optical fiber). The transmitted light 132 may propagate through a transmissive medium (e.g., plastic, glass, air, etc.) between the polarizing beam splitter 104 and the waveguide stack 166. Other variants are possible.

The one or more incoupling optical elements 144, 146, 148 can be configured to couple light into corresponding waveguides 154, 156, 158. In some embodiments, the one or more incoupling optical elements 144, 146, 148 can be configured to couple light of a particular wavelength (e.g., red, blue, green, etc.). Additionally or alternatively, in certain implementations, the one or more incoupling optical elements 144, 146, 148 can be configured to couple light of corresponding depth planes (see, e.g., FIG. 6). The illumination module 102 may correspond to other elements described herein, such as a light module 540 (FIG. 6). The polarizing beam splitter 104 may correspond to other elements described herein, such as a beam splitter 550 (FIG. 6).

Accordingly, light sources and illumination modules described herein can be used with or without polarization beamsplitters and/or wedge waveguides to illuminate spatial light modulators to produce images that are directed to an eyepiece and displayed to a viewer. A wide range of variations of such systems (as well as subsystems and components) are possible.

Likewise, any characteristics or features discussed with regard to the illumination modules, polarization beamsplitters, wedge waveguide, light integrators, combination and/or components thereof herein can be applied to structures and concepts discussed elsewhere herein such as in connection with eyepieces or displays such as augmented or virtual reality displays. Similarly, any characteristics, features, or concepts with regard to eyepieces or displays such as augmented or virtual reality displays, head mounted displays, components thereof or any combination discussed herein can be applied to other structures, feature or concepts described herein such as illumination modules, polarization beamsplitter, wedge waveguide, light integrators, combination and/or components thereof. Accordingly, any characteristics or features discussed in this application can be applied to other structures and concepts discussed elsewhere herein.

EXAMPLE ASPECTS

Examples

Example Section I

1. A head mounted display system configured to project light to an eye of a user to display augmented reality image content in a vision field of said user, said head-mounted display system comprising:
 a frame configured to be supported on a head of the user; and
 an eyepiece disposed on the frame, at least a portion of said eyepiece being transparent and disposed at a location in front of the user's eye when the user wears said head-mounted display such that said transparent portion transmits light from the environment in front of the user to the user's eye to provide a view of the environment in front of the user, said eyepiece comprising one or more waveguides disposed to direct light into the user's eye,
 a light source configured to emit light;
 a wedge-shaped light turning element comprising:
  a first surface parallel to an axis;
  a second surface opposite to the first surface and inclined with respect to the axis by a wedge angle α;
  a light input surface between the first and the second surfaces configured to receive light emitted from a light source; and
  an end reflector disposed on a side opposite the light input surface;
  the second surface of said wedge-shaped light turning element is inclined such that a height of the light input surface is less than a height of the end reflector opposite the light input surface and such that light coupled into the wedge-shaped light turning element is reflected by the end reflector and redirected by the second surface towards the first surface,
 a spatial light modulator disposed with respect to said wedge-shaped light turning element to receive said light ejected from said wedge-shaped light turning element and modulate said light,
 wherein said wedge-shaped light turning element and said spatial light modulator are disposed with respect to said eyepiece to direct modulated light into said one or more waveguides of said eyepiece such that said modulated light is directed into the user's eye to form images therein.

2. The system of Example 1, wherein the wedge-shaped light turning element comprises a polarization selective element on the second surface, said polarization selective element configured to redirect light reflected by said end reflector towards the first surface.

3. The system of Example 1 or 2, wherein the polarization selective element comprises liquid crystal.

4. The system of any of Examples 1 to 3, wherein the polarization selective element comprises cholesteric liquid crystal.

The system of any of Examples 1 to 4, wherein the polarization selective element comprises a liquid crystal grating.

6. The system of any of Examples 1 to 5, wherein the polarization selective element comprises cholesteric liquid crystal comprising a cholesteric liquid crystal grating.

7. The system of any of Examples 1 to 6, wherein the polarization selective element comprises multiple layers of liquid crystal, different liquid crystal layers configured to diffract different wavelengths such that different wavelengths of light are directed toward said first surface.

8. The system of any of Examples 1 to 7, wherein the polarization selective element comprises multiple layers of cholesteric liquid crystal, different cholesteric liquid crystal layers configured to diffract different colors such that different colors of light are directed toward said first surface.

9. The system of Example 1, wherein the wedge-shaped light turning element comprises a plurality of turning features disposed on the second surface, said plurality of turning feature configured to redirect light reflected by said end reflector towards the first surface.

10. The system of Example 9, wherein the plurality of turning features include a polarization selective element.

11. The system of Example 10, wherein the polarization selective element comprises a thin film, a dielectric coating or a wire grid.

12. The system of any of Examples 9 or 10, wherein the plurality of turning features are configured to redirect a portion of the light received through the light input surface having a first polarization state towards the spatial light modulator.

13. The system of Example 12, wherein the wedge-shaped light turning element is configured to transmit a portion of the light reflected from the spatial light modulator having a second polarization state.

14. The system of any of Examples 10-13, wherein the plurality of turning features comprise prismatic turning features.

15. The system of any of Examples 10-14, wherein a turning feature comprises first and second portions, said first portion having a reflective coating thereon and said second portion not having said reflective coating.

16. The system of Example 15, wherein first and second portions comprise first and second facets.

17. The system of any of Examples 15-16, wherein the reflective coating may comprise a dielectric reflecting coating.

18. The system of any of Examples 15-16, wherein the reflective coating may comprise a polarization coating.

19. The system of any of Examples 10-17, wherein said turning features have curved surfaces.

20. The system of any of Examples 10-18, wherein the plurality of turning features are shaped to have positive optical power.

21. The system of any of Examples 10-18, wherein the plurality of turning features are shaped to have negative optical power.

22. The system of any of Examples 10-20, wherein the plurality of turning features have a pitch of 20 to 200 micrometer.

23. The system of any of Examples 1-22, wherein the end reflector comprises a curved reflector.

24. The system of Example 23, wherein the end reflector comprises a spherical or a parabolic mirror.

25. The system of any of Examples 1-22, wherein the end reflector comprises a reflective holographic structure comprising one or more holograms.

26. The system of any of Examples 1-22, wherein the end reflector is configured to collimate light from said light source and direct said collimated light to said second surface.

27. The system of any of Examples 1-26, wherein the spatial light modulator is a reflective spatial light modulator and the wedge-shaped light turning element is configured to transmit light reflected from the spatial light modulator therethrough.

28. The system of any of Examples 1-27, further comprising a refractive optical element disposed over the light turning element configured to compensate for refraction otherwise caused by the wedge-shaped light turning element.

29. The system of Example 28, wherein said refractive optical element has a shape that complements said wedge-shaped light turning element so as to reduce bending of light from said second surface of said wedge-shaped light turning element.

30. The system of any of Examples 28 or 29, wherein said refractive optical element has a wedge shape.

31. The system of any of Examples 28 to 30, further comprising a polarization selective component disposed over the refractive optical element.

32. The system of any of Examples 28 to 31, wherein said refractive optical element has a surface opposite said first surface of said wedge-shaped light turning element and said surface opposite said first surface of said wedge-shaped light turning element has an anti-reflective coating thereon.

33. The system of any of Examples 1-32, wherein said light input surface includes an anti-reflective coating thereon.

34. The system of any of Examples 28 to 33, wherein said refractive optical element has a surface opposite said end reflector and surface opposite said end reflector has an absorbing coating thereon.

35. The system of any of Examples 1-34, wherein the wedge angle $\alpha$ is between about 15 degrees and about 45 degrees.

36. The system of any of Examples 1-35, where the light source is disposed with respect to said input surface such that light from the source coupled into the wedge-shaped light turning element through said input surface is reflected by the end reflector and redirected by the plurality of turning features towards the first surface in an angular range between about 10 degrees with respect to a normal to the first surface.

37. The system of any of Examples 1-36, where the wedge-shaped light turning element comprises a waveguide, light from said light source total internally reflecting from at least said first surface.

38. The system of any of Examples 1-37, wherein the end reflector is configured to collimate the light from the emitter incident thereon.

39. The system of any of Examples 1-38, wherein input light surface includes turning features thereon to redirect light from the light source.

40. The system of any of Examples 1-39, wherein input light surface is orthogonal to said axis.

41. The system of any of Examples 1-40, wherein input light surface is tilted with an orthogonal to said axis.

42. The system of any of Examples 1-41, wherein said light source has an output face and an air gap is disposed between at least a portion of said output face of said light source and said input light surface of said wedge-shaped light turning element.

43. The system of any of Examples 1-42, wherein said light source has an output face and at least a portion of said output face of said light source contacts said input light surface of said wedge-shaped light turning element.

44. The system of any of Examples 1-43, wherein further comprising a deflector configured to deflect light input from said light source through said input light surface.

45. The system of any of Examples 1-44, wherein the light source is in optical communication with the input light surface of the wedge-shape light turning element via an optical fiber.

46. The system of any of Examples 1-45, wherein the light source comprises at least one of a laser or an LED.

47. The system of any of Examples 1-46, wherein the light source is configured to deliver at least red, green, and blue light into the wedge-shaped light turning element through the light input surface.

48. The system of any of Examples 1-47, wherein said light source comprises a plurality of emitters or illumination modules configured to output light.

49. The system of any of Examples 1-48, wherein said plurality of emitters or illumination modules each emit different color light.

50. The system of any of Examples 1-49, wherein different color light comprises red color light, green color light, and blue color light.

51. The system of any of Examples 1-50, wherein said light source comprises two emitters or two illumination modules configured to output light.

52. The system of any of Examples 1-50, wherein said light source comprises three emitters configured to output light.

53. The system of any of Examples 1-52, wherein the wedge-shaped light turning element and the one or more waveguides have lengths along a direction parallel to said axis and the length of the wedge-shaped light turning element is less than ⅓ the length of the one or more waveguides.

54. The system of any of Examples 1-53, wherein the wedge-shaped light turning element has length along a direction parallel to said axis and said length is a less than 10 mm.

55. The system of any of Examples 1-54, wherein the one or more waveguides in said eyepiece include one or more incoupling optical element and said wedge-shaped light turning element and spatial light modulator are disposed with respect to said one or more incoupling optical elements to direct light from said spatial light modulator therein.

Example Section II

1. An optical device comprising:
a wedge-shaped light turning element comprising:
   a first surface parallel to a horizontal axis;
   a second surface opposite to the first surface and inclined with respect to the horizontal axis by a wedge angle α;
   a light input surface between the first and the second surfaces configured to receive light emitted from a light source;
   an end reflector disposed on a side opposite the light input surface; and
   a plurality of light turning features disposed on the second surface,
wherein the second surface is inclined such that a height of the light input surface is less than a height of the side reflecting opposite the light input surface, and
wherein light coupled into the wedge-shaped light turning element is reflected by the end reflector and redirected by the plurality of turning features towards the first surface.

2. The optical device of Example 1, wherein the plurality of turning features include a polarization selective element.

3. The optical device of Example 2, wherein the polarization selective element comprises a thin film, a dielectric coating or a wire grid.

4. The optical device of any of Examples 1-3, wherein the end reflector comprises a spherical or a parabolic mirror configured to redirect light received through the light input surface along a direction parallel to the horizontal axis.

5. The optical device of any of Examples 1-3, wherein the end reflector comprises a reflective holographic structure comprising one or more holograms.

6. The optical device of any of Examples 1-5, further comprising a spatial light modulator disposed with respect to said first surface such that light coupled into the wedge-shaped light turning element through said input surface is reflected by the end reflector and redirected by the plurality of turning features towards the first surface and to said spatial light modulator.

7. The optical device of any of Examples 1-6, wherein the plurality of turning features are configured to redirect a portion of the light received through the light input surface having a first polarization state towards the spatial light modulator.

8. The optical device of any of Examples 1-7, wherein the plurality of turning features are configured to transmit a portion of the light reflected from the spatial light modulator having a second polarization state.

9. The optical device of any of Examples 1-8, further comprising a refractive optical element disposed over the light turning element.

10. The optical device of Example 9, further comprising a polarization selective component disposed over the refractive optical element.

11. The optical device of any of Examples 1-10, wherein the wedge angle α is between about 15 degrees and about 45 degrees.

12. The optical device of any of Examples 1-11, further comprising the light source disposed with respect to said input surface such that light from the source coupled into the wedge-shaped light turning element through said input surface is reflected by the end reflector and redirected by the plurality of turning features towards the first surface in an angular range between about 10 degrees with respect to a normal to the first surface.

13. The optical device of any of Examples 1-12, wherein the end reflector is configured to collimate the light from the emitter incident thereon.

Example Section III

1. A display device comprising:
one or more light emitters configured to emit light having more than one polarization state;
a waveguide disposed with respect to said one or more light emitters to receive light from said one or more light emitters such that at least some of said light is guided therein by total internal reflection, said waveguide configured to eject light having a first polarization state out of said waveguide;
a spatial light modulator disposed with respect to said waveguide to receive said light ejected from said waveguide and modulate said light; and
a light recycling system configured to convert light having a second polarization state to light having the first polarization state.

2. The display device of Example 1, wherein said light recycling system comprises a reflective element disposed with respect to an edge of said waveguide to reflect light not ejected to said spatial light modulator.

3. The display device of Example 2, wherein said light recycling system comprises a quarter wave retarder disposed with respect to said reflective element to allow light not ejected to said spatial light modulator to pass to said reflective element, wherein said reflective element is configured to reflect light back to said quarter wave retarder, such that light having the second polarization state is converted to light having the first polarization state.

4. The display device of any of Examples 1-3, further comprising one or more turning elements disposed relative to said waveguide to turn light guided within said waveguide out of said waveguide and to said spatial light modulator.

5. The display device of Example 4, wherein said one or more turning elements comprise one or more turning features configured to redirect light guided within said waveguide out of said waveguide.

6. The display device of Example 4 or 5, wherein said one or more turning elements comprise one or more microstructures or nanostructures configured to eject light having the first polarization state out of said waveguide.

7. The display device of Example 6, further comprising a wire grid disposed between said waveguide and said one or more microstructures or nanostructures, wherein said wire grid is configured to transmit light having the first polarization state to said one or more microstructures or nanostructures and reflect light having the second polarization state.

8. The display device of Example 6 or 7, wherein said one or more microstructures or nanostructures comprise one or more diffractive optical elements, or holographic optical elements.

9. The display device of Example 2, wherein said waveguide comprises an angled surface to reflect light having the first polarization state to said spatial light modulator and transmit light having the second polarization state.

10. The display device of Example 9, wherein said light recycling system comprises a polarization converter element disposed with respect to said reflective element to receive light reflected by said reflective element and convert light having the second polarization state to light having the first polarization state.

11. The display device of Example 9, wherein said light recycling system comprises a quarter wave retarder disposed with respect to said reflective element to allow light reflected by said reflected element to pass to a second reflective element configured to reflect light back to said quarter wave retarder, whereby light having the second polarization state is converted to light having the first polarization state.

12. The display device of Example 11, wherein said one or more light emitters is disposed at a location with respect to said waveguide and said reflective element is configured to reflect light away from the location of said one or more light emitters.

13. The display device of Example 11 or 12, wherein said second reflective element comprises a reflective coating.

14. The display device of any of Examples 11-13, wherein said light recycling system further comprises another reflective element disposed with respect to another edge of said waveguide to reflect light transmitted by the angled surface.

15. The display device of Example 14, wherein said another reflective element comprises a reflective coating.

16. The display device of Example 9, further comprising a second waveguide, wherein said light recycling system further comprises a half wave retarder configured to allow light transmitted by the angled surface to pass to said second waveguide, wherein said half wave retarder is configured to convert light having the second polarization state to light having the first polarization state.

17. The display device of Example 16, further comprising a second spatial light modulator, wherein said second waveguide is configured to eject light having the first polarization state to said second spatial light modulator.

18. The display device of Example 17, wherein said second waveguide comprises a second angled surface to reflect light having the first polarization state to said second spatial light modulator.

19. The display device of any of Examples 16-18, wherein the half wave retarder is disposed between said first and second waveguides.

20. The display device of any of Examples 9-19, wherein said reflective element comprises curvature.

21. The display device of Example 20, wherein said reflective element comprises a spherical mirror.

22. The display device of any of Examples 9-19, wherein said reflective element comprises a holographic optical element.

23. The display device of any of Examples 9-22, wherein said waveguide comprises one or more turning elements configured to turn light guided within said waveguide out of said waveguide and to said spatial light modulator.

24. The display device of Example 23, wherein said one or more turning elements comprise one or more turning features configured to redirect light guided within said waveguide out of said waveguide.

25. The display device of Example 23 or 24, wherein said one or more turning elements comprise one or more microstructures.

26. The display device of Example 25, wherein said one or more microstructures comprise a dielectric coating on one or more microprisms.

27. The display device of Example 25, wherein said one or more microstructures comprise a wire grid.

28. The display device of any of Examples 1-27, wherein said one or more light emitters comprise one or more light emitting diodes (LEDs).

29. The display system of Examples 1-27, wherein said one or more light emitters comprise one or more lasers.

30. The display device of any of Examples 1-29, wherein said spatial light modulator comprises a reflective spatial light modulator configured to reflect and modulate light incident thereon.

31. The display device of any of Examples 1-29, wherein said spatial light modulator comprises a transmissive spatial light modulator configured to modulate light transmitted through said spatial light modulator.

Example Section IV

1. An optical device comprising:
   a wedge-shaped light turning element comprising:
      a first surface parallel to a horizontal axis;
      a second surface opposite to the first surface and inclined with respect to the horizontal axis by a wedge angle $\alpha$;
   a light module configured to generate light;
   a fiber delivery system comprising an optical fiber in optical communication with the light module to receive light therefrom;
   a light input surface between the first and the second surfaces disposed with respect to said light delivery system to receive light emitted from the light module via the optical fiber; and
   an end reflector disposed on a side opposite the light input surface;
   wherein the second surface is inclined such that a height of the light input surface is less than a height of the side reflecting opposite the light input surface, and
   wherein light coupled into the wedge-shaped light turning element is reflected by the end reflector and reflected from the second surface towards the first surface.

2. The device of Example 1, wherein optical fiber comprises multimode fiber.

3. The device of Example 1 or 2, wherein optical fiber comprises polarization-maintaining fiber.

4. The device of any of Examples 1-3, wherein said light module comprises a plurality of light emitters.

5. The device of Example 4, wherein the plurality of light emitters comprises different color light emitters.

6. The device of any of Examples 1-5, wherein the light module comprise a least one laser.

7. The device of any of Examples 1-5, wherein the light module comprises a light emitting diode.

8. The device of Example 7, wherein the light emitting diode comprises a plurality of different color light emitting diodes.

9. The device of Example 7, wherein the light emitting diode comprises a superluminescent diode.

Example Section V

1. An optical device comprising:
   a wedge-shaped light turning element comprising:
      a first surface parallel to a horizontal axis;
      a second surface opposite to the first surface and inclined with respect to the horizontal axis by a wedge angle α;
   a light module comprising a laser configured to generate light;
   a light input surface between the first and the second surfaces in optical communication with said light module to receive light emitted from the laser; and
   an end reflector disposed on a side opposite the light input surface;
   wherein the second surface is inclined such that a height of the light input surface is less than a height of the side reflecting opposite the light input surface, and
   wherein light coupled into the wedge-shaped light turning element is reflected by the end reflector and reflected from the second surface towards the first surface.

2. The device of Example 1, wherein the laser comprises a fiber laser.

3. The device of Example 1 or 2, wherein the at least one laser comprises a plurality of different color lasers.

Example Section VI

4. An optical device comprising:
   a wedge-shaped light turning element comprising:
      a first surface parallel to a horizontal axis;
      a second surface opposite to the first surface and inclined with respect to the horizontal axis by a wedge angle α;
   a light module comprising a plurality of light emitters, said light module combining light for said plurality of emitters;
   a light input surface between the first and the second surfaces disposed with respect to said light module to receive light emitted from the plurality of emitters; and
   an end reflector disposed on a side opposite the light input surface;
   wherein the second surface is inclined such that a height of the light input surface is less than a height of the side reflecting opposite the light input surface, and
   wherein light coupled into the wedge-shaped light turning element is reflected by the end reflector and reflected from the second surface towards the first surface.

5. The device of Example 1, wherein light module comprises a least one wavelength dependent light-redirecting element configured to receive light from two light emitters.

6. The device of Example 1, wherein light module comprises a least two wavelength dependent light-redirecting element configured to receive light from three light emitters.

7. The device of any of Examples 1-3, wherein said plurality of light emitters comprise at least three emitters.

8. The device of any of Examples 1-4, wherein said at least three emitters comprise red, green, and blue emitters.

9. The device of any of Examples 4-5, wherein said light module comprises an x-cube in having three ports in optical communication said three emitters.

Example Section VII

1. An optical device comprising:
   a wedge-shaped light turning element comprising:
      a first surface parallel to a horizontal axis;
      a second surface opposite to the first surface and inclined with respect to the horizontal axis by a wedge angle α;
   a light module configured to generate light;
   a light input surface between the first and the second surfaces disposed with respect to said light module to receive light therefrom, said light input surface comprising microstructure or nanostructure; and
   an end reflector disposed on a side opposite the light input surface;
   wherein the second surface is inclined such that a height of the light input surface is less than a height of the side reflecting opposite the light input surface, and
   wherein light coupled into the wedge-shaped light turning element is reflected by the end reflector and reflected from the second surface towards the first surface.

2. The device of Example 1, wherein the microstructure or nanostructure is configured to redirect light input through said input surface.

3. The device of Example 1 or 2, wherein the light input surface comprises a diffractive optical element or diffraction grating.

4. The device of any of the above example, wherein the light module is configured to emit a cone of light, the cone of light having an angle of between about 10 degrees and 35 degrees from an axis of the cone.

5. The device of any of the above example, further comprising a spatial light modulator disposed with respect to the first surface to receive light reflected from the second surface.

Example Section VIII

1. A head mounted display system configured to project light to an eye of a user to display augmented reality image content in a vision field of said user, said head-mounted display system comprising:
   a frame configured to be supported on a head of the user; and
   an eyepiece disposed on the frame, at least a portion of said eyepiece being transparent and disposed at a location in front of the user's eye when the user wears said head-mounted display such that said transparent portion transmits light from the environment in front of the user to the user's eye to provide a view of the environment in front of the user, said eyepiece comprising one or more waveguides disposed to direct light into the user's eye,
   a light source configured to emit light;
   a polarization sensitive light turning element comprising:
      a first surface parallel to an axis;
      a second surface opposite to the first surface;

a light input surface between the first and the second surfaces configured to receive light emitted from a light source; and an end reflector disposed on a side opposite the light input surface;

the second surface of said polarization sensitive light turning element is such that light coupled into the polarization sensitive light turning element is reflected by the end reflector and redirected by the second surface towards the first surface, a spatial light modulator disposed with respect to said polarization sensitive light turning element to receive said light ejected from said polarization sensitive light turning element and modulate said light, wherein said polarization sensitive light turning element and said spatial light modulator are disposed with respect to said eyepiece to direct modulated light into said one or more waveguides of said eyepiece such that said modulated light is directed into the user's eye to form images therein.

2. The system of Example 1, wherein the polarization sensitive light turning element comprises a polarization selective element on the second surface, said polarization selective element configured to redirect light reflected by said end reflector towards the first surface.

3. The system of Example 1 or 2, wherein the polarization selective element comprises liquid crystal.

4. The system of any of Examples 1 to 3, wherein the polarization selective element comprises cholesteric liquid crystal.

The system of any of Examples 1 to 4, wherein the polarization selective element comprises a liquid crystal grating.

6. The system of any of Examples 1 to 5, wherein the polarization selective element comprises cholesteric liquid crystal comprising a cholesteric liquid crystal grating.

7. The system of any of Examples 1 to 6, wherein the polarization selective element comprises multiple layers of liquid crystal, different liquid crystal layers configured to diffract different wavelengths such that different wavelengths of light are directed toward said first surface.

8. The system of any of Examples 1 to 7, wherein the polarization selective element comprises multiple layers of cholesteric liquid crystal, different cholesteric liquid crystal layers configured to diffract different colors such that different colors of light are directed toward said first surface.

9. The system of Example 1, wherein the polarization sensitive light turning element comprises a plurality of turning features disposed on the second surface, said plurality of turning feature configured to redirect light reflected by said end reflector towards the first surface.

10. The system of Example 9, wherein the plurality of turning features includes a polarization selective element.

11. The system of Example 10, wherein the polarization selective element comprises a thin film, a dielectric coating or a wire grid.

12. The system of any of Examples 9 or 10, wherein the plurality of turning features are configured to redirect a portion of the light received through the light input surface having a first polarization state towards the spatial light modulator.

13. The system of Example 12, wherein the polarization sensitive light turning element is configured to transmit a portion of the light reflected from the spatial light modulator having a second polarization state.

14. The system of any of Examples 10-13, wherein the plurality of turning features comprise prismatic turning features.

15. The system of any of Examples 10-14, wherein a turning feature comprises first and second portions, said first portion having a reflective coating thereon and said second portion not having said reflective coating.

16. The system of Example 15, wherein first and second portions comprise first and second facets.

17. The system of any of Examples 15-16, wherein the reflective coating may comprise a dielectric reflecting coating.

18. The system of any of Examples 15-16, wherein the reflective coating may comprise a polarization coating.

19. The system of any of Examples 10-17, wherein said turning features have curved surfaces.

20. The system of any of Examples 10-18, wherein the plurality of turning features are shaped to have positive optical power.

21. The system of any of Examples 10-18, wherein the plurality of turning features are shaped to have negative optical power.

22. The system of any of Examples 10-20, wherein the plurality of turning features have a pitch of 20 to 200 micrometer.

23. The system of any of Examples 1-22, wherein the end reflector comprises a curved reflector.

24. The system of Example 23, wherein the end reflector comprises a spherical or a parabolic mirror.

25. The system of any of Examples 1-22, wherein the end reflector comprises a reflective holographic structure comprising one or more holograms.

26. The system of any of Examples 1-22, wherein the end reflector is configured to collimate light from said light source and direct said collimated light to said second surface.

27. The system of any of Examples 1-26, wherein the spatial light modulator is a reflective spatial light modulator and the polarization sensitive light turning element is configured to transmit light reflected from the spatial light modulator therethrough.

28. The system of any of Examples 1-27, further comprising a refractive optical element disposed over the light turning element configured to compensate for refraction otherwise caused by the polarization sensitive light turning element.

29. The system of Example 28, wherein said refractive optical element has a shape that complements said polarization sensitive light turning element so as to reduce bending of light from said second surface of said polarization sensitive light turning element.

30. The system of any of Examples 28 or 29, wherein said refractive optical element has a rectangular prism shape.

31. The system of any of Examples 28 to 30, further comprising a polarization selective component disposed over the refractive optical element.

32. The system of any of Examples 28 to 31, wherein said refractive optical element has a surface opposite said first surface of said polarization sensitive light turning element and said surface opposite said first surface of said polarization sensitive light turning element has an anti-reflective coating thereon.

33. The system of any of Examples 1-32, wherein said light input surface includes an anti-reflective coating thereon.

34. The system of any of Examples 28 to 33, wherein said refractive optical element has a surface opposite said end reflector and surface opposite said end reflector has an absorbing coating thereon.

35. The system of any of Examples 1-34, wherein the first surface is parallel to the second surface.

36. The system of any of Examples 9-35, where the light source is disposed with respect to said input surface such that light from the source coupled into the polarization sensitive light turning element through said input surface is reflected by the end reflector and redirected by the plurality of turning features towards the first surface in an angular range between about 10 degrees with respect to a normal to the first surface.

37. The system of any of Examples 1-36, where the polarization sensitive light turning element comprises a waveguide, light from said light source total internally reflecting from at least said first surface.

38. The system of any of Examples 1-37, wherein the end reflector is configured to collimate the light from the emitter incident thereon.

39. The system of any of Examples 1-38, wherein input light surface includes turning features thereon to redirect light from the light source.

40. The system of any of Examples 1-39, wherein input light surface is orthogonal to said axis.

41. The system of any of Examples 1-40, wherein input light surface is tilted with an orthogonal to said axis.

42. The system of any of Examples 1-41, wherein said light source has an output face and an air gap is disposed between at least a portion of said output face of said light source and said input light surface of said polarization sensitive light turning element.

43. The system of any of Examples 1-42, wherein said light source has an output face and at least a portion of said output face of said light source contacts said input light surface of said polarization sensitive light turning element.

44. The system of any of Examples 1-43, wherein further comprising a deflector configured to deflect light input from said light source through said input light surface.

45. The system of any of Examples 1-44, wherein the light source is in optical communication with the input light surface of the polarization sensitive light turning element via an optical fiber.

46. The system of any of Examples 1-45, wherein the light source comprises at least one of a laser or an LED.

47. The system of any of Examples 1-46, wherein the light source is configured to deliver at least red, green, and blue light into the polarization sensitive light turning element through the light input surface.

48. The system of any of Examples 1-47, wherein said light source comprises a plurality of emitters or illumination modules configured to output light.

49. The system of any of Examples 1-48, wherein said plurality of emitters or illumination modules each emit different color light.

50. The system of any of Examples 1-49, wherein different color light comprises red color light, green color light, and blue color light.

51. The system of any of Examples 1-50, wherein said light source comprises two emitters or two illumination modules configured to output light.

52. The system of any of Examples 1-50, wherein said light source comprises three emitters configured to output light.

53. The system of any of Examples 1-52, wherein the polarization sensitive light turning element and the one or more waveguides have lengths along a direction parallel to said axis and the length of the polarization sensitive light turning element is less than ⅓ the length of the one or more waveguides.

54. The system of any of Examples 1-53, wherein the polarization sensitive light turning element has length along a direction parallel to said axis and said length is a less than mm.

55. The system of any of Examples 1-54, wherein the one or more waveguides in said eyepiece include one or more incoupling optical elements and said polarization sensitive light turning element and spatial light modulator are disposed with respect to said one or more incoupling optical elements to direct light from said spatial light modulator therein.

56. The system of any of Examples 1-55, wherein the second surface is inclined such that a height of the light input surface is less than a height of the end reflector opposite the light input surface.

57. The system of any of Examples 1-56, wherein the second surface is inclined with respect to the axis by a wedge angle $\alpha$.

58. The system of Example 57, wherein the wedge angle $\alpha$ is between about 15 degrees and about 45 degrees.

59. The system of any of Examples 1-58, wherein said refractive optical element has a wedge shape.

Example Section IX

1. An illumination system comprising:
a light source configured to emit light;
a wedge-shaped light turning element comprising:
    a first surface parallel to an axis;
    a second surface opposite to the first surface and inclined with respect to the axis by a wedge angle $\alpha$;
    a light input surface between the first and the second surfaces configured to receive light emitted from a light source; and
    an end reflector disposed on a side opposite the light input surface;
    the second surface of said wedge-shaped light turning element is inclined such that a height of the light input surface is less than a height of the end reflector opposite the light input surface and such that light coupled into the wedge-shaped light turning element is reflected by the end reflector and redirected by the second surface towards the first surface,
a spatial light modulator disposed with respect to said wedge-shaped light turning element to receive said light ejected from said wedge-shaped light turning element and modulate said light.

2. The illumination system of Example 1, wherein the wedge-shaped light turning element comprises a polarization selective element on the second surface, said polarization selective element configured to redirect light reflected by said end reflector towards the first surface.

3. The illumination system of Example 1 or 2, wherein the polarization selective element comprises liquid crystal.

4. The illumination system of any of Examples 1 to 3, wherein the polarization selective element comprises cholesteric liquid crystal.

5. The illumination system of any of Examples 1 to 4, wherein the polarization selective element comprises a liquid crystal grating.

6. The illumination system of any of Examples 1 to 5, wherein the polarization selective element comprises cholesteric liquid crystal comprising a cholesteric liquid crystal grating.

7. The illumination system of any of Examples 1 to 6, wherein the polarization selective element comprises multiple layers of liquid crystal, different liquid crystal layers configured to diffract different wavelengths such that different wavelengths of light are directed toward said first surface.

8. The illumination system of any of Examples 1 to 7, wherein the polarization selective element comprises multiple layers of cholesteric liquid crystal, different cholesteric liquid crystal layers configured to diffract different colors such that different colors of light are directed toward said first surface.

9. The illumination system of Example 1, wherein the wedge-shaped light turning element comprises a plurality of turning features disposed on the second surface, said plurality of turning feature configured to redirect light reflected by said end reflector towards the first surface.

10. The illumination system of Example 9, wherein the plurality of turning features include a polarization selective element.

11. The illumination system of Example 10, wherein the polarization selective element comprises a thin film, a dielectric coating or a wire grid.

12. The illumination system of any of Examples 9 or 10, wherein the plurality of turning features are configured to redirect a portion of the light received through the light input surface having a first polarization state towards the spatial light modulator.

13. The illumination system of Example 12, wherein the wedge-shaped light turning element is configured to transmit a portion of the light reflected from the spatial light modulator having a second polarization state.

14. The illumination system of any of Examples 10-13, wherein the plurality of turning features comprise prismatic turning features.

15. The illumination system of any of Examples 10-14, wherein a turning feature comprises first and second portions, said first portion having a reflective coating thereon and said second portion not having said reflective coating.

16. The illumination system of Example 15, wherein first and second portions comprise first and second facets.

17. The illumination system of any of Examples 15-16, wherein the reflective coating may comprise a dielectric reflecting coating.

18. The illumination system of any of Examples 15-16, wherein the reflective coating may comprise a polarization coating.

19. The illumination system of any of Examples 10-17, wherein said turning features have curved surfaces.

20. The illumination system of any of Examples 10-18, wherein the plurality of turning features are shaped to have positive optical power.

21. The illumination system of any of Examples 10-18, wherein the plurality of turning features are shaped to have negative optical power.

22. The illumination system of any of Examples 10-20, wherein the plurality of turning features have a pitch of 20 to 200 micrometer.

23. The illumination system of any of Examples 1-22, wherein the end reflector comprises a curved reflector.

24. The illumination system of Example 23, wherein the end reflector comprises a spherical or a parabolic mirror.

25. The illumination system of any of Examples 1-22, wherein the end reflector comprises a reflective holographic structure comprising one or more holograms.

26. The illumination system of any of Examples 1-22, wherein the end reflector is configured to collimate light from said light source and direct said collimated light to said second surface.

27. The illumination system of any of Examples 1-26, wherein the spatial light modulator is a reflective spatial light modulator and the wedge-shaped light turning element is configured to transmit light reflected from the spatial light modulator therethrough.

28. The illumination system of any of Examples 1-27, further comprising a refractive optical element disposed over the light turning element configured to compensate for refraction otherwise caused by the wedge-shaped light turning element.

29. The illumination system of Example 28, wherein said refractive optical element has a shape that complements said wedge-shaped light turning element so as to reduce bending of light from said second surface of said wedge-shaped light turning element.

30. The illumination system of any of Examples 28 or 29, wherein said refractive optical element has a wedge shape.

31. The illumination system of any of Examples 28 to 30, further comprising a polarization selective component disposed over the refractive optical element.

32. The illumination system of any of Examples 28 to 31, wherein said refractive optical element has a surface opposite said first surface of said wedge-shaped light turning element and said surface opposite said first surface of said wedge-shaped light turning element has an anti-reflective coating thereon.

33. The illumination system of any of Examples 1-32, wherein said light input surface includes an anti-reflective coating thereon.

34. The illumination system of any of Examples 28 to 33, wherein said refractive optical element has a surface opposite said end reflector and surface opposite said end reflector has an absorbing coating thereon.

35. The illumination system of any of Examples 1-34, wherein the wedge angle $\alpha$ is between about 15 degrees and about 45 degrees.

36. The illumination system of any of Examples 1-35, where the light source is disposed with respect to said input surface such that light from the source coupled into the wedge-shaped light turning element through said input surface is reflected by the end reflector and redirected by the plurality of turning features towards the first surface in an angular range between about 10 degrees with respect to a normal to the first surface.

37. The illumination system of any of Examples 1-36, where the wedge-shaped light turning element comprises a waveguide, light from said light source total internally reflecting from at least said first surface.

38. The illumination system of any of Examples 1-37, wherein the end reflector is configured to collimate the light from the emitter incident thereon.

39. The illumination system of any of Examples 1-38, wherein input light surface includes turning features thereon to redirect light from the light source.

40. The illumination system of any of Examples 1-39, wherein input light surface is orthogonal to said axis.

41. The illumination system of any of Examples 1-40, wherein input light surface is tilted with an orthogonal to said axis.

42. The illumination system of any of Examples 1-41, wherein said light source has an output face and an air gap is disposed between at least a portion of said output face of said light source and said input light surface of said wedge-shaped light turning element.

43. The illumination system of any of Examples 1-42, wherein said light source has an output face and at least a portion of said output face of said light source contacts said input light surface of said wedge-shaped light turning element.

44. The illumination system of any of Examples 1-43, wherein further comprising a deflector configured to deflect light input from said light source through said input light surface.

45. The illumination system of any of Examples 1-44, wherein the light source is in optical communication with the input light surface of the wedge-shape light turning element via an optical fiber.

46. The illumination system of any of Examples 1-45, wherein the light source comprises at least one of a laser or an LED.

47. The illumination system of any of Examples 1-46, wherein the light source is configured to deliver at least red, green, and blue light into the wedge-shaped light turning element through the light input surface.

48. The illumination system of any of Examples 1-47, wherein said light source comprises a plurality of emitters or illumination modules configured to output light.

49. The illumination system of any of Examples 1-48, wherein said plurality of emitters or illumination modules each emit different color light.

50. The illumination system of any of Examples 1-49, wherein different color light comprises red color light, green color light, and blue color light.

51. The illumination system of any of Examples 1-50, wherein said light source comprises two emitters or two illumination modules configured to output light.

52. The illumination system of any of Examples 1-50, wherein said light source comprises three emitters configured to output light.

53. A head mounted display system configured to project light to an eye of a user to display augmented reality image content in a vision field of said user, said head-mounted display system comprising:
  a frame configured to be supported on a head of the user;
  an eyepiece disposed on the frame, at least a portion of said eyepiece being transparent and disposed at a location in front of the user's eye when the user wears said head-mounted display such that said transparent portion transmits light from the environment in front of the user to the user's eye to provide a view of the environment in front of the user, said eyepiece comprising one or more waveguides disposed to direct light into the user's eye, and
  the illumination system of any of Examples 1-52.

54. The system of Example 53, wherein said wedge-shaped light turning element and said spatial light modulator are disposed with respect to said eyepiece to direct modulated light into said one or more waveguides of said eyepiece such that said modulated light is directed into the user's eye to form images therein.

55. The system of any of Examples 53-54, wherein the wedge-shaped light turning element and the one or more waveguides have lengths along a direction parallel to said axis and the length of the wedge-shaped light turning element is less than ⅓ the length of the one or more waveguides.

56. The system of any of Examples 53-55, wherein the wedge-shaped light turning element has length along a direction parallel to said axis and said length is a less than mm.

57. The system of any of Examples 53-56, wherein the one or more waveguides in said eyepiece include one or more incoupling optical element and said wedge-shaped light turning element and spatial light modulator are disposed with respect to said one or more incoupling optical elements to direct light from said spatial light modulator therein.

Example Section X

1. An illumination system comprising:
  a light source configured to emit light;
  a polarization sensitive light turning element comprising:
    a first surface parallel to an axis;
    a second surface opposite to the first surface;
    a light input surface between the first and the second surfaces configured to receive light emitted from a light source; and
    an end reflector disposed on a side opposite the light input surface;
    the second surface of said polarization sensitive light turning element is such that light coupled into the polarization sensitive light turning element is reflected by the end reflector and redirected by the second surface towards the first surface,
  a spatial light modulator disposed with respect to said polarization sensitive light turning element to receive said light ejected from said polarization sensitive light turning element and modulate said light.

2. The illumination system of Example 1, wherein the polarization sensitive light turning element comprises a polarization selective element on the second surface, said polarization selective element configured to redirect light reflected by said end reflector towards the first surface.

3. The illumination system of Example 1 or 2, wherein the polarization selective element comprises liquid crystal.

4. The illumination system of any of Examples 1 to 3, wherein the polarization selective element comprises cholesteric liquid crystal.

5. The illumination system of any of Examples 1 to 4, wherein the polarization selective element comprises a liquid crystal grating.

6. The illumination system of any of Examples 1 to 5, wherein the polarization selective element comprises cholesteric liquid crystal comprising a cholesteric liquid crystal grating.

7. The illumination system of any of Examples 1 to 6, wherein the polarization selective element comprises multiple layers of liquid crystal, different liquid crystal layers configured to diffract different wavelengths such that different wavelengths of light are directed toward said first surface.

8. The illumination system of any of Examples 1 to 7, wherein the polarization selective element comprises multiple layers of cholesteric liquid crystal, different cholesteric liquid crystal layers configured to diffract different colors such that different colors of light are directed toward said first surface.

9. The illumination system of Example 1, wherein the polarization sensitive light turning element comprises a plurality of turning features disposed on the second surface, said plurality of turning feature configured to redirect light reflected by said end reflector towards the first surface.

10. The illumination system of Example 9, wherein the plurality of turning features include a polarization selective element.

11. The illumination system of Example 10, wherein the polarization selective element comprises a thin film, a dielectric coating or a wire grid.

12. The illumination system of any of Examples 9 or 10, wherein the plurality of turning features are configured to redirect a portion of the light received through the light input surface having a first polarization state towards the spatial light modulator.

13. The illumination system of Example 12, wherein the polarization sensitive light turning element is configured to transmit a portion of the light reflected from the spatial light modulator having a second polarization state.

14. The illumination system of any of Examples 10-13, wherein the plurality of turning features comprise prismatic turning features.

15. The illumination system of any of Examples 10-14, wherein a turning feature comprises first and second portions, said first portion having a reflective coating thereon and said second portion not having said reflective coating.

16. The illumination system of Example 15, wherein first and second portions comprise first and second facets.

17. The illumination system of any of Examples 15-16, wherein the reflective coating may comprise a dielectric reflecting coating.

18. The illumination system of any of Examples 15-16, wherein the reflective coating may comprise a polarization coating.

19. The illumination system of any of Examples 10-17, wherein said turning features have curved surfaces.

20. The illumination system of any of Examples 10-18, wherein the plurality of turning features are shaped to have positive optical power.

21. The illumination system of any of Examples 10-18, wherein the plurality of turning features are shaped to have negative optical power.

22. The illumination system of any of Examples 10-20, wherein the plurality of turning features have a pitch of 20 to 200 micrometer.

23. The illumination system of any of Examples 1-22, wherein the end reflector comprises a curved reflector.

24. The illumination system of Example 23, wherein the end reflector comprises a spherical or a parabolic mirror.

25. The illumination system of any of Examples 1-22, wherein the end reflector comprises a reflective holographic structure comprising one or more holograms.

26. The illumination system of any of Examples 1-22, wherein the end reflector is configured to collimate light from said light source and direct said collimated light to said second surface.

27. The illumination system of any of Examples 1-26, wherein the spatial light modulator is a reflective spatial light modulator and the polarization sensitive light turning element is configured to transmit light reflected from the spatial light modulator therethrough.

28. The illumination system of any of Examples 1-27, further comprising a refractive optical element disposed over the light turning element configured to compensate for refraction otherwise caused by the polarization sensitive light turning element.

29. The illumination system of Example 28, wherein said refractive optical element has a shape that complements said polarization sensitive light turning element so as to reduce bending of light from said second surface of said polarization sensitive light turning element.

30. The illumination system of any of Examples 28 or 29, wherein said refractive optical element has a rectangular prism shape.

31. The illumination system of any of Examples 28 to 30, further comprising a polarization selective component disposed over the refractive optical element.

32. The illumination system of any of Examples 28 to 31, wherein said refractive optical element has a surface opposite said first surface of said polarization sensitive light turning element and said surface opposite said first surface of said polarization sensitive light turning element has an anti-reflective coating thereon.

33. The illumination system of any of Examples 1-32, wherein said light input surface includes an anti-reflective coating thereon.

34. The illumination system of any of Examples 28 to 33, wherein said refractive optical element has a surface opposite said end reflector and surface opposite said end reflector has an absorbing coating thereon.

35. The illumination system of any of Examples 1-34, wherein the first surface is parallel to the second surface.

36. The illumination system of any of Examples 1-35, where the light source is disposed with respect to said input surface such that light from the source coupled into the polarization sensitive light turning element through said input surface is reflected by the end reflector and redirected by the plurality of turning features towards the first surface in an angular range between about 10 degrees with respect to a normal to the first surface.

37. The illumination system of any of Examples 1-36, where the polarization sensitive light turning element comprises a waveguide, light from said light source total internally reflecting from at least said first surface.

38. The illumination system of any of Examples 1-37, wherein the end reflector is configured to collimate the light from the emitter incident thereon.

39. The illumination system of any of Examples 1-38, wherein input light surface includes turning features thereon to redirect light from the light source.

40. The illumination system of any of Examples 1-39, wherein input light surface is orthogonal to said axis.

41. The illumination system of any of Examples 1-40, wherein input light surface is tilted with an orthogonal to said axis.

42. The illumination system of any of Examples 1-41, wherein said light source has an output face and an air gap is disposed between at least a portion of said output face of said light source and said input light surface of said polarization sensitive light turning element.

43. The illumination system of any of Examples 1-42, wherein said light source has an output face and at least a portion of said output face of said light source contacts said input light surface of said polarization sensitive light turning element.

44. The illumination system of any of Examples 1-43, wherein further comprising a deflector configured to deflect light input from said light source through said input light surface.

45. The illumination system of any of Examples 1-44, wherein the light source is in optical communication with the input light surface of the polarization sensitive light turning element via an optical fiber.

46. The illumination system of any of Examples 1-45, wherein the light source comprises at least one of a laser or an LED.

47. The illumination system of any of Examples 1-46, wherein the light source is configured to deliver at least red, green, and blue light into the polarization sensitive light turning element through the light input surface.

48. The illumination system of any of Examples 1-47, wherein said light source comprises a plurality of emitters or illumination modules configured to output light.

49. The illumination system of any of Examples 1-48, wherein said plurality of emitters or illumination modules each emit different color light.

50. The illumination system of any of Examples 1-49, wherein different color light comprises red color light, green color light, and blue color light.

51. The illumination system of any of Examples 1-50, wherein said light source comprises two emitters or two illumination modules configured to output light.

52. The illumination system of any of Examples 1-50, wherein said light source comprises three emitters configured to output light.

53. The illumination system of any of Examples 1-52, wherein the second surface is inclined such that a height of the light input surface is less than a height of the end reflector opposite the light input surface.

54. The illumination system of any of Examples 1-53, wherein the second surface is inclined with respect to the axis by a wedge angle α.

55. The illumination system of Example 54, wherein the wedge angle α is between about 15 degrees and about 45 degrees.

56. The illumination system of any of Examples 1-55, wherein said refractive optical element has a wedge shape.

57. A head mounted display system configured to project light to an eye of a user to display augmented reality image content in a vision field of said user, said head-mounted display system comprising:
a frame configured to be supported on a head of the user;
an eyepiece disposed on the frame, at least a portion of said eyepiece being transparent and disposed at a location in front of the user's eye when the user wears said head-mounted display such that said transparent portion transmits light from the environment in front of the user to the user's eye to provide a view of the environment in front of the user, said eyepiece comprising one or more waveguides disposed to direct light into the user's eye, and
the illumination system of any of Examples 1-56.

58. The system of Example 57, wherein said polarization sensitive light turning element and said spatial light modulator are disposed with respect to said eyepiece to direct modulated light into said one or more waveguides of said eyepiece such that said modulated light is directed into the user's eye to form images therein.

59. The system of any of Examples 57-58, wherein the polarization sensitive light turning element and the one or more waveguides have lengths along a direction parallel to said axis and the length of the polarization sensitive light turning element is less than ⅓ the length of the one or more waveguides.

60. The system of any of Examples 57-59, wherein the polarization sensitive light turning element has length along a direction parallel to said axis and said length is a less than mm.

61. The system of any of Examples 57-60, wherein the one or more waveguides in said eyepiece include one or more incoupling optical element and said polarization sensitive light turning element and spatial light modulator are disposed with respect to said one or more incoupling optical elements to direct light from said spatial light modulator therein.

Example Section XI

1. An illumination system comprising:
at least one light source configured to output light of first and second colors;
a light integrator comprising a plurality of side walls and an interior configured to propagate light therein, said light integrator having a first and a second end, said light integrator disposed with respect to said light source such that light from said at least one light source enters said first end and exits said second end, said light integrator comprising at least two color regions at said first end configured to transmit respective first and second colors of light therethrough, light of said first and second colors mixing with propagation through said light integrator; and
a spatial light modulator, said light integrator in an optical path between said at least one light source such that light from said light source that is output from said light integrator illuminates said spatial light modulator, the second spatial light modulator comprising a plurality of pixels configured to form images using light incident thereon.
wherein said light integrator includes a first color region of said first color and a second color regions of said second color, said first and second color regions having different size, shape, or both.

2. The illumination system of claim 1, wherein the light integrator comprises a solid medium for light propagation, the solid medium comprising an optically transmissive material.

3. The illumination system of claim 2, wherein said integrator is configured such that light propagate within said interior in said solid medium by total internal reflection.

4. The illumination system of any of the claims above, wherein the optically transmissive material comprises glass or plastic.

5. The illumination system of claim 1, wherein the light integrator is hollow.

6. The illumination system of any of the claims above, wherein the at least one light source comprises a plurality of different color emitters.

7. The illumination system of any of the claims above, wherein said one or more light sources outputs a third color and said light integrator further includes a third color region of said third color.

8. The illumination system of claim 7, wherein said first and third color regions having different size, shape, or both.

9. The illumination system of claim 7 or 8, wherein said second and third color regions having different size, shape, or both.

10. The illumination system of any of the claims above, wherein the at least one light source comprises red, green, and blue emitters such that said colors comprise red, green, and blue.

11. The illumination system of any of the claims above, further comprising one or more non-color regions separating said first and second color region.

12. The illumination system of claim 11, wherein the one or more non-color regions comprises a first non-color region and a second non-color region, the first non-color region disposed between the first and second color regions, and the second non-color region disposed between the second and third color regions.

13. The illumination system of any of the claims above, wherein each of the at least three color regions comprise respective color filters configured to transmit light of a corresponding color.

14. The illumination system of any of the claims above, wherein:
the first color region has a first area; and
the second color region has a second area,
wherein the first area is different from both the second area.

15. The illumination system of claim 14, wherein said one or more light sources outputs a third color and said light integrator further includes a third color region of said third color, and wherein:
the third color region has a third area,
wherein the first area is different from both the third area.

16. The illumination system of any of claims 7-15, wherein the size of the first and second and third color regions provide color balance.

17. The illumination system of any of the claims above, wherein the size of the first and second color regions are correlated to efficiencies of corresponding color light sources.

18. The illumination system of any of the claims above, wherein the light integrator comprises a rectangular prism.

19. The illumination system of any of the claims above, wherein the light integrator comprises a diffusive medium configured to diffuse light.

20. The illumination system of claim 19, wherein the diffusive medium is disposed within a volume of the light integrator.

21. The illumination system of any of the claims above, wherein a length of the light integrator is at least twice a height of the light integrator.

22. The illumination system of any of the claims above, wherein a length of the light integrator is between 1.0 mm and 5.0 cm.

23. The illumination system of any of the claims above, wherein a height of the light integrator is between 0.20 mm and 2.5 cm.

24. The illumination system of any of the claims above, further comprising a waveguide disposed in the optical path between said light integrator and said spatial light modulator, said waveguide configured to receive light from said light integrator to provide illumination to said spatial light modulator.

25. The illumination system of any of the claims above, further comprising a wedge-shaped turning element disposed in the optical path between said light integrator and said spatial light modulator, said wedge-shaped turning element configured to receive light from said light integrator to provide illumination to said spatial light modulator.

26. The illumination system of any of the claims above, further comprising a beamsplitter disposed in the optical path between said light integrator and said spatial light modulator, said beamsplitter configured to receive light from said light integrator to provide illumination to said spatial light modulator.

27. The illumination system of any of the claims above, further comprising a polarization sensitive reflector disposed in the optical path between said light integrator and said spatial light modulator, said polarization sensitive reflector configured to receive light from said light integrator to provide illumination to said spatial light modulator.

28. The illumination system of any of the claims above, further comprising a polarizing beamsplitter disposed in the optical path between said light integrator and said spatial light modulator, said polarizing beamsplitter configured to receive light from said light integrator to provide illumination to said spatial light modulator.

Example Section XII

1. A system comprising:
a light source configured to emit broadband light;
a first spatial light modulator disposed to receive light from the light source, the first spatial light modulator configured to selectively transmit light therethrough, the first spatial light modulator comprising a plurality of pixels and color filters associated therewith, the first spatial light modulator comprising:
one or more first regions configured to output light of a first color; and
one or more second regions configured to output light of a second color; and
a second spatial light modulator, said first spatial light modulator in an optical path between said light source and said second spatial light modulator such that light from said light source that is output from said first spatial light modulator illuminates said second spatial light modulator, the second spatial light modulator comprising a plurality of pixels configured to form images using light incident thereon.

2. The system of claim 1, wherein said first spatial light modulator further comprises one or more third regions configured to output light of a third color.

3. The system of claim 2 or 3 wherein said first, second, and third colors comprise red, green, and blue.

4. The system of any of the claims above, wherein said first spatial light modulator comprises a liquid crystal modulator.

5. The system of any of the claims above, wherein the first spatial light modulator further comprises a first polarizer, a second polarizer, and a modulator array configured to alter the polarization of light disposed between said first and second polarizers.

6. The system of any of the claims above, wherein the first spatial light modulator is configured to alter a polarization of light transmitted therethrough.

7. The system of any of the claims above, further comprising a color mixing element disposed in the optical path between the first spatial light modulator and the second spatial light modulator.

8. The system of any of the claims above, wherein the light source comprises a white light source.

9. The system of any of the claims above, wherein the light source comprises a white LED.

10. The system of any of the claims above, wherein the second spatial light modulator is configured to alter a polarization of light incident thereon.

11. The system of any of the claims above, further comprising a waveguide disposed in the optical path between said first spatial light modulator and said second spatial light modulator, said waveguide configured to receive light from said first spatial light modulator to provide illumination to said second spatial light modulator.

12. The system of any of the claims above, further comprising a wedge-shaped turning element disposed in the optical path between said first spatial light modulator and said second spatial light modulator, said wedge-shaped turning element configured to receive light from said first spatial light modulator to provide illumination to said second spatial light modulator.

13. The system of any of the claims above, further comprising a beamsplitter disposed in the optical path between said first spatial light modulator and said second spatial light modulator, said beamsplitter configured to receive light from said first spatial light modulator to provide illumination to said second spatial light modulator.

14. The system of any of the claims above, further comprising a polarization sensitive reflector disposed in the optical path between said first spatial light modulator and said second spatial light modulator, said polarization sensitive reflector configured to receive light from said first spatial light modulator to provide illumination to said second spatial light modulator.

15. The system of any of the claims above, further comprising a polarizing beamsplitter disposed in the optical path between said first spatial light modulator and said second spatial light modulator, said polarizing beamsplitter configured to receive light from said first spatial light modulator to provide illumination to said second spatial light modulator.

Example Section XIII

1. An illuminator comprising:
   at least one light source; and
   an elongate reflective structure comprising:
      a first sidewall and a second sidewall opposite the first sidewall;
      an input aperture configured to receive light from the at least one light source; and
      an exit aperture configured to emit light,
   wherein the elongate reflective structure is configured such that light from the at least one light source coupled into the elongate reflective structure through the input aperture propagates towards the exit aperture by multiple reflections from the first sidewall and the second sidewall.

2. The illuminator of Example 1, wherein the input aperture is located on the first sidewall and the exit aperture is located on the second sidewall.

3. The illuminator of Example 1, wherein the input aperture and the exit aperture are located on a same side of the elongate reflective structure.

4. The illuminator of any of Examples 1-3, wherein the at least one light source comprises a broadband light source.

5. The illuminator of any of Examples 1-4, wherein the at least one light source is configured to emit at least one of red, green or blue light.

6. The illuminator of any of Examples 1-3, wherein the at least one light source comprises a first source configured to emit red light, a second light source configured to emit green light and a third light source configured to emit blue light.

7. The illuminator of any of Examples 1-6, wherein the at least one light source comprises a light emitting diode (LED) or a laser.

8. The illuminator of any of Examples 1-7, wherein the elongate reflective structure comprises an optically transmissive medium.

9. The illuminator of any of Examples 1-8, wherein the elongate reflective structure comprises glass, plastic or acrylic.

10. The illuminator of any of Examples 1-9, wherein portions of an inner surface of the first sidewall are configured to be reflective.

11. The illuminator of any of Examples 1-10, wherein portions of an inner surface of the second sidewall are configured to be reflective.

12. The illuminator of any of Examples 10 or 11, wherein portions of the inner surface of the first sidewall or portions of the inner surface of the second sidewall comprise a reflective coating.

13. The illuminator of any of Examples 10-12, wherein portions of the inner surface of the first sidewall or portions of the inner surface of the second sidewall comprise a mirror coating.

14. The illuminator of any of Examples 10-12, wherein portions of the inner surface of the first sidewall or portions of the inner surface of the second sidewall are white.

15. The illuminator of any of Examples 10 or 11, wherein portions of the inner surface of the first sidewall or portions of the inner surface of the second sidewall are textured to provide diffuse reflection.

16. The illuminator of any of Examples 1-9, wherein the elongate reflective structure comprises a diffusive material.

17. The illuminator of Example 16, wherein the diffusive material is doped with diffusive particles.

18. The illuminator of Example 16, wherein the diffusive material comprises diffusing features or scattering features.

19. The illuminator of any of Examples 1-18, wherein an interior of the elongate structure is hollow.

20. The illuminator of any of Examples 1-18, wherein the elongate structure is solid.

21. The illuminator of any of Examples 1-20, wherein the elongate structure is a rectangular prism.

22. The illuminator of any of Examples 1-21, wherein a ratio of a length of the first sidewall or the second sidewall to a distance between the first sidewall and the second sidewall is at least greater than 2.

23. The illuminator of any of Examples 1-22, further comprising a polarization selective element configured to transmit light having a first polarization state and reflect light having a second polarization state.

24. The illuminator of Example 23, wherein reflected light having the second polarization state is recycled in the elongate structure.

25. The illuminator of any of Examples 23-24, wherein the polarization selective element is proximal to the exit aperture.

26. The illuminator of any of Examples 1-25, further comprising a light integrator configured to receive light from the exit aperture, wherein the light integrator is configured to direct light from the exit aperture and/or increase mixing.

27. A system comprising:
   a spatial light modulator comprising a plurality of pixels configured to form images using light incident thereon; and
   the illuminator of any of Examples 1-26.

28. The system of Example 27, further comprising a waveguide disposed in the optical path between the illuminator of any of Examples 1-26 and said spatial light modulator, said waveguide configured to receive light from the illuminator of any of Examples 1-26 to provide illumination to said spatial light modulator.

29. The system of any of Examples 27-28, further comprising a wedge-shaped turning element disposed in the optical path between the illuminator of any of Examples 1-26 and said spatial light modulator, said wedge-shaped turning element configured to receive light from the illuminator of any of Examples 1-26 to provide illumination to said spatial light modulator.

30. The system of any of Examples 27-29, further comprising a beamsplitter disposed in the optical path between the illuminator of any of Examples 1-26 and said spatial light modulator, said beamsplitter configured to receive light from the illuminator of any of Examples 1-26 to provide illumination to said spatial light modulator.

31. The system of any of Examples 27-30, further comprising a polarization sensitive reflector disposed in the optical path between the illuminator of any of Examples 1-26 and said spatial light modulator, said polarization sensitive reflector configured to receive light from the illuminator of any of Examples 1-26 to provide illumination to said spatial light modulator.

32. The system of any of Examples 27-31, further comprising a polarizing beam splitter disposed in the optical path between the illuminator of any of Examples 1-26 and said spatial light modulator, said polarizing beamsplitter configured to receive light from the illuminator of any of Examples 1-26 to provide illumination to said spatial light modulator.

Example Section XIV

1. A system comprising:
   a light source configured to emit broadband light;
   a switchable color filter disposed to receive light from the light source, the switchable color filter comprising:
      a first wavelength selective filter configured to attenuate transmission of light of a first color, said first wavelength selective filter controlled by an electrical signal; and
      a second wavelength selective filter configured to attenuate transmission of light of a second color, said second wavelength selective filter controlled by an electrical signal; and
   a spatial light modulator, said switchable color filter disposed in an optical path of said light source and said spatial light filter such that light from said light source that passes through said switchable filter illuminates said spatial light modulator, the spatial light modulator comprising a plurality of pixels configured to form images using light incident thereon.

2. The system of claim 1, wherein said first wavelength selective filter is configured to block transmission of light of said first color in response to an electrical signal, and said second wavelength selective filter is configured to block transmission of light of said second color in response to an electrical signal.

3. The system of claim 2 or 3, wherein said switchable color filter further comprises a third wavelength selective filter configured to attenuate transmission of light of a third color in response to an electrical signal, said third wavelength selective filter controlled by an electrical signal.

4. The system of claim 3, wherein said third wavelength selective filter is configured to block transmission of light of said second color in response to an electrical signal.

5. The system of any of the Claims above, wherein the light source is configured to emit white light.

6. The system of any of the Claims above, wherein the light source comprises a white LED.

7. The system of any of the Claims above, wherein the spatial light modulator comprises a liquid crystal spatial light modulator.

8. The system of any of the Claims above, further comprising a color mixing element disposed in the optical path between the switchable color filter and the spatial light modulator.

9. The system of any of the Claims above, wherein one or more of the wavelength selective filters comprise a cholesteric liquid crystal.

10. The system of any of the claims 3-9, wherein said first, second, and third colors are red, green, and blue.

11. The system of claim 10, wherein, in response to an absence of electrical signal, each of the first, second, and third wavelength selective filters is configured to transmit red, green, and blue light.

12. The system of any of the Claims above, wherein, in response to an absence of electrical signal, each of the first and second wavelength selective filters is configured to transmit the visible spectrum therethrough.

13. The system of any of the claims above, wherein:
   the first wavelength selective filter is configured to transmit light of the second color; and
   the second wavelength selective filter is configured to transmit light of the first color.

14. The system of any of claims 3-12, wherein:
   the first wavelength selective filter is configured to transmit light of both the second and third colors;
   the second wavelength selective filter is configured to transmit light of both the first and third colors; and
   the third wavelength selective filter is configured to transmit light of both the first and second colors.

15. The system of any of the claims above, wherein the first, second, and third wavelength selective filters are configured to be deactivated sequentially.

16. The system of any of the claims above, further comprising a waveguide disposed in the optical path between said light source and said spatial light modulator, said waveguide configured to receive light from said switchable color filter to provide illumination to said spatial light modulator.

17. The system of any of the claims above, further comprising a wedge-shaped turning element disposed in the optical path between said light source and said spatial light modulator, said wedge-shaped turning element configured to receive light from said switchable color filter to provide illumination to said spatial light modulator.

18. The system of any of the claims above, further comprising a beamsplitter disposed in the optical path between said light source and said spatial light modulator, said beamsplitter configured to receive light from said switchable color filter to provide illumination to said spatial light modulator.

19. The system of any of the claims above, further comprising a polarization sensitive reflector disposed in the optical path between said light source and said spatial light modulator, said polarization sensitive reflector configured to receive light from said switchable color filter to provide illumination to said spatial light modulator.

20. The system of any of the claims above, further comprising a polarizing beam splitter disposed in the optical path between said light source and said spatial light modulator, said polarizing beamsplitter configured to receive light from said switchable color filter to provide illumination to said spatial light modulator.

Example Section XV

1. A display device comprising:
   an illumination module comprising:
      at least one color mixing element comprising a first dichroic beam combiner element and a second dichroic beam combiner element;
      a plurality of light emitters comprising:
         a first light emitter configured to emit light of a first color into the at least one color mixing element; and
         a second light emitter configured to emit light of a second color into the at least one color mixing element, wherein the at least one color mixing element is configured to combine the light of the first color and the light of the second color;
a waveguide disposed with respect to the illumination module configured to receive at least some of the combined light from the illumination module such that at least some of the received light is guided therein by total internal reflection;
one or more turning elements disposed relative to the waveguide configured to redirect and eject light out of the waveguide; and
a spatial light modulator disposed with respect to the waveguide configured to receive and modulate light ejected from the waveguide.

2. The display device of Example 1, wherein the at least one color mixing element comprises an x-cube comprising the first and second dichroic beam combiner elements.

3. The display device of Example 1 or 2, wherein the plurality of light emitters comprises a third light emitter configured to emit light of a third color into the at least one color mixing element, and wherein the at least one color mixing element is configured to combine the light of the first color, the light of the second color, and the light of the third color.

4. The display device of Example 3, wherein the first dichroic beam combiner element is configured to reflect the light from the first light emitter, wherein the second dichroic beam combiner element is configured to reflect the light from the second light emitter, and wherein the first and second dichroic beam combiners are configured to transmit the light from the third light emitter.

5. The display device of Example 1, wherein the at least one color mixing element comprises:
a first color mixing element comprising the first dichroic beam combiner element; and
a second color mixing element comprising the second dichroic beam combiner element.

6. The display device of Example 5, wherein the first light emitter is configured to emit light of the first color into the first color mixing element, and wherein the second light emitter is configured to emit light of the second color into the second color mixing element.

7. The display device of Example 5 or 6, wherein the plurality of light emitters comprises a third light emitter configured to emit light of a third color into the second color mixing element, and wherein the first and second color mixing elements are configured to combine the light of the first color, the light of the second color, and the light of the third color.

8. The display device of any of Examples 5-7, wherein the first color mixing element and the second color mixing element are adjacent one another.

9. The display device of Example 5, wherein the at least one color mixing element comprises a third color mixing element comprising a third dichroic beam combiner element, wherein the plurality of light emitters comprises a third light emitter configured to emit light of a third color into the third dichroic beam combiner element, and wherein the first, second, and third color mixing elements are configured to combine the light of the first color, the light of the second color, and the light of the third color.

10. The display device of Example 1, wherein the plurality of light emitters comprises a third light emitter configured to emit light of a third color, wherein the illumination module further comprises a turning mirror configured to redirect light from the third emitter into the at least one color mixing element, and wherein the at least one color mixing element is configured to combine the light of the first color, the light of the second color, and the light of the third color.

11. The display device of Example 10, wherein the turning mirror comprises an inclined reflective surface.

12. The display device of Example 10 or 11, wherein the turning mirror comprises a prism.

13. The display device of any of Examples 1-12, wherein the at least one color mixing element comprises one or more prisms, cube prisms, rectangular prisms, microprisms, and/or beam combiner plates.

14. The display device of any of Examples 1-13, wherein the first and/or second dichroic beam combiner element comprises one or more dichroic reflectors, dichroic mirrors, dichroic films, dichroic coatings, and/or wavelength selective filters.

15. The display device of any of Examples 1-14, wherein the plurality of light emitters comprises one or more light emitting diodes (LEDs).

16. The display device of any of Examples 1-14, wherein the plurality of light emitters comprises one or more lasers.

17. The display device of any of Examples 1-16, wherein the plurality of light emitters is butt coupled to the at least one color mixing element.

18. The display device of any of Examples 1-16, wherein the plurality of light emitters is spaced from the at least one color mixing element.

19. The display device of any of Examples 1-18, wherein the illumination module comprises at least one diffuser.

20. The display device of Example 19, wherein the at least one color mixing element and the at least one diffuser are disposed along a common optical path such that the diffuser is configured to receive light from the plurality of light emitters.

21. The display device of any of Examples 1-20, wherein the illumination module comprises one or more beam-shaping optics disposed between the plurality of light emitters and the at least one color mixing element, the one or more beam-shaping optics configured to shape a beam of light entering the at least one color mixing element.

22. The display device of Example 21, wherein the one or more beam-shaping optics comprise one or more collimating lenses.

23. The display device of Example 22, wherein the one or more lenses have negative power.

24. The display device of any of Examples 1-23, wherein the waveguide comprises a wedge-shaped light turning element comprising:
a first surface parallel to a horizontal axis; and
a second surface opposite the first surface and inclined with respect to the horizontal axis by a wedge angle $\alpha$.

25. The display device of Example 24, wherein the wedge angle $\alpha$ is from about degrees to about 45 degrees.

26. The display device of any of Examples 1-25, wherein the waveguide comprises a light input surface configured to receive light emitted from the illumination module, and wherein the waveguide comprises a reflector disposed on a side opposite the light input surface.

27. The display device of any of Examples 1-26, further comprising a refractive optical element disposed over the waveguide.

28. The display device of any of Examples 1-27, wherein the spatial light modulator comprises a reflective spatial light modulator configured to reflect and modulate light incident thereon.

29. The display device of any of Examples 1-27, wherein the spatial light modulator comprises a transmissive spatial light modulator configured to module light transmitted through the spatial light modulator.

30. A head mounted display system configured to project light to an eye of a user to display augmented reality image content in a vision field of said user, said head-mounted display system comprising:
a frame configured to be supported on a head of the user;
an eyepiece disposed on the frame; and
the display device of any of Examples 1-29.

31. The head mounted display system of Example 30, wherein said waveguide and said spatial light modulator are disposed with respect to said eyepiece to direct said modulated light into said waveguide such that said modulated light is directed into the user's eye to form images therein.

Example Section XVI

1. An optical device comprising:
first and second color mixing elements, each comprising:
a first end and a second end, wherein the second end is larger than the first end such that a surface therebetween is inclined, wherein the first end of the first color mixing element is adjacent the second end of the second color mixing element such that the inclined surfaces of the first and second color mixing elements form a larger inclined surface, wherein the first color mixing element comprises a first dichroic beam combiner element, and wherein the second color mixing element comprises a second dichroic beam combiner element.

2. The optical device of Example 1, further comprising:
a plurality of light emitters comprising:
a first light emitter configured to emit light of a first color into the first color mixing element; and
a second light emitter configured to emit light of a second color into the second color mixing element.

3. The optical device of Example 2, wherein the plurality of light emitters comprises a third light emitter configured to emit light of a third color into the second color mixing element, and wherein the first and second color mixing elements are configured to combine the light of the first color, the light of the second color, and the light of the third color.

4. The optical device of Example 2 or 3, wherein first light emitter is configured to inject light into the inclined surface of the first color mixing element.

5. The optical device of Example 2 or 3, wherein first light emitter is configured to inject light into the surface opposite the inclined surface of the first color mixing element.

6. The optical device of any of Examples 2-5, wherein the second light emitter is configured to inject light into the inclined surface of the second color mixing element.

7. The optical device of any of Examples 2-5, wherein the second light emitter is configured to inject light into the surface opposite the inclined surface of the second color mixing element.

8. The optical device of any of Examples 1-7, wherein the first and second dichroic beam combiner elements are configured to direct light from the plurality of light emitters along a common optical path.

9. The optical device of Example 8, wherein the inclined surfaces of the first and second color mixing elements are inclined with respect to the common optical path.

10. The optical device of any of Examples 1-9, wherein the inclined surfaces of the first and second color mixing elements are coplanar with one another.

11. The optical device of Example 2, wherein the plurality of light emitters comprises a third light emitter configured to emit light of a third color, wherein the optical device further comprises a turning mirror configured to redirect light from the third emitter into the second color mixing element, and wherein the first and second color mixing elements are configured to combine the light of the first color, the light of the second color, and the light of the third color.

12. The optical device of Example 11, wherein the turning mirror comprises an inclined reflective surface.

13. The optical device of Example 11 or 12, wherein the turning mirror comprises a prism.

14. The optical device of any of Examples 1-13, wherein the first and/or second color mixing element comprises one or more prisms, cube prisms, rectangular prisms, microprisms, and/or beam combiner plates.

15. The optical device of any of Examples 1-14, wherein the first and/or second dichroic beam combiner element comprises one or more dichroic reflectors, dichroic mirrors, dichroic films, dichroic coatings, and/or wavelength selective filters.

16. The optical device of any of Examples 2-15, wherein the plurality of light emitters comprises one or more light emitting diodes (LEDs).

17. The optical device of any of Examples 2-15, wherein the plurality of light emitters comprises one or more lasers.

18. The optical device of any of Examples 2-17, wherein the first light emitter is butt coupled to the first color mixing element and/or the second light emitter is butt coupled to the second color mixing element.

19. The optical device of any of Examples 2-17, wherein the first light emitter is spaced from the first color mixing element and/or the second light emitter is spaced from the second color mixing element.

20. The optical device of any of Examples 2-19, further comprising at least one diffuser.

21. The optical device of Example 20, wherein the first and second color mixing elements and the at least one diffuser are disposed along a common optical path such that the diffuser is configured to receive light from the plurality of light emitters.

22. The optical device of any of Examples 2-21, further comprising one or more beam-shaping optics disposed between the plurality of light emitters and the first and/or second color mixing element, the one or more beam-shaping optics configured to shape a beam of light entering the first and/or second color mixing element.

23. The optical device of Example 22, wherein the one or more beam-shaping optics comprise one or more collimating lenses.

24. The optical device of Example 23, wherein the one or more lenses have negative power.

25. The optical device of any of Examples 2-24, further comprising:
a waveguide disposed with respect to the first and second color mixing elements configured to receive at least some light from the first and second color mixing elements such that at least some of the received light is guided therein by total internal reflection.

26. The optical device of Example 25, wherein the waveguide comprises a wedge-shaped light turning element comprising:
a first surface parallel to a horizontal axis; and
a second surface opposite the first surface and inclined with respect to the horizontal axis by a wedge angle $\alpha$.

27. The optical device of Example 26, wherein the wedge angle $\alpha$ is from about degrees to about 45 degrees.

28. The optical device of any of Examples 25-27, wherein the waveguide comprises a light input surface configured to receive light emitted from the first and second color mixing elements, and wherein the waveguide comprises a reflector disposed on a side opposite the light input surface.

29. The optical device of any of Examples 25-28, further comprising one or more turning elements disposed relative to the waveguide configured to redirect and eject light out of the waveguide.

30. The optical device of Example 29, wherein the one or more turning elements comprise one or more turning layers, polarization selective elements, diffractive optical elements, and/or holographic optical elements.

31. The optical device of any of Examples 25-30, further comprising a refractive optical element disposed over the waveguide.

32. The optical device of any of Examples 25-31, further comprising a spatial light modulator disposed with respect to the waveguide configured to receive and modulate light ejected from the waveguide.

33. The optical device of Example 32, wherein the spatial light modulator comprises a reflective spatial light modulator configured to reflect and modulate light incident thereon.

34. The optical device of Example 32, wherein the spatial light modulator comprises a transmissive spatial light modulator configured to module light transmitted through the spatial light modulator.

35. A head mounted display system configured to project light to an eye of a user to display augmented reality image content in a vision field of said user, said head-mounted display system comprising:
    a frame configured to be supported on a head of the user;
    an eyepiece disposed on the frame; and
    the optical device of any of Examples 32-34.

36. The head mounted display system of Example 35, wherein said waveguide and said spatial light modulator are disposed with respect to said eyepiece to direct said modulated light into said waveguide such that said modulated light is directed into the user's eye to form images therein.

Example Section XVII

1. An optical device comprising:
    waveguide comprising:
        a first surface parallel to a horizontal axis;
        a second surface opposite to the first surface;
        a third surface between the first and the second surfaces, the third surface comprising a reflecting element;
        a fourth surface opposite the third surface; and
        first and second dichroic beam combining elements disposed within the waveguide,
    wherein the first dichroic beam combining element is configured to reflect light of a first color from a first light emitter toward the reflecting element, wherein the second dichroic beam combining element is configured to reflect light of a second color from a second light emitter toward the reflecting element, and wherein the first and second dichroic beam combining elements are configured to combine the light of the first color and the light of the second color.

2. The optical device of Example 1, wherein the first and second dichroic beam combining elements are configured to transmit light of a third color from a third light emitter, and wherein the first and second dichroic beam combining elements are configured to combine the light of the first color, the light of the second color, and the light of the third color.

3. The optical device of any of Examples 1-2, wherein the first and/or second dichroic beam combiner element is tilted with respect to the first surface of the waveguide.

4. The optical device of any of Examples 1-3, wherein the first and/or second dichroic beam combiner element comprise one or more dichroic coatings or layers.

5. The optical device of any of Examples 1-4, wherein the waveguide comprises a wedge-shaped light turning element, wherein the second surface is inclined with respect to the horizontal axis by a wedge angle $\alpha$.

6. The optical device of Example 5, wherein the wedge angle $\alpha$ is between about degrees and about 45 degrees.

7. The optical device of any of Examples 2-6, further comprising a plurality of light emitters comprising the first, second, and third light emitters.

8. The optical device of Example 7, wherein the first light emitter is configured to inject light into the first surface of the waveguide.

9. The optical device of Example 7, wherein first light emitter is configured to inject light into the second surface of the waveguide.

10. The optical device of any of Examples 7-9, wherein the second light emitter is configured to inject light into the first surface of the waveguide.

11. The optical device of any of Examples 7-9, wherein the second light emitter is configured to inject light into the second surface of the waveguide.

12. The optical device of any of Examples 7-11, wherein the third light emitter is configured to inject light into the fourth surface of the waveguide.

13. The optical device of any of Examples 7-12, wherein the plurality of light emitters comprises one or more light emitting diodes (LEDs).

14. The optical device of any of Examples 7-12, wherein the plurality of light emitters comprises one or more lasers.

15. The optical device of any of Examples 1-14, further comprising one or more turning elements disposed relative to the waveguide configured to redirect and eject light out of the waveguide.

16. The optical device of Example 15, wherein the one or more turning elements comprise one or more turning layers, polarization selective elements, diffractive optical elements, and/or holographic optical elements.

17. The optical device of any of Examples 1-16, further comprising a refractive optical element disposed over the waveguide.

18. The optical device of any of Examples 1-17, further comprising a spatial light modulator disposed with respect to the waveguide configured to receive and modulate light ejected from the waveguide.

19. The optical device of Example 18, wherein the spatial light modulator comprises a reflective spatial light modulator configured to reflect and modulate light incident thereon.

20. The optical device of Example 18, wherein the spatial light modulator comprises a transmissive spatial light modulator configured to module light transmitted through the spatial light modulator.

21. A head mounted display system configured to project light to an eye of a user to display augmented reality image content in a vision field of said user, said head-mounted display system comprising:
    a frame configured to be supported on a head of the user;
    an eyepiece disposed on the frame; and
    the optical device of any of Examples 18-20.

22. The head mounted display system of Example 21, wherein said waveguide and said spatial light modulator are disposed with respect to said eyepiece to direct said modulated light into said waveguide such that said modulated light is directed into the user's eye to form images therein.

Example Section XVIII

1. An integrated optical device comprising:
   at least one dichroic combiner
   a plurality of light emitters comprising:
      a first light emitter configured to emit light of a first color into the at least one dichroic combiner; and
      a second light emitter configured to emit light of a second color into the at least one dichroic combiner; and
   a light integrator disposed adjacent the at least one dichroic combiner,
   wherein the at least one dichroic combiner is configured combine the light of the first color and the light of the second color, and wherein the light integrator is configured to receive at least some of the combined light from the at least one dichroic combiner.

2. The integrated optical device of Example 1, wherein the plurality of light emitters comprises a third light emitter configured to emit light of a third color into the at least one dichroic combiner, and wherein the at least one dichroic combiner is configured to combine the light of the first color, the light of the second color, and the light of the third color.

3. The integrated optical device of Example 2, wherein the at least one dichroic combiner comprises a first and second dichroic combining element, wherein the first dichroic combining element is configured to reflect the light from the first light emitter, wherein the second dichroic combining element is configured to reflect the light from the second light emitter, and wherein the first and second dichroic combining elements are configured to transmit the light from the third light emitter.

4. The integrated optical device of Example 2, wherein the at least one dichroic beam combiner comprises a single dichroic beam combining element, wherein the single dichroic beam combining element is configured to reflect the light from the first and second light emitters and to transmit the light from the third light emitter.

5. The integrated optical device of any of Examples 1-4, wherein the at least one dichroic beam combiner comprises one or more tilted surfaces configured to direct light from the plurality of light emitters along a common optical path.

6. The integrated optical device of Example 5, wherein the one or more tilted surfaces are inclined with respect to the common optical path.

7. The integrated optical device of any of Examples 1-6, wherein the at least one dichroic beam combiner comprises one or more dichroic coatings.

8. The integrated optical device of any of Examples 1-7, wherein the light integrator comprises diffusing features.

9. The integrated optical device of any of Examples 1-8, wherein the light integrator comprises hollow portions defined by inner reflective sidewalls through which light can propagate.

10. The integrated optical device of any of Examples 1-8, wherein the light integrator comprises solid optically transmissive material through which light can propagate via total internal reflection.

11. The integrated optical device of any of Examples 1-10, further comprising planar outer surfaces.

12. The integrated optical device of Example 11, wherein the planar outer surfaces have a shape of a rectangular prism.

13. A head mounted display system configured to project light to an eye of a user to display augmented reality image content in a vision field of said user, said head-mounted display system comprising:
   a frame configured to be supported on a head of the user;
   an eyepiece disposed on the frame;
   a waveguide configured to receive light emitted from the integrated optical device of any of Examples 1-12; and
   a spatial light modulator disposed with respect to said waveguide to receive and modulate light ejected from the waveguide.

14. The head mounted display system of Example 13, wherein said waveguide and said spatial light modulator are disposed with respect to said eyepiece to direct said modulated light into said waveguide such that said modulated light is directed into the user's eye to form images therein.

Example Section XIX

1. An optical device comprising:
   a wedge-shaped light turning element comprising:
      a first surface parallel to a horizontal axis;
      a second surface opposite to the first surface and inclined with respect to the horizontal axis by a wedge angle $\alpha$;
      a light input surface between the first and the second surfaces configured to receive light emitted from a light source;
      an end reflector disposed on a side opposite the light input surface; and
      a plurality of light turning features disposed on the second surface,
   wherein the second surface is inclined such that a height of the light input surface is less than a height of the side reflecting opposite the light input surface, and
   wherein light coupled into the wedge-shaped light turning element is reflected by the end reflector and redirected by the plurality of turning features towards the first surface.

2. The optical device of Example 1, wherein the plurality of turning features include a polarization selective element.

3. The optical device of Example 2, wherein the polarization selective element comprises a thin film, a dielectric coating or a wire grid.

4. The optical device of any of Examples 1-3, wherein the end reflector comprises a spherical or a parabolic mirror configured to redirect light received through the light input surface along a direction parallel to the horizontal axis.

5. The optical device of any of Examples 1-3, wherein the end reflector comprises a reflective holographic structure comprising one or more holograms.

6. The optical device of any of Examples 1-5, further comprising a spatial light modulator disposed with respect to said first surface such that light coupled into the wedge-shaped light turning element through said input surface is reflected by the end reflector and redirected by the plurality of turning features towards the first surface and to said spatial light modulator.

7. The optical device of any of Examples 1-6, wherein the plurality of turning features are configured to redirect a portion of the light received through the light input surface having a first polarization state towards the spatial light modulator.

8. The optical device of any of Examples 1-7, wherein the plurality of turning features are configured to transmit a portion of the light reflected from the spatial light modulator having a second polarization state.

9. The optical device of any of Examples 1-8, further comprising a refractive optical element disposed over the light turning element.

10. The optical device of Example 9, further comprising a polarization selective component disposed over the refractive optical element.

11. The optical device of any of Examples 1-10, wherein the wedge angle α is between about 15 degrees and about 45 degrees.

12. The optical device of any of Examples 1-11, further comprising the light source disposed with respect to said input surface such that light from the source coupled into the wedge-shaped light turning element through said input surface is reflected by the end reflector and redirected by the plurality of turning features towards the first surface in an angular range between about 10 degrees with respect to a normal to the first surface.

13. The optical device of any of Examples 1-12, wherein the end reflector is configured to collimate the light from the emitter incident thereon.

14. An optical device comprising:
  a wedge-shaped light turning element comprising:
    a first surface;
    a second surface opposite to the first surface and inclined with respect to the first surface by a wedge angle α;
    a light input surface between the first and the second surfaces configured to receive light emitted from a light source;
    an end reflector disposed on a side opposite the light input surface; and
    a plurality of light turning features disposed on the second surface,
  wherein the second surface is inclined such that a height of the light input surface is less than a height of the side reflecting opposite the light input surface, and
  wherein light coupled into the wedge-shaped light turning element is reflected by the end reflector and redirected by the plurality of turning features towards the first surface.

15. The optical device of Example 14, wherein the plurality of turning features include a polarization selective element.

16. The optical device of Example 15, wherein the polarization selective element comprises a thin film, a dielectric coating or a wire grid.

17. The optical device of any of Examples 14-17, wherein the end reflector comprises a spherical or a parabolic mirror configured to redirect light received through the light input surface along a direction parallel to the first surface.

18. The optical device of any of Examples 14-17, wherein the end reflector comprises a reflective holographic structure comprising one or more holograms.

19. The optical device of any of Examples 14-18, further comprising a spatial light modulator disposed with respect to said first surface such that light coupled into the wedge-shaped light turning element through said input surface is reflected by the end reflector and redirected by the plurality of turning features towards the first surface and to said spatial light modulator.

20. The optical device of any of Examples 14-19, wherein the plurality of turning features are configured to redirect a portion of the light received through the light input surface having a first polarization state towards the spatial light modulator.

21. The optical device of any of Examples 14-20, wherein the plurality of turning features are configured to transmit a portion of the light reflected from the spatial light modulator having a second polarization state.

22. The optical device of any of Examples 14-21, further comprising a refractive optical element disposed over the light turning element.

23. The optical device of Example 22, further comprising a polarization selective component disposed over the refractive optical element.

24. The optical device of any of Examples 14-23, wherein the wedge angle α is between about 15 degrees and about 45 degrees.

25. The optical device of any of Examples 14-24, further comprising the light source disposed with respect to said input surface such that light from the source coupled into the wedge-shaped light turning element through said input surface is reflected by the end reflector and redirected by the plurality of turning features towards the first surface in an angular range between about 10 degrees with respect to a normal to the first surface.

26. The optical device of any of Examples 14-25, wherein the end reflector is configured to collimate the light from the emitter incident thereon.

27. A method of manufacturing an optical device, the method comprising:
  providing a wedge shaped light turning element comprising:
    a first surface and a second surface inclined with respect to the first surface by a wedge angle α; and
    a light input surface intersecting the first surface and the second surface, the light input surface configured to receive light from a light source;
  providing a polarization selective element configured to be disposed over the second surface of the wedge shaped light turning element; and
  providing a reflector configured to be disposed on a side opposite the light input surface, the reflector configured to reflect light input to wedge shaped light turning element from the light source through the light input surface.

28. The method of Example 27, wherein providing a polarization selective element comprises:
  providing a plurality of layers of a transmissive material;
  patterning the plurality of layers with a polarization selective coating, the plurality of patterned layers comprising one or more regions comprising the polarization selective coating and one or more regions devoid of the polarization selective coating; and
  slicing the plurality of patterned layers to obtain the polarization selective element.

29. The method of Example 28, wherein the transmissive material comprises glass.

30. The method of Examples 27 or 28, wherein the polarization selective coating comprises one or more thin films.

31. The method of any of Examples 27-30, wherein slicing the plurality of patterned layers comprises slicing a stack of the plurality of patterned layers at an angle between about 5° and 65° with respect to a normal to the stack of the plurality of patterned layers.

32. The method of any of Examples 27-31, wherein the polarization selective element is configured to be molded or adhered to the second surface.

33. The method of any of Examples 27-32 further comprising providing a refractive optical element configured to be disposed over the wedge shaped light turning element, the refractive optical element comprising:
a planar surface;
an inclined surface inclined with respect to the planar surface by angle substantially equal to the wedge angle α; and
a surface intersecting the inclined surface and the planar surface,
wherein the refractive optical element is configured to be disposed over the wedge shaped light turning element with the inclined surface of the refractive optical element facing the second surface and the surface intersecting the inclined surface and the planar surface facing the reflector.

34. The method of Example 33, further comprising providing a light absorbing element on a side of the surface intersecting the inclined surface and the planar surface.

35. An optical device comprising:
a first major surface;
a second major surface inclined with respect to the first surface by an angle α;
a light input surface intersecting the first major surface and the second major surface and configured to receive light from a light source;
a reflector on a side opposite the light input surface and configured to reflect light from the light source received through the light input surface; and
a polarization selective element over the second major surface, the polarization selective element comprising:
a first transmissive surface;
a second transmissive surface;
one or more regions comprising a polarization selective coating between the first transmissive surface and the second transmissive surface; and
one or more regions devoid of the polarization selective coating between the first transmissive surface and the second transmissive surface,
wherein the one or more regions comprising the polarization selective coating are configured to turn light reflected from the reflector towards the first surface, and
wherein the one or more regions devoid of the polarization selective coating are configured to pass light reflected from the reflector.

36. The optical device of Example 35, wherein the angle α is between about 5° and about 80°.

37. The optical device of any of Examples 35-36, wherein the angle α is less than about 45°.

38. The optical device of any of Examples 35-37, wherein the angle α is between about 8° and about 35°.

39. The optical device of any of Examples 35-36, wherein the angle α is between about 5° and about 55°.

40. The optical device of any of Examples 35-39, wherein the one or more regions comprising the polarization selective coating are inclined at a transverse angle with respect to at least one of the first transmissive surface or the second transmissive surface.

41. The optical device of Example 40, wherein the transverse angle is between about 5° and about 65°.

42. The optical device of any of Examples 40-41, wherein the transverse angle is between about 10° and about 35°.

43. The optical device of any of Examples 40-42, wherein the transverse angle is about 21°.

44. The optical device of any of Examples 35-43, further comprising a refractive optical element comprising:
a planar surface;
an inclined surface inclined with respect to the planar surface by angle substantially equal to the wedge angle α; and
a surface intersecting the inclined surface and the planar surface,
wherein the refractive optical element is configured to be disposed over the second major surface such that the inclined surface of the refractive optical element faces the second major surface and the surface intersecting the inclined surface and the planar surface faces the reflector.

45. The optical device of Example 44, further comprising a light absorbing component disposed on a side of the surface intersecting the inclined surface and the planar surface of the refractive optical element.

46. The optical device of Example 45, wherein the surface intersecting the inclined surface and the planar surface of the refractive optical element comprises the light absorbing component.

47. The optical device of any of Examples 35-46, wherein the polarization selective coating comprises one or more thin films.

48. The optical device of any of Examples 35-46, wherein the polarization selective coating comprises a liquid crystal.

49. The optical device of Example 48, wherein the polarization selective coating comprises a cholesteric liquid crystal.

50. The optical device of any of Examples 35-46, wherein the polarization selective coating comprises a dielectric coating.

51. The optical device of any of Examples 35-50, wherein at least one of a curvature or a tilt of the reflector is configured to reflect light along a direction parallel to the first major surface.

52. The optical device of any of Examples 35-51, wherein the reflector comprises at least one of a curved mirror or a reflective holographic structure.

53. An optical device comprising:
a first major surface;
a second major surface inclined with respect to the first surface by an angle α;
a light input surface intersecting the first major surface and the second major surface and configured to receive light from a light source;
a reflector on a side opposite the light input surface and configured to reflect light from the light source received through the light input surface; and
a polarization selective element over the second major surface, the polarization selective element configured to turn at least a portion of light reflected from the reflector towards the first surface.

54. The optical device of Example 53, wherein the angle α is between about 5° and about 80°.

55. The optical device of any of Examples 53-54, wherein the angle α is less than about 45°.

56. The optical device of any of Examples 53-56, wherein the angle α is between about 8° and about 35°.

57. The optical device of any of Examples 53-55, wherein the angle α is between about 5° and about 55°.

58. The optical device of any of Examples 53-57, wherein the light turning element comprises a plurality of light turning features.

59. The optical device of Example 58, wherein the polarization selective element comprises at least one of a polarization selective coating, a liquid crystal element, a dielectric coating or a wire grid.

60. The optical device of any of Examples 53-59, further comprising a refractive optical element comprising:
   a planar surface;
   an inclined surface inclined with respect to the planar surface by angle substantially equal to the wedge angle α; and
   a surface intersecting the inclined surface and the planar surface,
   wherein the refractive optical element is configured to be disposed over the second major surface such that the inclined surface of the refractive optical element faces the second major surface and the surface intersecting the inclined surface and the planar surface faces the reflector.

61. The optical device of Example 60, further comprising a light absorbing component disposed on a side of the surface intersecting the inclined surface and the planar surface of the refractive optical element.

62. The optical device of Example 61, wherein the surface intersecting the inclined surface and the planar surface of the refractive optical element comprises the light absorbing component.

63. The optical device of any of Examples 53-62, wherein at least one of a curvature or a tilt of the reflector is configured to reflect light along a direction parallel to the first major surface.

64. The optical device of any of Examples 53-62, wherein at least one of a curvature or a tilt of the reflector is configured such that light reflected from the reflector converges towards a focal region on a side of the second major surface away from the first major surface.

65. The optical device of Example 64, wherein the polarization selective element comprises a plurality of turning features configured to provide optical power.

66. The optical device of any of Examples 53-65, wherein the reflector comprises at least one of a curved mirror or a reflective holographic structure.

67. A method of manufacturing an optical device comprising providing a plurality of layers of a transmissive material;
   disposing a polarization selective coating on the plurality of layers;
   stacking the plurality of layers comprising the polarization selective coating; and
   slicing the plurality of stacked layers to obtain the polarization selective element.

68. The method of Example 67, wherein the transmissive material comprises glass.

69. The method of Examples 67 or 68, wherein the polarization selective coating comprises one or more thin films.

70. The method of any of Examples 67-69, wherein slicing the plurality of stacked layers comprises slicing the plurality of stacked layers at an angle between about 5° and 65° with respect to a normal to the plurality of stacked layers.

71. The method of any of Examples 67-70, further comprising adhering individual layers of the plurality of stacked layers together with an adhesive.

72. The method of any of Examples 67-70, wherein the polarization selective element is configured to be molded or adhered to an optical component.

73. The method of any of Examples 67-72, wherein disposing the polarization selective coating on the plurality of layers comprises disposing the polarization selective coating on one or more regions of the plurality of layers such that one or more other regions of the plurality of layers are devoid of the polarization selective coating.

74. An optical device comprising:
   a first major surface and a second major surface;
   a light input surface intersecting the first major surface and the second major surface and configured to receive light from a light source;
   a reflector on a side opposite the light input surface and configured to reflect light from the light source received through the light input surface; and
   a polarization selective element over the second major surface, the polarization selective element comprising:
      a first transmissive surface;
      a second transmissive surface;
      one or more regions comprising a polarization selective coating between the first transmissive surface and the second transmissive surface; and
      one or more regions devoid of the polarization selective coating between the first transmissive surface and the second transmissive surface,
   wherein the one or more regions comprising the polarization selective coating are configured to turn light reflected from the reflector towards the first surface, and
   wherein the one or more regions devoid of the polarization selective coating are configured to pass light reflected from the reflector.

75. The optical device of Example 74, wherein the second major surface is inclined with respect to the first major surface at an angle α.

76. The optical device of Example 75, wherein the angle α is between about 5° and about 80°.

77. The optical device of any of Examples 75-76, wherein the angle α is less than about 45°.

78. The optical device of any of Examples 75-77, wherein the angle α is between about 8° and about 35°.

79. The optical device of any of Examples 75-78, wherein the angle α is between about 5° and about 55°.

80. The optical device of any of Examples 74-79, wherein the one or more regions comprising the polarization selective coating are inclined at a transverse angle with respect to at least one of the first transmissive surface or the second transmissive surface.

81. The optical device of Example 80, wherein the transverse angle is between about 5° and 65°.

82. The optical device of any of Examples 80-81, wherein the transverse angle is between about 10° and 35°.

83. The optical device of any of Examples 80-82, wherein the transverse angle is about 21°.

84. The optical device of any of Examples 74-83, further comprising a refractive optical element over the second major surface.

85. The optical device of Example 84, wherein the refractive optical element comprises a first surface, a second surface and a third surface intersecting the first and the second surfaces, wherein the refractive optical element is configured to be disposed over the second major surface such that the third surface intersecting faces the reflector.

86. The optical device of Example 85, further comprising a light absorbing component disposed on a side of the third surface of the refractive optical element.

87. The optical device of Example 86, wherein the third surface of the refractive optical element comprises the light absorbing component.

88. The optical device of any of Examples 74-87, wherein the polarization selective coating comprises one or more thin films.

89. The optical device of any of Examples 74-87, wherein the polarization selective coating comprises a liquid crystal.

90. The optical device of Example 88, wherein the polarization selective coating comprises a cholesteric liquid crystal.

91. The optical device of any of Examples 74-87, wherein the polarization selective coating comprises a dielectric coating.

92. The optical device of any of Examples 74-87, wherein at least one of a curvature or a tilt of the reflector is configured to reflect light along a direction parallel to the first major surface.

93. The optical device of any of Examples 74-87, wherein the reflector comprises at least one of a curved mirror or a reflective holographic structure.

94. An optical device comprising:
a first major surface;
a second major surface;
a light input surface intersecting the first major surface and the second major surface and configured to receive light from a light source;
a reflector on a side opposite the light input surface and configured to reflect light from the light source received through the light input surface; and
a light turning element over the second major surface, the light turning element configured to turn at least a portion of light reflected from the reflector towards the first surface.

95. The optical device of Example 94, wherein the second major surface is inclined with respect to the first major surface at an angle α between about 5° and about 80°.

96. The optical device of Example 95, wherein the angle α is less than about 45°.

97. The optical device of any of Examples 95-96, wherein the angle α is between about 8° and about 35°.

98. The optical device of any of Examples 95-97, wherein the angle α is between about 5° and about 55°.

99. The optical device of any of Examples 94-98, wherein the light turning element comprises a plurality of light turning features.

100. The optical device of Example 99, wherein the plurality of light turning features comprise a polarization selective element.

101. The optical device of Example 100, wherein the polarization selective elements comprise a polarization selective coating, a liquid crystal or a wire grid.

102. The optical device of any of Examples 99-101, wherein each of the plurality of light turning features comprise a pair of facets.

103. The optical device of Example 102, wherein at least one of the pair of facets is curved.

104. The optical device of any of Examples 102-103, wherein at least one of the pair of facets comprises the polarization selective element.

105. The optical device of any of Examples 100-104, wherein the polarization selective element is configured to reflect light having a first polarization state and transmit light having a second polarization state.

106. The optical device of any of Examples 100-105, wherein the polarization selective element comprises a plurality of thin films.

107. The optical device of any of Examples 100-105, wherein the polarization selective element comprises one or more dielectric layers.

108. The optical device of any of Examples 100-105, wherein the polarization selective element comprises a wire grid.

109. The optical device of any of Examples 100-105, wherein the polarization selective element is a broadband coating that is configured to reflect light at a plurality of wavelengths in the visible spectral range having a first polarization state and transmit light at the plurality of wavelengths in the visible spectral range having a second polarization state.

110. The optical device of any of Examples 100-109, wherein one of the pair of facets that receives light reflected from the reflector at least partially comprises the polarization selective element, and wherein the other of the pair of facets does not comprise the polarization selective element.

111. The optical device of any of Examples 100-110, wherein one of the pair of facets that receives light reflected from the reflector is inclined at an angle of about 45 degrees with respect to a normal to the first major surface and at least partially comprises the polarization selective element.

112. The optical device of Example 111, wherein the other of the pair of facets is inclined at an angle greater than about 45 degrees with respect to the normal to the first major surface and does not comprise the polarization selective element.

113. The optical device of Example 112, wherein the other of the pair of facets is parallel to the first major surface.

114. The optical device of any of Examples 112-113, wherein the other of the pair of facets does not receive light reflected from the reflector.

115. The optical device of any of Examples 94-114, further comprising a refractive optical element over the second major surface.

116. The optical device of Example 115, wherein the refractive optical element comprises a first surface over the second major surface, a second surface opposite the first surface and a third surface intersecting the first and the second surfaces and facing the reflector.

117. The optical device of Example 116, further comprising a light absorbing component disposed on a side of the third surface.

118. The optical device of Example 117, wherein the third surface comprises the light absorbing component.

119. The optical device of any of Examples 94-118, wherein at least one of a curvature or a tilt of the reflector is configured to reflect light along a direction parallel to the first major surface.

120. The optical device of any of Examples 94-119, wherein at least one of a curvature or a tilt of the reflector is configured such that light reflected from the reflector converges towards a focal region on a side of the second major surface away from the first major surface.

121. The optical device of any of Examples 94-120, wherein the reflector comprises at least one of a curved mirror or a reflective holographic structure.

122. The optical device of any of Examples 27-121, wherein the optical device comprises a waveguide.

123. The optical device of any of Examples 67-121, wherein the optical device comprises a wedge-shaped turning element.

124. The optical device of any of Examples 27-121, wherein the optical device comprises a beamsplitter.

125. The optical device of any of Examples 27-121, wherein the optical device comprises a polarization sensitive reflector.

126. The optical device of any of Examples 27-121, wherein the optical device comprises a polarizing beam splitter.

127. A system comprising:
a spatial light modulator;

at least one light source; and the optical device of any of Examples 27-121 disposed in an optical path between the at least one light source and the spatial light illuminator, wherein the optical device of any of Examples 27-121 is configured to receive light from the at least one light source and provide illumination to the spatial light modulator.

Various examples of devices (e.g., optical devices, display devices, illuminators, integrated optical devices, etc.) and systems (e.g., illumination systems) have been provided. Any of these devices and/or systems can be included in a head mounted display system to couple light (e.g., with one or more in-coupling optical elements) into a waveguide and/or eyepiece to form images. In addition, the devices and/or systems can be relatively small (e.g., less than 1 cm) such that one or more of the devices and/or systems can be included in a head mounted display system. For example, the devices and/or systems can be small with respect to the eyepiece (e.g., less than a third of the length and/or width of the eyepiece).

Various features have also been described with respect to example devices and systems. Any one or more of the features described in an example device or system can be used instead of or in addition to one or more features in another example device or system. For example, any of the features described herein can be implemented in a wedge-shaped light turning element, a waveguide, a polarization beam splitter, or a beam splitter.

Although illumination systems may be described above as waveguide based and comprising one or more waveguides, other types of light turning optical elements may be employed instead of a waveguide. Such light turning optical elements may include turning features to eject the light out of the light turning optical element, for example, onto the spatial light modulator. Accordingly, in any of the examples described herein as well as any of the examples below, any reference to waveguide may be replaced with light turning optical element instead of a waveguide. Such a light turning optical element may comprise, for example, a polarizing beam splitter such as a polarizing beam splitting prism.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an example combination may in some cases be excised from the combination, and the exampled combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the disclosure are not intended to be limited to the embodiments shown herein, but are to be accorded the widest scope consistent with this disclosure, the principles and the novel features disclosed herein.

What is claimed is:
1. An optical device comprising:
  a spatial light modulator; and
  a light turning element comprising:
    a waveguide including:
      a first surface parallel to a first axis;
      a second surface opposite to the first surface;
      a plurality of polarization selective light turning features directly on the second surface; and
      a light input surface between the first and the second surfaces, the light input surface arranged to receive light that is emitted from a light source and to couple the light into the waveguide; and an end reflector proximal to a side of the light turning element that is opposite the light input surface;

wherein the plurality of polarization selective light turning features are configured to: i) redirect, toward the first surface and the spatial light modulator, a first portion of the light that has a first polarization state, and ii) not redirect a second portion of the light that has a second polarization state different than the first polarization state, wherein at least a portion of the light coupled into the waveguide is reflected by the end reflector and redirected by the plurality of polarization selective light turning features toward the first surface and the spatial light modulator.

2. The optical device of claim 1, wherein the end reflector comprises a mirror configured to redirect light received through the light input surface along a direction that is substantially parallel to the first axis, and wherein the mirror is a spherical mirror or a parabolic mirror.

3. The optical device of claim 1, wherein the end reflector comprises a reflective holographic structure comprising one or more holograms.

4. The optical device of claim 1, wherein the plurality of polarization selective light turning features are configured to transmit, through the second surface, a portion of the light reflected from the spatial light modulator having a second polarization state different than the first polarization state.

5. The optical device of claim 1, further comprising a refractive optical element disposed over the light turning element.

6. The optical device of claim 5, further comprising a polarization selective component disposed over the refractive optical element.

7. The optical device of claim 1, wherein the end reflector is configured to collimate the light that is incident on the end reflector.

8. The optical device of claim 1, wherein the second surface is substantially parallel to the first axis.

9. The optical device of claim 1, further comprising the light source, wherein the light source is arranged with respect to the light input surface such that the light from the light source that is coupled into the waveguide is reflected by the end reflector and redirected by the plurality of polarization selective light turning features toward the first surface in an angular range between about −10 degrees and +10 degrees with respect to a normal to the first surface.

10. The optical device of claim 1, further comprising a quarter wave retarder arranged between the end reflector and the side of the waveguide that is opposite the light input surface.

11. The optical device of claim 10, wherein the quarter wave retarder is transmissive such that the light incident on the quarter wave retarder is transmitted to the end reflector.

12. The optical device of claim 11, wherein the quarter wave retarder is configured to convert, to the first polarization state, at least a portion of the light that is incident on the quarter wave retarder and that has the second polarization state.

13. The optical device of claim 1, wherein the first polarization state is an s-polarization state, and wherein the second polarization state is a p-polarization state.

14. The optical device of claim 1, wherein the plurality of polarization selective light turning features are included in one or more diffractive gratings on the second surface.

15. The optical device of claim 1, wherein the plurality of polarization selective light turning features include one or more holographic optical elements.

16. The optical device of claim 1, wherein the plurality of polarization selective light turning features include one or more of nanostructures or microstructures.

* * * * *